US008562489B2

(12) United States Patent
Burton et al.

(10) Patent No.: US 8,562,489 B2
(45) Date of Patent: Oct. 22, 2013

(54) ATHLETIC WATCH

(75) Inventors: Maximillian P. Burton, San Francisco, CA (US); Matt Capozzi, Portland, OR (US); Jamian R. Cobbett, Portland, OR (US); James Molyneux, Portland, OR (US); Aaron B. Weast, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 449 days.

(21) Appl. No.: 12/767,288

(22) Filed: Apr. 26, 2010

(65) Prior Publication Data

US 2011/0003665 A1 Jan. 6, 2011

Related U.S. Application Data

(60) Provisional application No. 61/172,769, filed on Apr. 26, 2009.

(51) Int. Cl.
*A63B 24/00* (2006.01)

(52) U.S. Cl.
USPC ......... 482/9; 482/1; 482/8; 482/901; 702/178

(58) Field of Classification Search
USPC ........ 482/1–9, 900–902; 702/178; 368/10, 11
See application file for complete search history.

(56) References Cited

U.S. PATENT DOCUMENTS 5,504,474 A 4/1996 Libman et al.
5,762,241 A 6/1998 Cross
5,769,290 A 6/1998 Pestana
5,946,274 A 8/1999 Yamaguchi et al.
6,013,008 A 1/2000 Fukushima
6,536,941 B1 3/2003 Fang
6,736,759 B1 5/2004 Stubbs et al.
6,837,827 B1 1/2005 Lee et al.
7,016,263 B2 * 3/2006 Gueissaz et al. ................ 368/10
7,057,551 B1 6/2006 Vogt
D545,220 S * 6/2007 Leung ............................ D10/31
7,345,954 B2 3/2008 Ehrsam et al.
7,398,151 B1 7/2008 Burrell et al.
7,510,508 B2 * 3/2009 Santomassimo et al. ......... 482/8
7,529,155 B2 5/2009 Fasciano
7,717,827 B2 5/2010 Kurunmaki et al.

(Continued)

FOREIGN PATENT DOCUMENTS

CN 1655097 8/2005
CN 2752825 1/2006

(Continued)

OTHER PUBLICATIONS

Chinese Office Action in related Chinese Patent Application No. 201080023090.6; issued Jul. 30, 2012.

(Continued)

*Primary Examiner* — Glenn Richman
(74) *Attorney, Agent, or Firm* — Banner & Witcoff, Ltd.

(57) ABSTRACT

A device for monitoring athletic performance of a user has a wristband configured to be worn by the user. An electronic module is removably attached to the wristband. The electronic module has a controller and a screen and a plurality of user inputs operably associated with the controller. The user inputs include a user input configured to be applied by the user against the screen and in a direction generally normal to the screen.

64 Claims, 159 Drawing Sheets

(56) References Cited

U.S. PATENT DOCUMENTS

| | | | | |
|---|---|---|---|---|
| 7,771,320 | B2 | 8/2010 | Riley et al. | |
| 7,789,802 | B2 | 9/2010 | Lee et al. | |
| 7,828,697 | B1 | 11/2010 | Oberrieder et al. | |
| 7,843,769 | B2 * | 11/2010 | Ishida et al. | 368/82 |
| 8,040,758 | B1 * | 10/2011 | Dickinson | 368/11 |
| 8,088,044 | B2 | 1/2012 | Tchao et al. | |
| 8,152,693 | B2 | 4/2012 | Nurmela et al. | |
| 2002/0055419 | A1 | 5/2002 | Hinnebusch | |
| 2004/0081025 | A1 | 4/2004 | Chen | |
| 2005/0033515 | A1 | 2/2005 | Bozzone | |
| 2005/0209051 | A1 * | 9/2005 | Santomassimo et al. | 482/8 |
| 2006/0136173 | A1 | 6/2006 | Case, Jr. et al. | |
| 2007/0033069 | A1 | 2/2007 | Rao et al. | |
| 2007/0091730 | A1 | 4/2007 | Ting | |
| 2007/0213955 | A1 * | 9/2007 | Ishida et al. | 702/178 |
| 2007/0246494 | A1 | 10/2007 | Kim et al. | |
| 2008/0204225 | A1 | 8/2008 | Kitchen | |
| 2009/0047645 | A1 | 2/2009 | Dibenedetto et al. | |
| 2009/0048070 | A1 | 2/2009 | Vincent et al. | |
| 2009/0280861 | A1 | 11/2009 | Khan | |
| 2011/0003665 | A1 | 1/2011 | Burton et al. | |
| 2011/0281687 | A1 | 11/2011 | Gilley et al. | |

FOREIGN PATENT DOCUMENTS

| | | | |
|---|---|---|---|
| CN | 101111743 | A | 1/2008 |
| CN | 101329600 | | 12/2008 |
| EP | 0700661 | A2 | 3/1996 |
| EP | 0700661 | A3 | 5/1998 |
| EP | 1833103 | | 9/2007 |
| EP | 2025369 | | 2/2009 |
| GB | 2424084 | | 9/2006 |
| JP | H11-178798 | | 7/1999 |
| JP | 2000-300711 | | 10/2000 |
| JP | 2001-289975 | | 10/2001 |
| JP | 2002-022859 | | 1/2002 |
| JP | 2002-507734 | | 3/2002 |
| JP | 2002-300632 | | 10/2002 |
| JP | 2002-306660 | | 10/2002 |
| JP | 2003-236028 | | 8/2003 |
| JP | 2006-058806 | | 3/2006 |
| JP | 2009-050699 | | 3/2009 |
| JP | 2009-078134 | | 4/2009 |
| KR | 10-0724887 | | 6/2007 |
| KR | 10-2008-0022680 | | 3/2008 |
| KR | 10-2009-0029695 | | 3/2009 |
| WO | 2004100059 | | 11/2004 |
| WO | 2006065679 | | 6/2006 |
| WO | 2007135389 | | 11/2007 |
| WO | 2008050590 | | 5/2008 |
| WO | 2008056524 | | 5/2008 |
| WO | 2008101085 | | 8/2008 |
| WO | 2009030484 | | 3/2009 |
| WO | 2009033034 | | 3/2009 |

OTHER PUBLICATIONS

International Search Report in corresponding PCT Application, International Application No. PCT/US2010/032391, mailed Jul. 16, 2010.

Polar Electro Oy: "Polar RS200 User Manual" Company website. 2005, XPOO2585994, retrieved from the internet: URL: http://support.polar.fi/gip/PKBStoGIP. nsf/4eb122f6011156bec22573e0003779ed/c225742500419a8ac225702e004619aa/$FILE/Polar_RS200_user_manual_English.pdf [retrieved on Jul. 5, 2010].

International Search Report in corresponding PCT Application, International Application No. PCT/US2010/032381, mailed Jul. 22, 2010.

Garmin: "Forerunner 405CX owner's manual" Company website Mar. 2009, XP002587382 Retrieved from the Internet: URL:http://www8.garmin.com/manuals/Forerunner405CX_OwnersManual.pdf [retrieved on Jul. 7, 2010] pp. 33, 37, 38.

Garmin: "Foot Pod" Company website Oct. 2008, XP002587384 Retrieved from the Internet: URL: http://www8.garmin.com/manuals/FootPod_Instructions_Multlingual_.pdf [retrieved onJul. 7, 2010] pp. EN-1-EN-4.

European Office Action from European Patent Application No. 10717937.6; issued Aug. 29, 2012.

International Preliminary Report in related PCT Patent Application No. PCT/US2010/032381, dated Nov. 10, 2011.

U.S. Non Final Office Action in related U.S. Appl. No. 12/767,308; mailed Feb. 28, 2012.

International Search Report in corresponding PCT Application, International Application No. PCT/US2010/032401, mailed Jul. 14, 2010.

Garmin Owner's Manual Forerunner 405CX GPS-Enabled Sports Watch With Wireless Sync Mar. 2009.

Office Action dated Jul. 30, 2012 Chinese Appln. No. 201080023164.6.

U.S. Non Final Office Action from U.S. Appl. No. 12/767,425; dated Dec. 4, 2012.

Korean Office Action from Korean Patent Application No. 10-2011-7028263; dated Dec. 20, 2012.

Korean Office Action from Korean Patent Application No. 10-2011-7028262; dated Feb. 27, 2013.

U.S. Final Office Action from U.S. Appl. No. 12/767,308; dated Dec. 19, 2012.

European Office Action from European Patent Application No. 10717937.6; dated Mar. 1, 3013.

U.S. Office Action from U.S. Appl. No. 12/767,447; dated Jan. 3, 2013.

Chinese Office Action from Chinese Patent Application No. 201080023164.6; issued Jan. 18, 2013.

European Office Action from European Patent Application No. 10719155.3; dated Aug. 29, 2012.

Chinese Office Action from Chinese Patent Application No. 201080023090.6; issued Mar. 27, 2013.

European Search Report from European Patent Application No. 13151122.2; dated Mar. 27, 2013.

International Search Report from International Application No. PCT/US2012/071700 dated Jun. 11, 2013.

Japanese Office Action from Japanese Patent Application No. 2012-507466 dated Jun. 17, 2013.

Japanese Office Action from Japanese Patent Application No. 2012-507467 dated Jun. 13, 2013.

U.S. Office Action from U.S. Appl. No. 12/767,308 dated Jun. 19, 2013.

U.S. Final Office Action from U.S. Appl. No. 12/767,425 dated Jul. 17, 2013.

* cited by examiner

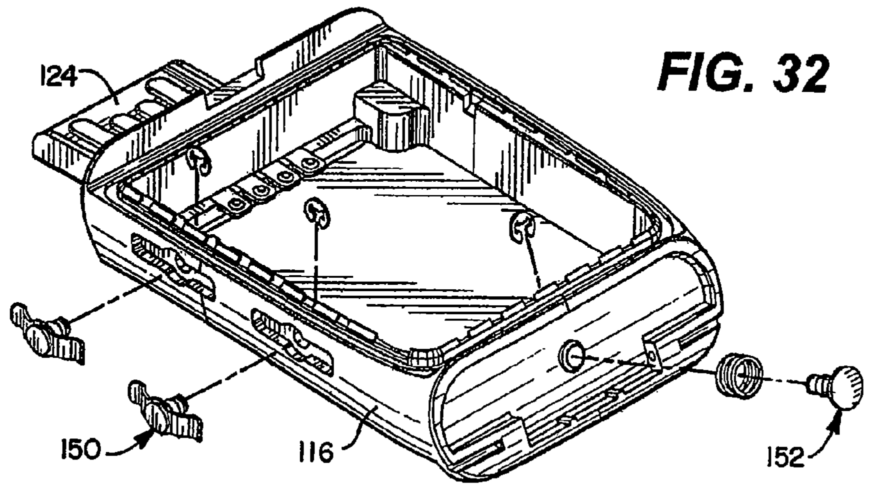
FIG. 32
FIG. 33
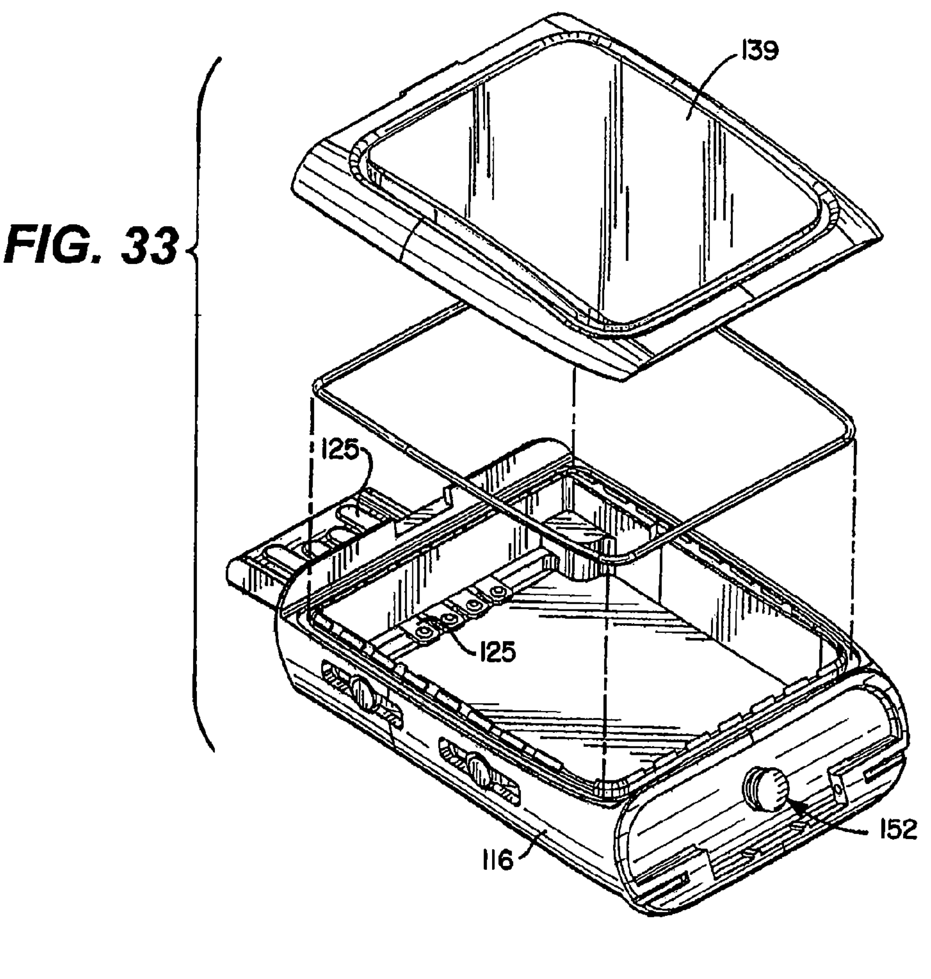

FIG. 59
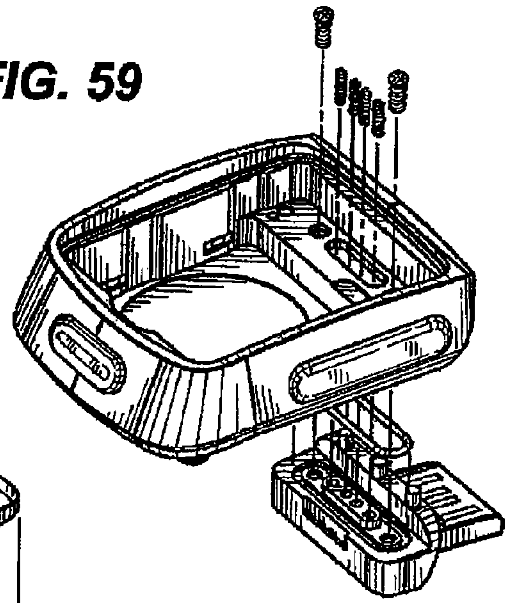
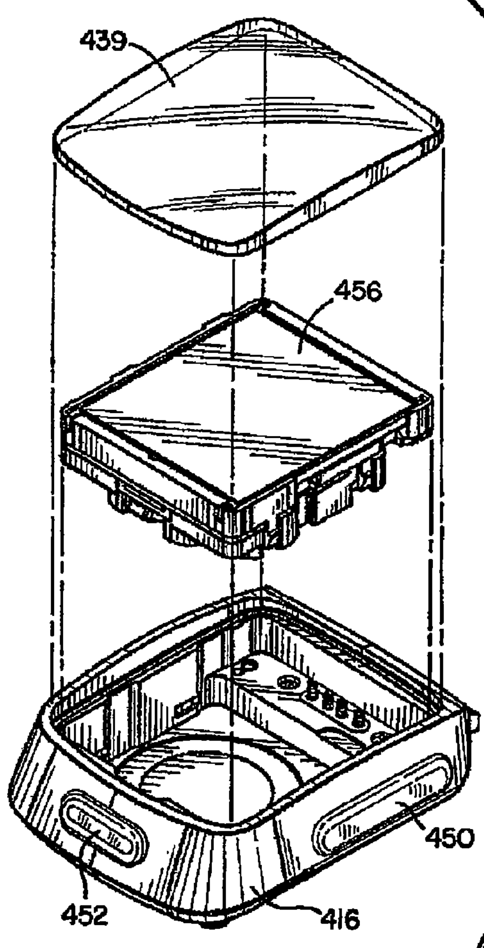
FIG. 58
FIG. 60
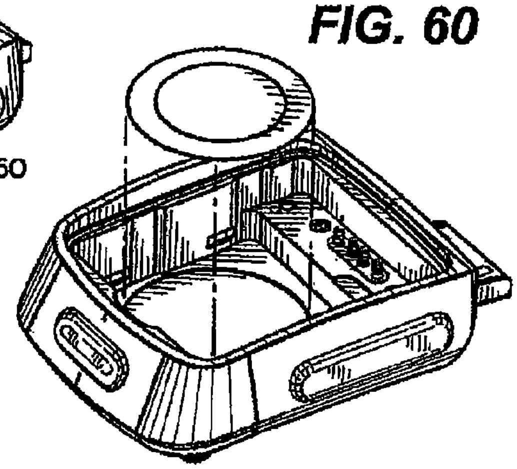

FIG. 65
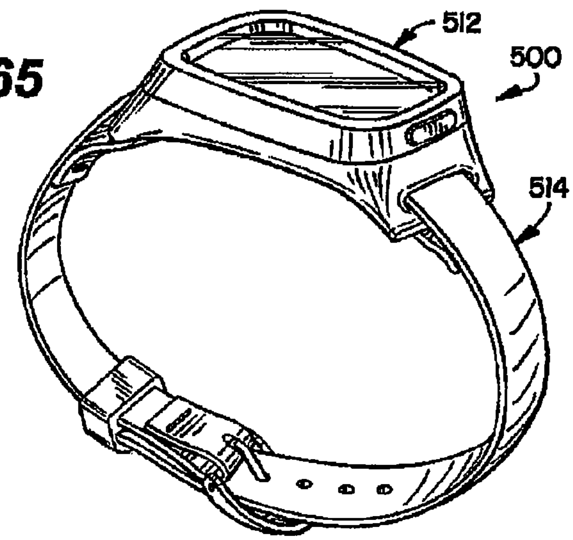
FIG. 66
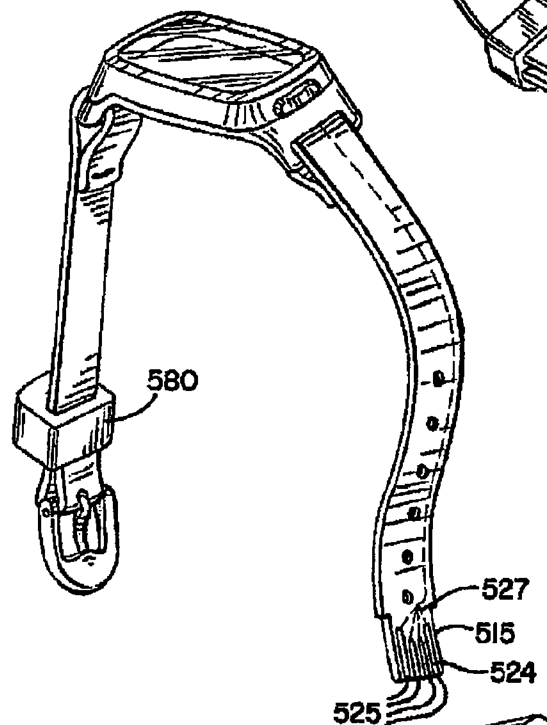
FIG. 64
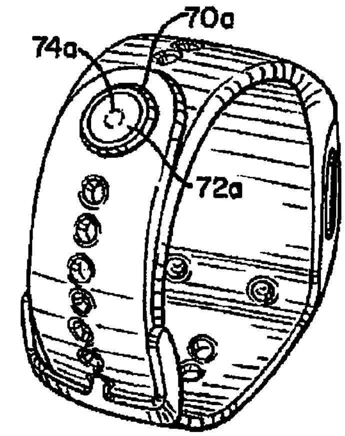
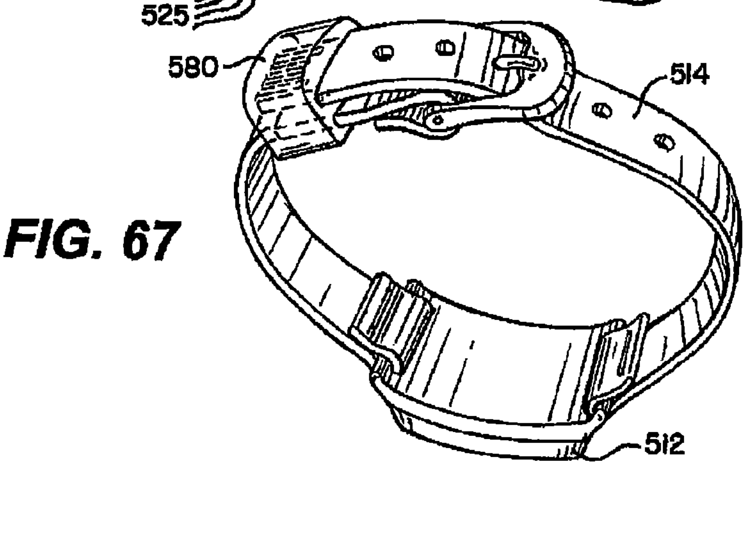
FIG. 67

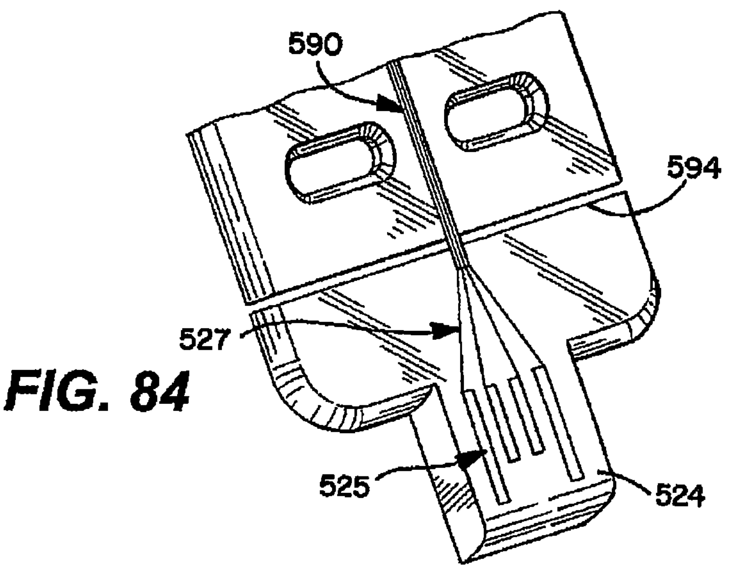
FIG. 84
FIG. 85
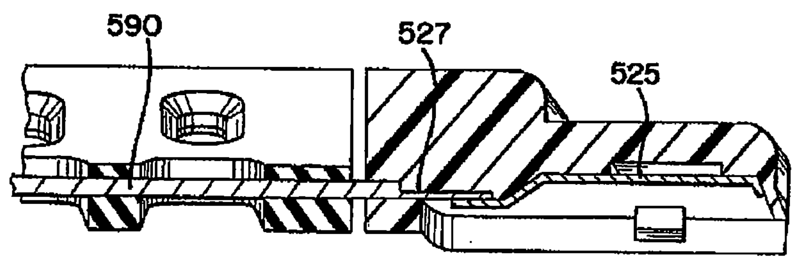

FIG. 86a
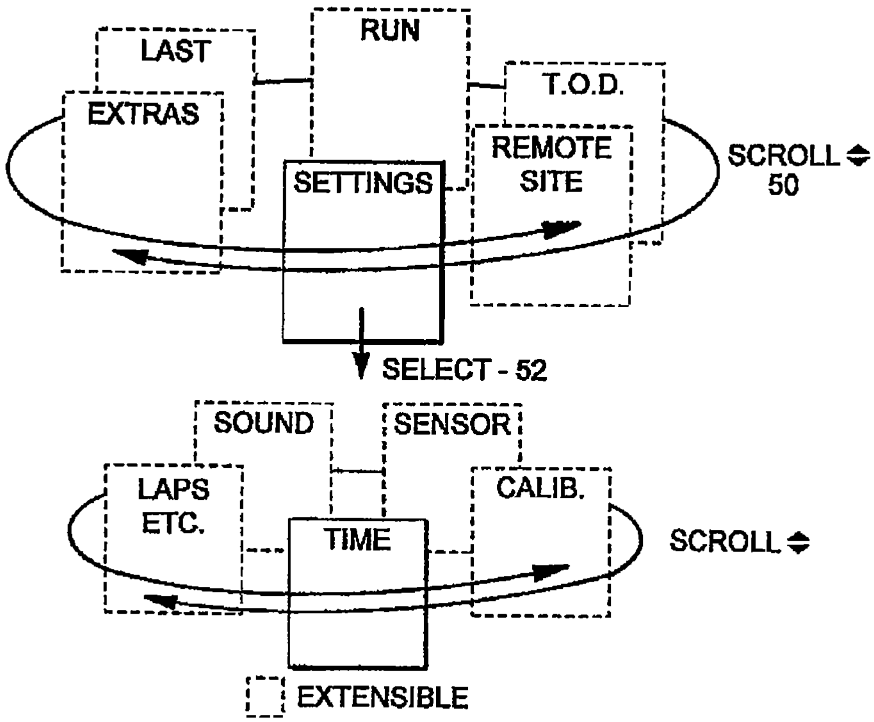
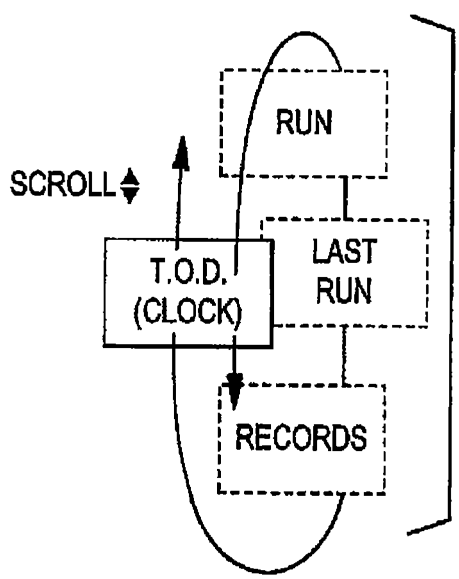
FIG. 86b

*INTERVAL TRAINING (OFF BY DEFULT OOB, BUT AVAILABLE AS A SPECIAL "LAPS" MODE FOR ADVANCED USERS)

USER-SELECTABLE ROTATION (APPLIES TO RUN / TIMING SCREENS ONLY

T.O.D. + WEEKLY RUNS
(DEFAULT SELECTION OUT-OF-BOX)

T.O.D.+ WEEKLY RUNS

FIG. 112
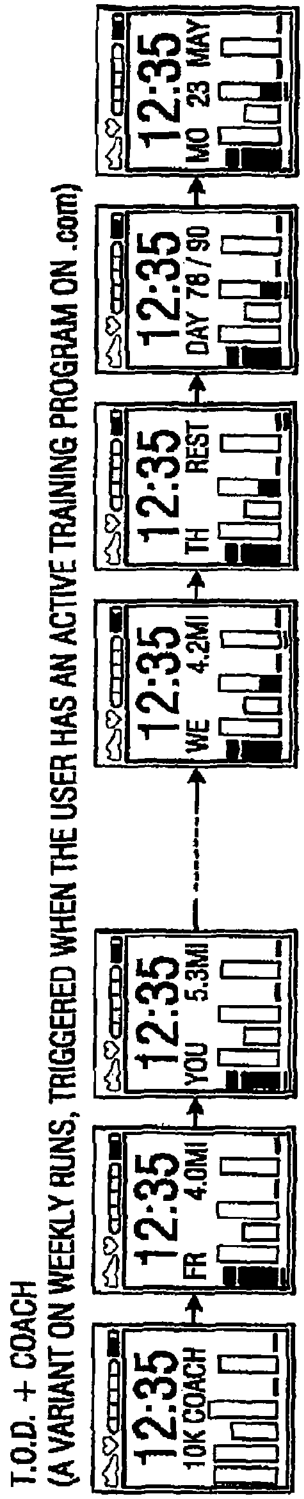
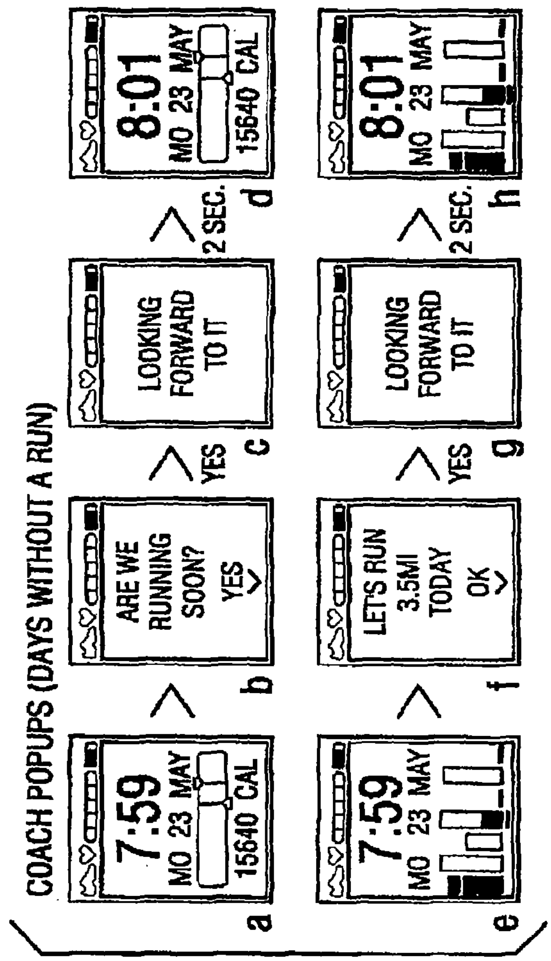
FIG. 113

| | Lap Pace | Ave. Lap HR | Cum. Time | Change from Previous |
|---|---|---|---|---|
| Runner A | | | | |
| Lap 1 | 7:02.20 | 110 | 7:02.20 | – |
| Lap 2 | 6.49.23 | 132 | 13:51.43 | - 0:13.97 |
| Lap 3 | 7:04.94 | 130 | 20:56.37 | + 0:16.73 |
| Lap 4 | 7:01.18 | 128 | 27:57.55 | - 0:03.76 |
| Lap 5 | 6:44.36 | 139 | 34:41.91 | - 0:16.82 |
| Runner B | | | | |
| Lap 1 | 6:55.43 | 114 | 6:55.43 | – |
| Lap 2 | 6.54.19 | 123 | 13:49.62 | - 0:01.24 |
| Lap 3 | 7:01.11 | 132 | 20:50.73 | + 0:06.92 |
| Lap 4 | 7:03.14 | 131 | 27:53.87 | + 0:02.03 |
| Lap 5 | 6:51.16 | 138 | 34:45.03 | - 0:11.98 |

FIG. 186
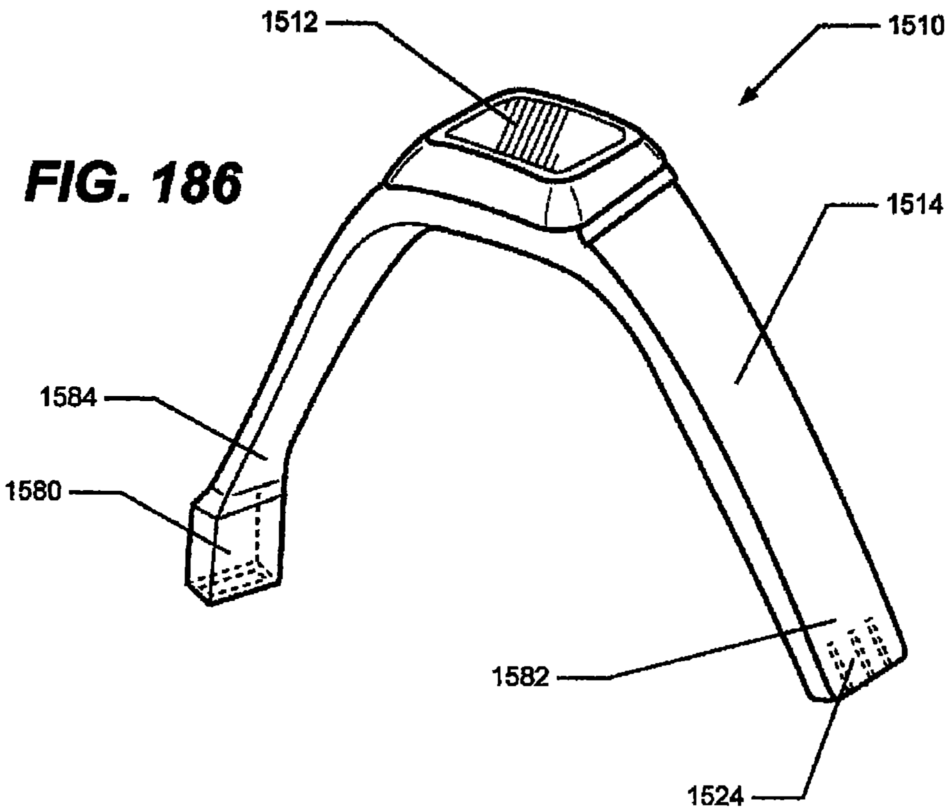
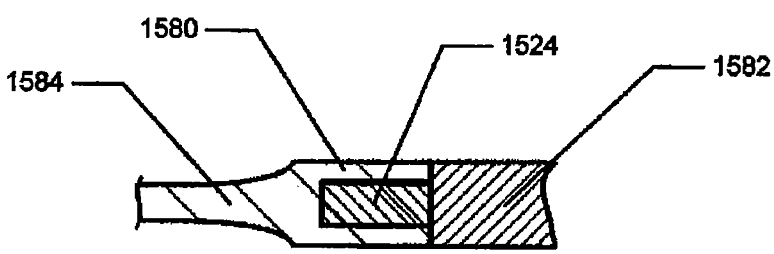
FIG. 187

FIG. 217
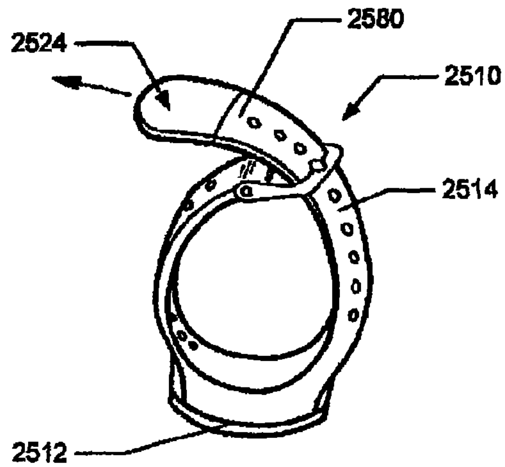
FIG. 216
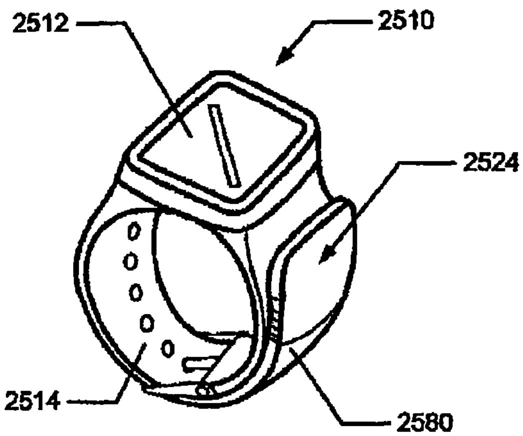
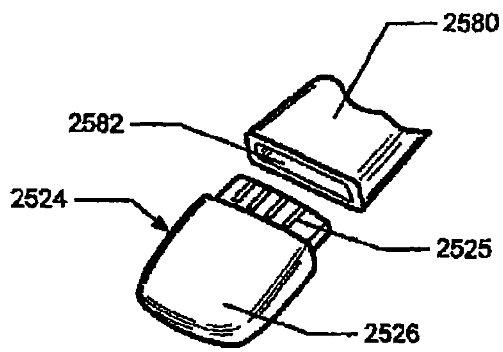
FIG. 219
FIG. 218
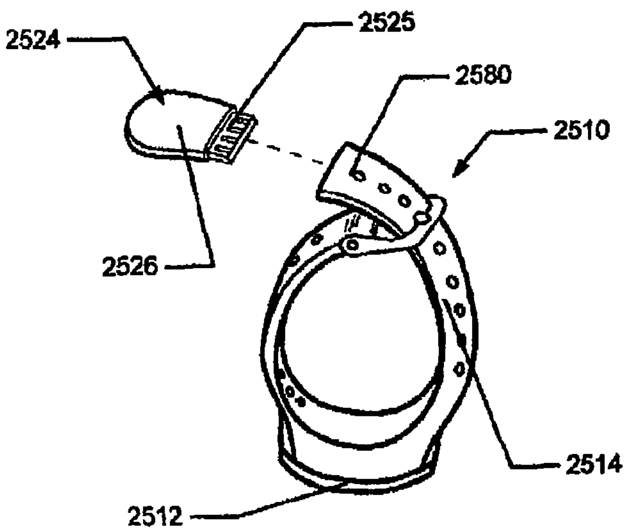

FIG. 238
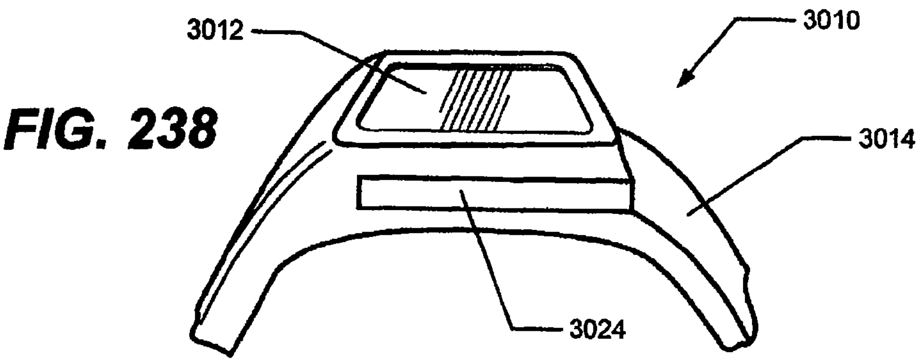
FIG. 239
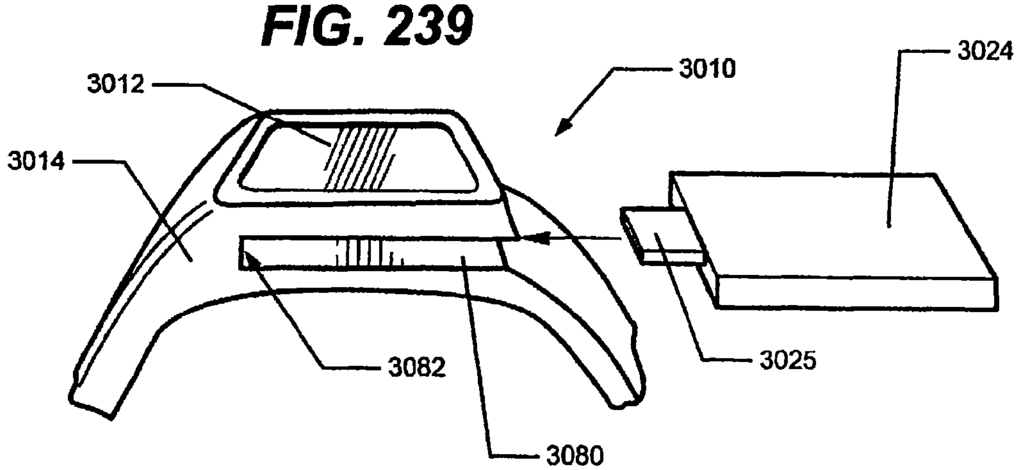
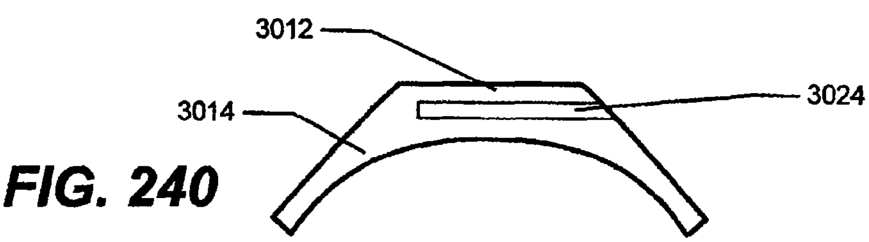
FIG. 240
FIG. 241
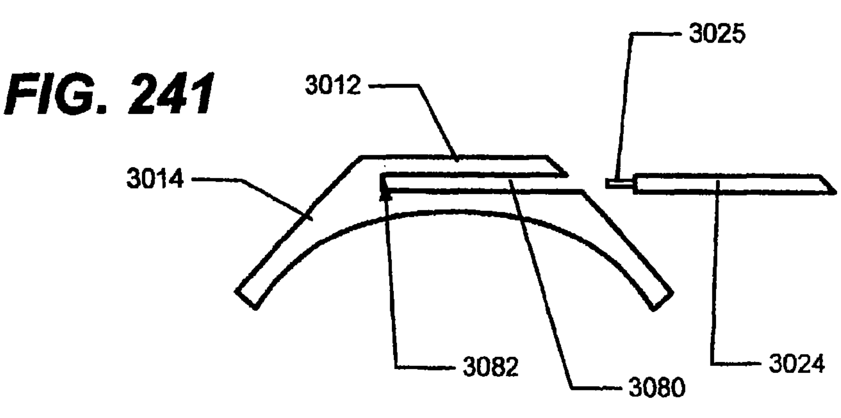

FIG. 258
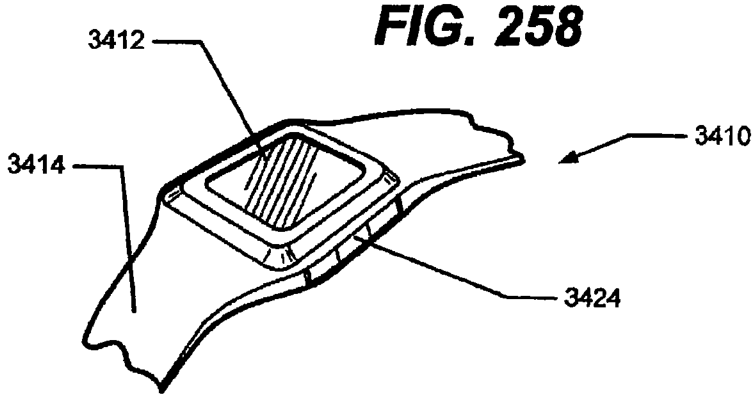
FIG. 259
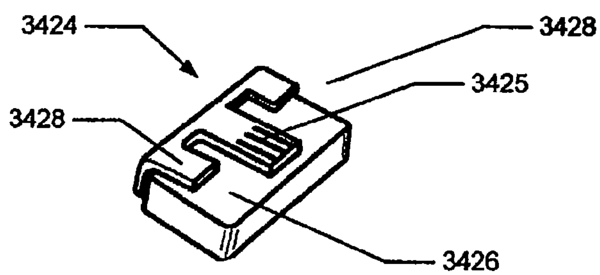
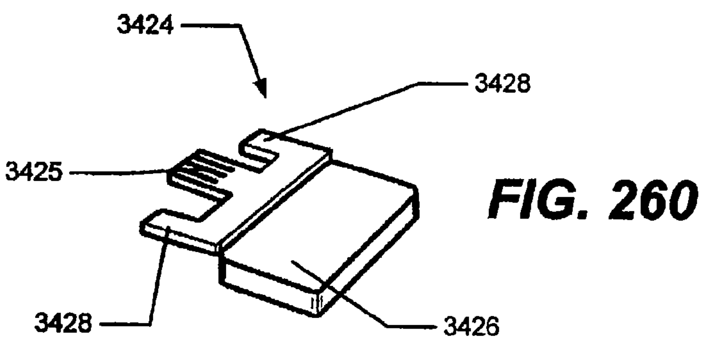
FIG. 260
FIG. 262
FIG. 261
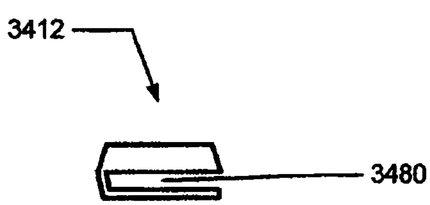
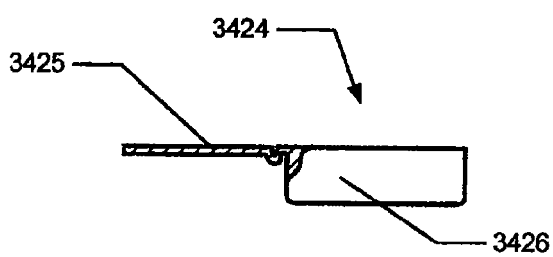

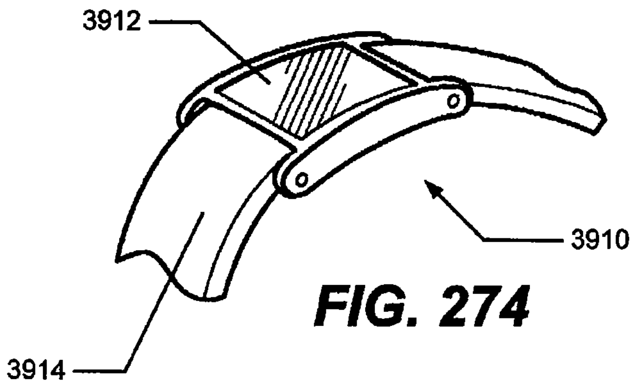
FIG. 274
FIG. 275
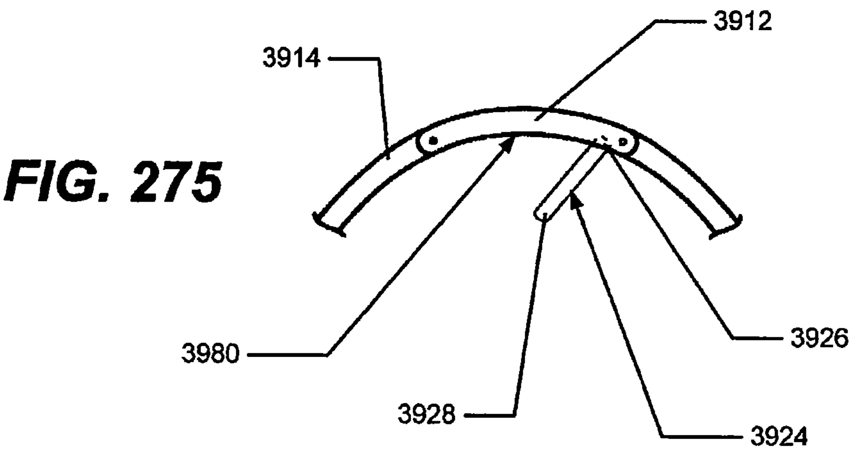
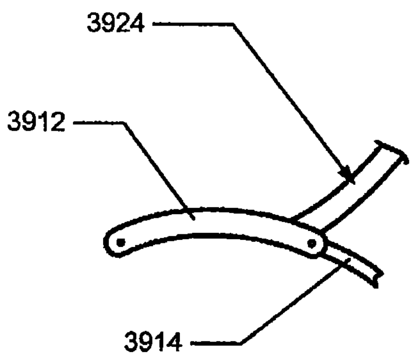
FIG. 276

ATHLETIC WATCH

RELATED APPLICATIONS

The present application is a continuation-in-part of and claims the benefit of U.S. Patent Application No. 61/172,769, filed on Apr. 26, 2009, which application is expressly incorporated herein by reference and made a part hereof. Also, aspects of this invention may be used in conjunction with user interface features, global positioning system ("GPS") features and other watch constructions described for example, in the following concurrently filed U.S. patent applications:

(a) U.S. patent application Ser. No. 12/767,308 entitled "Athletic Watch";

(b) U.S. patent application Ser. No. 12/767,447 entitled "GPS Features And Functionality In An Athletic Watch System"; and (c) U.S. patent application Ser. No. 12/767,425 entitled "Athletic Watch".

These concurrently filed U.S. patent applications are entirely incorporated herein by reference and made a part hereof.

TECHNICAL FIELD

The present invention generally relates to an athletic performance monitoring device and, more particularly, to a watch having enhanced athletic functionality.

BACKGROUND OF THE INVENTION

Devices such as watches and, in particular, watches having features allowing a wearer to monitor athletic performance are known. For example, runners often wear watches to keep track of time, distance, pace and laps etc. Such watches, however, are oftentimes not user friendly and cumbersome to use. Consequently, the wearer may not utilize the watch to its full potential. Such watches also have limited athletic performance monitoring capabilities. Accordingly, while certain watches having athletic functionality provide a number of advantageous features, they nevertheless have certain limitations. The present invention seeks to overcome certain of these limitations and other drawbacks of the prior art, and to provide new features not heretofore available.

SUMMARY OF THE INVENTION

The present invention relates to athletic performance monitoring devices and, in particular, to a watch having enhanced athletic functionality.

According to one aspect of the invention, a device for monitoring athletic performance of a user has a wristband configured to be worn by the user. An electronic module is removably attached to the wristband. The electronic module has a controller and a screen and a plurality of user inputs operably associated with the controller. In an exemplary embodiment, the user inputs are configured in a three-axis or tri-axis configuration for enhanced user operability. A first input is applied along an x-axis. A second input is applied along an y-axis. A third input is applied along a z-axis. Methods of such operability may also be included as aspects of this invention.

According to a further aspect of the invention, the device is used to monitor athletic performance of a user. The device has a wristband configured to be worn by the user. An electronic module is removably attached to the wristband. The electronic module has a controller and a plurality of user inputs operably associated with the controller. The plurality of user inputs include a first user input operable along an x-axis direction, and a second user input operable along a y-axis direction, and a third user input operable along a z-axis direction According to a further aspect of the invention, the third input is applied along the z-axis in a direction generally normal to the screen or crystal of the watch. The user taps or applies force to the screen in the third input. In an exemplary embodiment regarding the third input, the controller is operably connected to a shock sensor contained within a housing of the watch. In a further exemplary embodiment, a user can mark laps during a run by utilizing the third input wherein the user taps the screen of the watch.

According to another aspect of the invention, the electronic module has a communication connector. The electronic module is configured to be plugged into a computer of a user when the electronic module is removed from the wristband. In an exemplary embodiment, the communication connector is in the form of a USB (Universal Serial Bus) connector. When the communication connector is inserted into the computer, athletic performance data recorded by the electronic module can be uploaded to the computer as well as a remote site accessed by the computer. The remote site may be a site dedicated to the tracking, analyzing and display of athletic performance. In a further exemplary embodiment, data from the remote site and the user's computer can be transferred to the electronic module for enhanced operability for the user.

According to a further aspect of the invention, the USB connector may be fixedly attached to the housing of the electronic module. In other embodiments, the USB connector may be flexibly connected to the housing. In an exemplary embodiment, the USB connector has a plurality of leads. The leads have a first segment embedded in a finger or leg member extending from the housing. The leads have a second segment positioned in a base member connected to the finger. The second segment may be in the form of resilient members having one end engaged with the first segment and another end operably connected to the controller. The second segments of the leads may be in the form of compressible springs. The base member is connected to the housing.

According to another aspect of the invention, the watch has a controller and user interface having enhanced operability for the user.

According to another aspect of the invention, the watch has a GPS receiver (Global Positioning System) and antenna. The watch is configured to receive GPS signals for enhanced operability and enhanced athletic functionality.

According to another aspect of the invention, a user can send a motivational message to a second user via the remote site. Upon connecting to the remote site, a notify message is transferred to the electronic module of the second user. When the second user reaches a certain predetermined metric associated with the message, the second user receives the notify message. The second user can access the motivational message by plugging in the electronic module into the computer to connect to the remote site. In another embodiment, the message may be displayed directly on the watch of the second user.

According to another aspect of the invention, the electronic module is removably connected to the wristband. In one embodiment, the electronic module may have one or more protrusions received by corresponding apertures in the wristband. The watch may employ alternative connection structures. The connection structures may have flexible configurations, removable key module configurations, and articulating connector configurations.

According to yet another aspect of the invention, the device has a wristband configured to be worn by the user. An electronic module is removably attached to the wristband. The electronic module has a controller and a screen and a plurality of user inputs operably associated with the controller. The user inputs include a user input configured to be applied by the user against the screen and in a direction generally normal to the screen.

According to another aspect of the invention, the watch has a controller and user interface having enhanced operability for the user. For example, the controller may generate one or more user interfaces displaying various types of athletic activity statistics during, before or after user performance of an athletic activity. A user interface may include multiple lines of data, each line displaying a different workout statistic or other information (e.g., time of day, time zone, user location, etc.). In one arrangement, a user interface may include a goal progress tracker. The tracker may include one or more progress bars, for example, representing one or more sub-goals. Sub-goals may correspond to tasks required for completion of the overall goal. Sub-goals may be defined and scheduled to facilitate completion of the overall goal. An indicator may further be displayed to identify a current sub-goal or time period for a sub-goal (e.g., a current day). Depending on an amount of athletic activity a user has performed for a time period of a sub-goal, a corresponding progress bar may be filled in by a corresponding amount. For example, if a user has completed 50% of a distance scheduled to be run on Wednesday, a progress bar for Wednesday may be filled in halfway.

According to another aspect, reminders or motivating messages may be displayed to a user to encourage users to maintain an athletic activity regimen and/or to keep on track to complete a goal. In one or more arrangements, the reminders or motivating messages may include a prompt asking the user to confirm that athletic activity will be performed within a specified amount of time from the reminder. Additionally, upon the user confirming that athletic activity will be performed within a specified amount of time, a confirmation message may be displayed. The confirmation may include a further motivational or encouraging message. Further, a user may be asked to schedule the athletic activity upon specifying that athletic activity will be performed within the specified amount of time.

According to yet another aspect, a user may mark laps through an interface of an athletic activity monitoring device. In one or more arrangements, lap information might only be updated after a specified amount of time after the receipt of the user lap marking input. Additionally or alternatively, a lap indicator might only be increased or an increased lap indicator might only be displayed after the specified amount of time. An interface other than an interface displaying the lap indicator may be displayed after receiving the lap marking input but prior to expiration of the specified amount of time.

Another aspect of this invention relates to systems for monitoring athletic performances. Such systems may include, for example: an input system (e.g., wired or wireless input ports, antennae, etc.) for receiving: (a) a first type of input data (e.g., pedometer data, speedometer data, odometer data, etc.) indicative of an athlete's movement distance during an athletic performance over at least a first portion of a route and (b) a second type of input data (e.g., GPS data) indicative of the athlete's movement distance during the same athletic performance over at least the first portion of the route, wherein the first type of input data is generated by a first sensor system that is independent from a second sensor system that generates the second type of input data. The athletic performance monitoring systems further include a processing system (e.g., one or more microprocessors) programmed and adapted for: (a) determining whether the first type of input data or the second type of input data is likely more accurate for the first portion of the route and (b) determining at least one of overall movement distance during the athletic performance, movement distance over the first portion of the route, overall pace during the athletic performance, pace over the first portion of the route, overall calorie burn during the athletic performance, or calorie burn over the first portion of the route using the type of input data determined to be more accurate over the first portion of the route. In this manner, the most reliable data for each portion or segment of a route may be used to provide the most overall accurate possible movement distance information for making various calculations (and one sensor may provide the data for some portions or segments of the route and the other sensor may provide the data for other portions or segments of the route). The system may be contained within a portable electronic device carried by the athlete during the performance, such as a wrist borne device, like a watch.

Systems according to at least some examples of this invention may receive data from other sources that may help in determining which type of data is likely more accurate. As one more specific example, data indicative of acceleration changes over at least the first portion of the route (from an accelerometer) might be useful in determining whether the user has made a turn (and thus in determining whether the GPS data remains accurate). As another example, input data indicative of GPS signal strength or GPS reliability over at least the first portion of the route may be considered in determining which input data stream is more accurate for that portion of the route. In some instances the determination of which data stream is more accurate may be determined, at least in part, by comparing the content of the two data streams (e.g., comparing the GPS and pedometer data), optionally along with other data, such as accelerometer data, map data, signal strength data, battery strength data, foot contact pressure profile data, foot contact angle data, etc.

Additional aspects of this invention relate to methods for monitoring athletic performances. Such methods may include, for example: (a) receiving input data from a first sensor system (e.g., a pedometer, speedometer, odometer, or other distance measuring sensor) indicative of an athlete's movement distance during an athletic performance over at least a first portion of a route; (b) receiving input data from a second sensor system (e.g., a GPS system) indicative of the athlete's movement distance during the same athletic performance over at least the first portion of the route, wherein the second sensor system is independent from the first sensor system; (c) determining whether the input data from the first sensor system or the input data from the second sensor system is likely more accurate for the first portion of the route; and (d) determining at least one of overall movement distance during the athletic performance, movement distance over the first portion of the route, overall pace during the athletic performance, pace over the first portion of the route, overall calorie burn during the athletic performance, or calorie burn over the first portion of the route using the input data determined to be more accurate for the first portion of the route. These methods may include any of the various features for the systems described above.

Additional aspects of this invention relate to athletic performance monitoring systems that may include, for example: an input system (e.g., one or more wired or wireless input ports, antennae, etc.) for receiving: (a) a first type of input data indicative of an athlete's location on a route (e.g., GPS data)

as the athlete moves along the route during an athletic performance, (b) a second type of input data indicative of a message trigger location (e.g., geographic coordinates, GPS coordinates, map coordinates, etc.), and (c) a third type of input data including a message payload (e.g., textual, audio, graphical, and/or video data; an audio message arrival indicator; a tactile message arrival indicator; etc.), wherein the second type of input data and the third type of input data are received through a computing device temporarily connected to the input system for data exchange. Such systems further may include a processing system (e.g., one or more microprocessors) programmed and adapted to: (a) compare the first type of input data indicative of the athlete's location on the route and the second type of input data indicative of the message trigger location, and (b) deliver the message payload when the first type of input data indicates that the athlete is or has been physically present at the message trigger location, wherein the compare and deliver steps are accomplished when the computing device is not connected to the input system and while the athlete is at or in close proximity to the message trigger location. In this manner, non-network connected devices carried by users during an athletic performance can interact with the user in a manner in which it appears that there is a live networked connection.

Such systems may have further sensors to assure that the message payload is delivered on under certain conditions, such as under conditions in which the athlete reached the geographic trigger location as a result of a workout. This may be accomplished, for example, by including a speed or distance sensor operatively coupled to the input system to provide input data indicative of the athlete's movement speed or movement distance on the route. This input data may be provided, for example, by a pedometer, by GPS, by an accelerometer, by a speedometer, by an odometer, etc. As some more specific examples, systems according to at least some examples of this invention may be programmed and adapted to deliver the message payload only if pedometer or speedometer data indicates that the athlete reached the location on foot or on a bicycle (e.g., by requiring a threshold movement distance as indicated by a pedometer or odometer before the location was reached or by requiring that the athlete approach the location within a predetermined speed range to indicate movement on foot or bicycle, etc.).

Additional aspects of this invention may include methods of monitoring athletic performances, including, for example: (a) operably connecting a portable electronic device to a computing device for data exchange; (b) receiving input data indicative of a message trigger location on the portable electronic device from the computing device; (c) receiving input data including a message payload on the portable electronic device from the computing device; (d) terminating the connection between the portable electronic device and the computing device; (e) receiving input data on the portable electronic device indicative of the athlete's location on a route as the athlete moves along the route during an athletic performance and while there is no operable data exchange connection between the portable electronic device and the computing device; (f) comparing the input data indicative of the athlete's location on the route and the input data indicative of the message trigger location while there is no operable data exchange connection between the portable electronic device and the computing device; and (g) delivering the message payload when the input data indicates that the athlete is or has been physically present at the message trigger location while there is no operable data exchange connection between the portable electronic device and the computing device. These methods may include any of the various features for the systems described above.

Other features and advantages of the invention will be apparent from the following examples in the specification taken in conjunction with the following drawings.

BRIEF DESCRIPTION OF THE DRAWINGS

FIGS. 22-49 disclose views of another embodiment of a device in the form of a watch of an exemplary embodiment of the present invention;

FIGS. 50-64 disclose views of another embodiment of a device in the form of a watch of an exemplary embodiment of the present invention;

FIGS. 65-69 disclose views of another embodiment of a device in the form of a watch of an exemplary embodiment of the present invention;

FIGS. 78-85 disclose views of portions of a wristband having a USB connector associated therewith in accordance with exemplary embodiments of the present invention;

FIGS. 86-117*a* show various screen displays generated by a user interface operably associated with the watch of the present invention that a user may select for display according to various embodiments of the invention;

DETAILED DESCRIPTION

Figure 1:
FIGS. 1-21 disclose views of a first embodiment of a device in the form of a watch of an exemplary embodiment of the present invention including views showing certain user interface operability of the watch.

While this invention is susceptible of embodiment in many different forms, there are shown in the drawings, and will herein be described in detail, preferred embodiments of the invention with the understanding that the present disclosure is to be considered as an exemplification of the principles of the invention and is not intended to limit the broad aspects of the invention to the embodiments illustrated and described.

Device Structures

Figure 167:
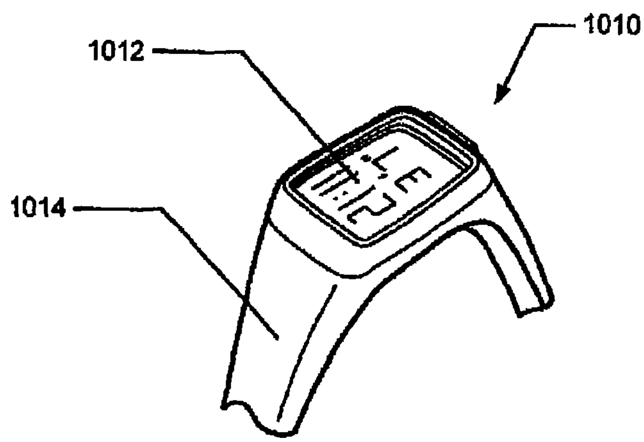
FIGS. 167-309 disclose views of additional exemplary embodiments of the watch of the present invention and showing additional connection constructions between a wristband and electronic module or a component of the electronic module.
Figure 168:
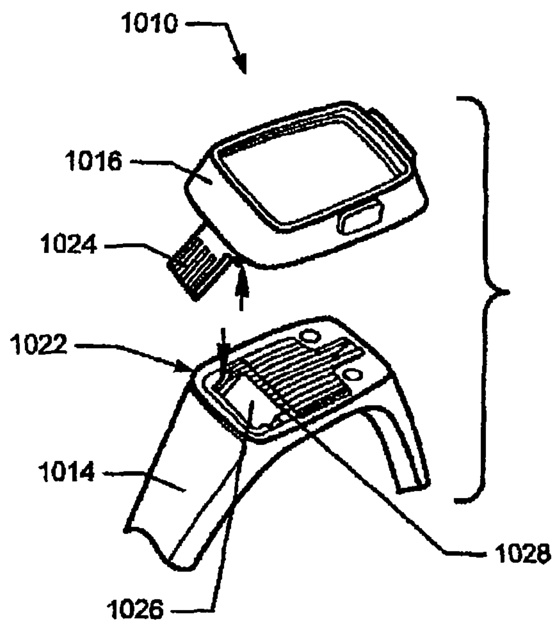
Figure 309:
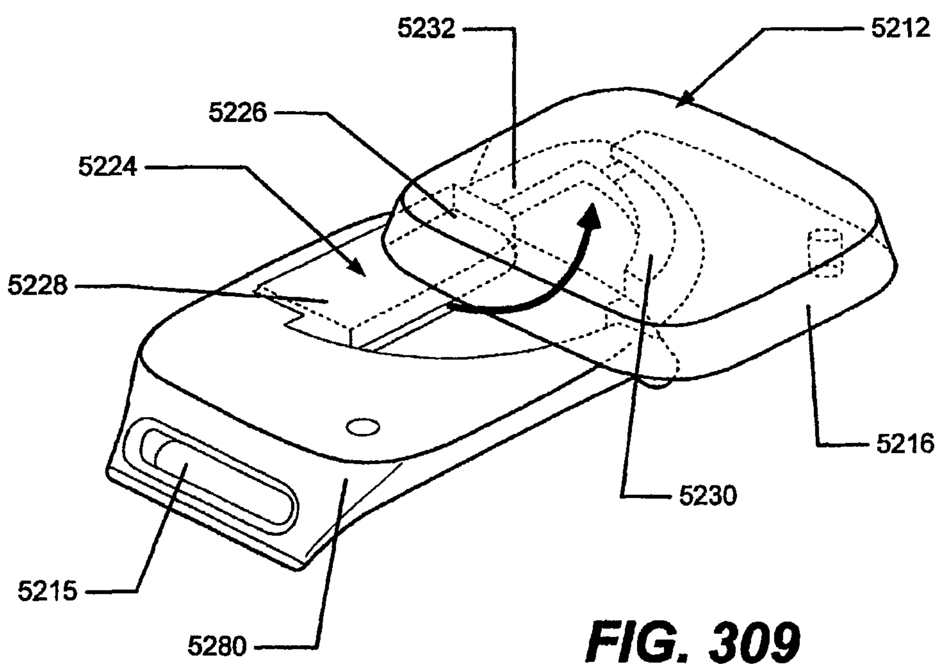

The present invention discloses multiple embodiments of a device or athletic watch. FIGS. 1-21 disclose a first embodiment of the watch; FIGS. 22-49 disclose a second embodiment of the watch; FIGS. 50-64 disclose a third embodiment of the watch; and FIGS. 65-85 disclose additional alternative embodiments of the watch. FIGS. 167-309 disclose yet further alternative embodiments of the watch. As discussed further herein, each of the embodiments can incorporate the various operational features, user interface and global positioning system ("GPS") features as described herein. Structures of each embodiment will be described in greater detail below and a description of additional capabilities and features of the watch embodiments is also included. It is understood that features of the various embodiments can be combined as desired in the watch of the present invention.

Figure 2:
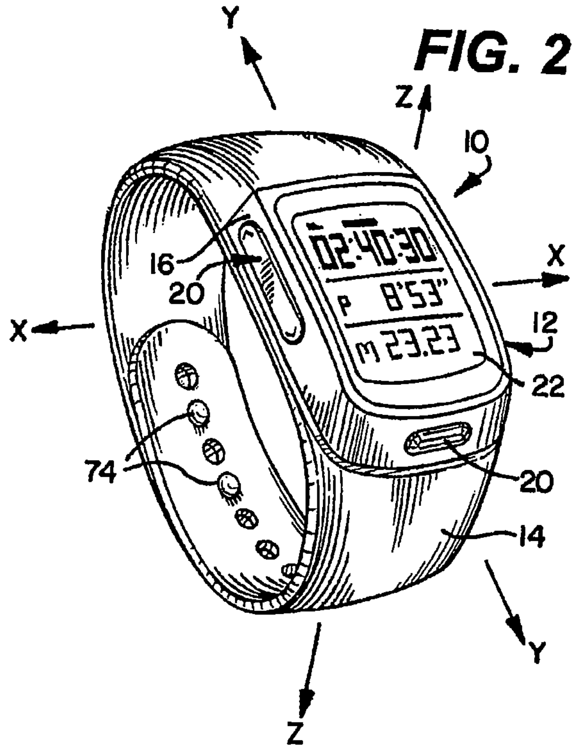
Figure 3:
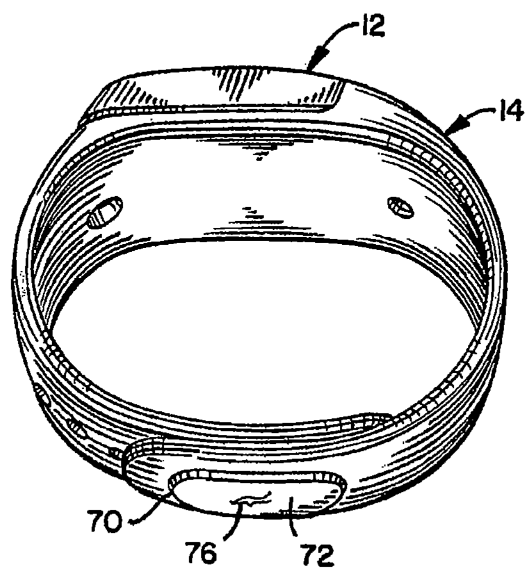

FIGS. 1-3 generally show a device or watch of the present invention, generally designated with the reference numeral 10. While the watch 10 has traditional uses such as incorporating a chronograph for general timekeeping, as explained in greater detail below, the watch 10 has unique functionality for athletic and fitness use such as monitoring athletic performance of the user. The watch 10 generally includes a portable electronic module 12 removably connected to a carrier 14 or strap member in the form of a wristband 14 in an exemplary embodiment.

The structure of the watch 10 will first be described followed by a description of the operation of the watch 10. However, as explained in greater detail below, it is noted that the watch 10 is capable of wirelessly communicating with various sensors 1 worn by a user to record and monitor athletic performance of a user. The sensor(s) can take various forms. For example, the sensor may be mounted on the shoe of a user as shown in FIG. 1 and include an accelerometer. The sensor may have various electronic components including a power supply, magnetic sensor element, microprocessor, memory, transmission system and other suitable electronic devices. The sensor may be used in conjunction with other components of the system to record speed and distance among other parameters of athletic performance. In exemplary embodiments, the sensor can be a sensor as disclosed in U.S. Publications No. 2007/0006489; 2007/0011919 and 2007/0021269, which are incorporated by reference herein and made a part hereof. Additionally, the sensor may be a component of a heart-rate monitor 1 worn by a user as shown in FIG. 1. Thus, the watch 10 may communicate with both a shoe sensor 1 and a heart rate sensor 1. The watch 10 may further communicate with only one of the shoe sensor and heart rate sensor depending on a user's preference. As explained in greater detail below, the watch 10 may also include component(s) such as a three-axis accelerometer to monitor speed and distance of a user/runner without the need for the shoe sensor. As also explained below, the watch 10 has communication capabilities with remote locations for receiving and transferring data relating to athletic performance monitoring.

Electronic Module

As further shown in FIGS. 2-8, the portable electronic module 12 includes various components supported by a housing 16, the components include a controller 18 having a suitable processor and other known components, an input device assembly 20, an output device assembly 22, and a communication connector 24, which may be considered a part of the input device assembly 20 and/or the output device assembly 22 in various embodiments. The communication connector 24 may be, for instance, a USB connector 24. The controller 18 is operably connected to the input device assembly 20, the output device assembly 22 and the communication connector 24. As explained in greater detail below, the electronic module 12 may also include a GPS ("Global Positioning System") receiver and associated antenna operably connected to the controller 18 for incorporating various GPS features.

Figure 7:
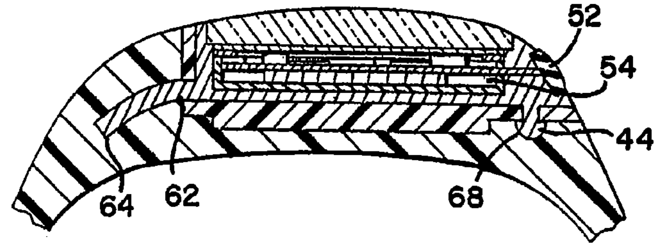

As depicted in FIGS. 2-5, the housing 16 has a first end 30, a second end 32, a first side 34, a second side 36, a front side 38, and a back side 40. The front side 38 may also include a glass member 39 or crystal 39 for viewing a display of the controller 18 therethrough. The housing 16 defines a cavity 42 therein for accommodating the various components of the controller 18. It is understood that the housing ends, sides and crystal cooperate to enclose the housing 16. As further shown in the figures, the communication connector 24 extends from the first side 30 of the housing 16. It is understood that the communication connector 24 could be positioned at various other locations of the housing 16. The communication connector 24 generally extends rigidly from the housing 16. As further shown in other embodiments, the communication connector 24 can be flexible with respect to the housing 16. In other embodiments described herein, the USB connector 24 may be rigidly connected to the housing 16 in other configurations. As discussed, the communication connector 24 is a USB connector and may have a plurality of leads therein and wherein the leads are operably connected to the controller 18. The housing 16 can be made from a variety of different rigid materials including metal or generally rigid polymeric materials. The housing 16 could also be formed in a two-shot injection molding process wherein the communication connector 24 could be molded to be flexible with respect to the housing 16. It is also understood that the USB connector 24 could be separately fastened to the housing 16 consistent with other embodiments described herein. The USB connector 24 generally provides a water-resistant connection with the housing 16 and controller 18. As shown in FIG. 7, the housing 16 has a pair of protrusions 44 (it is understood one protrusion 44 is hidden) extending from the back side 40 of the housing 16. It is understood that a single protrusion 44 could be used or more protrusions 44. Because the watch 10 may be used in fitness activities, there is some chance that the watch 10 can be subject to water or moisture such as perspiration. The housing 16 is designed to be water-resistant to protect components of the controller 18. Such structures further provide for a certain level of impact resistance. A vent opening is provided in the wristband 14 to channel any moisture away from the module 12.

Figure 4:
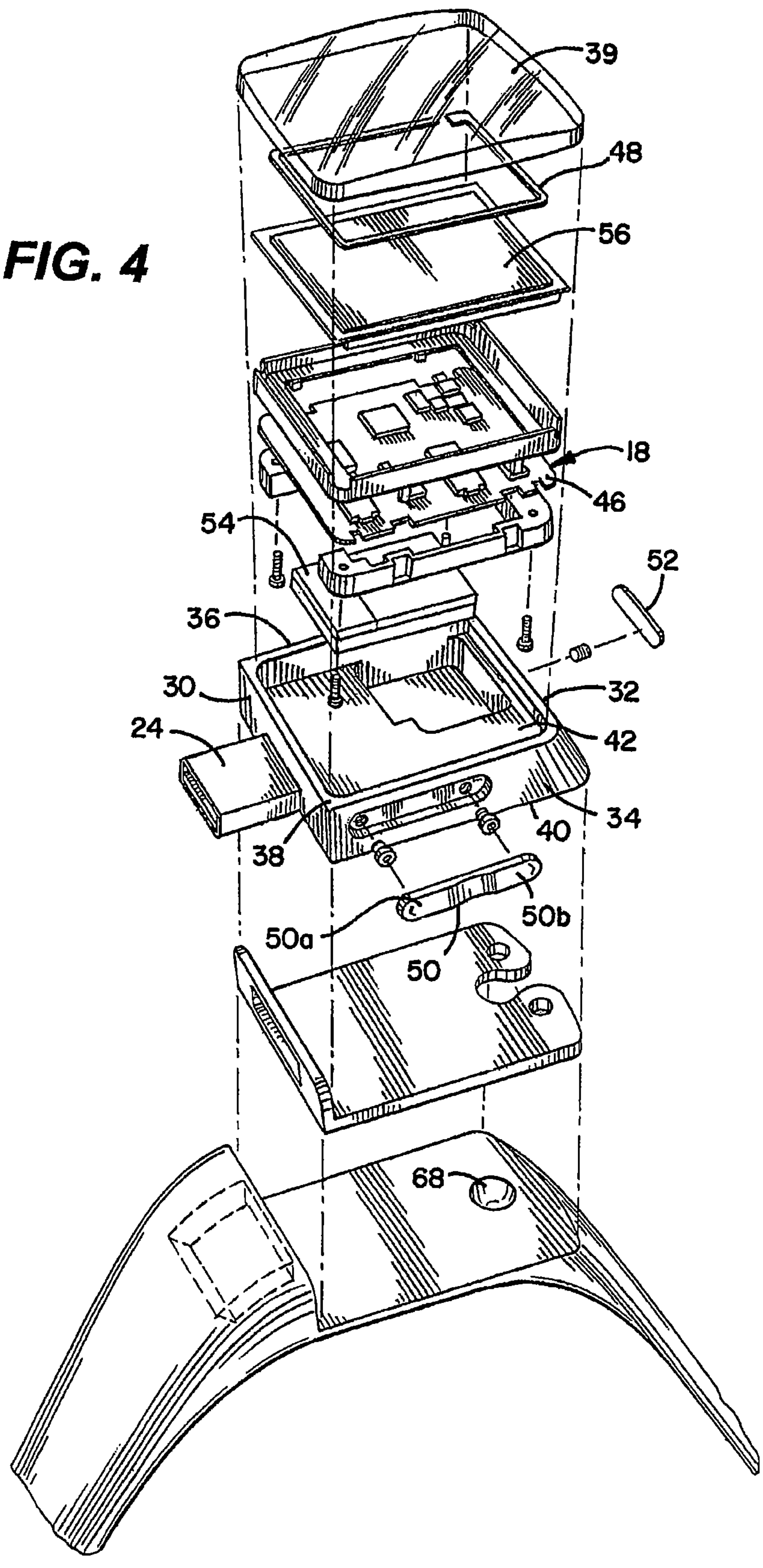
Figure 5:
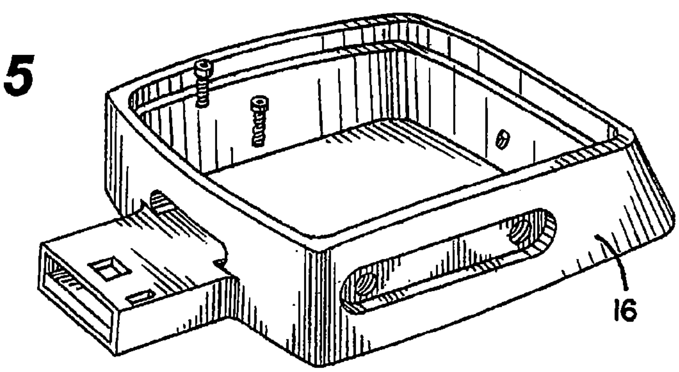

As further shown in FIG. 4, the controller 18 generally has a processor 46 that is operably connected to the input device assembly 20 and the output device assembly 22 as understood by those skilled in the art. The controller 18 includes software that in cooperation with the input device assembly and output device assembly provide user interface features as will be described in greater below. The components of the controller 18 are contained within and supported by the housing 16. The controller 18 includes various electrical components including a rechargeable power supply (e.g., rechargeable battery or other battery types) and system memory. The controller 18 will also include an antenna 48, allowing the controller and portable electronic module to communicate with the sensors 1, record and store data relating to athletic performance, and other time information. The controller 18 also functions to upload performance data to a remote location or site as is known in the art, but can also download additional information from a remote site or location to be stored by the controller 18 for further use. The antenna 48 can take various forms including a chip antenna associated with the controller 18. Alternatively, the antenna 48 could be a sheet metal antenna. With other embodiments incorporating GPS features, an additional GPS antenna may also be provided. Thus, the watch 10 may incorporate multiple antennas. The controller 18 is operably connected to the communication connector 24 of the housing 16.

As further shown in FIGS. 2-4, the input device assembly 20 includes a plurality of input devices such as in the form of depressible buttons. In certain exemplary embodiment, the USB connector 24 can also be considered an input device when data is transferred to the watch 10 via the connector 24. In one exemplary embodiment, the input device assembly 20 has three input buttons that collectively define a tri-axis operating configuration (e.g., x-y-z axes). The input buttons include a side button 50, an end button 52 and a shock sensor, shock button or tap button 54.

Figure 11:
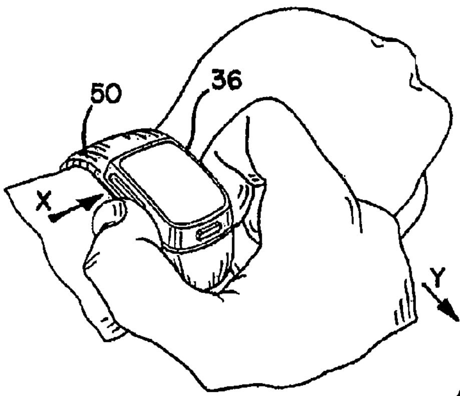

The side button 50 is located on the first side 34 of the housing 16. The side button 50 may correspond with a first input and being operably connected to the controller 18 for controlling the portable electronic module 12. As shown in FIG. 1, the side button 50 is configured to operate in an x-axis direction. The user may activate the first input by pressing on the side button 50 on the first side 34 of the housing 16. The user may squeeze the side button 50 and opposite second side 36 of the housing 16 along the x-axis direction (FIGS. 2 and 11). The side button 50 may also cooperate with an additional input of the controller 18 for controlling the portable electronic module 12. For example, a user may press one segment of the side button 50, such as a top segment 50*a*, for a first input, and may press a second segment of the side button 50, such as a bottom segment 50*b*, for a second or additional input different from the first input. As explained in greater detail below regarding the operation of the watch 10, the side button 50 may be utilized as a toggle button or scroll button, with the first input located towards the top of the side button and the additional input located towards the bottom of the side button. The side button 50 may then be used to move a cursor on the display up or down in order to select an item from a list. It is also understood that the side button 50 may be positioned on the opposite side 36 of the housing 16, which may be considered a three o'clock position. The side button 50 shown in FIG. 2 is considered to be in the nine o-clock position.

Figure 12:
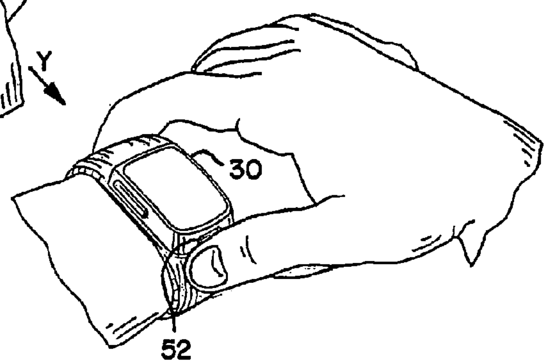

The end button 52 may be located on the second end 32 of the housing 16. The end button 52 will correspond to a second input and is operably connected to the controller 18 for controlling the portable electronic module 12. As shown in FIG. 2, the end button 52 is configured to operate in a y-axis direction. The user may activate the second input by pressing on the end button 52 on the second end 32 of the housing 16. The user may squeeze the end button 50 and the opposite first end 30 of the housing 16 along the y-axis direction (FIG. 12). As explained in greater detail below regarding the operation of the watch 10, the end button may be used as the OK or SELECT function. In an exemplary embodiment, the end button 52 may be positioned at a downward angle for enhanced user operability.

Figure 8A:
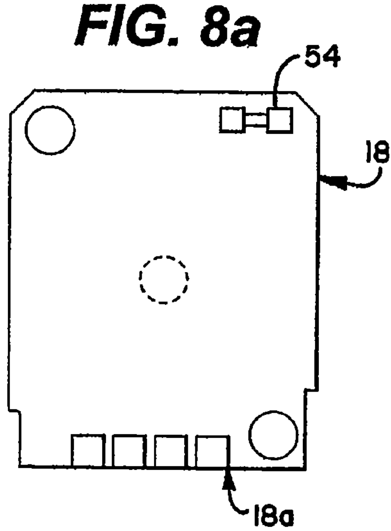
Figure 8B:
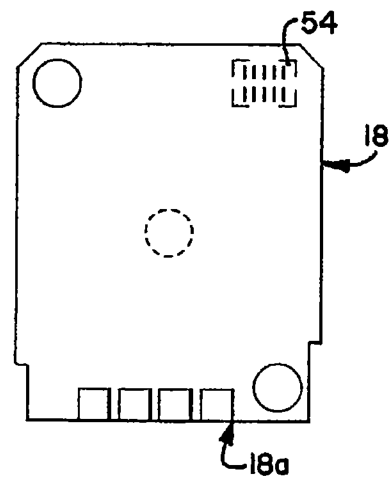

In an exemplary embodiment, the shock button 54 or tap button 54 generally corresponds to a shock sensor that is preferably located within the housing 16 and is operably connected to the controller 18, such as a printed circuit board of the controller 18. FIG. 8*a* shows a schematic view of a printed circuit board of the controller 18. The controller 18 includes lead interfaces 18*a* that cooperate with the USB connector 24. The board operably supports the shock sensor 54 generally proximate a periphery of the board which also positions the shock sensor 54 at a periphery of the housing 16. Thus, the shock sensor 54 is operably connected to the controller 18 and may be a piezo shock sensor in this exemplary embodiment. Even when positioned proximate a periphery, the acceleration sensed at the periphery location is generally very close to the acceleration at the center location such as from a user tapping generally at a center of the screen 39. It is understood that the shock button 54 may be located in alternate positions on the controller 18 or in the housing 16. For example, the shock sensor 54 may be located proximate a center of the board as shown in phantom lines in FIG. 8*a*, which generally corresponds to a center of the housing 16 and underneath a center point of the crystal 39. In this configuration, the shock sensor has a low-profile design to minimize the required height of the electronic module 12. The shock sensor can take other forms other than a shock sensor and may also be an accelerometer in one exemplary embodiment. For example, FIG. 8*b* shows a printed circuit board of the controller 18 wherein a shock button 54 is in the form of an accelerometer and positioned at a periphery of the board. As shown in phantom lines, the accelerometer may also be positioned proximate a center of the board and therefore proximate a center of the housing 16. As discussed, the shock button 54, in any of its forms, is generally positioned within the housing 16 and beneath the crystal 39 (FIG. 7). It is understood that the shock sensor 54 shown in FIG. 8*a* may have lesser power requirements than the accelerometer sensor 54 shown in FIG. 8*b*. It is understood that the accelerometer 54 shown in FIG. 8*b* could be a three-axis accelerometer and have additional function in addition to sensing the tap input or third input. For example, the accelerometer could be used to wake-up the device upon motion as well as speed and distance measurement for the user.

The shock sensor 54 could also be positioned on the front side 38 of the housing 16. The shock button 54 corresponds to a third input and is operably connected to the controller 18 for controlling the portable electronic module 12. It is understood that the shock button 54 possesses required sensitivity to sense taps or forces applied to the screen 39 by the user. As shown in FIG. 2, the shock button 54 is configured to operate in a z-axis direction. The user may activate the third input by tapping or pressing on the crystal 39 or display screen. This tapping or pressing on the display screen 39 will activate the shock button 54 or tap button 54. Thus, the shock button 54 has a sensitivity such that a tap on the crystal 39 activates the shock button 54 and applies certain inputs associated with the controller 18. In an exemplary embodiment, the z-axis direction is a direction that is generally normal to the screen 39. It is understood that directions varying from a normal direction can also be sufficient to activate the shock button.

Additionally, the shock button 54 may be configured to correspond with a fourth input of the controller 18 for controlling the portable electronic module 12. For instance, the shock button 54 may sense two different shock levels or forces, e.g. a soft level and a hard level. The soft level is activated when the user presses or taps with a first amount of force (F1) in order to activate the soft level of the sensor 54. The hard level is activated when the user presses or taps with a greater amount of force (F2) to activate the hard level of the sensor 54. Additional levels could also be incorporated into the shock button 54. Additional tapping sequences can also be operably associated with the button 54 to provide additional inputs to the watch 10. Generally, the watch 10 can be programmed to receive a plurality of taps to provide a desired input to the watch 10 and for the watch to provide a particular action in response to the input. For example, a fast double tap or triple tap could provide a preset input. In addition, as further described herein, the watch 10 may have a variety of different operational modes. The various tap or tapping sequences could be assigned to different inputs based on a particular operational mode. The tap-related inputs can also be assigned to the watch at the user's computer location. Once assigned at the user's computer, and once data transfer is performed from the computer to the watch 10, the tap-related inputs are loaded onto the watch 10. The tap sensor could also be combined with other force-related sensors wherein a tap combined with dragging the user's finger across the screen could provide yet additional input(s). Thus, the watch 10 may provide the shock button in combination with a touch screen for additional input capabilities. As a further exemplary embodiment, the tap or tapping sequence may provide other specific inputs if the user is in the GPS operational mode of the watch 10. The sensors can further be configured to sense forces applied to the screen in different directions other than a general normal force on the screen. The shock button tap sequences could also be combined with the other inputs such as the side button 150 and end button 152.

As further shown in FIG. 4, the output device assembly 22 includes a plurality of output devices including a display 56. The USB connector 24 may also be considered an output device when transferring data from the electronic module 12. It is further understood that the output device assembly 22 may include an audible speaker if desired. The controller 18 can have additional capabilities for communicating with other devices such as digital music players or other electronic devices.

The display 56 is located generally proximate the front side 38 of the housing 16 and is positioned beneath the crystal 39 or screen 39. The display 56 is operably connected to the controller 18 and includes a plurality of different display fields as shown in the user interface display screens to be described. In cooperation with the user interface associated with the watch 10, information is displayed in the various display fields as described in greater detail below. As also described, a user can modify what information is displayed and the manner in which the information is displayed. In one exemplary embodiment, the display 56 may be a liquid crystal display (LCD) screen. The display 56 may also have a negative screen. The negative screen may give the user the option to reverse the appearance of text from black numbers on a white background to white numbers on a black background. This negative screen may also be referred to as reverse display or negative display. The negative screen may help to reduce the glare for many users. It is understood that the portable electronic module 12 can have additional or alternate input devices and output devices.

Figure 10:
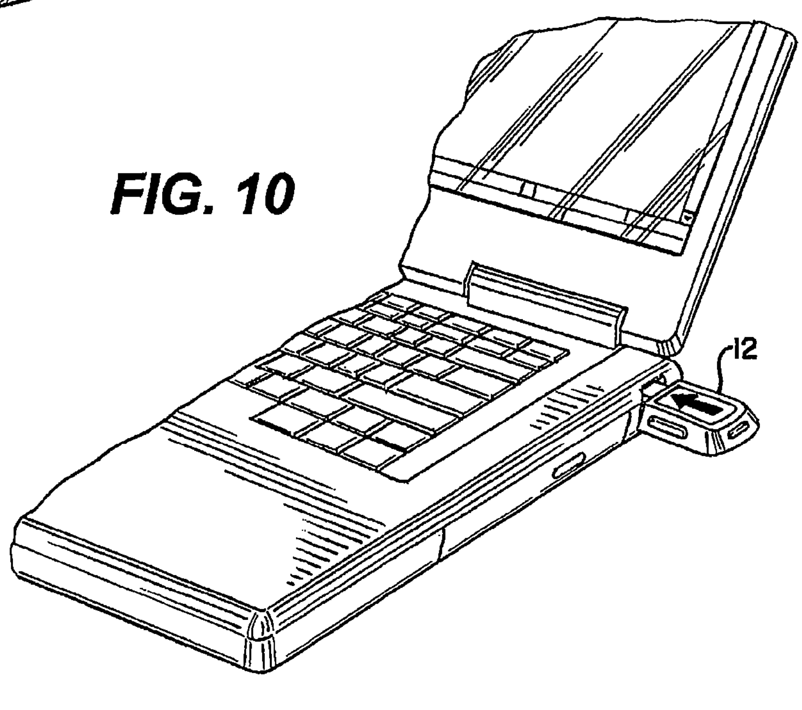

The electronic module has a rechargeable battery contained within the housing to provide power to the watch 10. The rechargeable battery is charged such as when the user plugs the electronic module into a computer as shown in FIG. 10. It is understood that the battery associated with the controller can utilize a plurality of batteries or power sources. A first battery may be utilized for the general watch/chronograph functions. A second battery may be utilized for other controller functions including communicating with the sensors for example. The first battery would be a typical battery that has a long life and support the basic watch functions. The other second battery can be a traditional rechargeable battery to support the additional controller functions associated with monitoring athletic performance, which functions may be more demanding on the power source. In such configuration, the watch functions would not be compromised even if the rechargeable battery was depleted by the athletic performance monitoring functions or if the user had not worked out for some time and had not charged the electronic module.

Carrier

Figure 6:
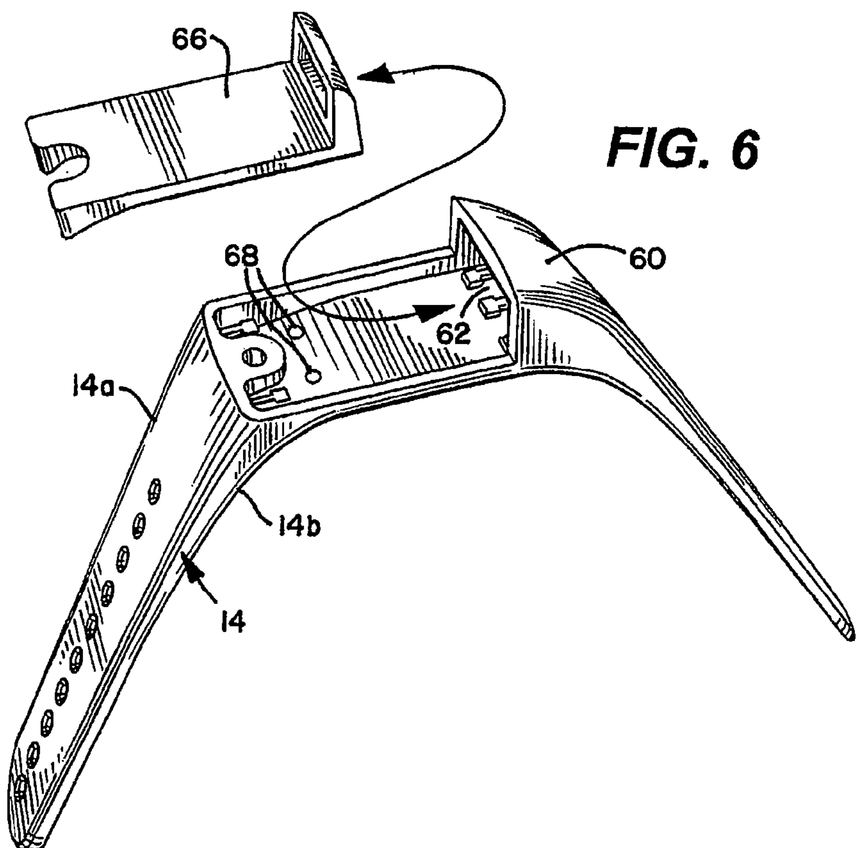

As shown in FIGS. 1-7, the carrier 14 is generally in the form of a wristband 14 having a central portion between a first end portion and a second end portion. The wristband 14 may include a first member and second member generally molded or connected together. The wristband 14 is flexible to fit around a user's wrist. In one exemplary embodiment, the wristband 14 may be injected molded of a flexible polymeric material. The wristband 14 has receiving structures for connection to the portable electronic module 12. As shown in FIG. 6, the carrier 14 includes a protective sleeve 60 proximate the central portion and having an opening 62 in communication with an internal passageway 64. The communication connector 24 is received through the opening 62 and into the internal passageway 64. The protective sleeve 60 has a generally contoured outer surface. The sleeve 60 may have internal structure for assisting in securing the connector 24, such as ridges that provide an interference type fit between the sleeve 60 and the connector 24. As further shown in FIG. 6, the central portion of the wristband 14 may have an insert 66 that defines a portion of the opening 62. A vent may be provided through a bottom portion of the wristband 14 and is in communication with the passageway 64 proximate the connector 24 when inserted into the wristband 14. The vent allows any moisture to escape from the wristband 14 and be channeled away from the connector 24. Also at the central portion, the carrier 14 has a pair of apertures 68 dimensioned to respectively receive the pair of protrusions 44 of the portable electronic module 12.

As further shown in the figures, the first end portion has a pair of holes to accommodate a removable closure 70 used to fasten the wristband 14 to a wrist of a user. To this end, the removable closure 70 cooperates with the plurality of holes in the wristband 14. The removable closure 70 has a plate member 72 and a plurality of posts 74 extending generally in a perpendicular direction from the plate member 72. In the exemplary embodiment, the plate member 72 has two posts 74. To wear the wristband, first the removable closure 70 is connected to the first end portion of the wristband strap wherein the pair of holes is provided to receive the posts 74. The wristband 14 is positioned around the user's wrist and the posts 74 are inserted into holes provided on the second end portion of the wristband 14 as can be appreciated from FIG. 2. After the posts 74 are inserted into the pair of holes of the first end portion of the wristband 14 and the plurality of holes of the second end portion of the wristband 14, the first end portion and second end portion of the wristband 14 overlap one another. With the use of a pair of posts 74, the removable closure 70 allows for a secure connection and greater flexibility in connection providing for a greater adjustment to accommodate for a range of wrist sizes.

Additionally, the plate member 72 can have indicia 76 thereon. The plate member 72, when attached to the wristband 14 faces away from the wristband 14 wherein the indicia 76 can be viewed by others. Because the removable closure 70 is easily removable, the closure 70 can be used as a memento, different closures can be provided and used with the wristband 18. Thus, removable closures 70 having different indicia can be provided and used as a keepsake, memento, or a reward for accomplishing a goal, participating in a race, or otherwise achieving a certain level of fitness. Indicia can take various forms including wording, graphics, color schemes, textures, or other designs etc.

The watch 10 can utilize alternate closure mechanisms. For example, as shown in FIG. 64, the wristband 14 can utilized a traditional buckle member in conjunction with an alternate removable closure **70*a*. In this embodiment, the removable closure 70 has a smaller circular plate member 72*a* having a single post 74*a*. The removable closure 70*a* is attached at a distal end of one of the end portions of the wristband 14 and then inserted into the other portion of the wristband 14**.

Figure 21:
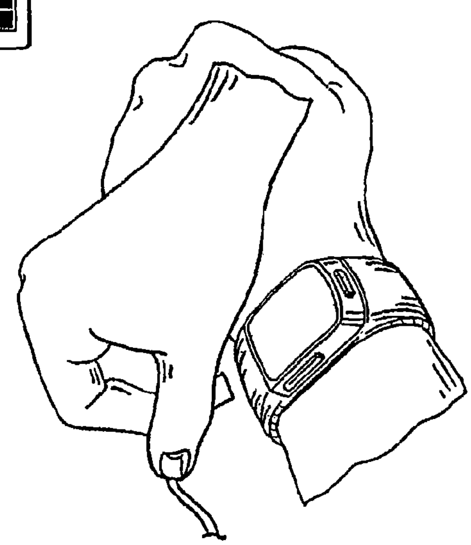
Figure 22:
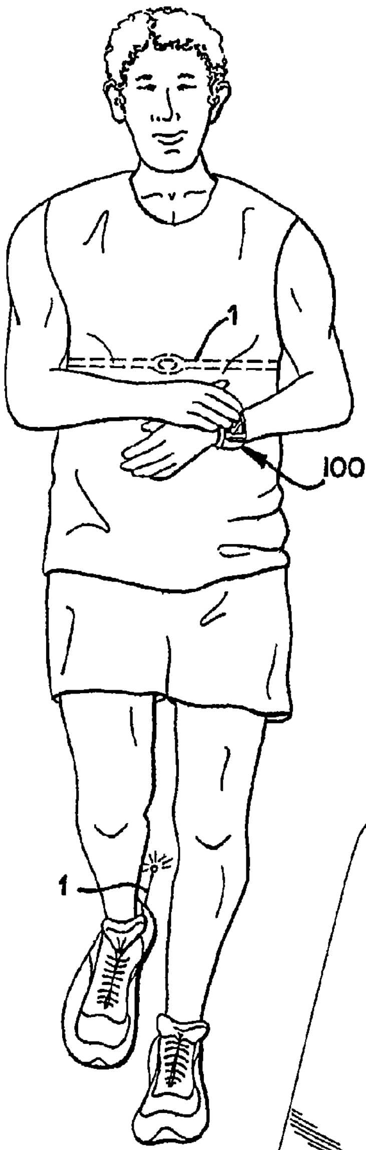
Figure 23:
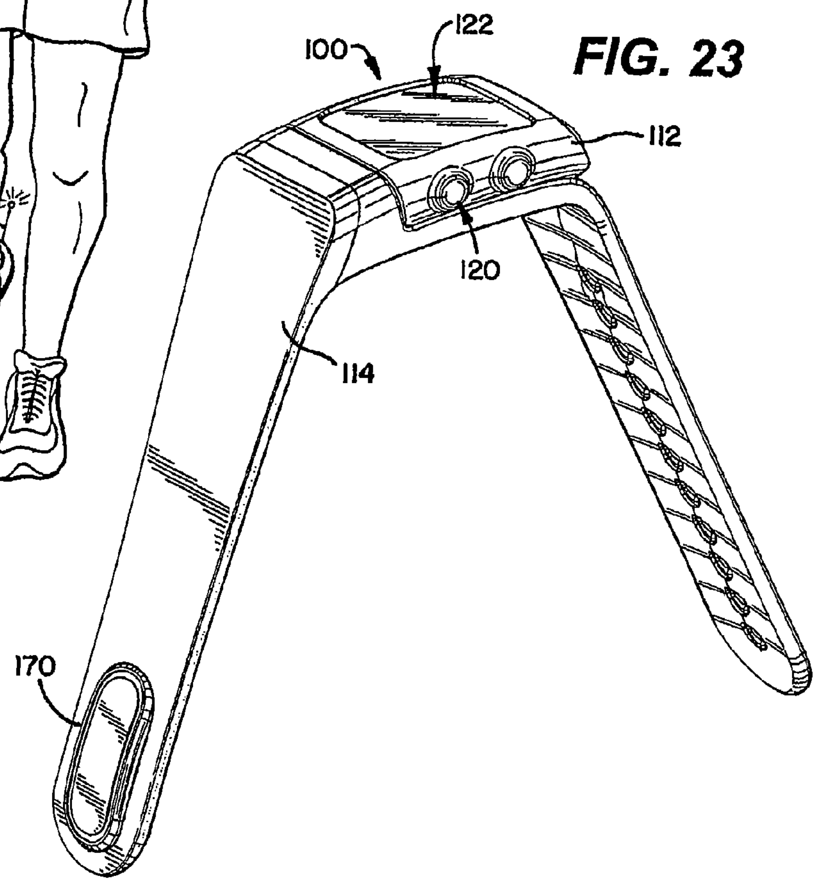
Figure 24:
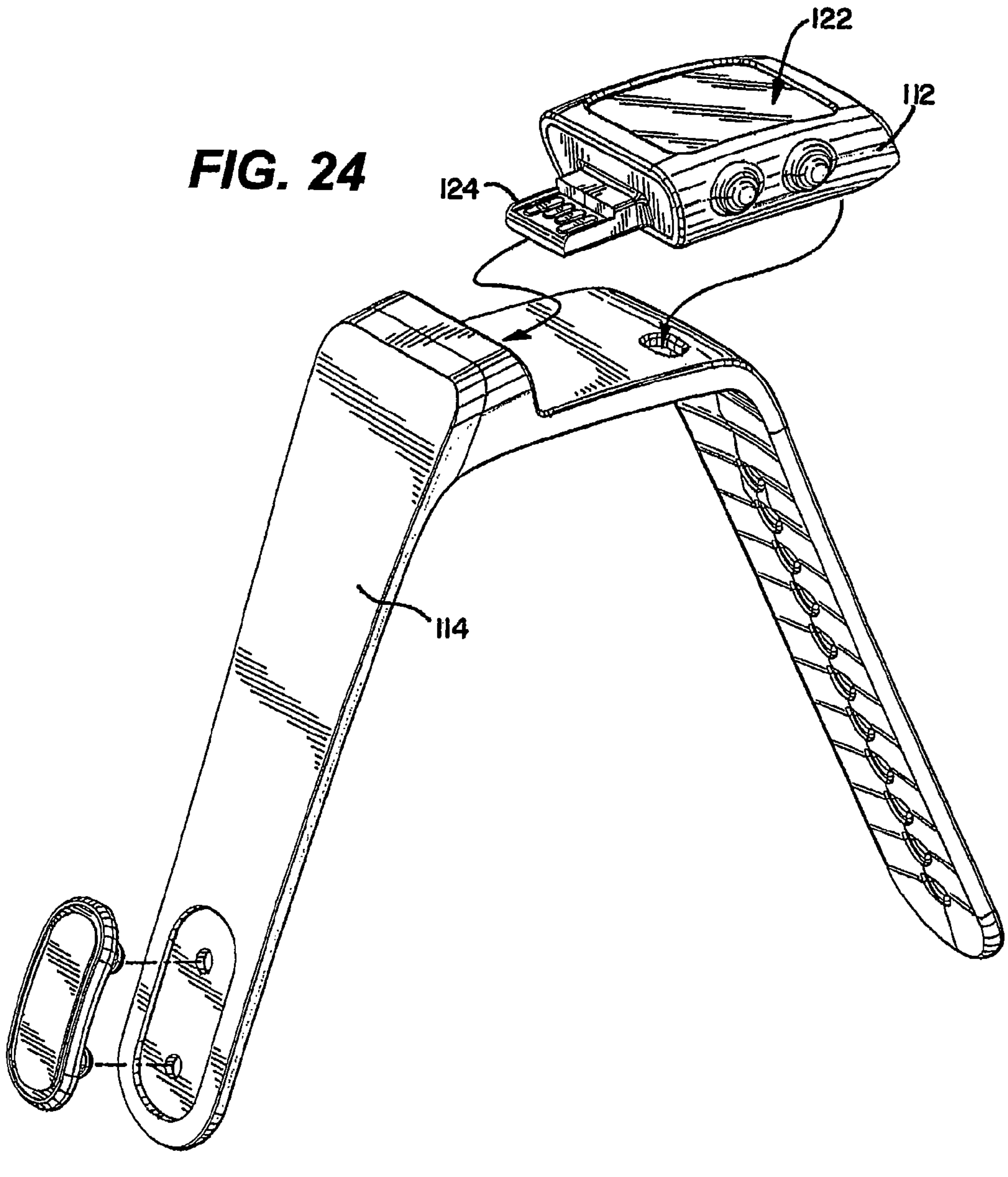

As discussed, the portable electronic module 12 is removably connected to the carrier 14 or wristband 14. As explained in greater detail below, the portable electronic module 12 may be plugged into a computer via the communication connector 24 wherein data and other information may be downloaded to the module 12 from a remote location such as an athletic performance monitoring site, or remote site (FIGS. 9, 10, 16-20). Data recorded by the electronic module 12 may also be uploaded to the computer and then the remote site. Data can be displayed as shown in FIGS. 16, 17, 19 and 20. Additional data can also be downloaded from the remote site or computer to the portable electronic module 12. The portable electronic module 12 can then be re-connected to the wristband 14. The connector 24 is inserted into the sleeve 60 of the carrier 14, and the protrusions 44 are placed into the respective apertures 68 of the carrier 14. It is understood that the protrusions 44 and apertures 68 can be reversed on the electronic module 12 and carrier 14 if desired. The enlarged heads of the protrusions 44 abut against the wristband 14 to retain the module 12 onto the wristband 14. This provides for a wearable watch 10 wherein a user can utilize additional features of the watch 10 described herein relating to athletic performance and fitness. As discussed, the electronic module 12 is removably connected to the wristband 14 wherein data can be transferred by plugging the module 12 into the computer as shown in FIG. 10. In another exemplary embodiment as shown in FIG. 21, the module 12 can have a port to receive a communication cord used for data transfer between the module 12 and a computer or remote site.

General Operation

Figure 18:
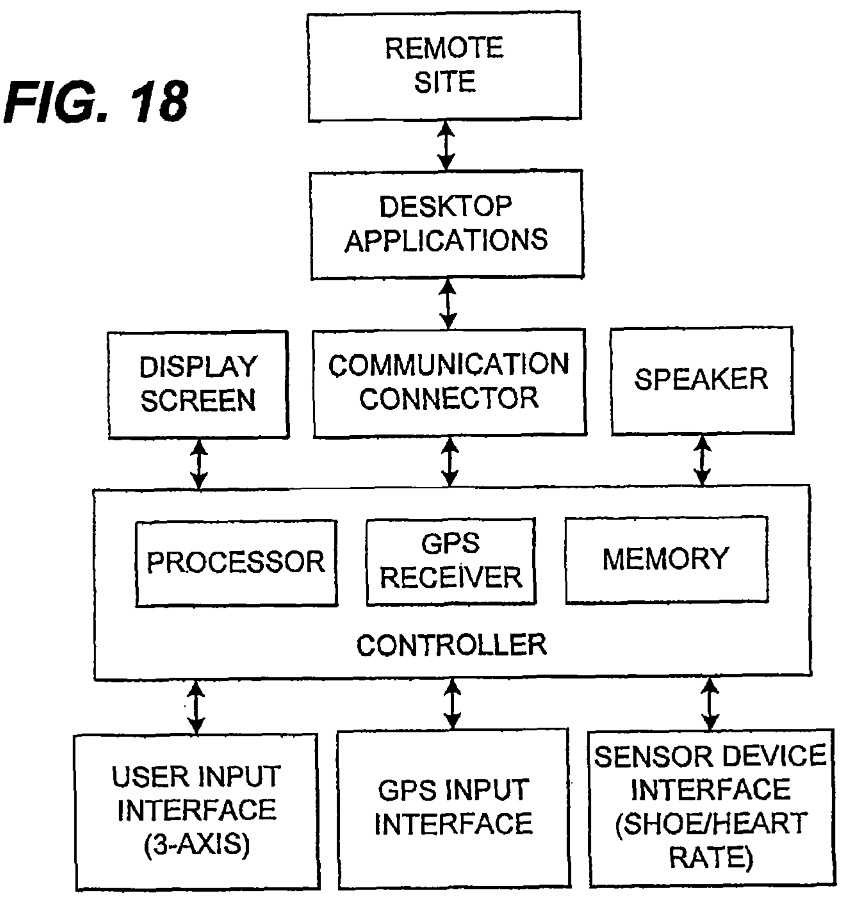

It is understood that the portable electronic module 12 of the watch 10 has associated software to function with the user interfaces associated with the watch 10. FIG. 18 shows schematically components of an overall system associated with the watch 10. As explained in greater detail below, in addition to having chronograph functions like a conventional watch, the watch 10 has additional athletic functionality. For example, a user wearing shoes having a sensor(s) 1 mounted therein or a heart rate monitor 1 can use the watch 10 to wirelessly communicate with the sensor(s) 1 and monitor performance such as during exercise including running. Other sensor types can also be incorporated for use by the user and communication with the watch 10. The watch 10 can record and monitor athletic performance of the user.

Figure 14:
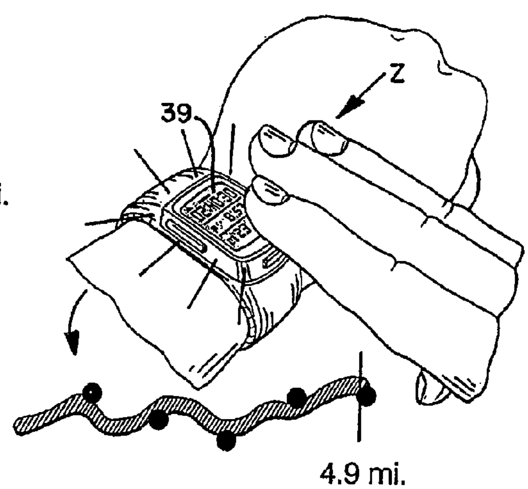
Figure 15:
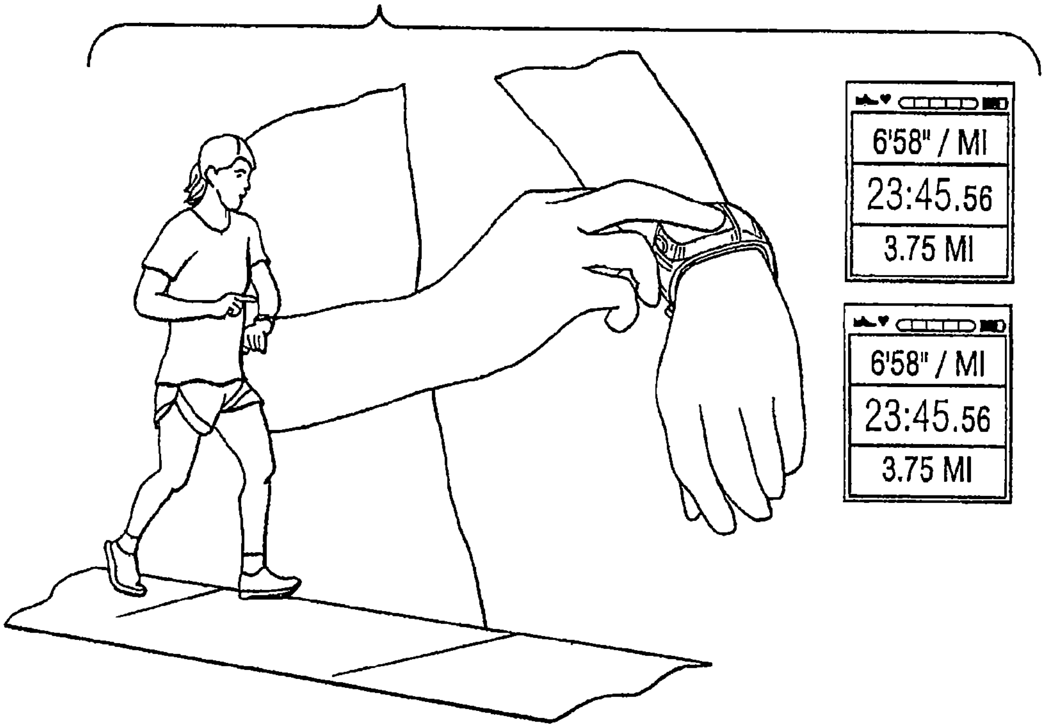
Figure 16:
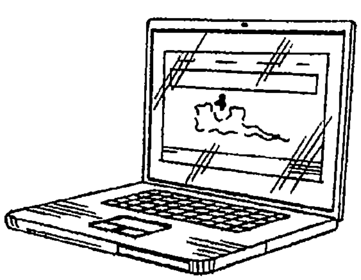
Figure 17:
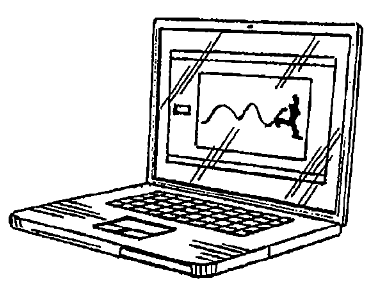

Generally, the user controls operation of the watch 10 utilizing the three inputs described above, namely the side button 50, the end button 52 and the shock button 54. These inputs are configured such that the user provides inputs along first, second and third axes. In an exemplary embodiment, the inputs are configured in a tri-axes configuration, namely an x-y-z axes configuration wherein axes are positioned in generally perpendicular fashion (FIG. 2). This provides an enhanced user friendly user interface wherein the user can easily control operation of the watch 10 while participating in athletic activity. As can be appreciated from FIG. 11, the side button 50 is typically actuated by a user squeezing or pinching the side button 50 and opposite housing side 36 generally along the x-axis. The end button 52 is typically actuated by a user squeezing or pinching the end button 52 and proximate the opposite housing end 30 generally along the y-axis (FIG. 12). Finally, the shock button 54 is typically actuated by the user tapping the front side 38 of the housing 16, typically the crystal 39, generally along the z-axis (FIGS. 14 and 15). As explained in greater detail below, the side button 50 is normally utilized to scroll or cycle through a list of items or values within the user interface, by pressing up or down in order to scroll through the list of items. The end button 52 is normally utilized for selecting items within the user interface, such as the options of "SELECT" and "OK." The shock button 54 is generally utilized for lighting the backlight and other specific functions such as marking of laps. For example, to light the backlight associated with the controller 18 and display 56, a user can simply tap the crystal 39. As also discussed in greater detail below, a user can tap the crystal 39 to actuate the shock button 54 to "mark" a segment of an athletic performance. In one exemplary embodiment, the user marks laps during a workout as discussed in greater detail below regarding a user interface associated with the watch 10. Tapping the screen 39 to activate the shock button 54 is easily done while the user can keep stride during a run (FIG. 15). As can be appreciated from FIGS. 10, 14 and 19, in response to the electronic module 12 being plugged into the user's computer, athletic performance data is uploaded such as to a remote site. The remote site may be configured to display the athletic performance data in unique configurations including as a "run-line" corresponding to the user's performance and wherein the run-line includes indicia such as dot markings on the run-line corresponding to the taps or marks designated by the user during the workout. The user may also have the ability to customize the buttons to their own preferences by utilizing the set-up functionality within the watch 10 or other software such as from a desktop utility associated with the watch 10 as well as remote site functionality that may be inputted into the watch 10 such as through the USB connector 24. Additional operability and features of the watch 10 will be described in greater detail below.

FIGS. 22-49 disclose another embodiment of the athletic watch of the present invention, generally designated with the reference numeral 100. Similar structures will be designated with similar reference numerals in the 100 series of reference numerals Similar to the embodiment of FIGS. 1-21, the athletic watch 100 generally includes an electronic module 112 and a carrier 114 in the form of a wristband 114 in the exemplary embodiment. Similar to the watch 10 of FIGS. 1-21, the watch 100 has traditional uses such as incorporating a chronograph for general timekeeping, as well as the unique functionality for athletic and fitness use such as monitoring athletic performance of the user. Thus, the watch 100 can communicate with a shoe-based sensor 1 and/or a hear rate monitor 1 (shown in phantom in FIG. 22). It is further understood that the watch 100 has the same operational features regarding user interfaces, GPS and other features as described herein.

Electronic Module

As shown in FIGS. 23-28, the portable electronic module 112 includes various components supported by a housing 116, the components including a controller 118 having a suitable processor and other known components, an input device assembly 120, an output device assembly 122, and a communication connector 124, which may be considered a part of the input device assembly 120 and/or the output device assembly 122 in various embodiments. The communication connector 124 may be, for instance, a USB connector 124. The controller 118 is operably connected to the input device assembly 120, the output device assembly 122 and the communication connector 124. As discussed, the electronic module 112 may also include a GPS receiver and associated antenna for incorporating various GPS features.

Figure 25:
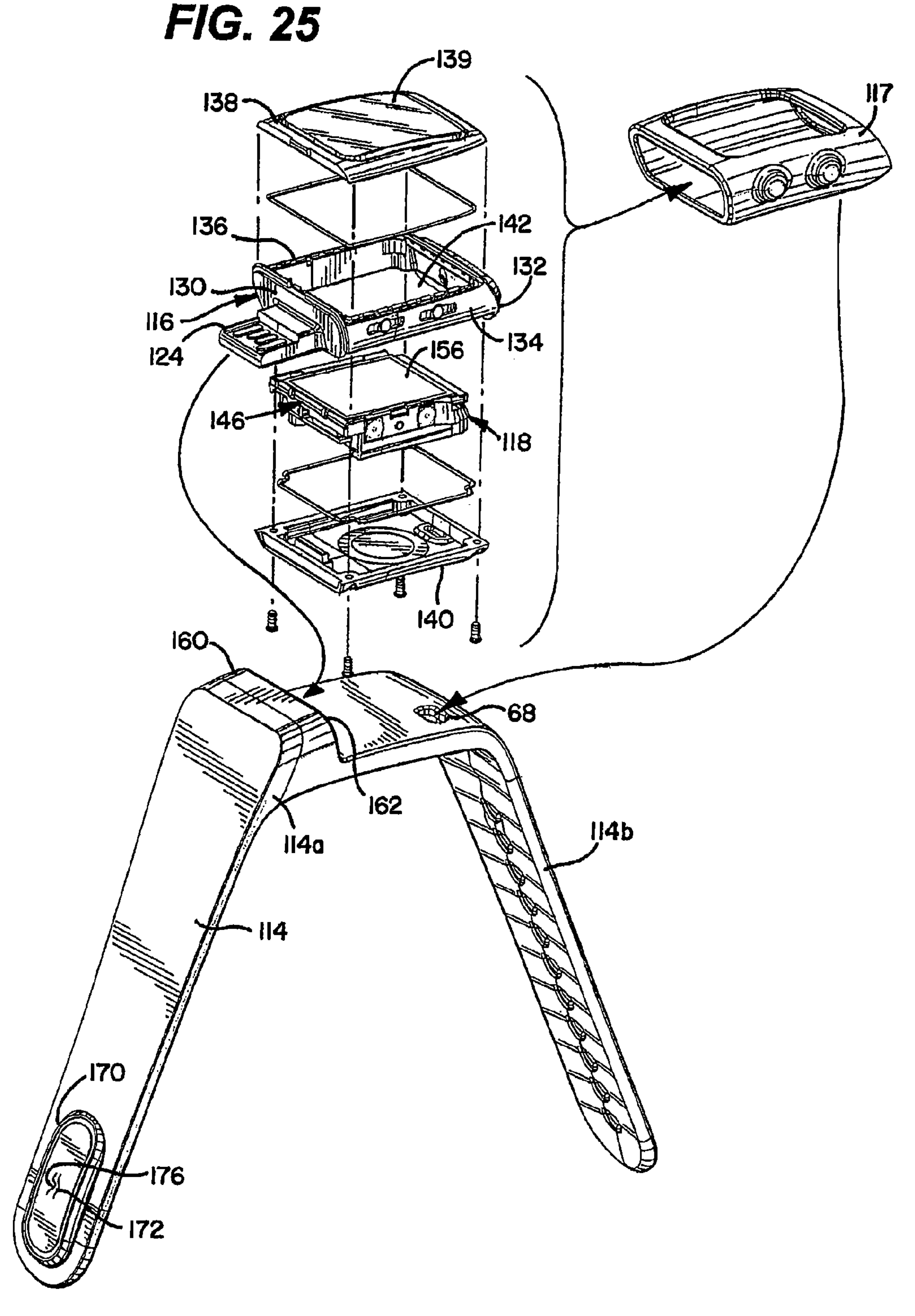
Figure 27:
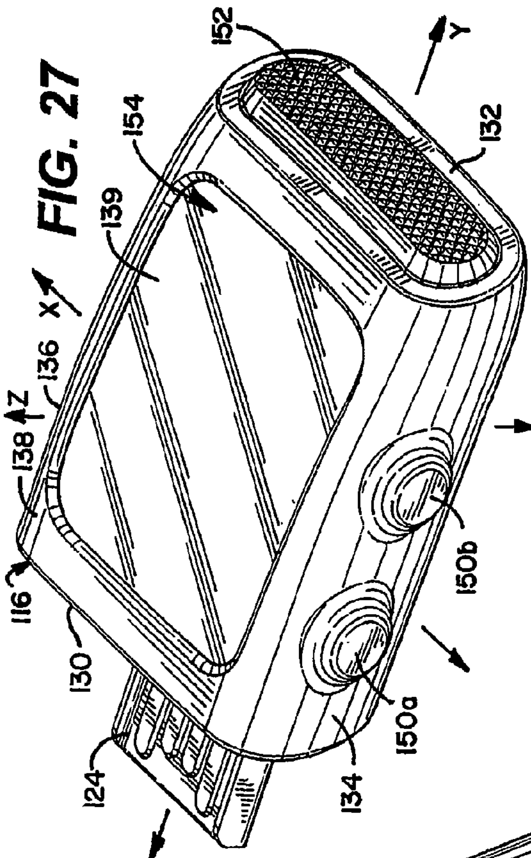
Figure 29:
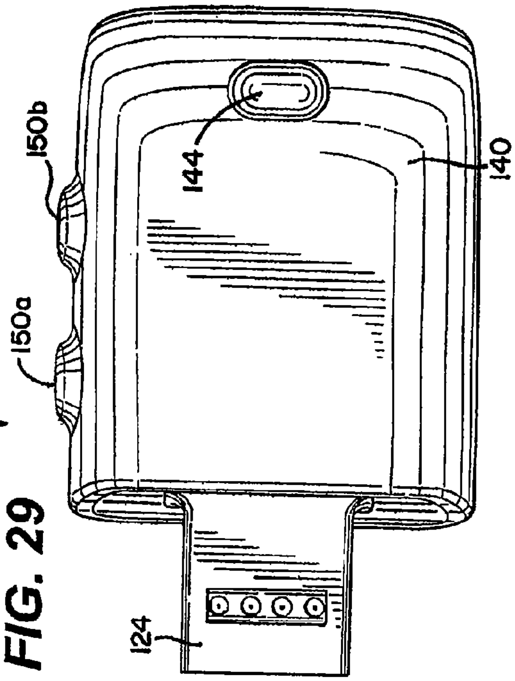
Figure 26:
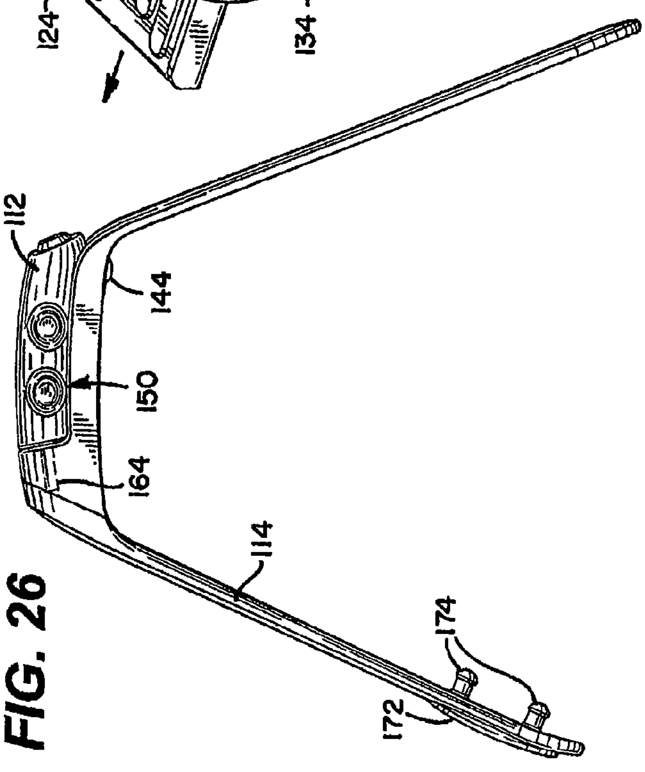
Figure 28:
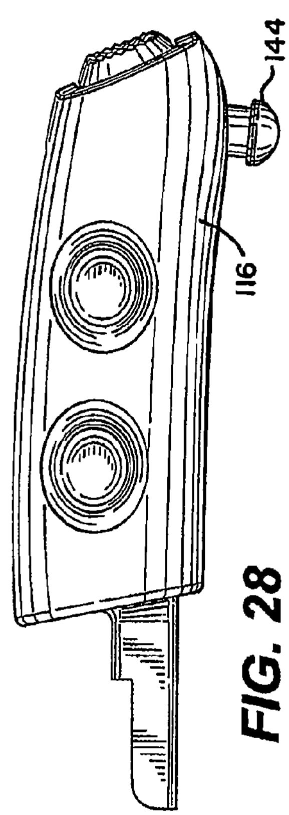

As depicted in FIG. 25, the housing 116 has a first end 130, a second end 132, a first side 134, a second side 136, a front side 38, and a back side 140. The front side 138 may also include a glass member 139 or crystal 139 for viewing a display of the controller 118 therethrough. The housing 116 defines a cavity 142 therein for accommodating the various components of the controller 118. It is understood that the housing ends, sides and crystal cooperate to enclose the housing 116. As further shown in the figures, the communication connector 124 extends from the first side 130 of the housing 116. It is understood that the communication connector 124 could be positioned at various other locations of the housing 16. The communication connector 124 could also be operably connected to other portions of the watch 10 such as various portions of the carrier 114. In this embodiment, the communication connector 124 generally rigidly extends from the housing 116. As discussed, the communication connector 124 is a USB connector and may have a plurality of leads therein and wherein the leads are operably connected to the controller 118. In one exemplary embodiment, the leads can be gold-plated, platinum or other corrosion resistant materials. The housing 116 can be made from a variety of different rigid materials including metal or generally rigid polymeric materials. In this exemplary embodiment, the housing 116 is injection molded. The USB connector 124 generally provides a water-resistant connection with the housing 16 and controller 18. As shown in FIGS. 26, 27-28, the housing 116 has a protrusion 144 extending from the back side 140 of the housing 116. It is understood that a plurality of protrusions 144 could be used if desired. Because the watch 100 may be used in fitness activities, there is some chance that the watch 10 can be subject to water or moisture such as perspiration. The housing 116 is designed to be water-resistant to protect components of the controller 118. Such structures further provide for a certain level of impact resistance. A vent opening may also be provided in the wristband 114 to channel any moisture away from the module 112. As further shown in FIG. 25, the housing 116 may also include a rubber boot 117 that is designed to generally cover surfaces of the housing 117 and serve as an outer skin. It is understood that the rubber boot 117 has an opening for the crystal 139 to be visible and for the protrusion 144 to extend through. The rubber boot 117 is cooperatively dimensioned to wrap around the housing 116 to resist any moisture or debris penetration.

As further shown in FIG. 25, the controller 118 generally has a processor 146 that is operably connected to the input device assembly 120 and the output device assembly 122 as understood by those skilled in the art. The controller 118 includes software that in cooperation with the input device assembly 120 and output device assembly 122 provide user interface features as will be described in greater below. The components of the controller 118 are contained within and supported by the housing 116. The controller 118 includes various electrical components including a rechargeable power supply (e.g., rechargeable battery or other battery types) and system memory. The controller 118 will also include an antenna 148 (FIG. 38), allowing the controller 118 and portable electronic module 112 to communicate with the sensors 1, record and store data relating to athletic performance, other time information, as well other operational features such as GPS features. The antenna 148 can take various forms including a chip antenna associated with the controller 118. Alternatively, the antenna 148 could be a sheet metal antenna. With other embodiments incorporating GPS features, a separate GPS antenna may also be provided. Thus, the watch 110 may incorporate multiple antennas. The controller 118 is operably connected to the communication connector 124 of the housing 116.

The input device assembly 120 includes a plurality of input devices such as in the form of depressible buttons. In certain exemplary embodiment, the USB connector 124 can also be considered an input device when data is transferred to the watch 100 via the connector 124. In one exemplary embodiment, the input device assembly 120 has three input buttons that collectively define a tri-axis operating configuration (e.g., x-y-z axes) (FIG. 27). The input buttons include a side button 150, an end button 152 and a shock or tap button 154.

The side button 150 is located on the first side 134 of the housing 116. The side button 150 may correspond with a first input and being operably connected to the controller 118 for controlling the portable electronic module 112. As shown in FIG. 1, the side button 150 is configured to operate in an x-axis direction. The user may activate the first input by pressing on the side button 150 on the first side 134 of the housing 116. The user may squeeze the side button 150 and opposite second side 136 of the housing 116 along the x-axis direction (FIG. 27). In an exemplary embodiment, the side button 150 may include a pair of buttons that are operably associated with the controller 118 for controlling the portable electronic module 112. For example, the side button 150 has a first side button 150*a* and a second side button 150*b*. Thus, a user may press the first side button 150*a*, for a first input, and may press the second side button 150*b* for a second or additional input different from the first input. As explained in greater detail below regarding the operation of the watch 110, the side buttons 150*a*,150*b* may be utilized as a toggle button or scroll button, with the first input corresponding to the first side button 150*a* and the additional input corresponding to the second side button 150*b*. The side buttons 150*a*,150*b* may then be used to move a cursor on the display up or down in order to select an item from a list. It is also understood that the side button 150 may be positioned on the opposite side 136 of the housing 16, which may be considered a three o'clock position. The side button 150 shown in FIG. 27 is considered to be in the nine o-clock position.

The end button 152 is located on the second end 132 of the housing 116. The end button 152 corresponds to a second input and is operably connected to the controller 118 for controlling the portable electronic module 112. As shown in FIG. 27, the end button 152 is configured to operate in a y-axis direction. The user may activate the second input by pressing on the end button 152 on the second end 132 of the housing 116. The user may squeeze the end button 152 and the opposite first end 130 of the housing 116 along the y-axis direction (FIG. 27). As explained in greater detail below regarding the operation of the watch 110, the end button 152 may be used as the OK or SELECT function.

Figure 30:
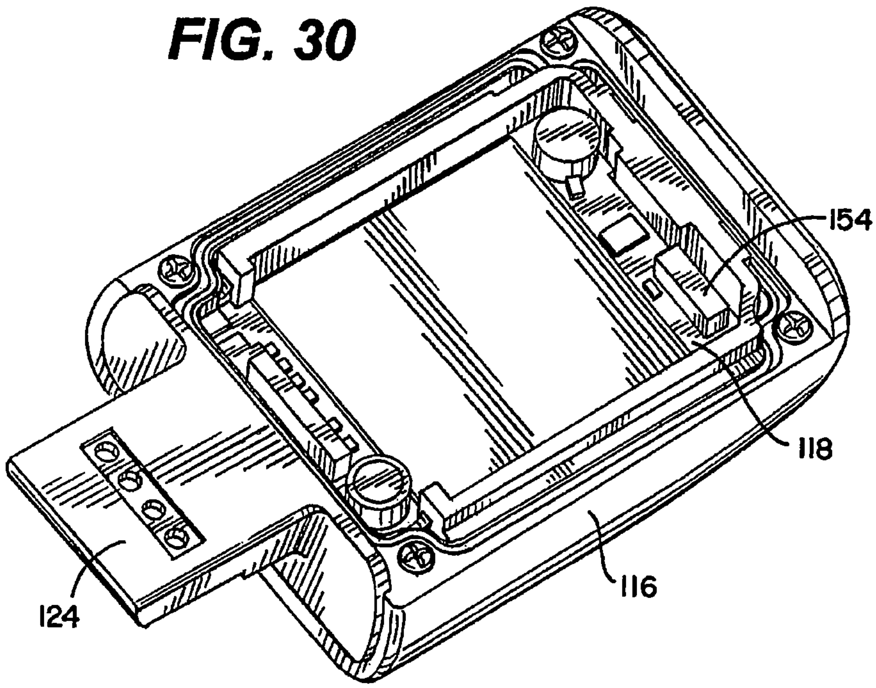
Figure 31:
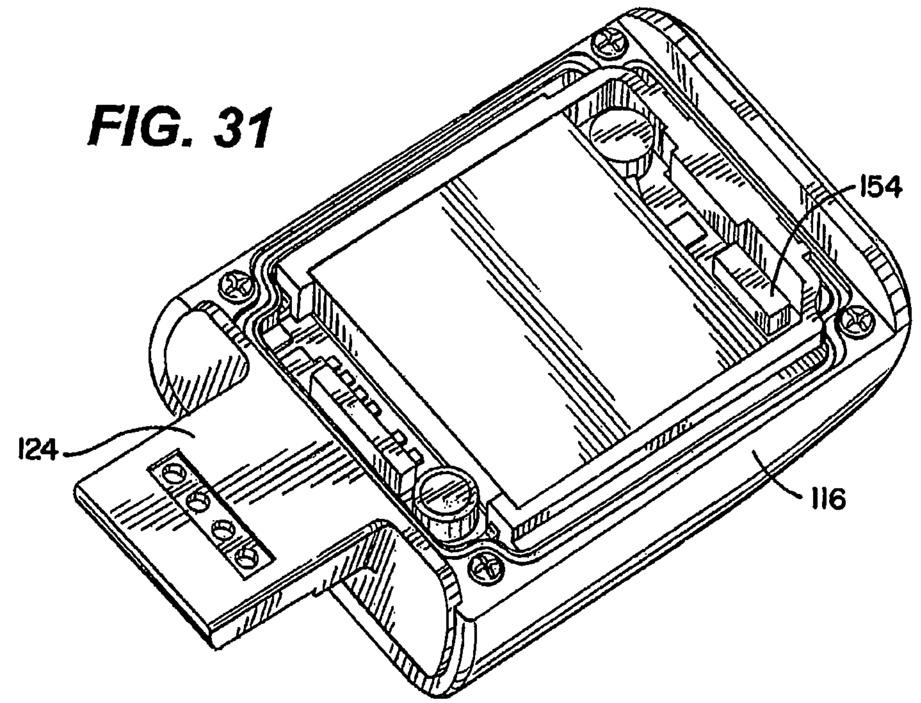
Figure 35:
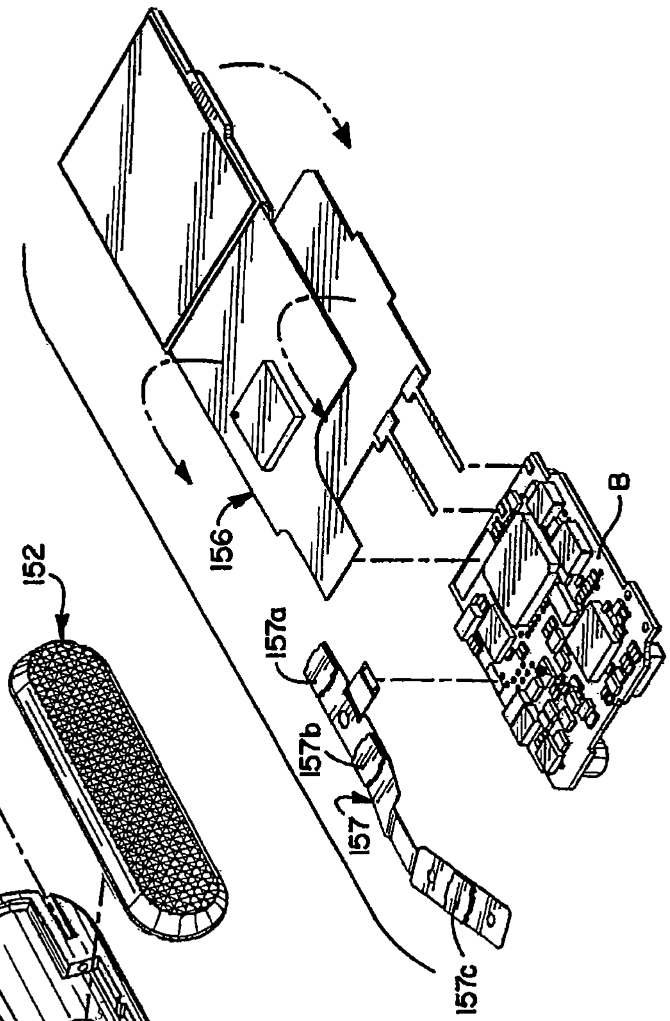

In an exemplary embodiment, the shock button 154 or tap button 154 generally corresponds to a shock sensor that is preferably located within the housing 16. It is understood that the discussion above regarding the shock button 54 of FIGS. 1-21 equally applies to the shock button 154 in this embodiment. Thus, the shock button 154 can be operably connected to a printed circuit board of the controller 118. It is understood that the button 154 can take other forms other than a shock sensor and also may be located in alternate positions within the housing 116. The shock sensor 154 is generally positioned within the housing 116 (FIGS. 30-31) and beneath the crystal 139. As shown in FIGS. 30 and 31, the shock button 154 is positioned proximate a periphery of the controller 118 and housing 116. FIG. 31 shows the shock button 154 adjacent to the battery positioned in the housing 116. As discussed above, the shock button 154 could be positioned at other locations such as generally proximate a center of the housing controller 18 and housing 116. The shock sensor 154 could be positioned on the front side 138 of the housing 116. The shock button 54 corresponds to a third input and is operably connected to the controller 118 controlling the portable electronic module 12. As shown in FIG. 27, the shock button 154 is configured to operate in a z-axis direction. The user may activate the third input by tapping or pressing on the crystal 39 or display screen. This tapping or pressing on the display screen 39 will activate the shock button 154 or tap button 154. Thus, the shock sensor 154 has a sensitivity such that a tap on the crystal 39 activates the shock button 54. Additionally, the shock button 154 may be configured to correspond with a fourth input of the controller 118 for controlling the portable electronic module 112. For instance, the shock button 154 may sense two different shock levels or forces, e.g. a soft level and a hard level. The soft level is activated when the user presses or taps with a first amount of force F1 in order to activate the soft level of the sensor 154. The hard level is activated when the user presses or taps with a greater amount of force F2 to activate the hard level of the sensor 154. Additional levels could also be incorporated into the shock sensor 154.

As further shown in FIGS. 25 and 27, the output device assembly 122 includes a plurality of output devices including a display 156. The USB connector 124 may also be considered an output device when transferring data from the electronic module 112. It is further understood that the output device assembly 122 may include an audible speaker (FIG. 47) if desired. The controller 118 can have additional capabilities for communicating with other devices such as digital music players or other electronic devices.

The display 156 is located generally proximate the front side 138 of the housing 116 and is positioned beneath the crystal 139 or screen 139. The display 156 is operably connected to the controller 118 and includes a plurality of different display fields as shown in the user interface display screens to be described. In cooperation with the user interface associated with the watch 100, information is displayed in the various display fields as described in greater detail below. As also described, a user can modify what information is displayed and the manner in which the information is displayed. In one exemplary embodiment, the display 156 may be a liquid crystal display (LCD) screen. The display 156 may also have a negative screen. The negative screen may give the user the option to reverse the appearance of text from black numbers on a white background to white numbers on a black background. This negative screen may also be referred to as reverse display or negative display. The negative screen may help to reduce the glare for many users. It is understood that the portable electronic module 112 can have additional or alternate input devices and output devices.

The electronic module has a rechargeable battery contained within the housing to provide power to the watch 100. The rechargeable battery is charged such as when the user plugs the electronic module into a computer as shown in FIG. 10. It is understood that the battery associated with the controller can utilize a plurality of batteries or power sources. A first battery may be utilized for the general watch/chronograph functions. A second battery may be utilized for other controller functions including communicating with the sensors for example. The first battery would be a typical battery that has a long life and support the basic watch functions. The other second battery can be a traditional rechargeable battery to support the additional controller functions associated with monitoring athletic performance, which functions may be more demanding on the power source. In such configuration, the watch functions would not be compromised even if the rechargeable battery was depleted by the athletic performance monitoring functions or if the user had not worked out for some time and had not charged the electronic module. FIG. 31 discloses a battery positioned in the housing 116.

Carrier

As shown in FIGS. 23-26, the carrier 114 is generally in the form of a wristband 114 having a central portion between a first end portion and a second end portion. The wristband 114 may include separate members generally molded or connected together. The wristband 114 is flexible to fit around a user's wrist. In one exemplary embodiment, the wristband 114 may be injected molded of a flexible polymeric material. The wristband 114 has receiving structures for connection to the portable electronic module 112. The carrier 114 includes a protective sleeve 160 proximate the central portion and having an opening 162 in communication with an internal passageway 164. The communication connector 124 is received through the opening 162 and into the internal passageway 164. The protective sleeve 160 has a generally contoured outer surface. The sleeve 160 may have internal structure for assisting in securing the connector 124, such as ridges that provide an interference type fit between the sleeve 160 and the connector 124. A vent may be provided through a bottom portion of the wristband 114 and is in communication with the passageway 164 proximate the connector 124 when inserted into the wristband 114. The vent allows any moisture to escape from the wristband 118 and be channeled away from the connector 124. Also at the central portion, the carrier 14 has an aperture 68 dimensioned to respectively receive the protrusion 44 of the portable electronic module 112.

As further shown in the figures, the first end portion has a pair of holes to accommodate a removable closure 170 used to fasten the wristband 114 to a wrist of a user. To this end, the removable closure 170 cooperates with the plurality of holes in the wristband 114. The removable closure 170 has a plate member 172 and a plurality of posts 174 extending generally in a perpendicular direction from the plate member 172. In the exemplary embodiment, the plate member 172 has two posts 174. To wear the wristband, first the removable closure 170 is connected to the first end portion of the wristband strap 114 wherein the pair of holes is provided to receive the posts 174. The wristband 114 is positioned around the user's wrist and the posts 174 are inserted into holes provided on the second end portion of the wristband 114. After the posts 174 are inserted into the pair of holes of the first end portion of the wristband 114 and the plurality of holes of the second end portion of the wristband 114, the first end portion and second end portion of the wristband 114 overlap one another. With the use of a pair of posts 174, the removable closure 170 allows for a secure connection and greater flexibility in connection providing for a greater adjustment to accommodate for a range of wrist sizes.

Additionally, the plate member 172 can have indicia 176 thereon. The plate member 172, when attached to the wristband 114 faces away from the wristband 114 wherein the indicia 176 can be viewed by others. Because the removable closure 170 is easily removable, the closure 170 can be used as a memento, different closures can be provided and used with the wristband 114. Thus, removable closures 170 having different indicia can be provided and used as a keepsake, memento, or a reward for accomplishing a goal, participating in a race, or otherwise achieving a certain level of fitness. Indicia can take various forms including wording, graphics, color schemes, textures, or other designs etc.

FIGS. 33-49 disclose additional views and features of the watch 100 and, in particular, showing additional connection of components associated with the electronic module 112.

Figure 34:
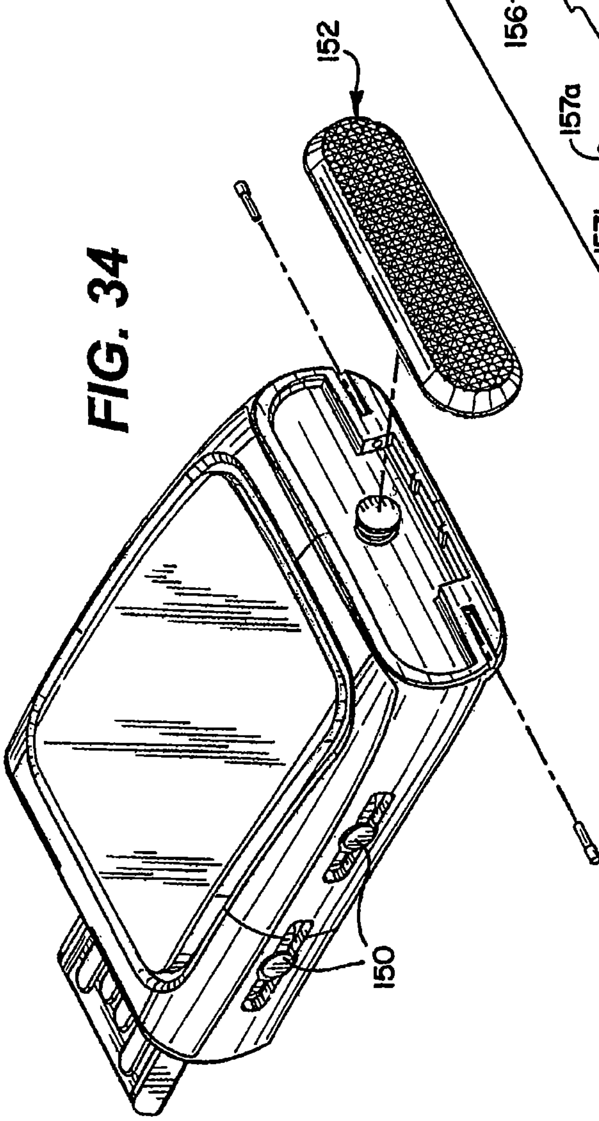
Figure 37:
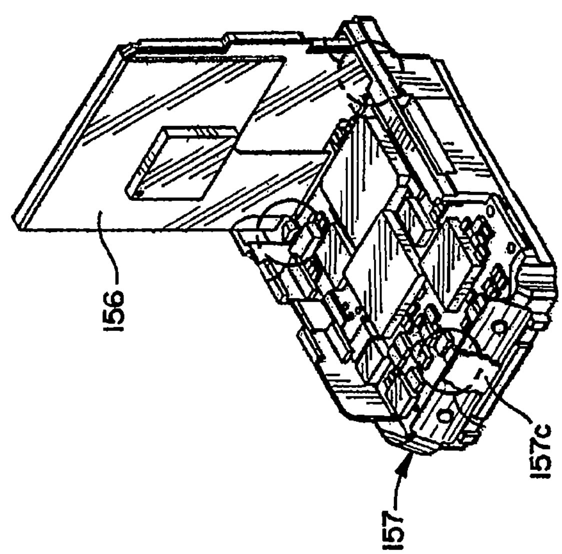

As shown in FIGS. 32-34, the housing 116 is provided and is an injection-molded component in an exemplary embodiment. The USB connector 124 may be integrally formed as part of the housing 116 and the USB connector 124 may have metal leads 125 embedded within the connector 124. Ends of the leads 125 extend into the internal cavity of the housing 116 to be in operable connection with the controller 118 as explained in greater detail below. The side button 150 and end button 152 are suitably mounted to the housing 116 and have associated resilient spring members to assist in the operability of the buttons. In an exemplary embodiment, the housing 116 has multiple components wherein a top component supporting the screen 139 is fastened to the main housing component such as by ultrasonic welding. A seal ring may also be positioned between the housing components prior to connection to provide a sealed configuration.

Figure 36:
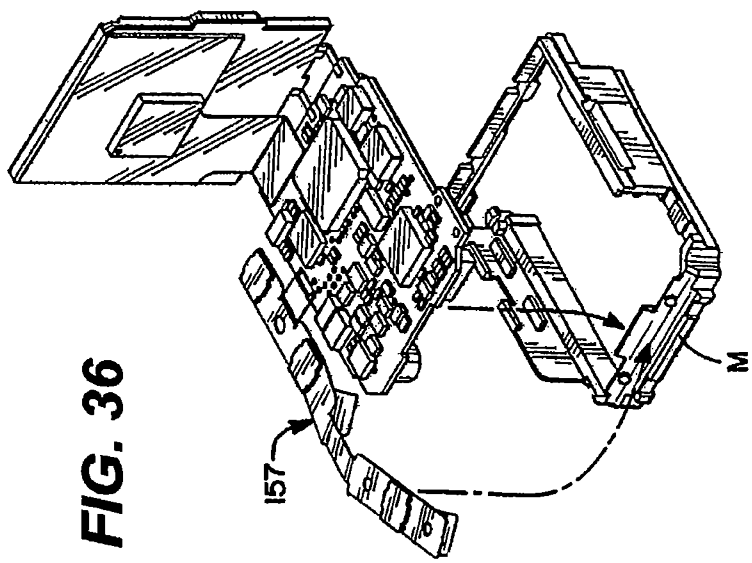
Figure 38:
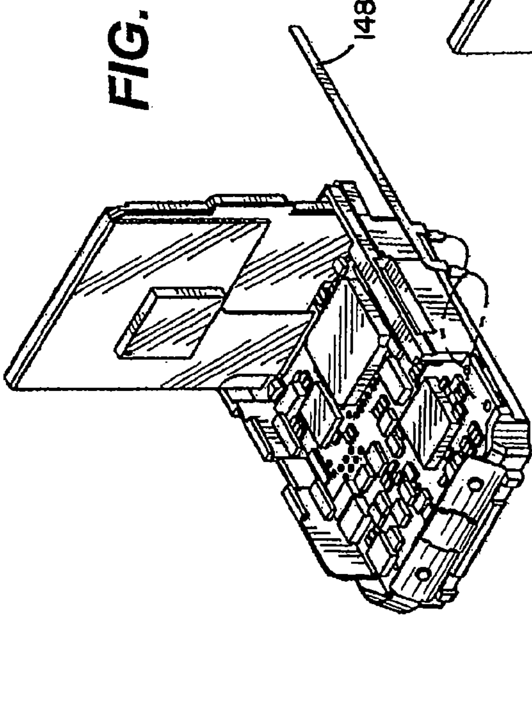
Figure 39:
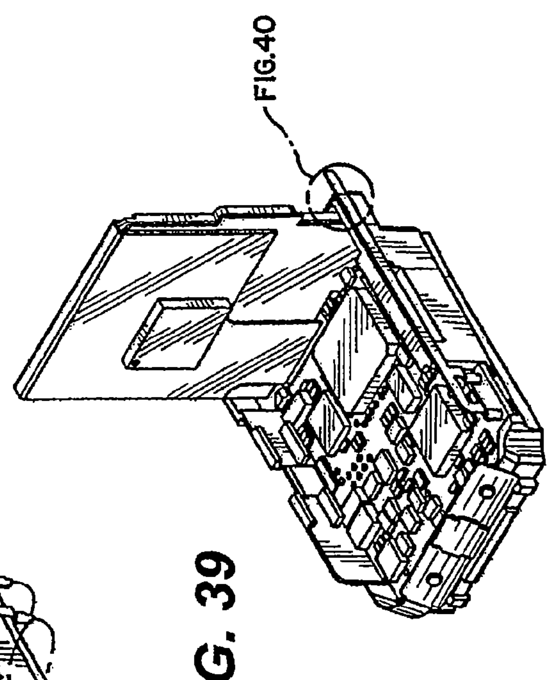
Figure 40:
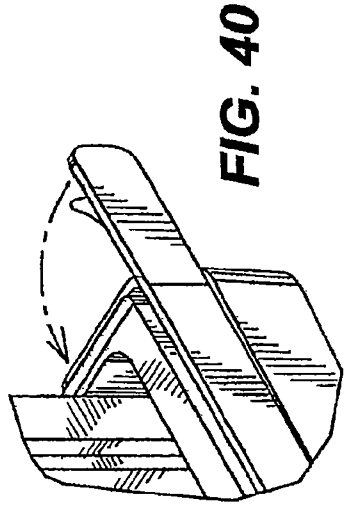
Figure 41:
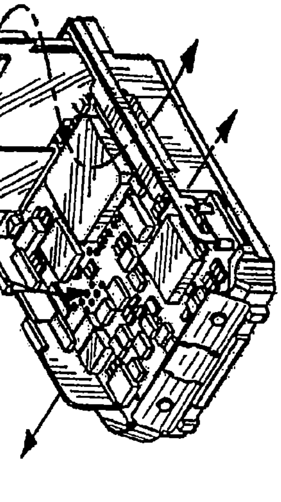
Figure 42:
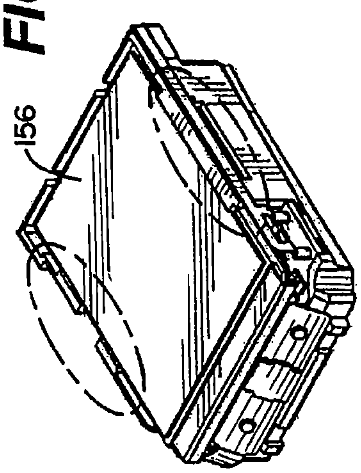
Figure 43:
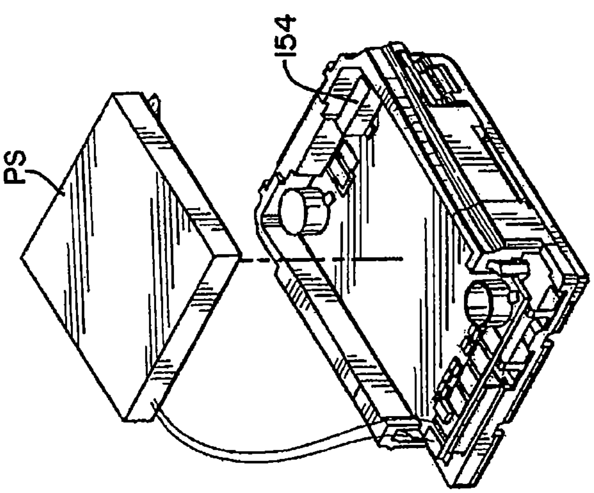

As further shown in FIGS. 35-43, the controller 118 is formed as a sub-assembly to be mounted in the housing 116. The controller 118 has a main printed circuit board B that is connected to the display 156, which is an LCD display in an exemplary embodiment. A high density connection is provided. The controller 118 further has a user input interface 157 that is also operably connected to the main printed circuit board. The user input interface 157 is a flexible member and has a first pair of members 157*a*,157*b* that correspond to the first input/side button 150*a*,150*b* as well as a second member 157*c* that corresponds to the second input/end button 152. The flexible member is capable of bending around so that one segment of the flexible member is mounted on a side of the controller 118 and a second segment of the flexible member is mounted on an end of the controller 118. The flexible member may have locating openings that mount on pegs on the mid-frame M. The user input interface 157 has a common connection to the circuit board B wherein chances for connection failure is minimized. The flexible user input interface 157 provides for a more efficient manufacture of the watch as the flexible member is more easy to handle and manipulate. The shock button 154 in the form of a shock sensor or accelerometer is also operably mounted on the main printed circuit board B consistent with the discussion regarding FIGS. 8*a* and 8*b* above. As shown in FIG. 36, the controller 118 may have a mid-frame component M to support the components of the controller 118. The antenna 148 is connected to the main printed circuit board B as shown in FIGS. 38-40. A distal end of the antenna 148 may be formed around an edge of the mid-frame M as shown in FIG. 40. As shown in FIGS. 41-42, the display 156 is snapped into place. The battery PS is also connected to the main printed circuit board B as shown in FIGS. 43-44.

Figure 44:
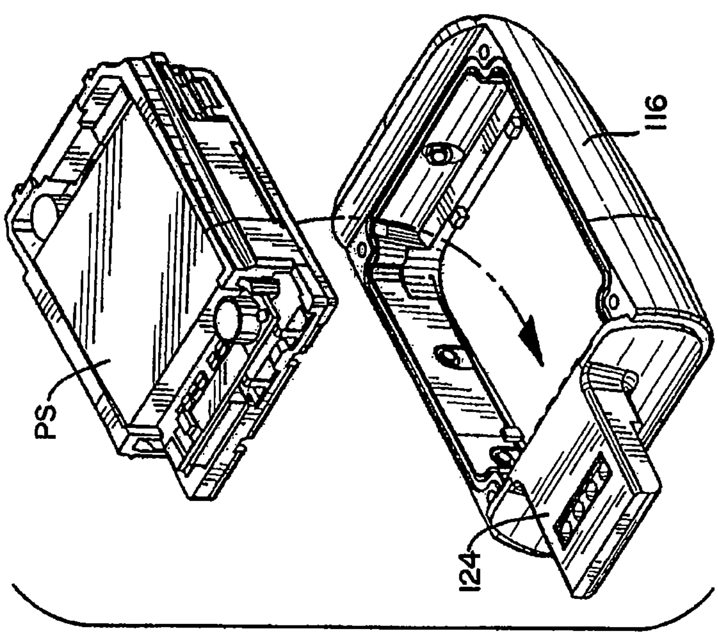
Figure 47:
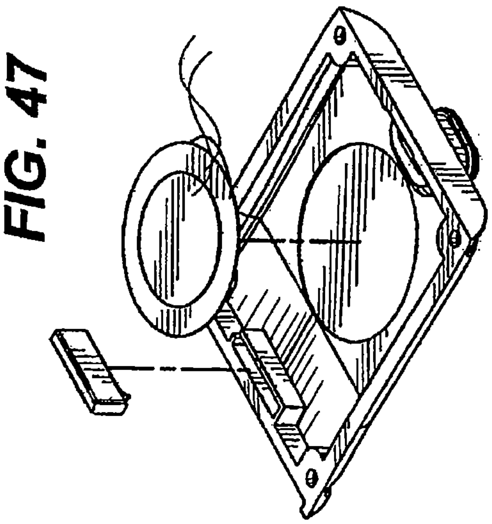
Figure 46:
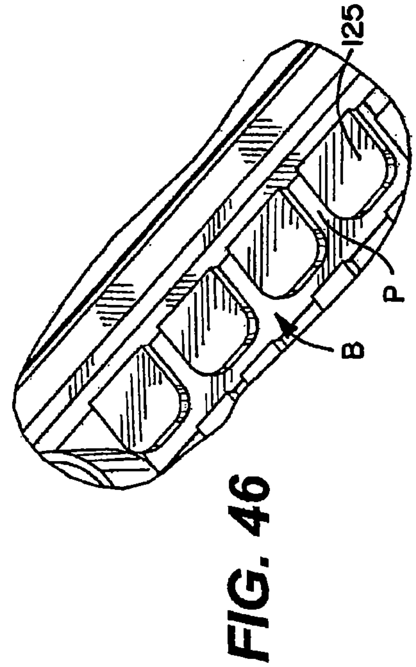
Figure 45:
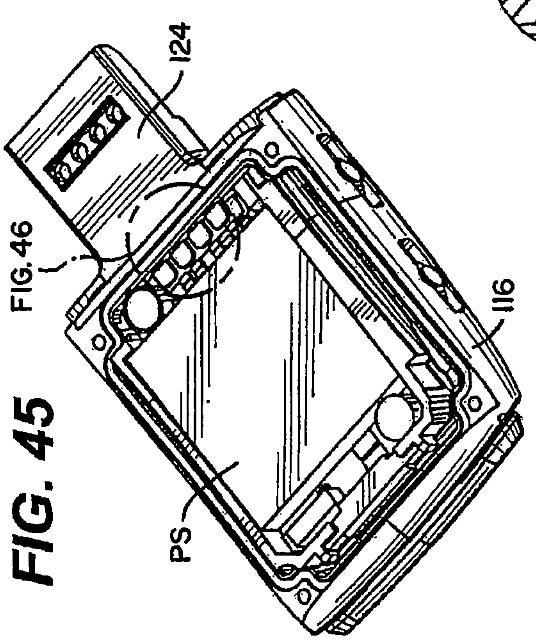
Figure 48:
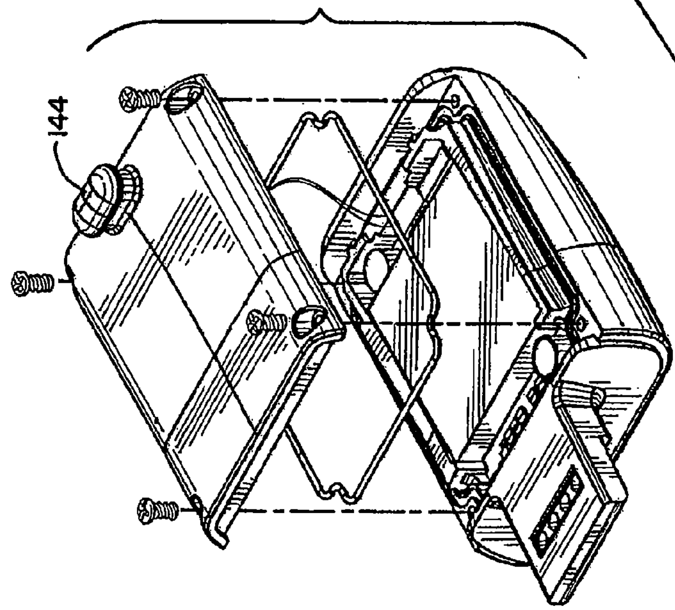
Figure 50:
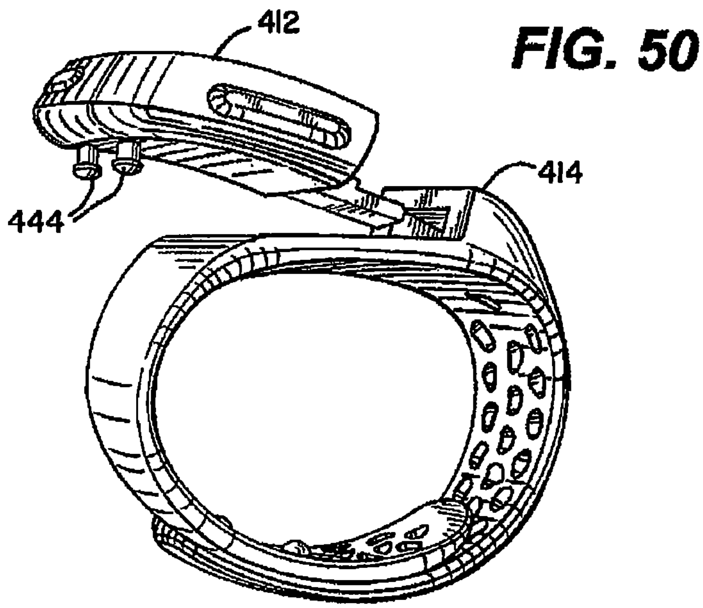
Figure 51:
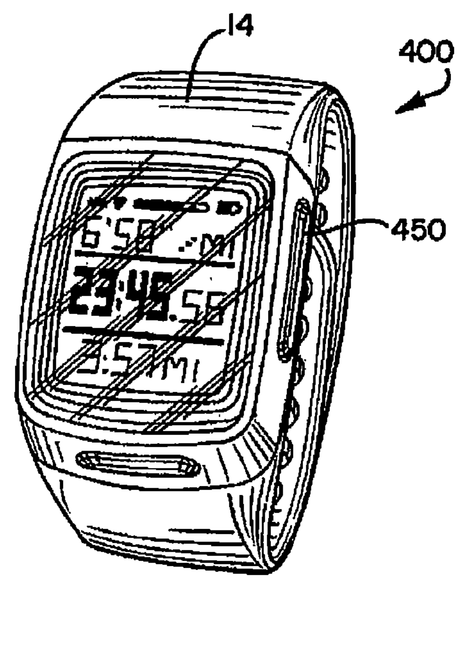
Figure 52:
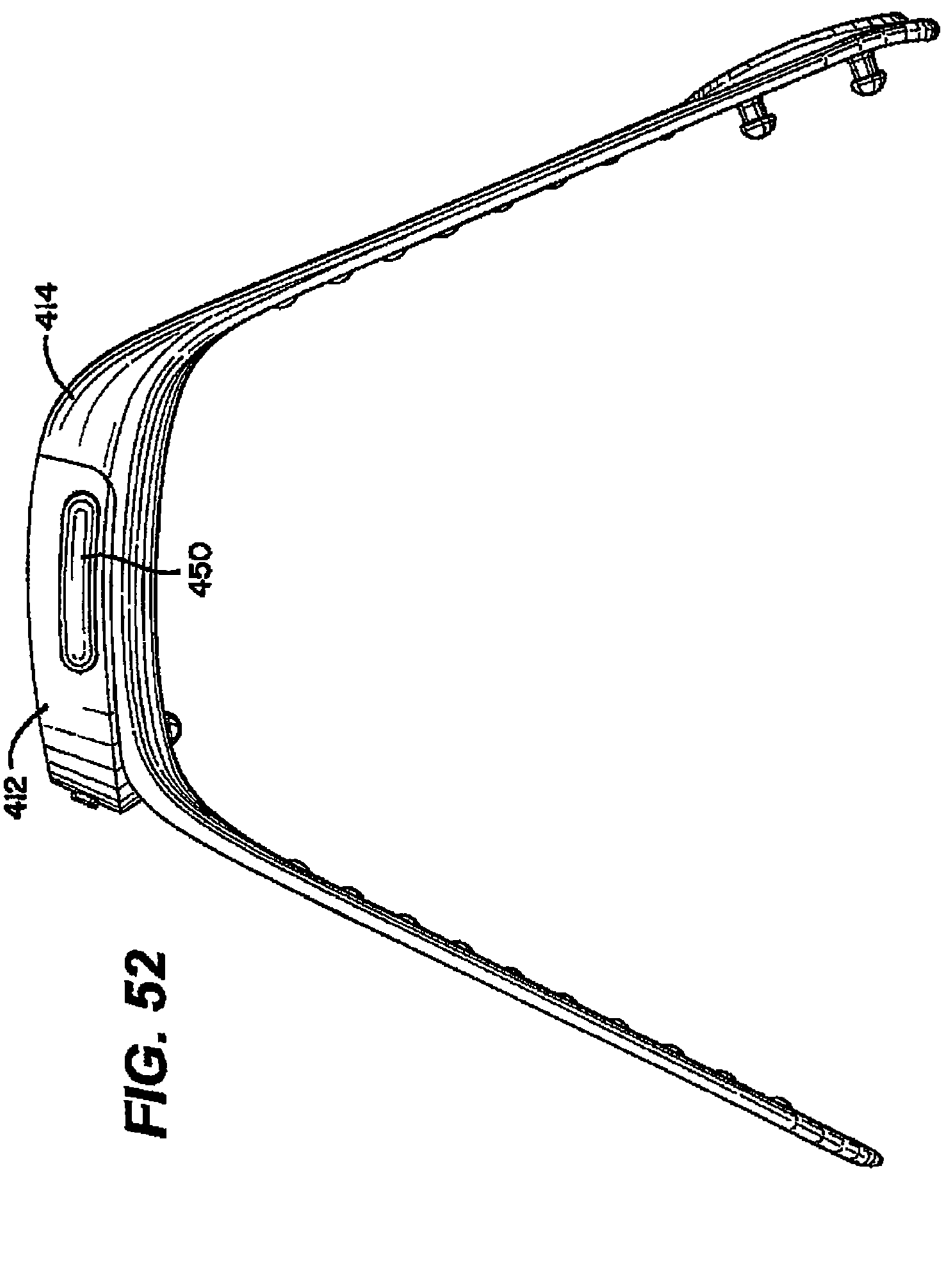
Figure 53:
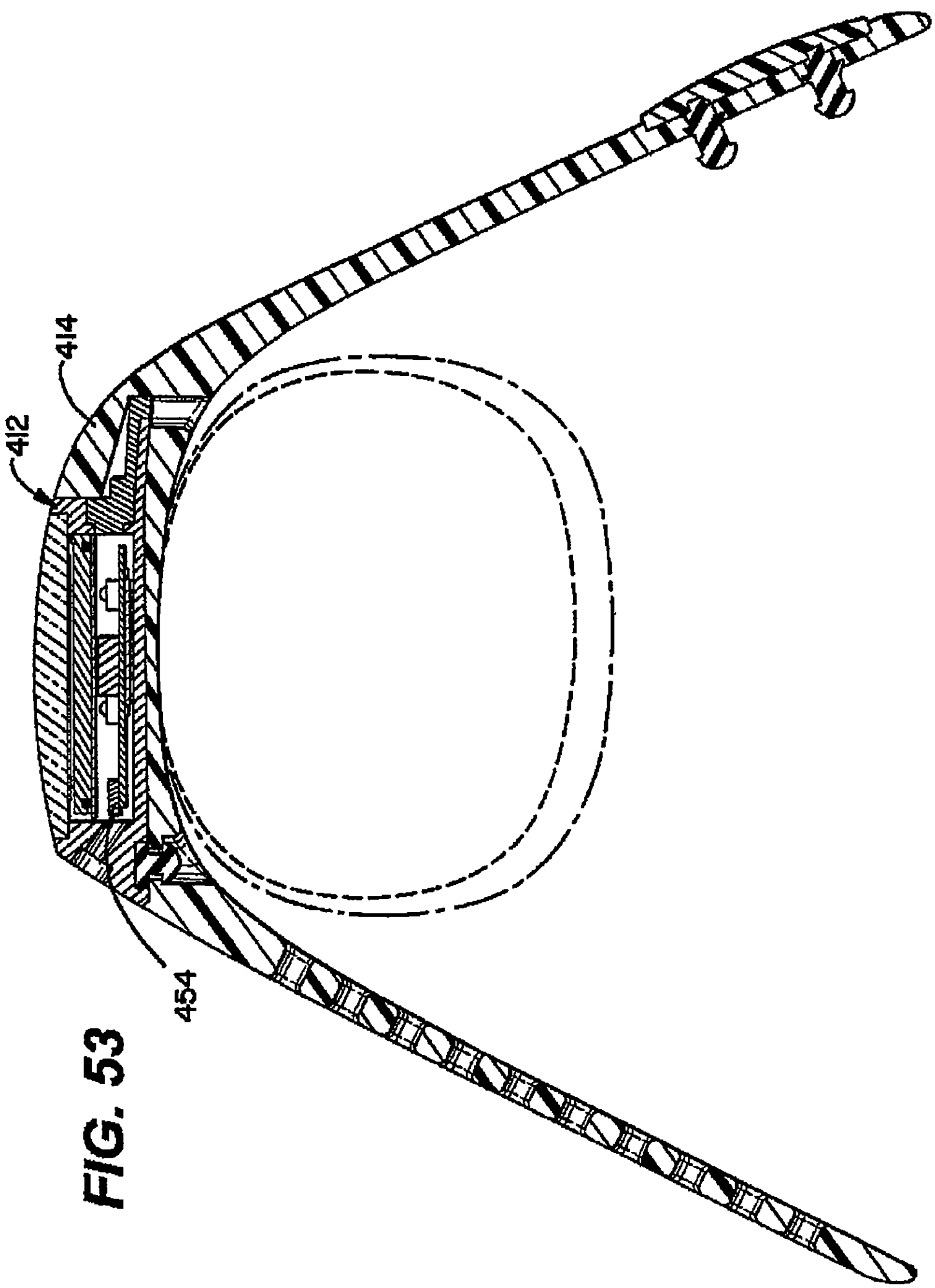

As further shown in FIGS. 44-46, the sub-assembly controller is positioned in the inner cavity of the housing 116 wherein the leads 125 of the USB connector 124 are operably connected to a contact pad P on the printed circuit board B of the controller 118. As shown in FIG. 47, a piezoelectric speaker member is connected to a back component of the housing 116 and can provide audio feedback for the user. As shown in FIG. 48, the back component of the housing 116 is connected to the other housing component supporting the controller sub-assembly wherein the controller 118 is suitably mounted in the housing 116. A seal member is positioned between the housing components to provide the desired seal. The bottom housing component has the protrusion 144 thereon. It is understood that the housing components can be connected via traditional screw fasteners or other known fastening means.

Figure 49:
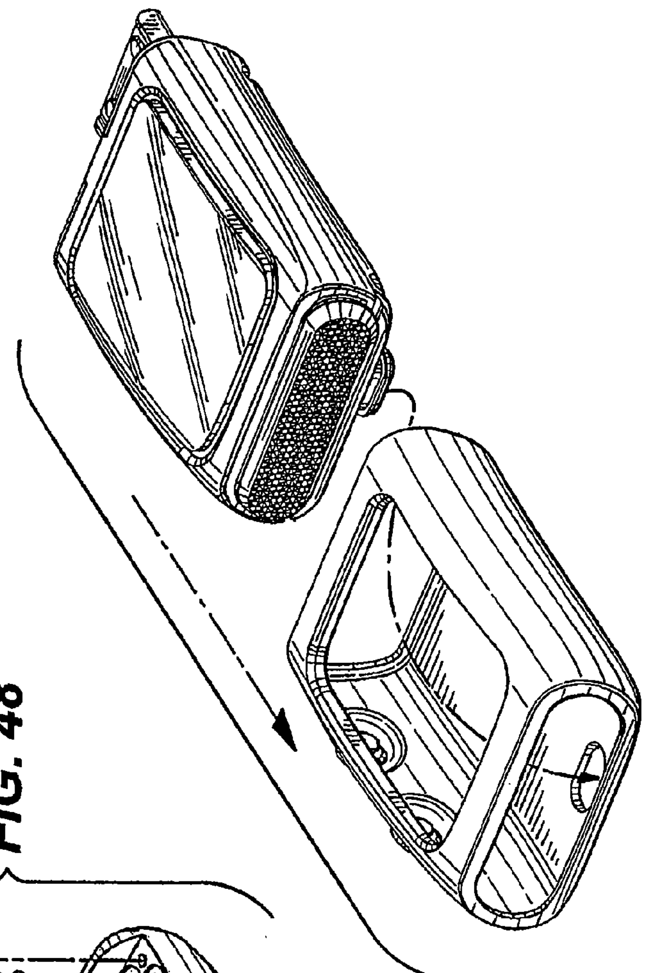

As shown in FIG. 49, an overlay member 117 in the form of a resilient rubber boot is considered part of the housing 116. The overlay member 117 has openings to accommodate the end button 152, the USB connector 124, the screen 139 and the protrusion 144. The overlay member 117 has raised sections corresponding to the side buttons. The overlay member 117 is positioned over the housing 116 wherein the electronic module 112 is formed. The overlay member 117 may have a heat-activated adhesive on an inside surface of the member 117 that is activated to affix the overlay member 117 to the housing components. It is understood that the housing 116 or the overlay member 117 can be molded in a certain color that is perceptively different from the carrier 114. The housing 116 or overlay member 117 can also be formed such that the side buttons 150 can be in a color perceptively different from other portions of the housing 116 or overlay 117. As further shown in FIG. 23-24, the electronic module 112 is removably connected to the wristband 114 wherein the USB connector 124 is received in the sleeve 160 through the opening 162 and the protrusion 144 is received in the aperture 168. The watch 100 can then be worn on the user's wrist.

As discussed, the portable electronic module 112 is removably connected to the carrier 114 or wristband 114. As explained in greater detail below, the portable electronic module 112 may be plugged into a computer via the communication connector 124 wherein data and other information may be downloaded to the module 112 from a remote location such as an athletic performance monitoring site, or remote site (See FIGS. 10 and 16-20). Data recorded by the electronic module 112 may also be uploaded to the computer and then the remote site. The portable electronic module 112 can then be connected to the wristband 114. The connector 124 is inserted into the sleeve 160 of the carrier 114, and the protrusion 144 is placed into the aperture 168 of the carrier 114. The enlarged head of the protrusion 144 abuts against the wristband 114 to retain the module 112 onto the wristband 114. This provides for a wearable watch 110 wherein a user can utilize additional features of the watch 100 described herein relating to athletic performance and fitness.

General Operation

It is understood that the portable electronic module 112 of the watch 100 has associated software to function with the user interfaces associated with the watch 100. As explained in greater detail below, in addition to having chronograph functions like a conventional watch, the watch 100 has additional athletic functionality. For example, a user wearing shoes having a sensor(s) 1 mounted therein or a heart rate monitor 1 can use the watch 100 to wirelessly communicate with the sensor(s) 1 and monitor performance such as during exercise including running. Other sensor types can also be incorporated for use by the user and communication with the watch 100. The watch 100 can record and monitor athletic performance of the user.

Generally, the user controls operation of the watch 100 utilizing the three inputs described above, namely the side button 150, the end button 152 and the shock button 154. These inputs are configured such that the user provides inputs along first, second and third axes. In an exemplary embodiment, the inputs are configured in a tri-axes configuration, namely an x-y-z axes configuration (FIG. 27). This provides an enhanced user friendly user interface wherein the user can easily control operation of the watch 100 while participating in athletic activity. As can be appreciated from FIG. 27, the side button 150 is typically actuated by a user squeezing or pinching the side button 150 and opposite housing side 136 generally along the x-axis. The end button 152 is typically actuated by a user squeezing or pinching the end button 152 and opposite housing end 130 generally along the y-axis (FIG. 27). Finally, the shock button 54 is typically actuated by the user tapping the front side 138 of the housing 116, typically the crystal 139, generally along the z-axis (FIGS. 14, 15 and 27). As explained in greater detail below, the side button 150 is normally utilized to scroll or cycle through a list of items or values within the user interface, by pressing up or down in order to scroll through the list of items. The end button 152 is normally utilized for selecting items within the user interface, such as the options of "SELECT" and "OK."

The shock button 154 is generally utilized for lighting the backlight and other specific functions such as marking of laps. For example, to light the backlight associated with the controller 118 and display 156, a user can simply tap the crystal 139. As also discussed in greater detail below, a user can tap the crystal 139 to actuate the shock button 154 to “mark” a segment of an athletic performance. The user may also have the ability to customize the buttons to their own preferences by utilizing the set-up functionality within the watch 100 or other software such as from a desktop utility associated with the watch 100 as well as remote site functionality that may be inputted into the watch 100 such as through the USB connector 124. It is further understood that the watch 10 can also have additional functionality for communication via audio data to the user wearing headphones that are in operable communication with the watch 10.

FIGS. 50-64 disclose another embodiment of the watch of the present invention generally designated with the reference numeral 400. The watch 400 of this embodiment has similar structure and functionality to the watch 10 of FIG. 1-21 and the watch 100 of FIGS. 22-49. Similar structures will not be fully described in greater detail as the above description applies equally to this additional embodiment. Similar structures will be described with reference numerals in the 400 series of reference numerals. As discussed, the watch 400 of this embodiment can utilize the user interface features described herein and have GPS functionality as described herein. As generally shown in FIGS. 50-53, the watch 400 generally includes a portable electronic module 412 removably connected to a carrier 414 or strap member in the form of a wristband 414.

As shown in FIGS. 54-60, the portable electronic module 412 includes various components supported by a housing 416, the components including a controller 418, an input device assembly 420, an output device assembly 422, and a communication connector 424, which may be considered a part of the input device assembly 420 and/or the output device assembly 422 in various embodiments. The communication connector 424 may be, for instance, a USB connector 424. The controller 418 is operably connected to the input device assembly 420, the output device assembly 422 and the communication connector 424.

Figure 54:
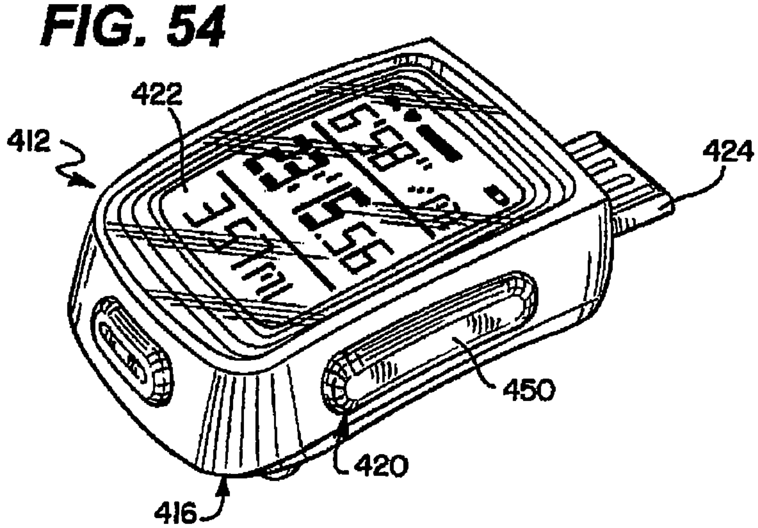
Figure 55:
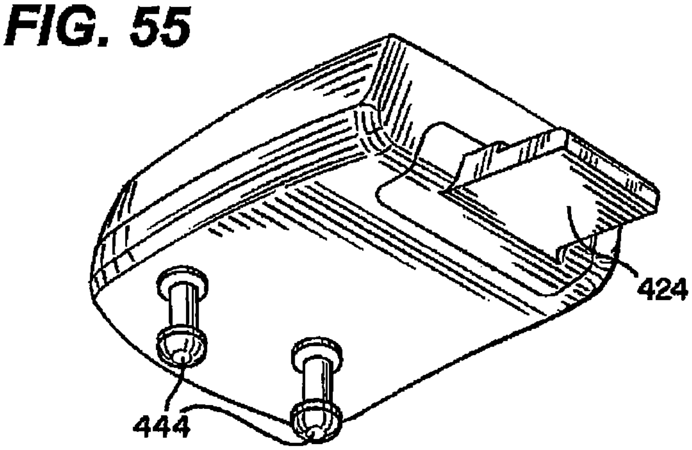
Figure 57:
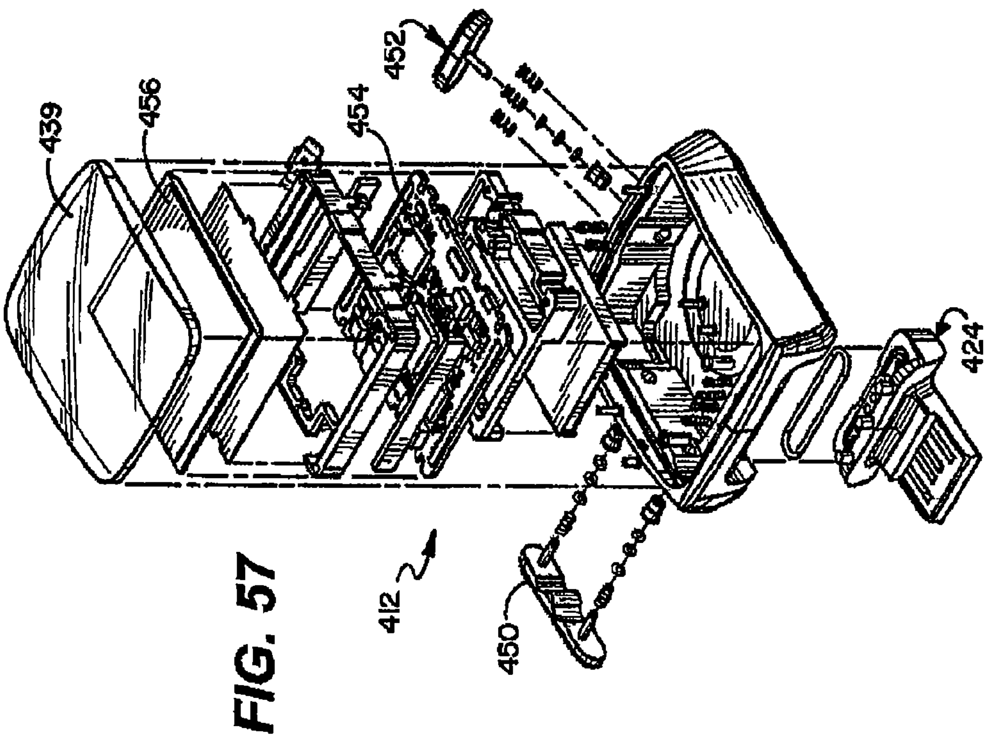
Figure 56:
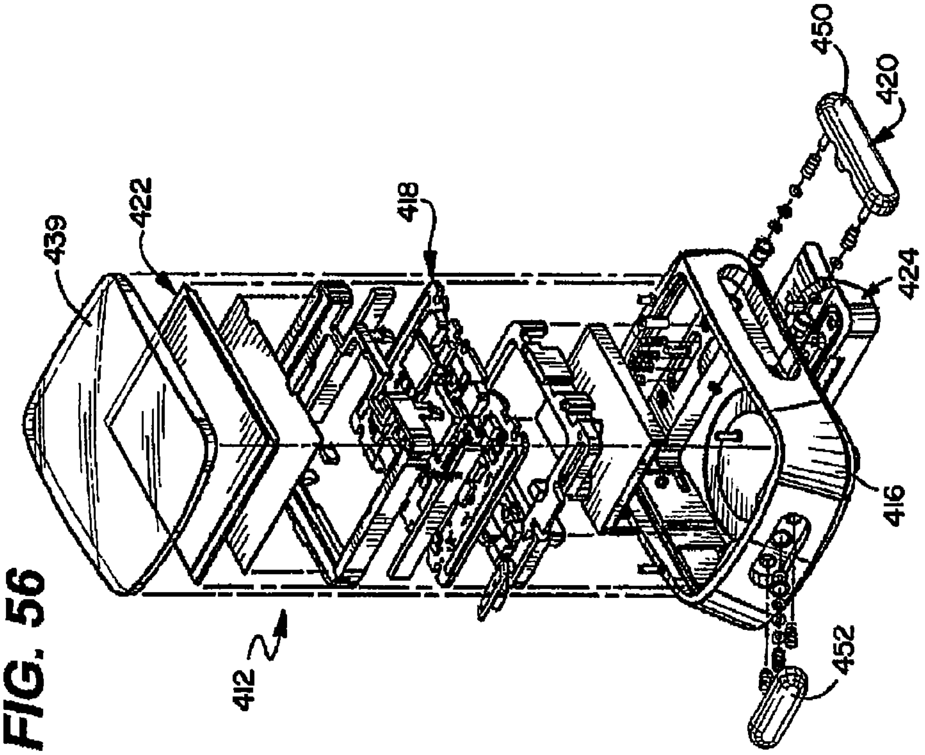

As shown in FIGS. 54-55, in this embodiment, the side button 450 is located at the three o-clock position, generally on the opposite side of the housing 416 from previous embodiments. Testing has found that for some users, this location can be more ergonomically preferred. The housing 416 also has the pair of protrusions 444 for cooperating with the apertures in the wristband 414 for securing the electronic module. The protrusions 444 are located for improved fit for user’s having smaller wrists. The mounting core associated with the wristband in prior embodiments is eliminated in this design.

FIGS. 56-61 also show different exploded views of the various components of the electronic module 412. It is noted that the main controller 418 can be connected in a sub-assembly that is received in the cavity of the housing 416 wherein the glass or crystal 439 is placed over the controller sub-assembly similar to the watch 100 of FIGS. 22-49. It is further understood that the input buttons have tactile surfaces for enhanced operability of the watch. The watch 400 further includes a piezo speaker for audio feedback (FIG. 60). The components of the controller sub-assembly are formed in a similar fashion as described above regarding the watch 100 of FIGS. 22-49.

Figure 61:
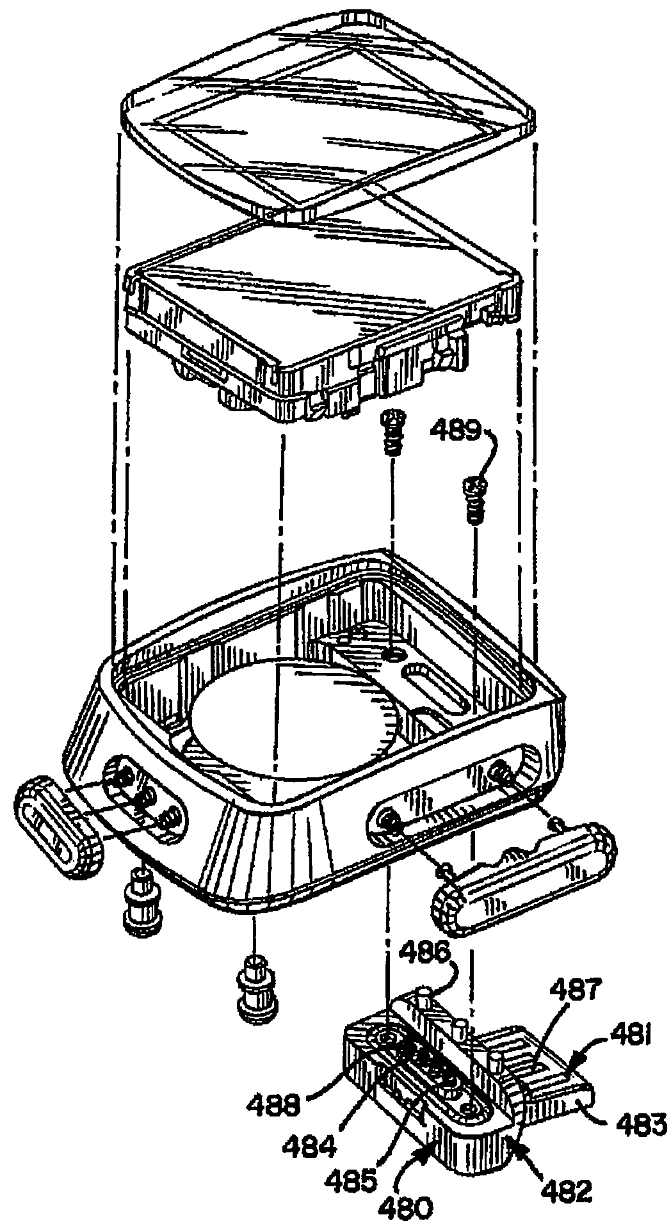
Figure 63:
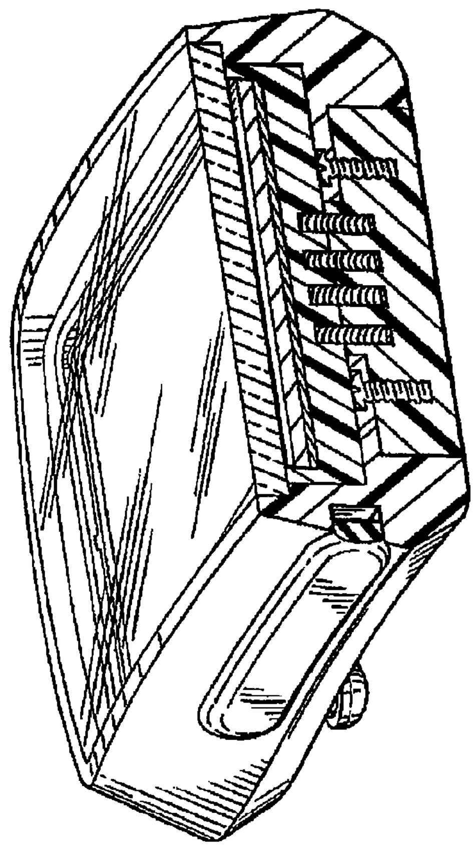
Figure 62:
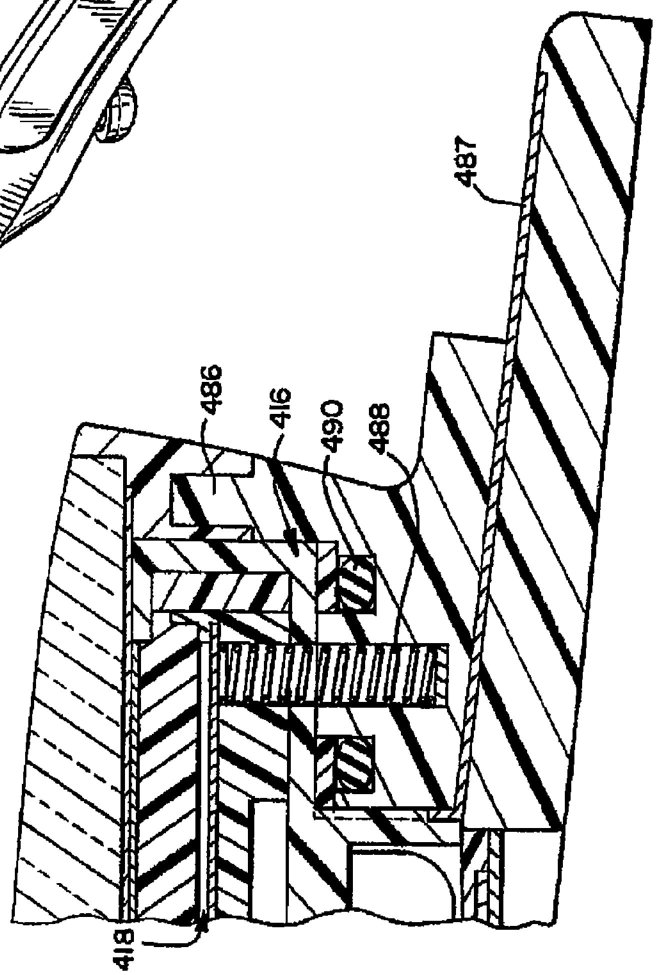

FIGS. 59-63 show the communication connector 424 in greater detail. In this embodiment, the communication connector 424 is a separate member that is connected to the housing 416 and also in operable communication with the controller 418. As discussed, the communication connector 424 is in the form of a USB connector 424. As shown in FIG. 61, the USB connector 424 generally includes a base member 480 and a lead assembly 481. The base member 480 has mounting structure 482 and a leg 483 extending from the mounting structure 482. The mounting structure 482 defines a floor 484 having a plurality of openings 485 extending from the floor 484 and into the mounting structure 482. In an exemplary embodiment, the mounting structure 482 has four openings 485. The mounting structure 482 further has three protrusions 486 extending vertically upwards. The lead assembly 481 has a first lead segment 487 and a second lead segment 488. The first lead segment 487 includes a plurality of leads supported by the leg 483 and having ends extending into the mounting structure 482 and into the openings 485. Thus, in an exemplary embodiment, the first lead segment 487 includes four leads. The leads 487 are embedded in the leg such as by an injection molding process wherein the plastic is injected into a mold around the leads 487. The second lead segment 488 includes a plurality of leads 488 and in an exemplary embodiment, four leads. In a further exemplary embodiment the second leads 488 are resilient members such as in the form of wire springs 488. Each second lead 488 is inserted into a respective opening in the mounting structure 482. One end of each second lead 488 is in engagement with a respective first lead 487 (FIG. 62). Opposite ends of the second leads 488 extend out of the openings in the mounting structure. As shown in FIGS. 58-63, the mounting structure 482 is inserted into a recess in a bottom of the housing 416 and secured thereto via suitable fasteners 489. Fasteners can be screws, adhesives, welding or other securing members. The recess further has three apertures that receive the three protrusions 486 on the mounting structure 482. A gasket 490 is also included around the second leads 488 and is sandwiched between the mounting structure 482 and a portion of the housing 416. The second leads 488 extend through an opening in the bottom of the housing 416 wherein the ends of the second leads 488 are in operable connection with corresponding openings in the controller 418. When the USB connector 424 is connected to the housing 416, the second leads 488 are in a compressed state. Accordingly, an operable conductive connection is provided from the controller 418 to the ends of the first leads 487 supported by the leg 483. The USB connector 424 is easily inserted into the user’s computer for data transfer as described above (FIG. 10). This USB connector design provides a secure and robust connection between the connector and the housing. This construction also minimizes the chance of moisture entering the housing via this connection. This configuration further allows for USB leads to be embedded in the leg via an injection molding process wherein the housing can be selected from various metal materials if desired.

As discussed, the embodiment of the watch shown in FIGS. 50-64 has all of the same operability characteristics described herein. Accordingly, the user interface features and the GPS features described herein are applicable to this watch embodiment.

Many embodiments described herein disclose a USB connector for data transfer between the electronic module and the user’s computer and/or the remote site. The communication connector of the watch can also take other forms. In one embodiment, the communication connector can be a plug in connector such as shown in FIG. 21. The connector may have a cord with plug members to be inserted into the electronic module and the user’s computer. The plug members that are inserted into the electronic module to secure the plug member can be magnetic members and also serve as data transfer members. Thus, data transmission can occur through the magnetic connectors if desired.

As discussed herein, the watch may employ various antennas for communication capabilities. The antennas can take various forms including chip antennas or sheet metal antennas. The sheet metal antenna may be a thin planar member positioned around a periphery of the display and sandwiched between the display and the crystal. The antennas are contained within the housing and in operable connection with the controller. The watch may further employ a GPS antenna in certain embodiments. The watch can employ a first antenna dedicated to communicate with the foot sensor and heart rate sensor and a second antenna dedicated to communicate with the GPS receiver chip.

FIGS. 65-69 disclose another embodiment of the watch of the present invention, generally designated with the reference numeral 500. Similar to previous embodiments, the watch 500 generally includes an electronic module 512 and a carrier 514. The module 12 may or may not be removably connected to the carrier 514. It is understood that the watch 500 has all the functional characteristics of other embodiments described herein including user interface and GPS features.

Figure 68:
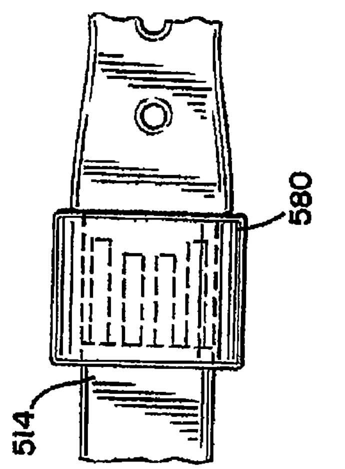
Figure 69:
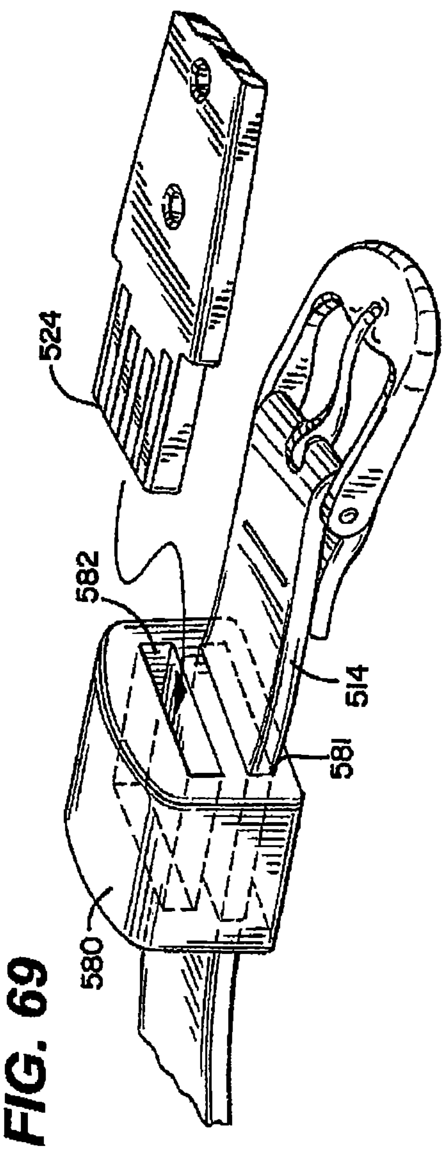

As further shown in FIG. 66, the watch 500 has a connector 524 structured in an alternate configuration. The connector 524 is operably connected to the electronic module 512 and is incorporated into the carrier 514. The carrier 514 is in the form of a wristband in the exemplary embodiment. A distal end 515 of the wristband 514 is in the form of a USB connector and represents the connector 524. The connector 524 has leads 525 at the distal end that define the USB connector 524. A plurality of flexible conductor connectors 527 are embedded in the wristband 514 and have one end operably connected to the controller of the electronic module 512 and another end operably connected to the leads 525 of the connector 524. The flexible connectors 527 may be bundled together if desired or can be embedded in separate fashion within the wristband 514. As further shown in FIGS. 66-69, the wristband 514 also has a cap member 580 at another segment of the wristband 514. The cap member 580 has a first slot 581 to accommodate the wristband segment to mount the cap member 580. The cap member 580 has a second slot 582 positioned on the cap member 580 generally adjacent to the first slot 581. When a user is wearing the watch 500, the distal end 515 of the wristband 514 having the connector 524 incorporated therein is inserted into and received by the second slot 582 as shown in FIGS. 67-68. The cap member 580 thus protects the USB connector 524.

Consistent with the description herein, the connector 524 is inserted into the USB port of a computer for data transfer. Data can be transferred between the electronic module 512, the user's computer, as well as a remote site as described herein. Other operational features described herein are incorporated into the watch 500.

Figure 70:
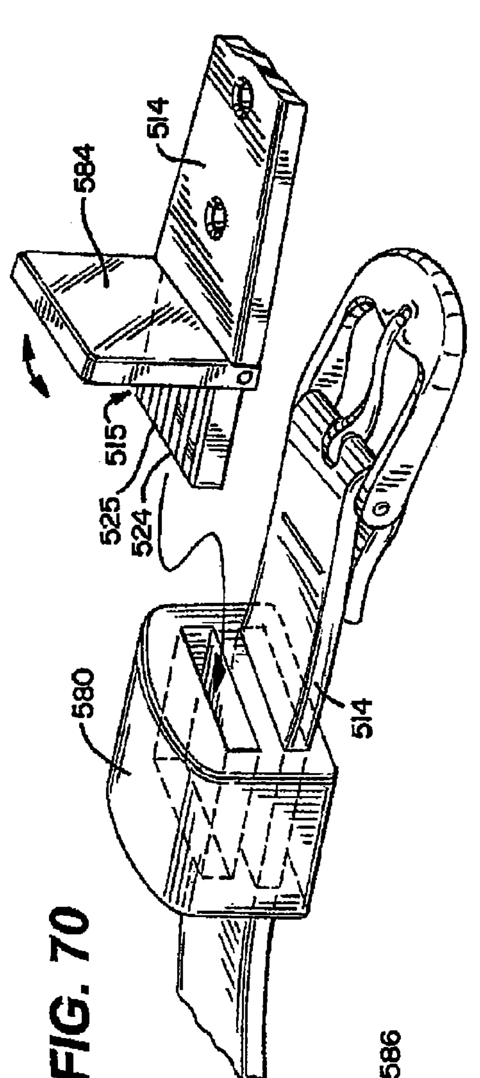
FIGS. 70-73 disclose views of another embodiment of a device in the form of a watch of an exemplary embodiment of the present invention.
Figure 72:
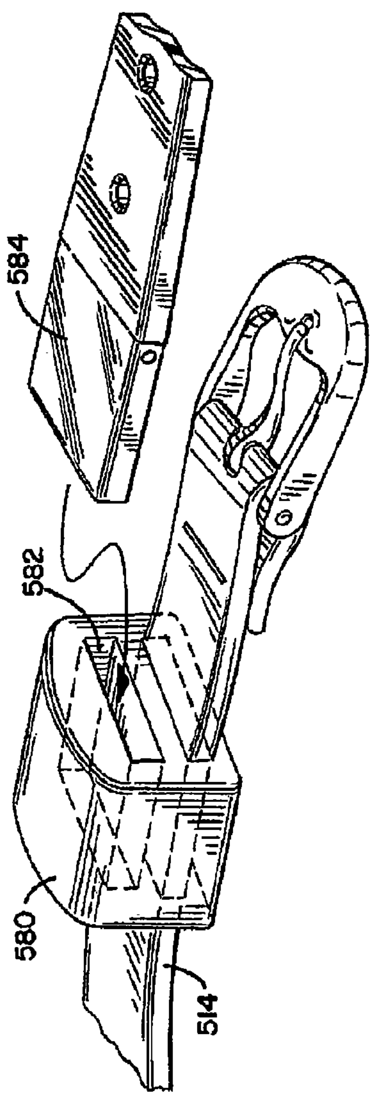
Figure 71:
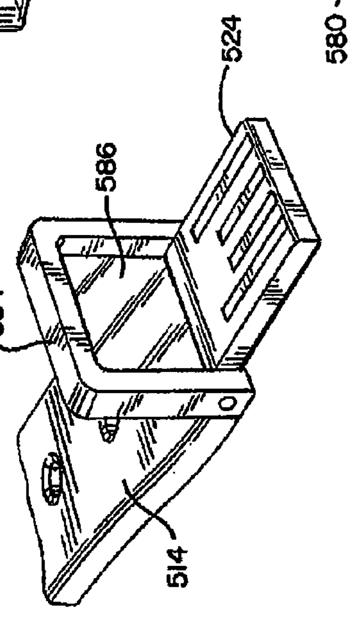
Figure 73:
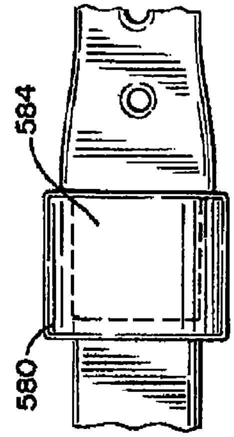

FIGS. 70-73 disclose an additional variation of the embodiment of FIGS. 65-69. As shown in FIGS. 70-73, the wristband 514 has a cover member 584 positioned proximate the distal end 515 of the wristband 514. The cover member 584 is hingedly connected to the wristband 514 proximate the distal end 515. As shown in FIG. 71, the cover member 584 has a recessed portion 586 therein that accommodates the connector 524. The cover member 584 is moveable between a first position and a second position. In a first position as shown in FIG. 72, the cover member 584 covers the USB connector 524 at the distal end 515. The recessed portion 586 receives the connector 524. Accordingly, the leads 525 of the USB connector 524 are protected by the cover member 584. As shown in FIG. 72, the distal end 515 with the cover member 584 in the first position can be inserted into the second slot 582 of the cap member 580. The slot 582 of the cap member 580 may be sized to accommodate the distal end with the cover member 584. As shown in FIG. 70, the cover member 584 is movable to the second position exposing the leads of the USB connector 524 by pivoting the cover member 584 away from the distal end 515. The leads 525 of the USB connector 524 are then exposed wherein the USB connector 524 can be plugged into the USB port of a computer for data transfer as described herein with reference to FIG. 10.

Figure 75:
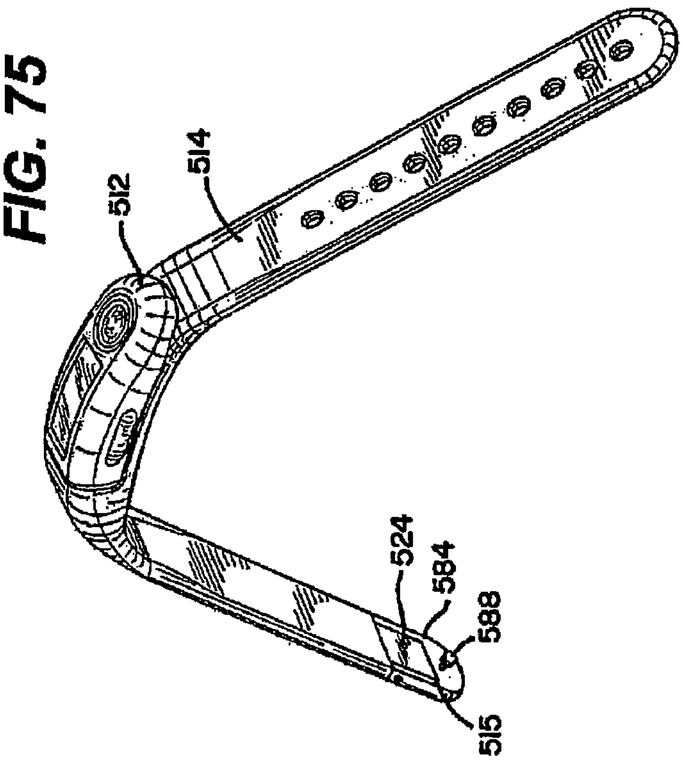
FIGS. 74-77 disclose views of another embodiment of a device in the form of a watch of an exemplary embodiment of the present invention.
Figure 74:
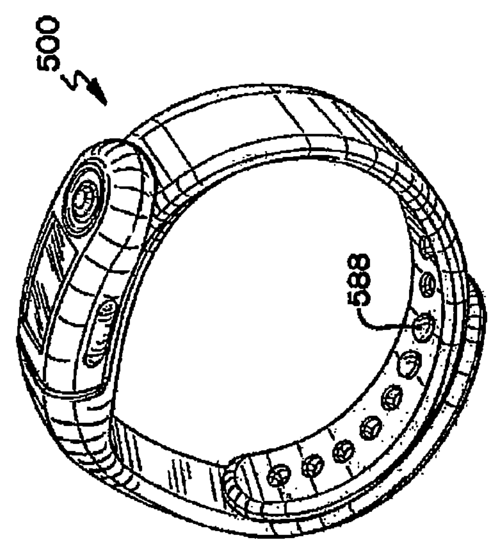
Figure 77:
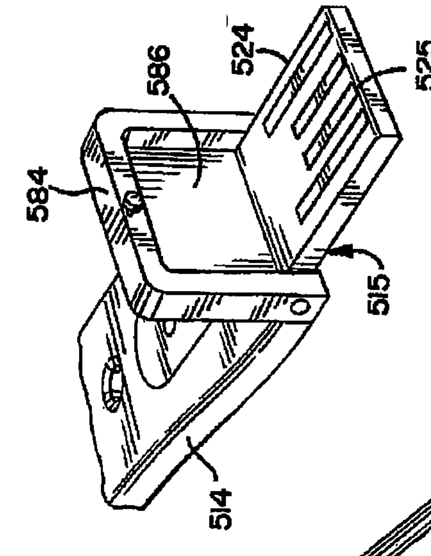
Figure 76:
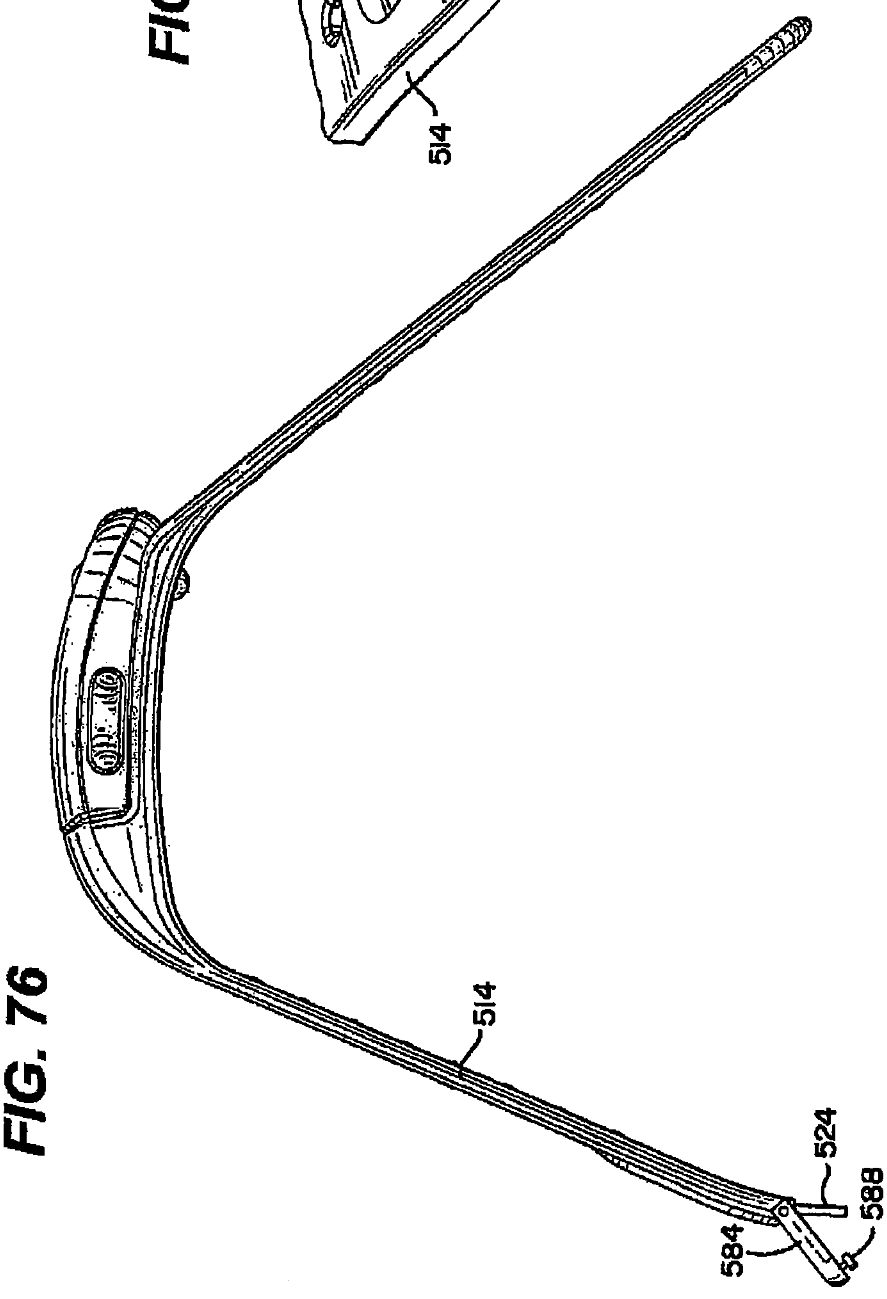

FIGS. 74-77 disclose another variation of the watch of the present invention, similar to the embodiment of FIGS. 70-73 and similar structures will be referenced with similar reference numerals. It is understood that flexible connectors are embedded in the wristband and are in communication between the module and USB connector at a distal end of the wristband. The watch also has a cover member 584 hingedly connected to the wristband 514. The cover member 584 may be connected to the wristband 514 via a support member attached to the wristband. The cover member 584 also has the recessed portion 586 to accommodate the USB connector 524 at the distal end 515 of the wristband 514. The cover member 584 has a protrusion 588 on an inside surface. The cover member 584 is moveable between a first position and a second position. In a first position as shown in FIG. 75, the cover member 584 covers the USB connector 524 at the distal end 515. Accordingly, the leads 525 of the USB connector 524 are protected by the cover member 584. As shown in FIG. 74, the distal end 515 with the cover member 584 in the first position can be connected to the other portion of the wristband 514 wherein the protrusion 588 is received in an aperture in the wristband 514. As shown in FIG. 76, the cover member 588 is movable to the second position exposing the leads of the USB connector 524 by pivoting the cover member 584 away from the distal end 515. The leads of the USB connector 524 are then exposed wherein the USB connector 524 can be plugged into the USB port of a computer for data transfer as described herein with reference to FIG. 10.

Figure 78:
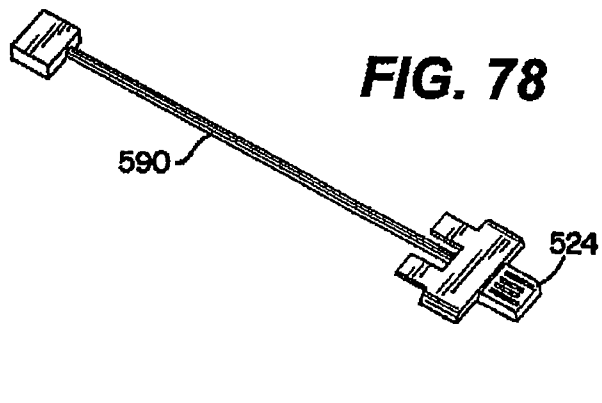
Figure 79:
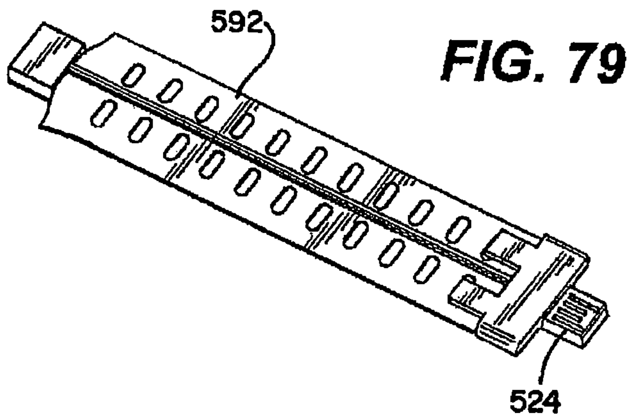
Figure 80:
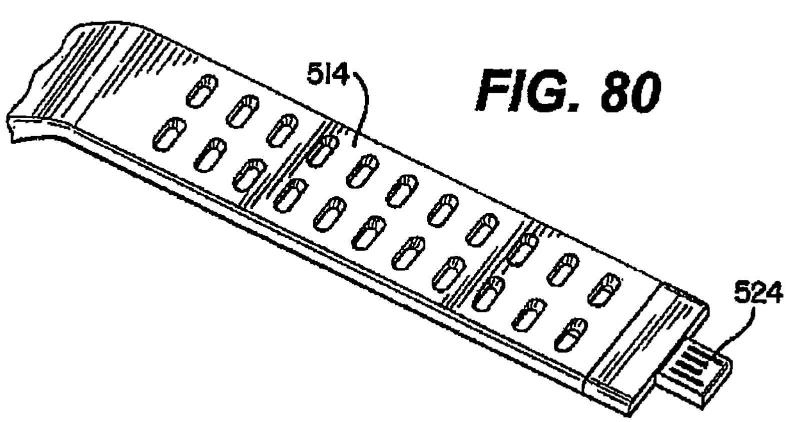

FIGS. 78-85 disclose additional structures wherein the USB connector 524 is incorporated into the wristband such as in the embodiments of FIGS. 65-77. In certain exemplary embodiments, the USB connector 524 has a lead assembly that is incorporated into the wristband via certain injection molding processes. FIGS. 78-79 disclose the formation of a portion of the wristband 514 via an injection molding process. As shown in FIG. 78, the USB connector 524 includes a cable assembly 590 that are in conductive communication with the USB leads at the distal end of the connector 524. The cable assembly 590 is laid in a mold wherein a first shot of injected molded material is injected into the mold and around the cable assembly to form a portion of the wristband as shown in FIG. 79. As can be appreciated from FIG. 80, a second shot of injected molded material is injected into the mold to form the wristband 514.

Figure 81:
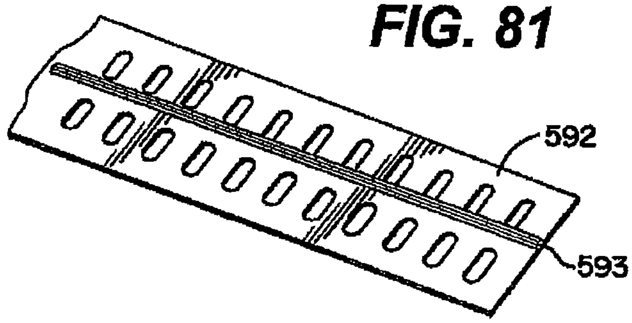
Figure 82:
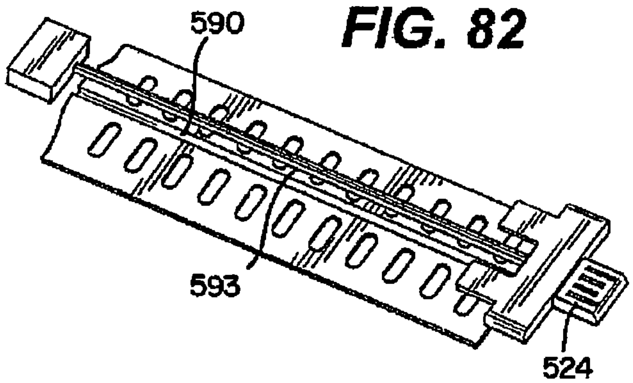
Figure 83:
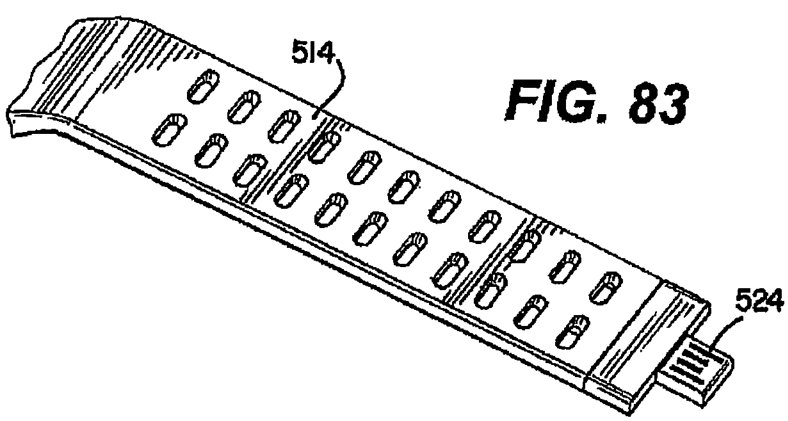

FIGS. 81-83 disclose another process in forming the wristband 514. As shown in FIG. 81, a first shot of injection molded material 592 is injected into a mold and includes a central groove 593 therein and forming a partial assembly. As shown in FIG. 82, the cable assembly 590 is laid into the groove 593 in a partial assembly. As shown in FIG. 83, a second shot of injection molded material is injected into the mold to form the wristband 514.

FIGS. 84 and 85 disclose a plug insert 594 of the USB connector. As a distal end, the cable assembly 590 has four flexible conductors 527 extending therefrom. Each conductor

527 extends and is connected to a respective USB lead 525 in the plug assembly 594. The cable assembly 590 is dimensioned to be as thin as possible while still allowing sufficient reliability while the thickness of the injected molded material is set so as to provide sufficient protection of the cable assembly but providing for a comfortable fit around a user's wrist.

It is understood that the various embodiments of the athletic watch described above can incorporate and include the operational features, user interface features and GPS functionality as describe herein. It is further understood that combinations of the various features can also be included in the various embodiments of the athletic watches of the present invention.

Operation and User Interfaces

As discussed, it is understood that the portable electronic module 12 of the watch 10 has associated software to function with the user interfaces associated with the watch 10. In one arrangement, one or more processors such as that of controller 18 may be configured to execute one or more computer readable instructions stored in computer readable media (e.g., memory of controller 18) to perform various functions including generating one or more user interfaces and processing the input and interactions received therethrough. As explained in greater detail below, in addition to having chronograph functions like a conventional watch, the watch 10 has additional athletic functionality. For example, a user wearing shoes having a sensor(s) 1 mounted therein or a heart rate monitor can use the watch 10 to wirelessly communicate with the sensor(s) 1 and monitor performance such as during exercise including running. Other sensor types can also be incorporated for use by the user and communication with the watch 10. The watch 10 can record and monitor athletic performance of the user. While reference is made to the watch designated with the reference numeral 10, it is understood that the user interface features described herein applies to any of the watch embodiments disclosed herein.

Generally, the user controls operation of the watch 10 utilizing the three inputs described above, namely the side button 50, the end button 52 and the shock button 54. These inputs are configured such that the user provides inputs along first, second and third axes. In an exemplary embodiment, the inputs are configured in a tri-axes configuration, namely an x-y-z axes configuration (FIG. 2). This provides an enhanced user friendly user interface wherein the user can easily control operation of the watch 10 while participating in athletic activity. As can be appreciated from FIG. 11, the side button 50 is typically actuated by a user squeezing or pinching the side button 50 and opposite housing side 36 generally along the x-axis. The end button 52 is typically actuated by a user squeezing or pinching the end button 52 and opposite housing end 30 generally along the y-axis (FIG. 12). Finally, the shock button 54 is typically actuated by the user tapping the front side 38 of the housing 16, typically the crystal 39, generally along the z-axis (FIGS. 14, 15). As explained in greater detail below, the side button 50 is normally utilized to scroll or cycle through a list of items or values within the user interface, by pressing up or down in order to scroll through the list of items. The end button 52 is normally utilized for selecting items within the user interface, such as the options of "SELECT" and "OK." The shock button 54 is generally utilized for lighting the backlight and other specific functions such as marking of laps. For example, to light the backlight associated with the controller 18 and display 56, a user can simply tap the crystal 39. As also discussed in greater detail below, a user can tap the crystal 39 to actuate the shock button 54 to "mark" a segment of an athletic performance. The user may also have the ability to customize the buttons to their own preferences by utilizing the set-up functionality within the watch 10 or other software such as from a desktop utility associated with the watch 10 as well as remote site functionality that may be inputted into the watch 10 such as through the USB connector 24.

In reference to FIGS. 1-20 and 86-140, the user interface has two different modes. The first mode is an out-of-workout ("OOWO") mode. The OOWO mode is used for normal operation when the user is not participating in an athletic performance. The second mode is an in-workout ("IWO") mode for controlling, displaying, and recording a user's athletic performance, such as a run. The OOWO mode is used to guide a user to the IWO mode such as when starting a run.

In the OOWO mode, the user interface provides a plurality of menu selections for operation of a plurality of sub-modes. While the selections can vary, in an exemplary embodiment, the menu selections include: a Time of Day mode, a Settings mode, a Run mode (which includes the IWO mode), a Last Run mode, a Remote Site mode, and an Extended Feature mode (FIG. 86*a*). In FIG. 86*b*, the menu selections may further include a records mode in which a user may view workout records set by the user. For example, the user may view the fastest run, farthest distance run, most calories burned, fastest pace, longest time run and the like.

Figure 127:
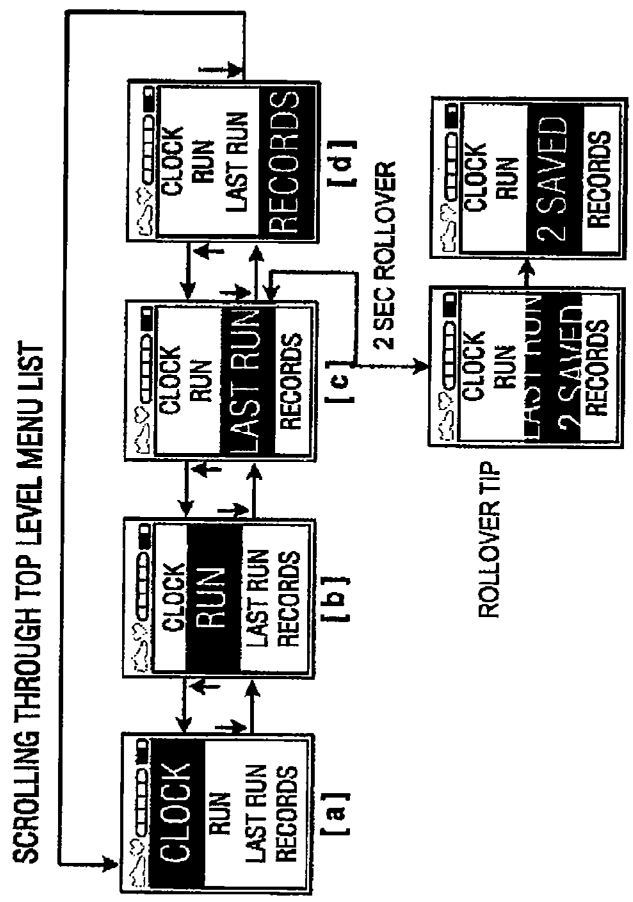
Figure 129:
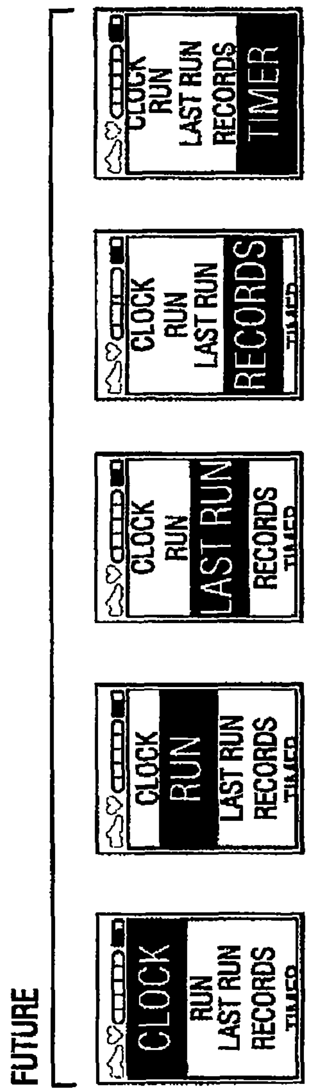

FIGS. 127 and 129 illustrate example sequences of interfaces in which a user may navigate through a menu list that includes a clock mode, a run mode, a last run mode and a records mode. A last run option in the menu interface may scroll within the highlight bar or region to display additional information (e.g., a number of saved workouts).

Figure 128:
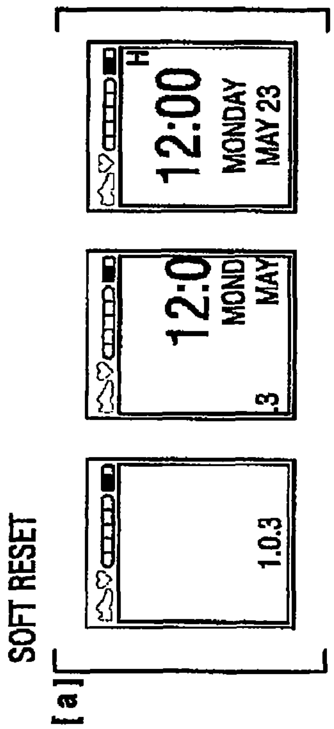

FIG. 128 illustrates a sequence of interfaces that may be displayed upon a user completing a soft reset of watch 10.

Figure 130A:
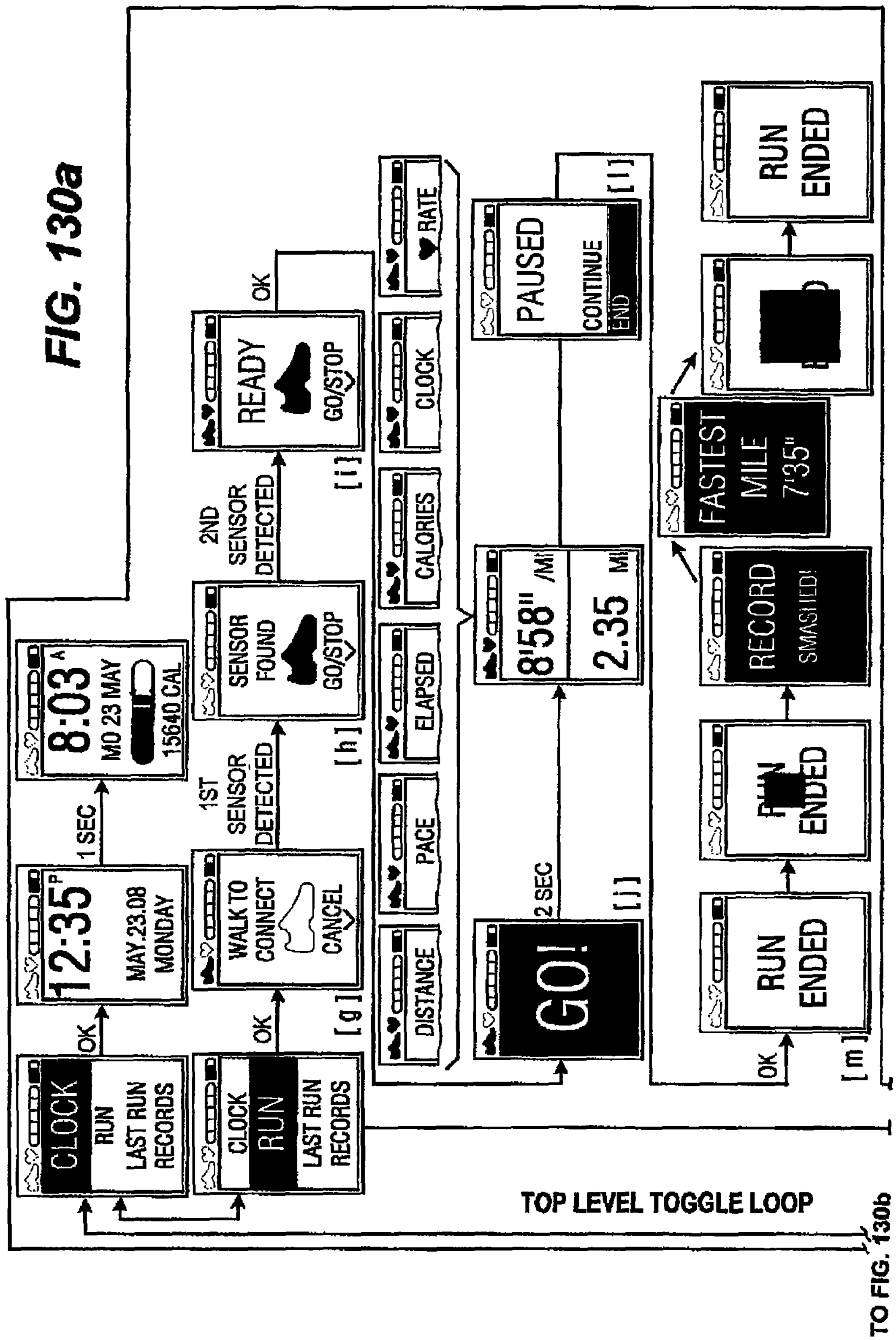
Figure 130B:
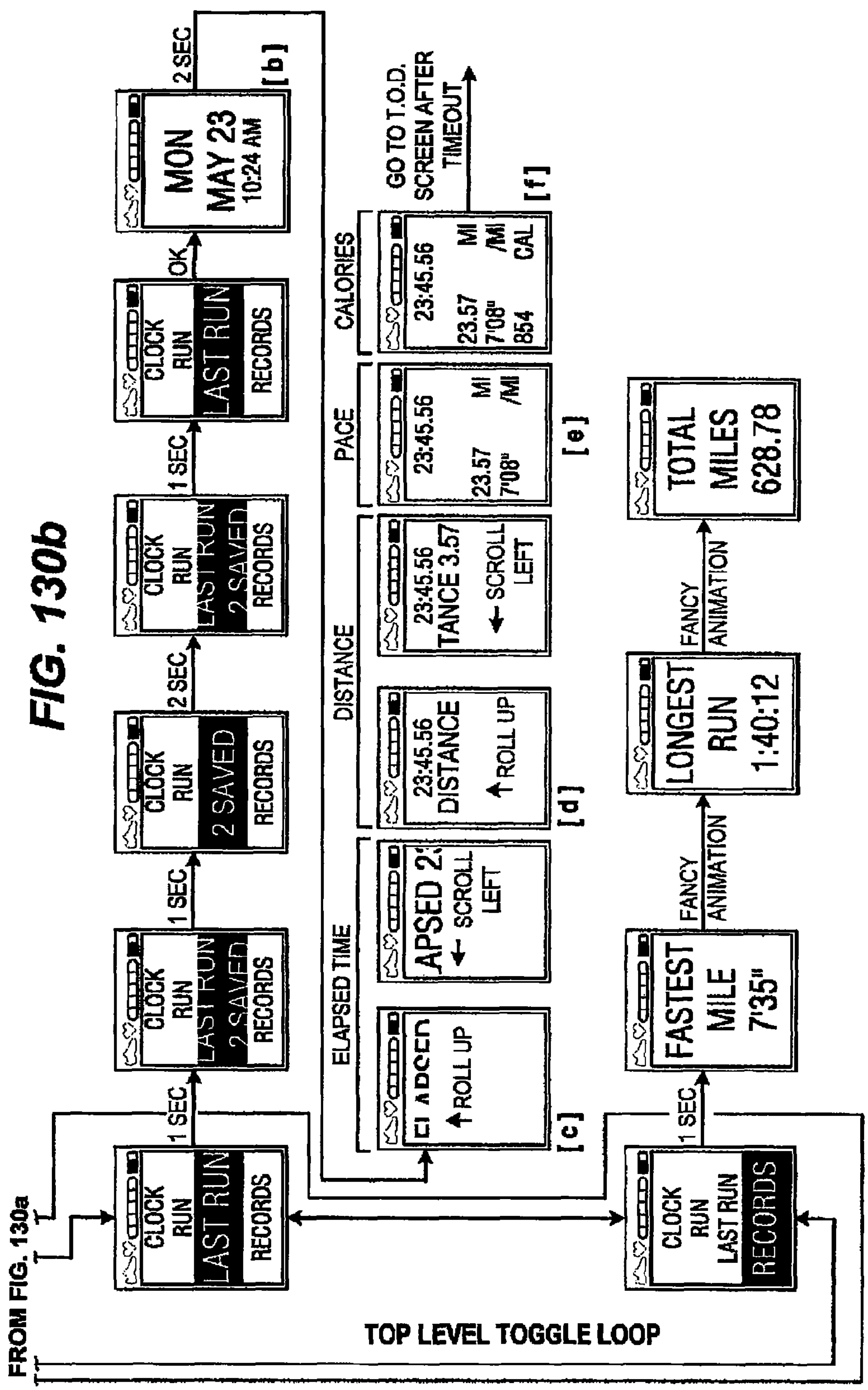

FIGS. 130*a* and 130*b* illustrate a map defining a navigation sequence through a sequence of interfaces for monitoring and tracking workouts. For example, a user may select a clock option, run option, last run option and a records option all from a top level menu. The interfaces of FIGS. 130*a* and 130*b* display examples of information that may be displayed upon selection each of the options.

Figure 107A:
Figure 107B:
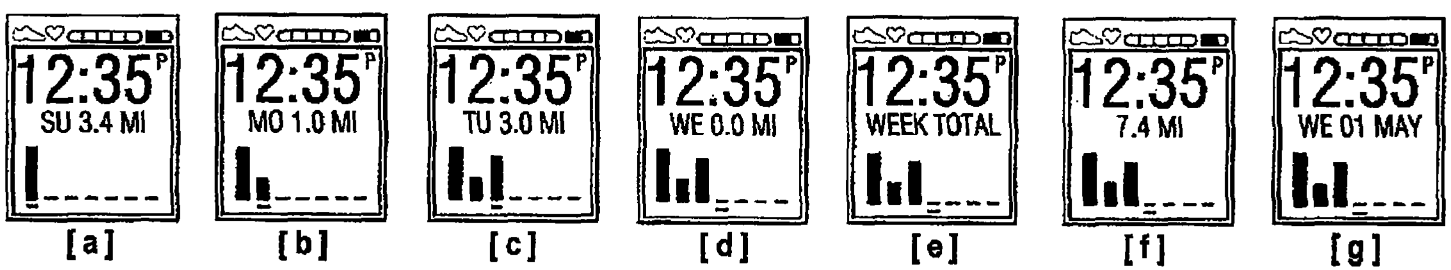

In the Time of Day mode, or the T.O.D. mode, the chronograph functions associated with the watch 10 are generally used and displayed such as shown in FIGS. 107*a* and 107*b*. The display in the T.O.D. mode can be customized by the user as further described herein. If a different mode of the user interface is selected, a user can scroll through the menu selections using the side button 50 and then select the T.O.D. mode using the end button 52. The T.O.D. mode may be the default setting for the watch 10. As discussed, the display 56 includes the plurality of different display fields. In these fields, the time of day, date and day of week may be displayed. Variations on how this information is displayed in the display fields can also be set by the user in the Settings mode as described below. The display 56 may also include a performance display field that can constantly display current information such as, weekly runs, distance run and/or calories burned over certain periods of time, as well as goals or records. Such performance values can be updated as desired. It is understood that the display 56 has a backlight associated therewith that deactivates after a predetermined time of inactivity. The user may tap the front side 38 to light the backlight to illuminate the display 56.

By scrolling through the menu selections using the side button and depressing the end button at the Settings mode, the user can set certain values and features of the watch 10. In one exemplary embodiment, the menu selections of the Settings mode include a Time/Date function, a Calibrate function, a Sensor function and a Sounds function.

Figure 96:
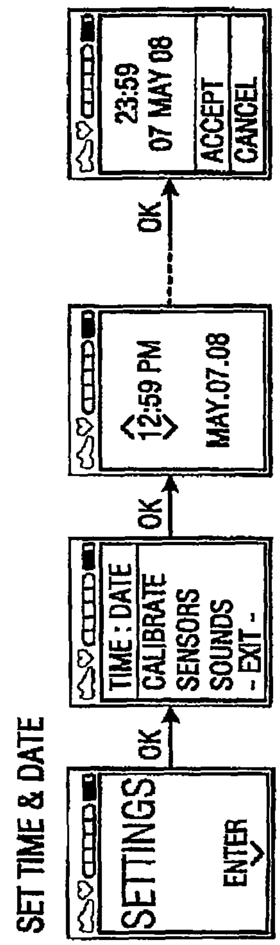

In the Time/Date function (FIG. 96), controller/the user interface will display the time and date as currently set within the controller. The controller may display a pair of arrows above and below the numbers in the display field to be set. Depressing the end button sets the correct value. The user continues this process to set the complete Time and Date. It is understood that the Time can be set in military time if desired. The order of the month, day and year could also be arranged as desired. Once the proper time and date have been set, the user is prompted to select Accept or Cancel. Selecting Accept takes the user back to the initial menu selection of the Settings Mode. The user can also then select "EXIT" from the Settings mode menu to return to a default setting such as the T.O.D. mode.

Figure 97A:
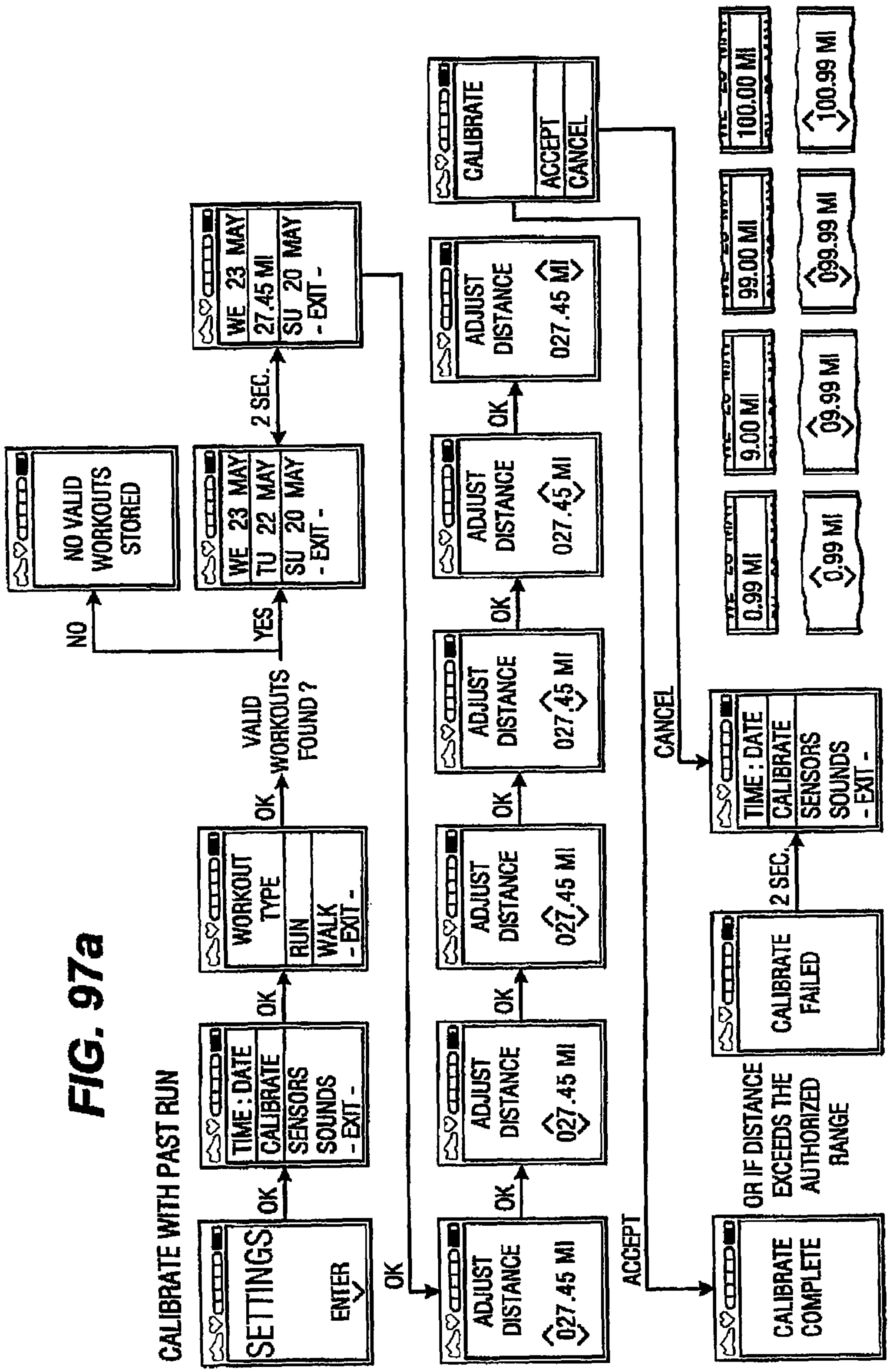

As shown in FIG. 97*a*, using the side button 50 and end button 52, a user can scroll and select the Calibrate function in the Settings mode. This allows the user to calibrate a sensor, such as the shoe-based sensor, to ensure accurate time-distance calculations for the athletic performances. As shown in FIG. 97*a*, once Calibrate is selected by pressing the end button 52, the controller will then display the message "WORKOUT TYPE," with the selection of "RUN" or "WALK" or "EXIT." The user may then select "RUN" and the controller will then display a list of the user's past runs. The highlighted workout displays the date and distance, toggling between each, so the user knows what the date and distance was for that workout. The user may then select the date of the run that the user wants to use for the calibration. The controller then displays the "ADJUST DISTANCE" screen. The user will then be able to adjust the distance in order to ensure the proper distance is entered into the controller. The controller may display a pair of arrows above and below the numbers for adjusting distance. The user can use the side button 50 to increment or decrement the numbers for the time. The user may then press the end button 52 to move to the next number. The user may continue this process while setting the correct distance as shown in FIG. 97*a*. After the user completes adjustment of the distance values, the controller displays an "ACCEPT/CANCEL" selection screen. Once the user presses the end button 52 to select "ACCEPT," the controller displays a "CALIBRATE COMPLETE" screen and returns to the Settings selection screen. If the distance exceeds a preset authorized range, the controller will display a "CALIBRATE FAILED" screen. The user would then be prompted to re-input a proper distance as describe above. A calibration can also cancelled by the user. It is understood that additional parameters can be added to the calibration process such as incorporating the user's inseam length and/or height with stride length.

Figure 97B:
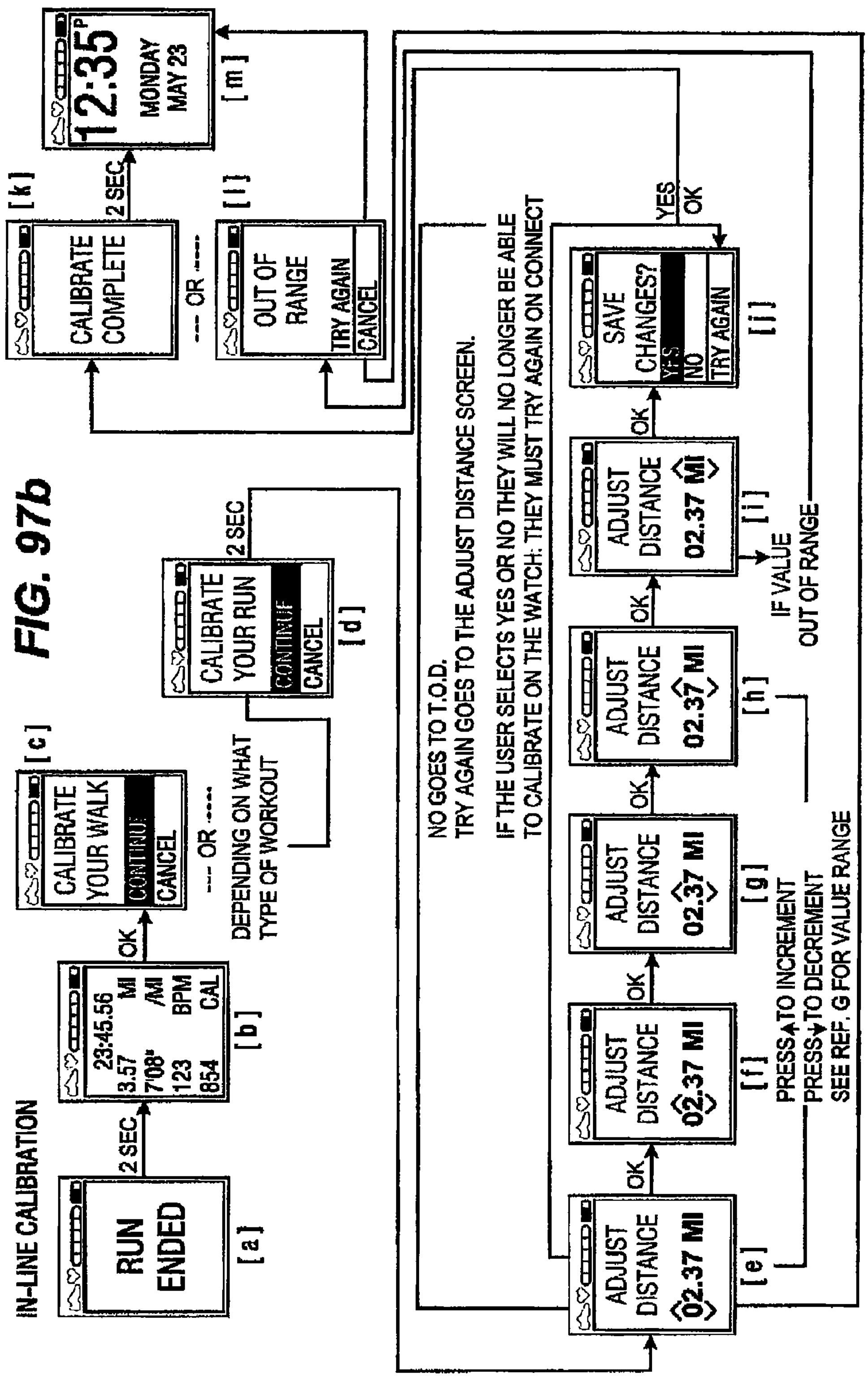

FIG. 97*b* illustrates another example series of interface for calibrating a sensor and workout. The calibration method may depend on the type of workout and thus, the interfaces may allow the user to select the type of workout.

Figure 98:
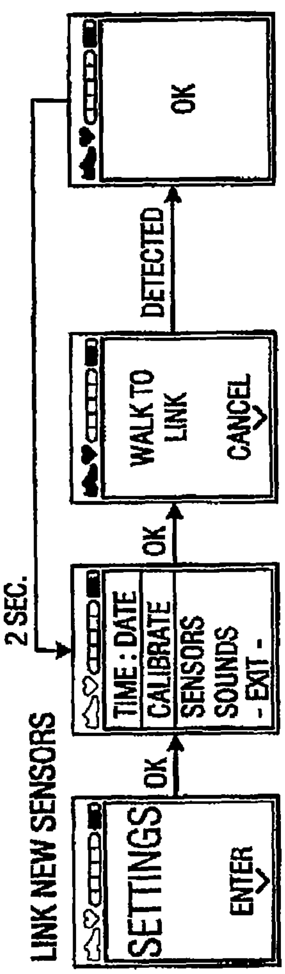
Figure 99:
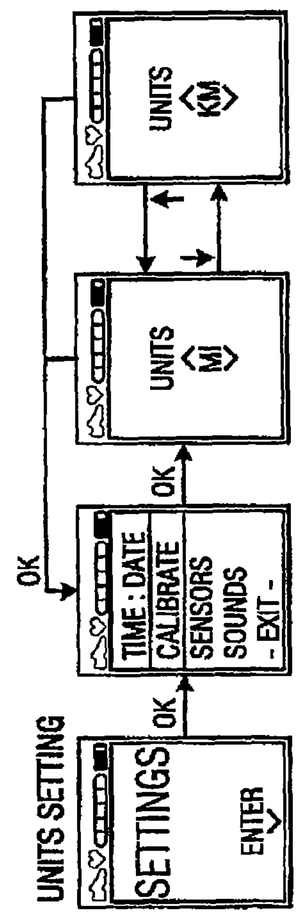

In the Settings mode, the user can also link new sensors to the watch 10. As shown in FIG. 98, several menu options are displayed in the Settings mode, namely: TIME:DATE, CALIBRATE, SENSORS, and SOUNDS. The user selects the "SENSORS" option using the side button 50 and the end button 52 consistent with the description above. The controller then displays the message "WALK TO LINK." After a set amount of time while the user walks, the watch 10 detects the sensor and the controller displays an "OK" screen for a set period of time. The user can then utilize other functions of the user interface. As further shown in FIG. 99, the user can also set the distance units in either miles or kilometers using the buttons 50,52 consistent with the description above.

Figure 100:
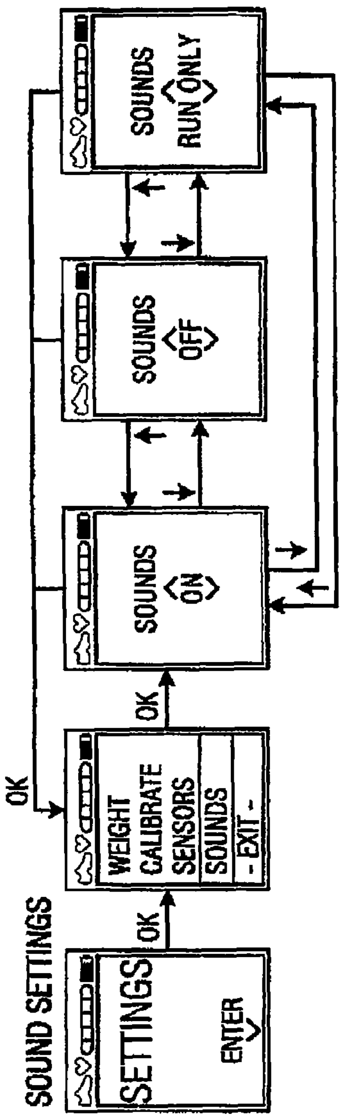
Figure 101:
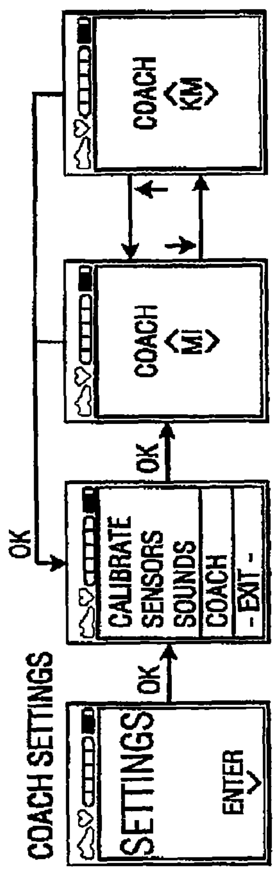
Figure 102:
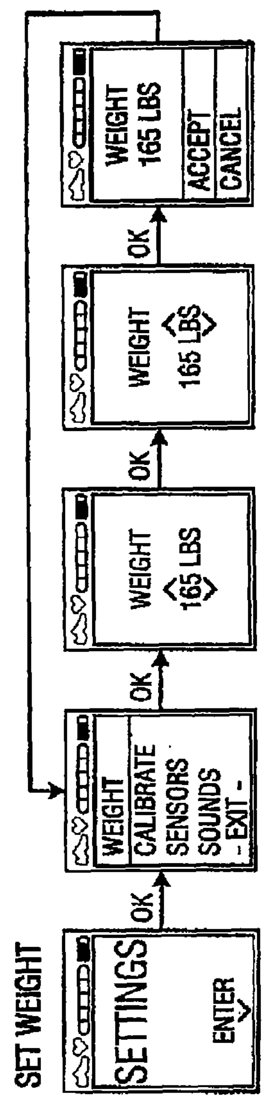

It is further understood that the user interface has a Sounds selection as part of the Settings menu (FIG. 100). The user has the option to have the Sounds on or off, as well as having the Sounds on only during a run in the IWO mode. The Settings menu may also have a Weight menu selection (FIG. 102) wherein a user can enter weight information to further enhance the performance features of the watch 10. As shown FIG. 101, the user can also select a COACH mode from the settings menu. Additional features regarding the COACH mode will be described in greater detail below.

Figure 103:
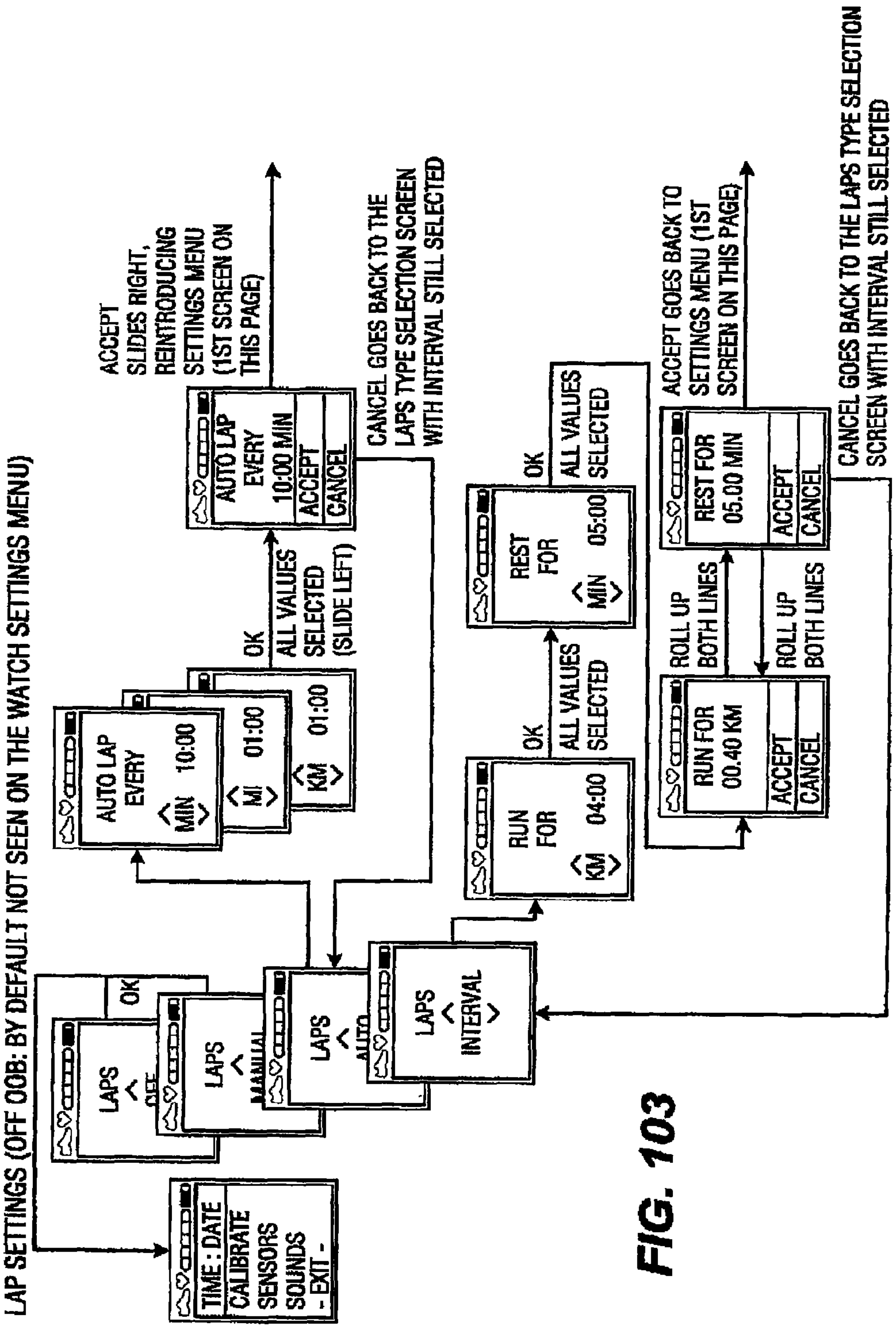

As further shown in FIG. 103, the Settings mode includes a menu selection for "Laps." The Laps function allows a user to manually or automatically apply certain demarcations to the performance data as displayed to the user as further described below. Generally, the Laps function is utilized by tapping the front side 38 of the watch 10 as described above, and generally the crystal 39 which activates the shock button 54. As discussed, the user can scroll through the menu selections and select "Laps." As shown in FIG. 103, a plurality of Laps types is available regarding the "Laps" function. First, the user can select that the Laps function be turned off. In other settings, the Laps function can be set to other types including Manual, Auto or Interval. If the user selects the Manual setting for the Laps function, the controller then displays the general Settings menu wherein a user can proceed with further activity. In this setting, the user can mark laps by tapping the crystal 39. For example as shown in FIGS. 14 and 15, the user may tap the watch 10 to mark a lap, which when the user connects the module 12 to the Remote Site, the laps will be marked with indicia marks on a run curve such as shown in FIGS. 16-20. If the user selects the Auto setting, the user interface displays an "Auto Lap Every" screen. The user can then select whether a lap will be marked at a certain time, e.g. every 10 minutes, or at each mile or kilometer. The user also has the option of multiple auto-marking intervals, e.g., marking 1 mile and then every 1 minute. Once selected, a review screen is displayed, wherein the user can accept the selection. If the user selects the Interval Laps type, additional screens are displayed prompting additional inputs from the user. These inputs will be described in further detail below in relation to the Run mode. A "Run For" screen is displayed wherein the user enters the distance to run. Once the distance is entered, a Rest For screen is displayed wherein the user enters the time the user will rest after the distance entered is run. As further shown in FIG. 103, the user is prompted to accept the entered values. The user can also choose to Cancel the entered values wherein the initial Laps Interval screen is displayed for the user.

If the user selects "LAPS," the controller may display the times of each of the laps for the past run. The controller will also display the numbered lap along with the time for the lap-time in a scrolling feature when the cursor is over that certain lap. If the user selects OK while the cursor is over a lap, the controller will display the specific data for that lap, such as pace, total workout time, and total distance.

Once various values and parameters are set in the Settings mode, the user can select the Run mode using the side button 50 and end button 52 as shown in FIG. 86*a*. The Run mode will enter the user into the in-work-out (IWO) as describe above. Once selected, the user is prompted to link to sensors worn by the user. In an exemplary embodiment, the sensor is a shoe-based sensor such as an accelerometer and/or a heart rate monitor.

Figure 86C:
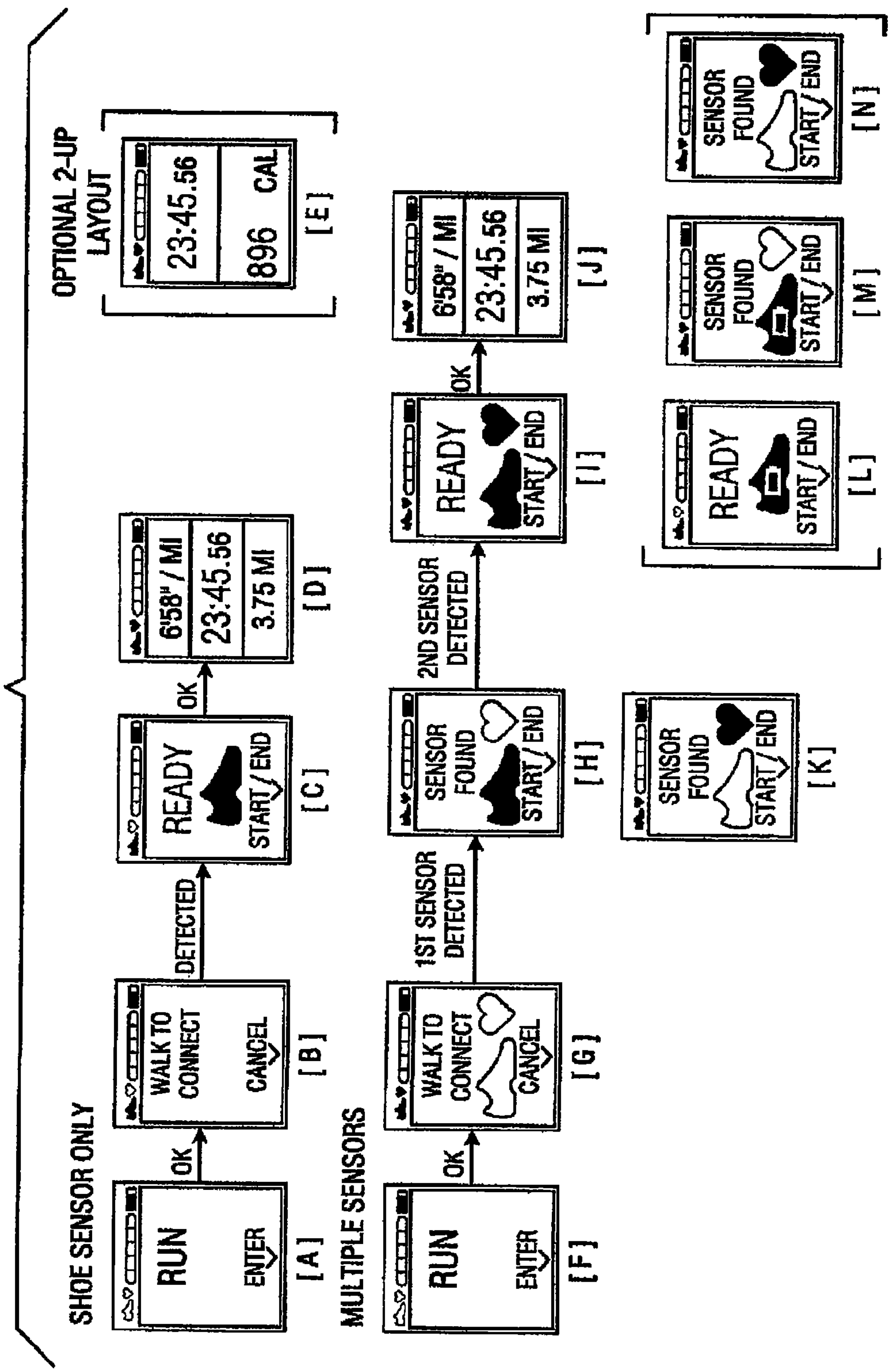

If the user has not previously linked a heart rate sensor to the watch 10, the user interface will attempt to detect the shoe-based sensor as shown in FIG. 86*c*. Thus, after entering the Run mode, the controller 18 displays the "Walk To Connect" screen with a shoe-shaped icon. The shoe-shaped icon is in outline form and in a blinking mode to indicate that the sensor has not yet been detected. It is understood that certain shortcuts can be provided to start a run such as pressing the one of the input buttons for a predetermined amount of time, such as pressing and holding the end button for two seconds. The user walks so that the watch 10 detects the sensor. The controller starts a timeout timer countdown for a preset time, such as 15 seconds. If a sensor is not detected within the preset time, the controller displays a screen indicating "Sensor Not Found" wherein the user can re-initiate the detecting process. Once properly detected, a "Ready" screen is displayed wherein the shoe-shaped icon is darkened and not blinking to indicate that the sensor has been properly detected. A "Start/End" selection is also displayed. Once the user selects the "Start" option, the watch 10 begins recording the athletic performance include speed, distance and other parameters such as calories burned.

Figure 86D:
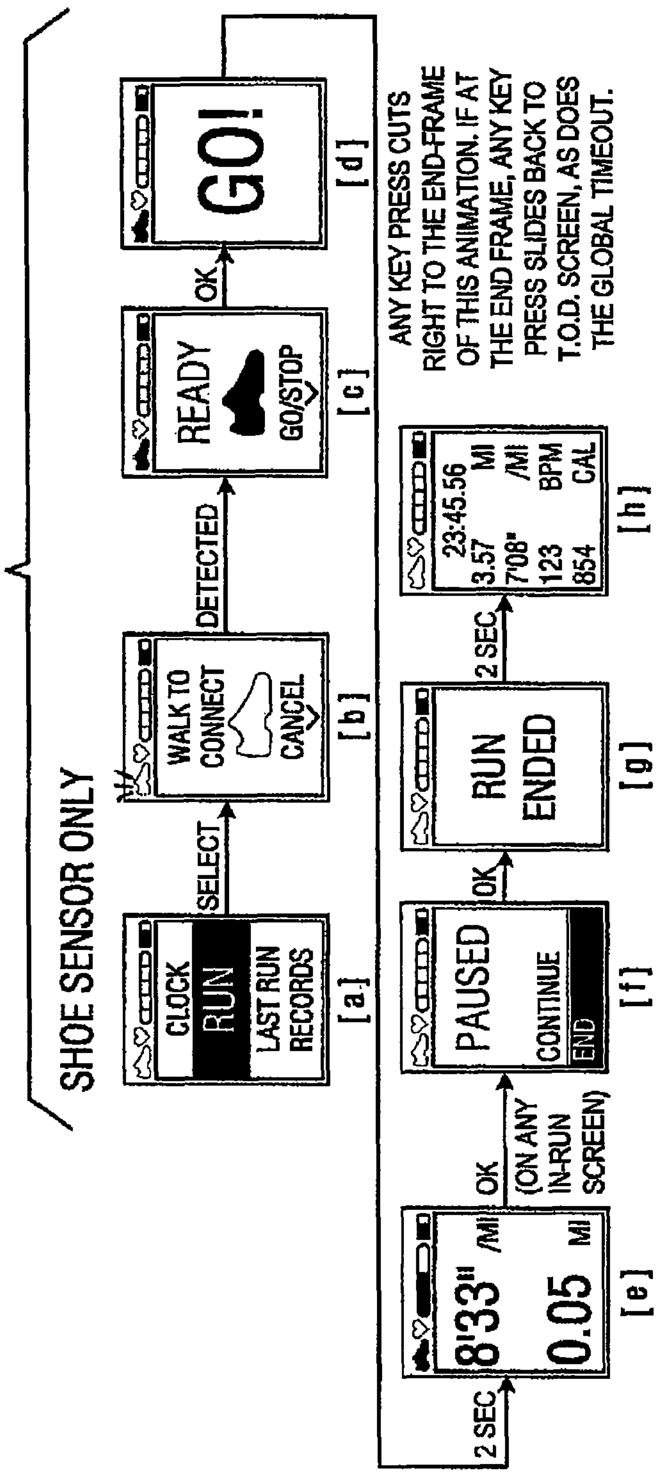

FIG. 86*d* illustrates another example of beginning a run with only a shoe-based sensor. As discussed above with respect to FIG. 86*c*, a user may select a run option and subsequently receive an instruction to walk or move in order to connect the shoe-based sensor to watch 10. During the run, a user's pace and distance may be displayed. If the user interacts with the interface (e.g., by selecting an OK button, tapping on a touch-screen), the run monitor may be suspended or paused. A user may subsequently choose to continue or end the run. When the run is ended, an interface displaying "RUN ENDED" may be displayed and, after a predefined amount of time, a run summary be displayed.

Figure 86E:
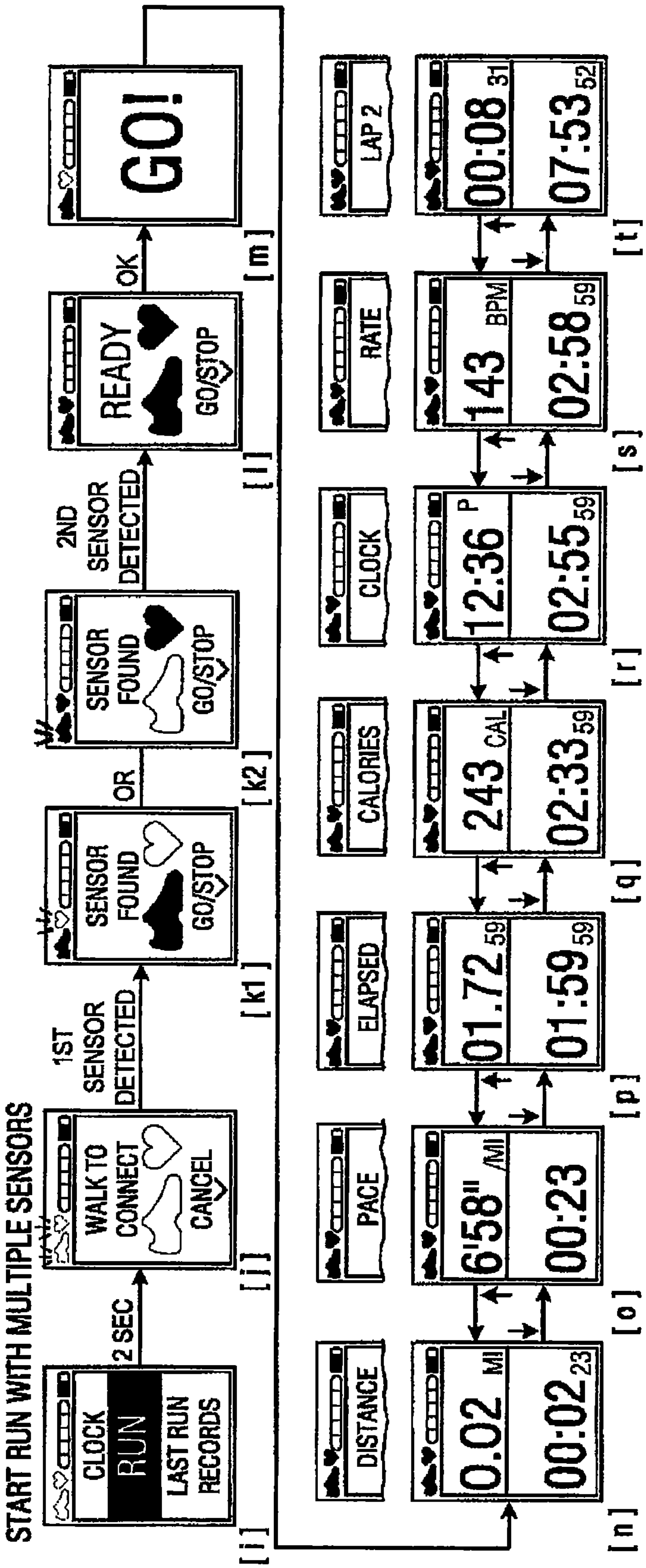

FIG. 86*e* illustrates another example series of user interfaces for initiating and conducting a run using multiple sensors such as a shoe-based sensor and a heart rate sensor. Depending on the desired type of run or the preferred display information, the interfaces may display distance information, pace information, elapsed time information, calories, clock, heart rate, lap splits and the like. Combinations of information may be displayed using bi- or tri-level display configurations. For example, distance and/or pace information may be displayed along with an elapsed time.

The controller then displays a Run Layout screen such as shown in FIG. 86*c*. The display screen may be in the form of a three-tiered display such as shown in FIG. 86*c*. The Run Layout screen may include the pace per mile, total workout time, and total distance, which is constantly updated during the athletic performance. The user can also modify the Run Layout screen wherein the performance data is displayed in a two-tiered display. A desktop utility software application associated with the user interface provides these options for the user as explained in further detail below. The two-tiered display allows the user to select data as desired that is displayed in a larger font, such as only displaying total workout time and calories. The user can also configure the layout to include additional information such as calories burned, heart-rate beats-per-minute, or time of day.

Figure 87:
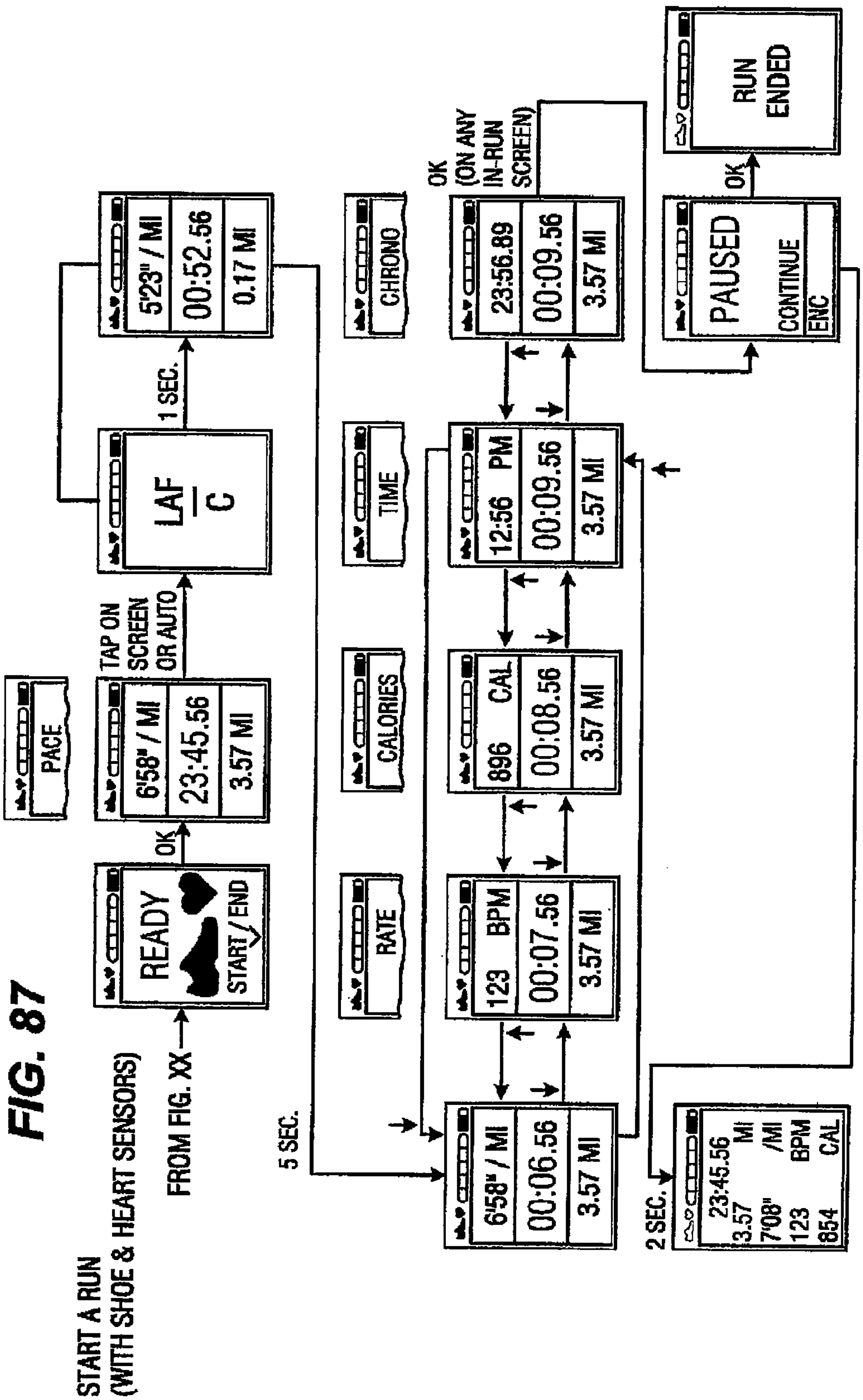

FIG. 87 discloses the screens the controller 18 displays when the user had previously linked heart rate monitor to the watch 10. Once the Run mode is selected, the controller displays the "Walk to Connect" screen similar to the discussion above, but now with a shoe-shaped icon and a heart-shaped icon, corresponding to the heart rate monitor. The shoe-shaped icon and the heart-shaped icon are both in outline form and in blinking mode to indicate that the sensors have not yet been detected. The user walks so that the watch 10 detects the sensors. The controller starts a timeout timer countdown for a preset time, such as 15 seconds. If a sensor is not detected within the preset time, the controller displays a screen indicating "Sensor Not Found" wherein the user can re-initiate the detecting process. Once properly detected, a "Ready" screen is displayed wherein the shoe-shaped icon and heart-shaped icon are darkened and not blinking to indicate that the sensors have been properly detected. As further shown in the FIG. 86*e*, depending on the sensor detected first by the watch 10, the shoe-shaped icon or the heart-shaped icon may be darkened while the other is still in outline form indicating that the watch 10 is detecting. A "Start/End" selection is also displayed with the "Ready" screen. Once the user selects the "Start" option, the watch 10 begins recording the athletic performance including speed, distance, heart rate and other parameters such as calories burned.

Figure 92A:
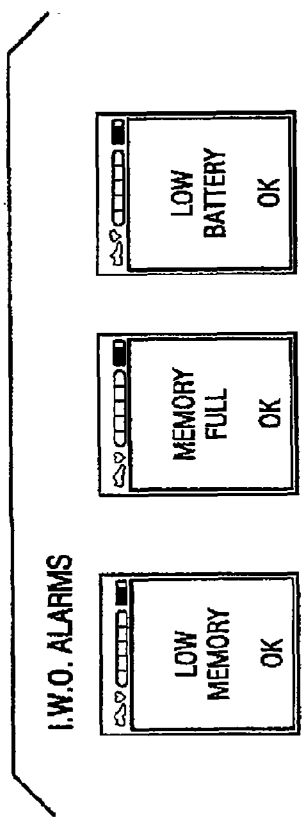
Figure 92B:
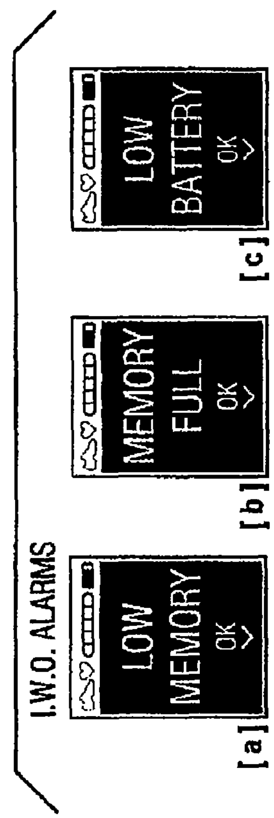
Figure 92C:
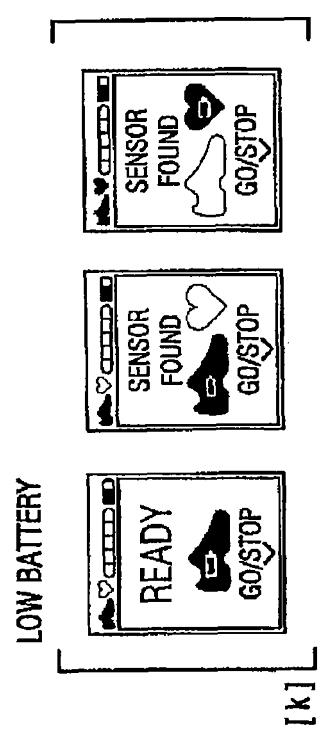

FIGS. 92*a* and 92*b* further show screens displayed if the sensors being used are low in battery power. A battery empty icon is shown within the sensor icon in such case. Thus, the battery empty icon is shown within the shoe-shaped icon or the heart-shaped icon. Alarms can also be displayed for low memory or full memory.

As the user continues in the athletic performance, the watch 10 constantly records and stores the data associated therewith. Performance data is also constantly displayed on the watch 10. As discussed, the display 56 may be set in the three-tier mode or the two-tier mode. As shown in the FIGS. 86*e* and 87, for instance, the controller may utilize labels associated with the data. For example, the label "PACE" may scroll across the top of the display and then the pace value (6'58"/ml) is constantly displayed. Such scrolling labels could also be used for the other metrics set to be displayed by the user. For example, FIG. 87 show that the display screens can be set to show scrolling labels and values such as heart rate, calories, time and chronograph. The labels could also be turned off or configured to scroll periodically during the athletic performance. If the Laps function is turned off or not utilized during the athletic performance, the user can pause the performance by pressing an input button. Once paused as shown in FIG. 87, the controller provides a menu selection for the user to Continue or to End the workout. If End is selected, the Run Ended screen is displayed as shown in FIG. 87. The controller is also configured to provide a shortcut to end a workout by pressing and holding the end button 52. This shortcut is provided when the user is in the IWO mode such as during a run.

As discussed above, the user has the option to utilize the Laps function by tapping the front side 38, or crystal 39 of the watch 10, to activate the shock button 54, which marks a lap providing additional functionality of the watch 10. As shown in FIGS. 14, 15 and 87, once the user taps the crystal 39, the shock button 54 is activated marking a lap wherein a "Lap" screen is displayed. A "Lap 2" screen is displayed and it is understood that Lap 1, Lap 2, Lap 3 screens and so on will be displayed based on the number of Laps marked by the user. The Lap screen is displayed in a reverse configuration wherein the background is darkened and the indicia shown in a "white" configuration (See also "Personal Record" screen in FIGS. 90*a* and 90*b*). Upon marking a lap, it is understood that the backlight is lit and the controller is configured to prevent any further laps from being marked for a set period of time such as 6 seconds. This time prevention protects against accidental taps. Once a lap is marked, the controller displays the Run Information Screen that shows performance data for that current lap. The backlight remains lit and the screen remains in a reversed darkened configuration with the indicia shown in "white" figures. As further shown, the pace, time (chronograph) and distance is displayed for a set amount of time, such as 5 seconds. The time and distance are shown as values for only that lap that has been marked and the pace displayed is the average pace over the lap interval.

After the predetermined time to display the lap performance data, the controller then displays the ongoing run data display screen. Thus, the pace, time and distance are again displayed. It is understood that the controller can be configured to display performance data relating to the total workout if desired wherein the overall average pace, total time and total distance is displayed while the user continues with the athletic performance. It is also understood, that the controller can be configured to display the current lap performance data wherein the average pace for the current lap, current lap time and current lap distance is displayed. A combination of total data and lap data can also be displayed based on user preferences. Other performance data can also be displayed as part of the Run data display screen such as heart rate, calories, time of day, and time (chronograph). The controller can be configured to display any combinations of these data metrics in the various locations as well as in total data or lap data. It is further understood that the user can continue to mark additional laps by tapping the crystal 39 and activating the shock button 54. Data will continue to be displayed as discussed above. In one exemplary embodiment, the display shown in FIG. 87 is particularly utilized when the LAPS function is set in the manual mode. In such case, after a first lap is marked by tapping the crystal 39, the chronograph is displayed at the top row of the display. From then on, the larger center row displays the delta time, i.e., the lap time elapsed for the current lap. In addition, in the Laps function when using multiple sensors (foot sensor and heart rate sensor), the watch 10 captures data relating to chronograph, lap time, distance delta, average pace for that lap, average heart rate for that lap, and calorie delta but only displays pace delta, lap time and distance delta.

Figure 90A:
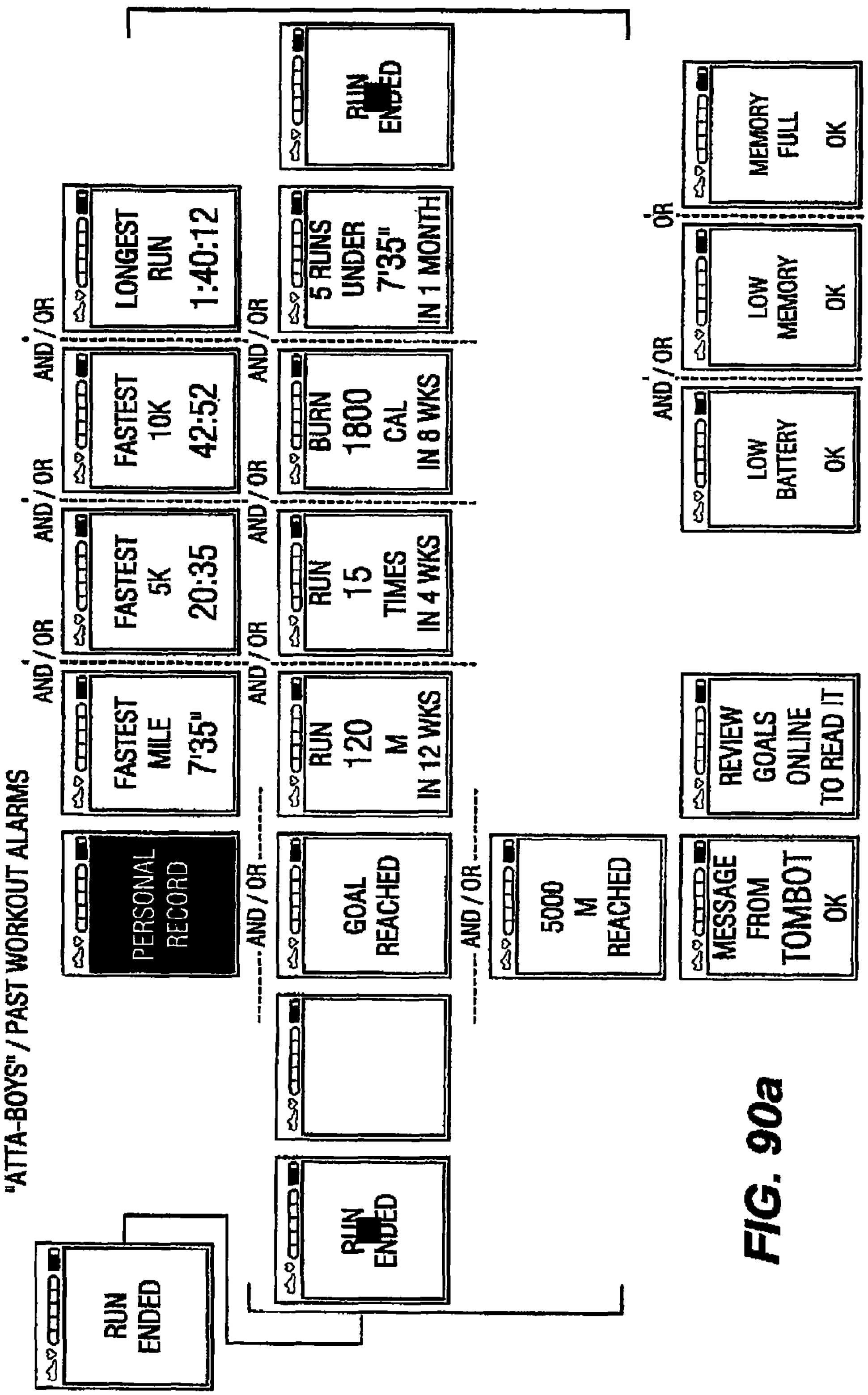
Figure 90B:
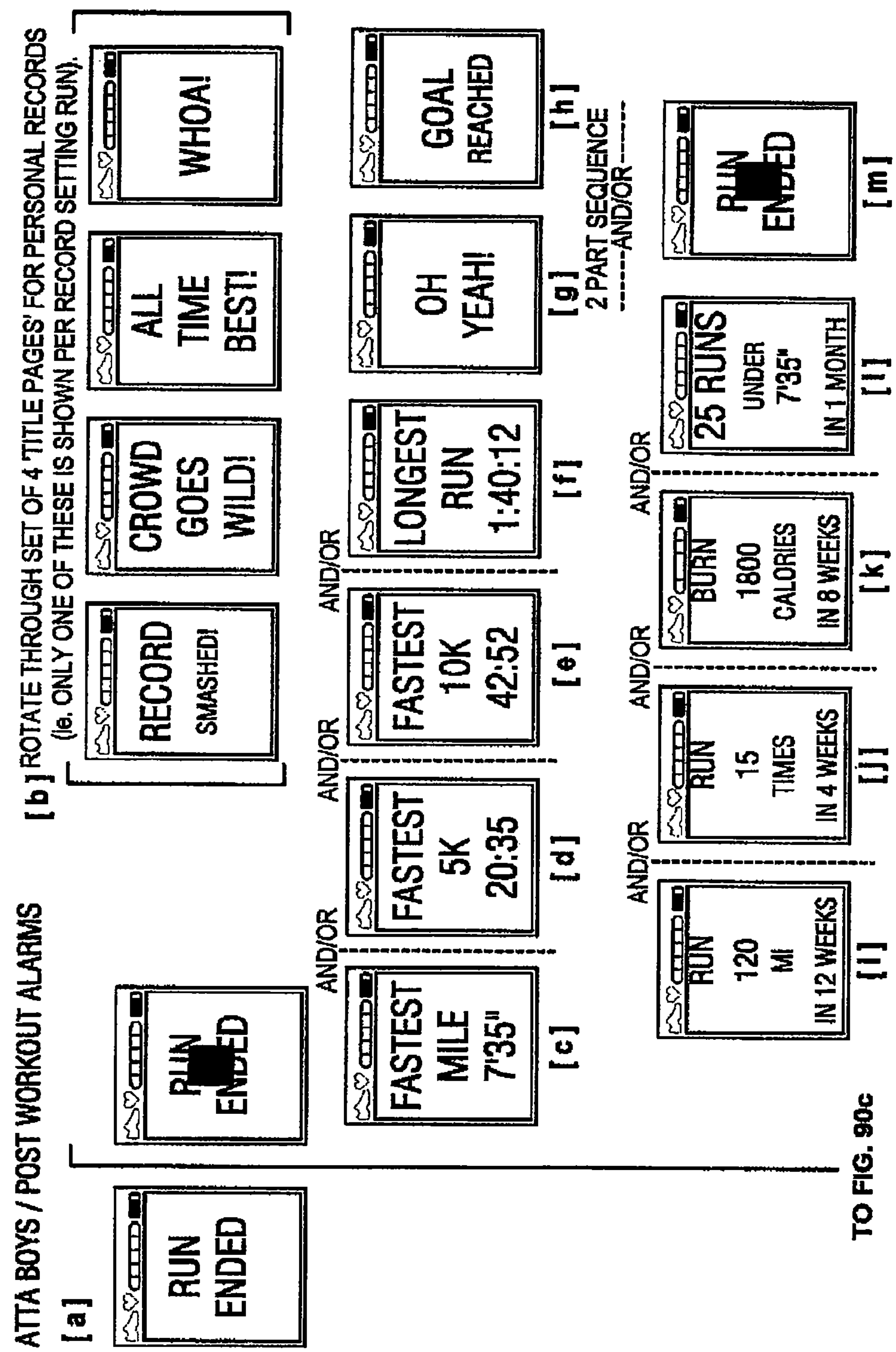

The user can pause recording of the athletic performance data by pressing the end button 52. As shown, a Paused screen is displayed with a Continue and End menu selection. When paused, the title bar acts as a ticker cycling through the user's chosen metrics (PAUSED—CHRONO—DISTANCE—PACE—HEART RATE—CALORIE—TIME OF DAY). Thus, the PAUSED title is displayed and then moves from right to left on the display wherein the numerical chronograph value scrolls onto the display from right to left, then followed by the distance numerical value, and so on for the other chosen metrics. If the user selects Continue, the watch 10 will resume recording performance data as discussed above. If the user selects End, the Run Ended screen is displayed. It is understood that a shortcut to end a run can be provided wherein the user can press and hold the end button 52 while in the IWO mode which will also stop the recording of data and display the Run Ended screen. If certain Goals are reached or other messages are provided by the watch, such information may be displayed to the user as described in greater detail below (FIGS. 90*a* and 90*b*). After a predetermined amount of time such as 2 seconds, a summary of the performance data is then displayed for review by the user. In an exemplary embodiment, a label of the performance metric scrolls across the screen from right to left followed by the numerical value of the data. Five rows of data can be displayed although this can be changed to add or subtract certain data. Thus, in one exemplary embodiment, the Time label scrolls across and the total time is displayed. The Distance label scrolls across and the total distance is displayed. The Pace label scrolls across the screen and the average pace for the workout is displayed. The Heart Rate label scrolls across the screen and the average heart rate in beats per minute (BPM) is displayed. Finally, the Calories label scrolls across the screen and the total number of calories burned is displayed. It is understood that if the watch 10 detects no sensors for a certain amount of time, e.g., 25 minutes, the watch 10 will go into the paused state automatically and an audible alert can be sent via the speaker. If paused for an additional predetermined period of time, e.g., five minutes, after the auto-paused state, then the run will automatically be ended. If the user entered the paused state manually, then the run will be ended after a predetermined amount of time such as thirty minutes.

Figure 88A:
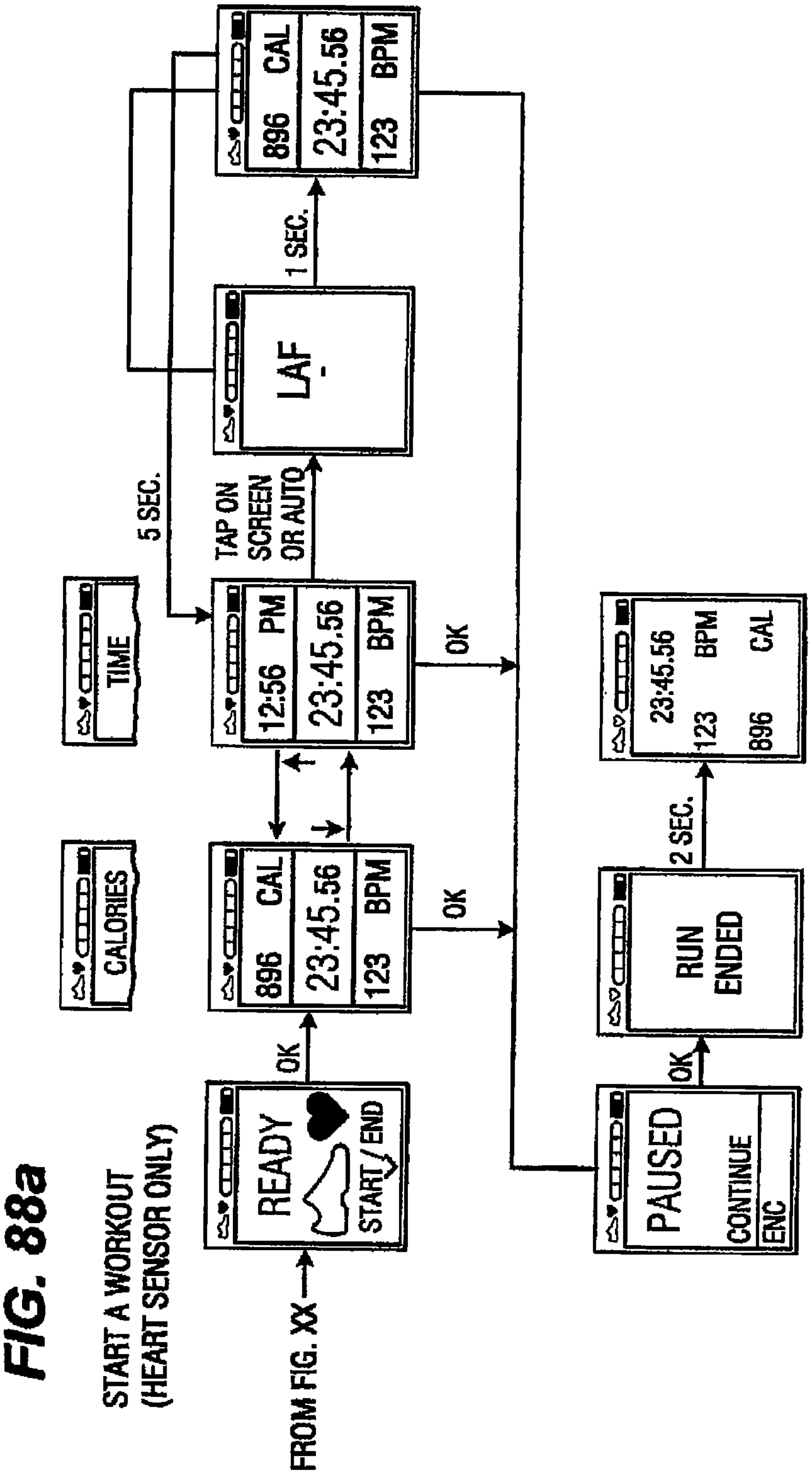

As shown in FIG. 88*a*, the user may have an athletic performance or workout with the heart sensor only and not a shoe based sensor. The user interface displays similar screens as described above utilizing both the shoe-based sensor and the heart rate sensor. The user initiates the Run mode wherein the watch detects the previously linked heart rate sensor as described above. As shown in FIG. 88*a*, the user interface displays the Ready screen once the heart rate sensor is detected wherein the heart icon is solid and not blinking while the shoe-based sensor remains in outline form. Once the user selects the Start menu selection, the watch 10 begins recording the performance data associated with the workout. In this instance, the user interface displays the Run Layout screen, which may be custom set by the user using the desktop utility application. For example, as shown in FIG. 88*a*, the controller can display calories, workout time, and heart rate (beats per minute—BPM) in the three-tier mode. As described above, the label scrolls across the display from right to left and then the value remains displayed. In another example, the user may set the Run Layout screen to show Time Of Day, workout time, and heart rate. Other screen layouts are also possible using the associated desktop utility software. The user performing a heart-rate only workout can also utilize the Laps function similarly as described above. As shown in FIG. 88*a*, the user can manually mark a lap by tapping the crystal 39 wherein a Lap 1 is marked and the backlight is illuminated. The user input (e.g., tapping the touch sensitive display) might only be interpreted as a lap marking when a user is currently performing an athletic activity and/or a particular interface (e.g., a workout monitoring interface) is displayed. After a predetermined amount of time, e.g., 1 second, the data on the Run Layout screen is again displayed as shown in FIG. 88*a*. The backlight may remain illuminated for a certain time. In this mode of operation, the Laps function captures and displays average heart rate, chronograph time and calories. The user can choose to capture and display other data as desired. The user can pause or end the workout, and it is understood that the Pause and Run Ended functions are similar as described above. Thus, when paused, the user interface displays data in ticker fashion wherein the label Paused scrolls across display, followed by the numerical values for chronograph, heart rate and calories scrolling across the display. Once the workout is ended, the performance data is displayed as described above wherein the label scrolls across the display followed by the numerical value. This can be done for the various performance metrics chosen to be displayed by the user such as workout time, heart rate and calories. After the performance data is displayed for a predetermined amount of time, the user interface returns to the Time Of Day screen.

Figure 88B:
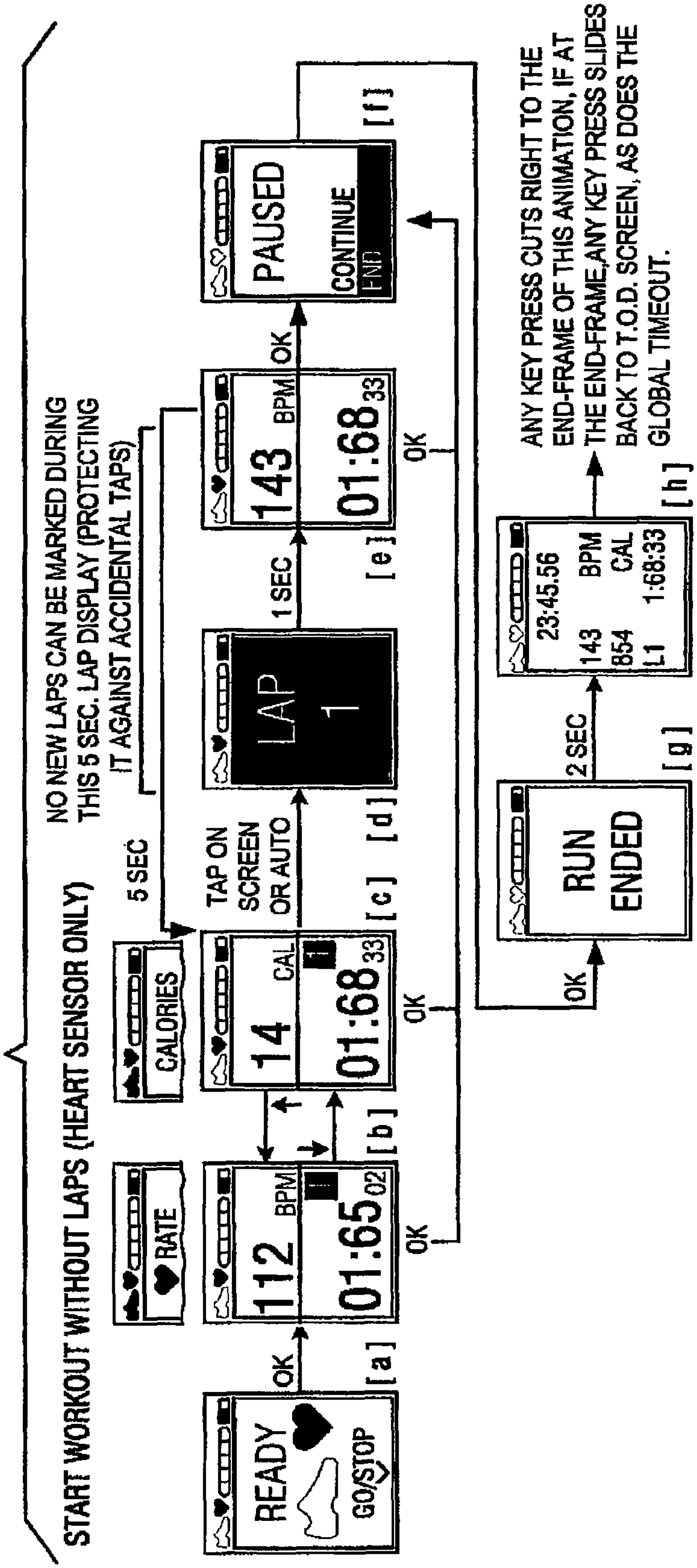
Figures 88C, 88D:
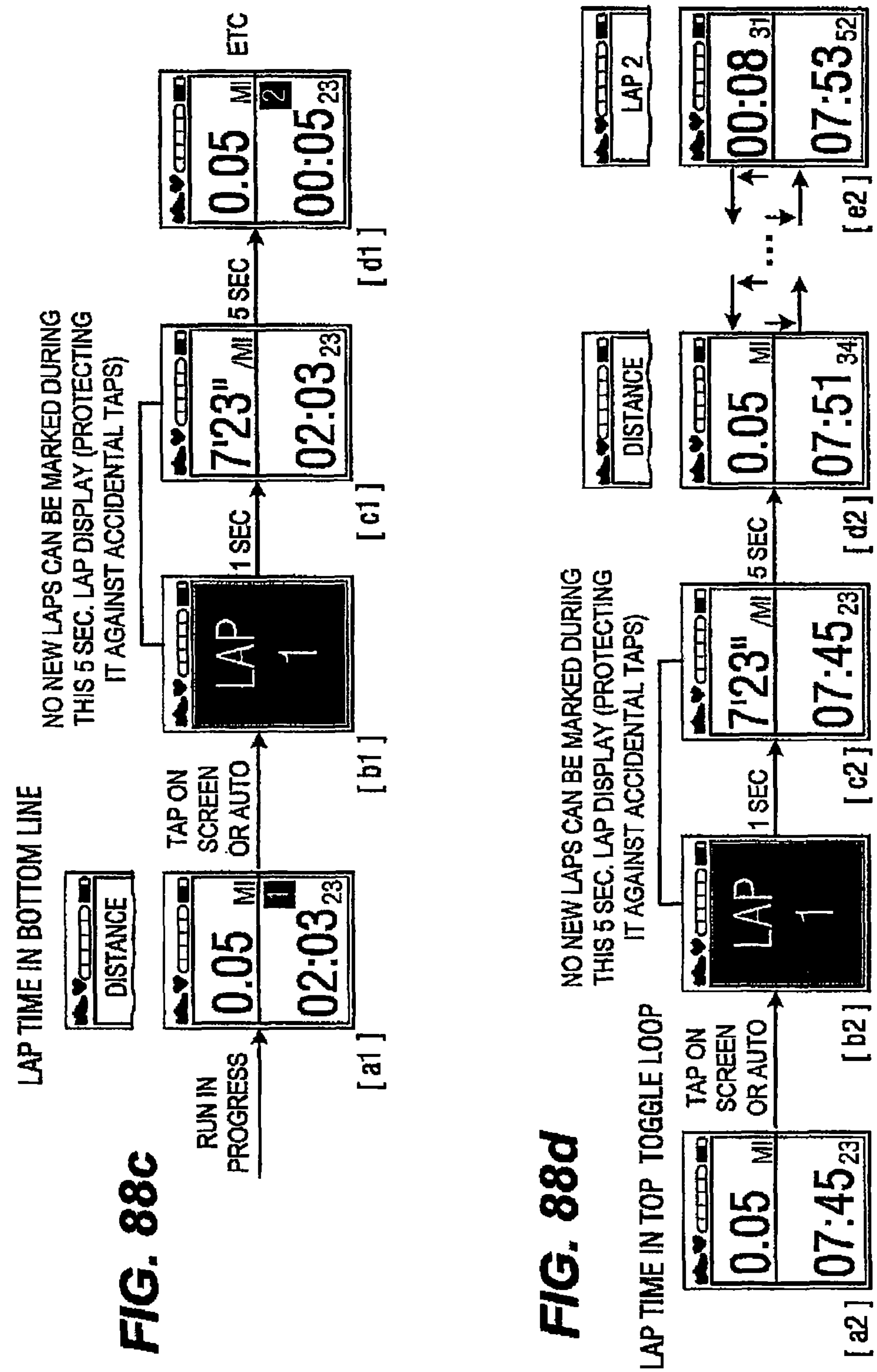

FIG. 88*b* illustrates another example series of interface for initiating and recording a workout and for allowing a user to manually mark laps during the run. For example, to mark a lap a user may tap a screen or a particular portion of the screen. Additionally, the interface may be locked from marking another lap for a predefined amount of time after the user has marked a lap. Such a lockout functionality may prevent accidental marking of laps (e.g., accidentally double tapping an interface). FIGS. 88*c* and 88*d* illustrate interfaces where lap time information may be displayed in a bottom position and a top position, respectively, of a display, e.g., of watch 10. For example, a lap indicator might not be incremented or the incremented lap indicator might not be displayed until a threshold amount of time (e.g., 5 seconds, 2 seconds, 10 seconds, 1 minute, 5 minutes) has passed since receiving the user input marking the lap. This may be used to insure that accidental double tapping within a short amount of time is not interpreted as multiple lap markings. Additionally, in response to receiving a lap marking (e.g., a user input through a touch sensitive display), an interface displaying a pace of immediately previous lap may be displayed. The pace display may be displayed until the threshold amount of time has elapsed, at which time a workout monitoring interface including a statistic other than pace (e.g., distance of a current lap) may be displayed. Alternatively, the interface may display the same information with the exception of the updated lap indicator.

Figure 89A:
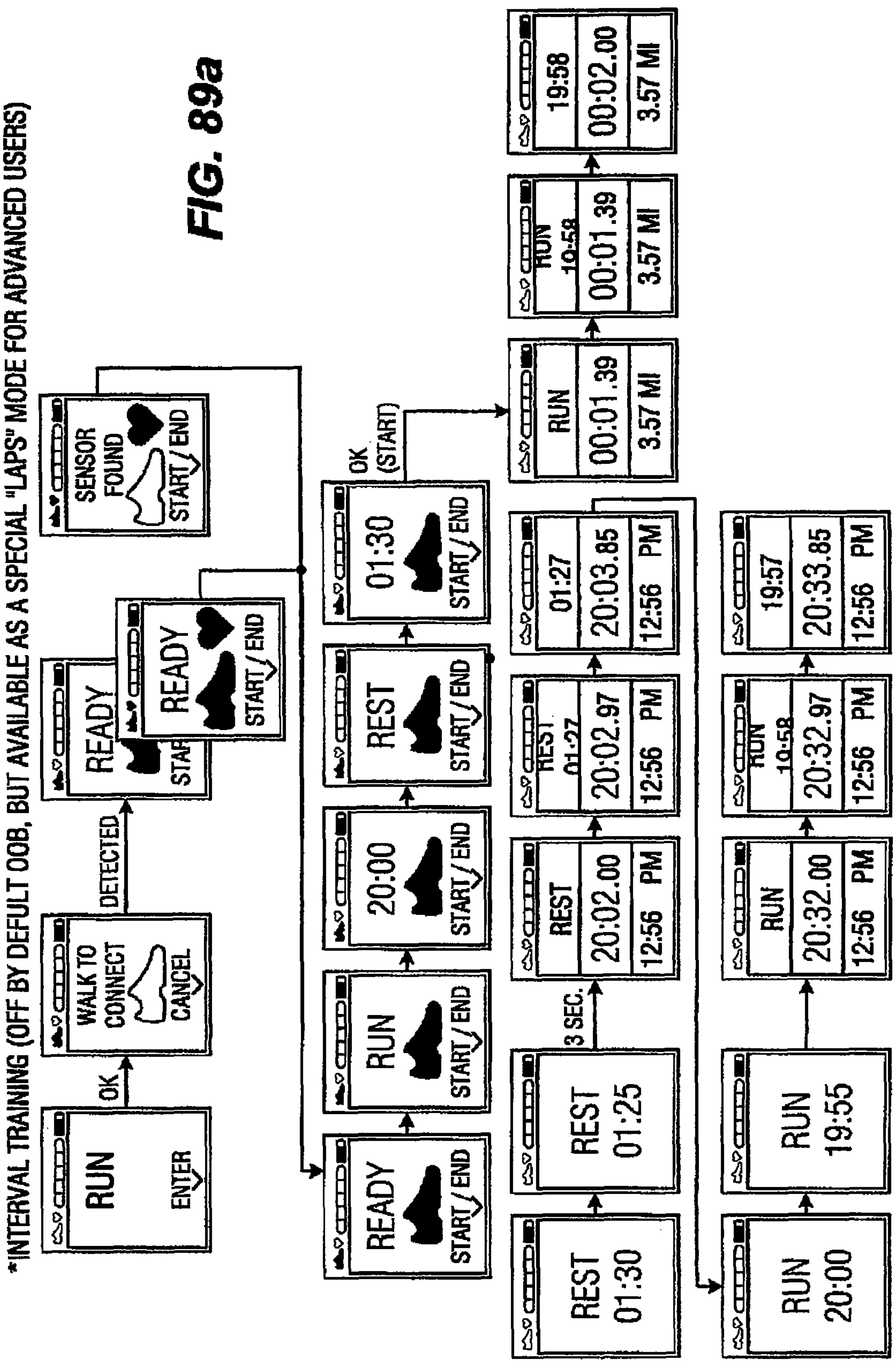

As discussed above, with the Laps function, the user can select the Interval option to perform an interval-based athletic performance in the IWO mode. As shown in FIG. 89*a*, the user walks in order for the watch 10 to link with the shoe sensor and/or the heart rate sensor. If the interval program has a distance setting in the program, it will only apply to emped based workouts such as the shoe sensor. As further shown in FIG. 89*a*, if the interval program has a distance setting and the user is performing a heart rate only workout, then Laps/intervals will be temporarily disabled for that workout only. It is understood, however, that if the interval program has only a time setting, then the user can perform interval training with a heart-rate only workout. Regardless, the watch 10 links to the sensors being used and the Ready screen is displayed.

FIG. 89*a* shows further screen views that the user interface displays for an interval workout. For example, once a user commences the interval workout by pressing the select or end button 52, the interval settings are displayed. Thus, as shown in FIG. 89*a*, the display indicates the user will run for 20 minutes. The display then indicates that the user will rest for 1 minute and 30 seconds. The user then commences the workout by pressing the end button 52. As shown in FIG. 89*a*, the user selected the three-tiered display with the desktop utility. Thus, initially, the Run label is displayed at the top row, the elapsed time is displayed in the larger middle row and the distance is displayed in the bottom row. As shown in FIG. 89*a*, after a predetermined time, the Run label scrolls upwards wherein an interval countdown timer is displayed wherein the 20 minute run interval is counted down. It is further understood that in an interval workout, the delta time elapsed will be displayed in the larger middle row in subsequent laps/interval periods. Using the desktop utility, the user can specify that the chronograph time can be displayed in the top row, or toggle loop, at the end of the loop.

As further shown in FIG. 89*a*, when the rest interval is reached, the backlight is illuminated wherein the user interface displays the Rest screen along with the time specified. The time is shown counting down for a predetermined time wherein the user interface displays the Run layout screen. Thus, the Rest label is displayed at the top row, the further elapsed time is displayed in the larger middle row and, based on user preferences, the time of day is displayed. The Rest label scrolls upwards wherein the rest interval time is displayed while counting down. Once the next run interval is reached, the user interface displays the Run screen with the designated time as shown in FIG. 89*a* and showing the backlight illuminated. The designated Run time begins to countdown. After a predetermined amount of time, the Run layout screen again is displayed. The Run label is displayed in the top row wherein the label scrolls upwards wherein the next designated run time continues to countdown. Further elapsed time is shown in the larger middle row. The time of day is also displayed in the bottom row as designated by the user.

Figure 89B:
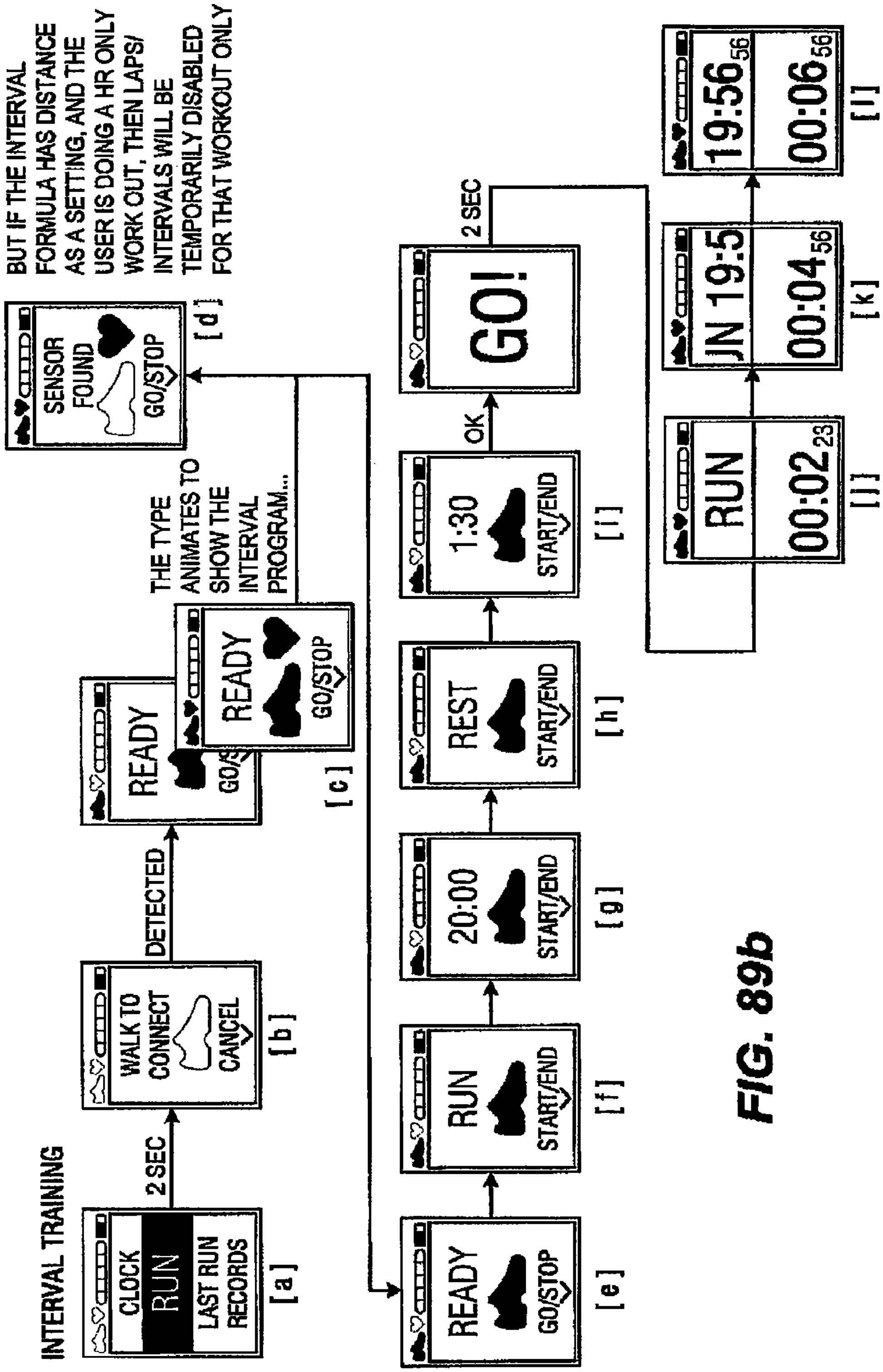
Figure 89C:
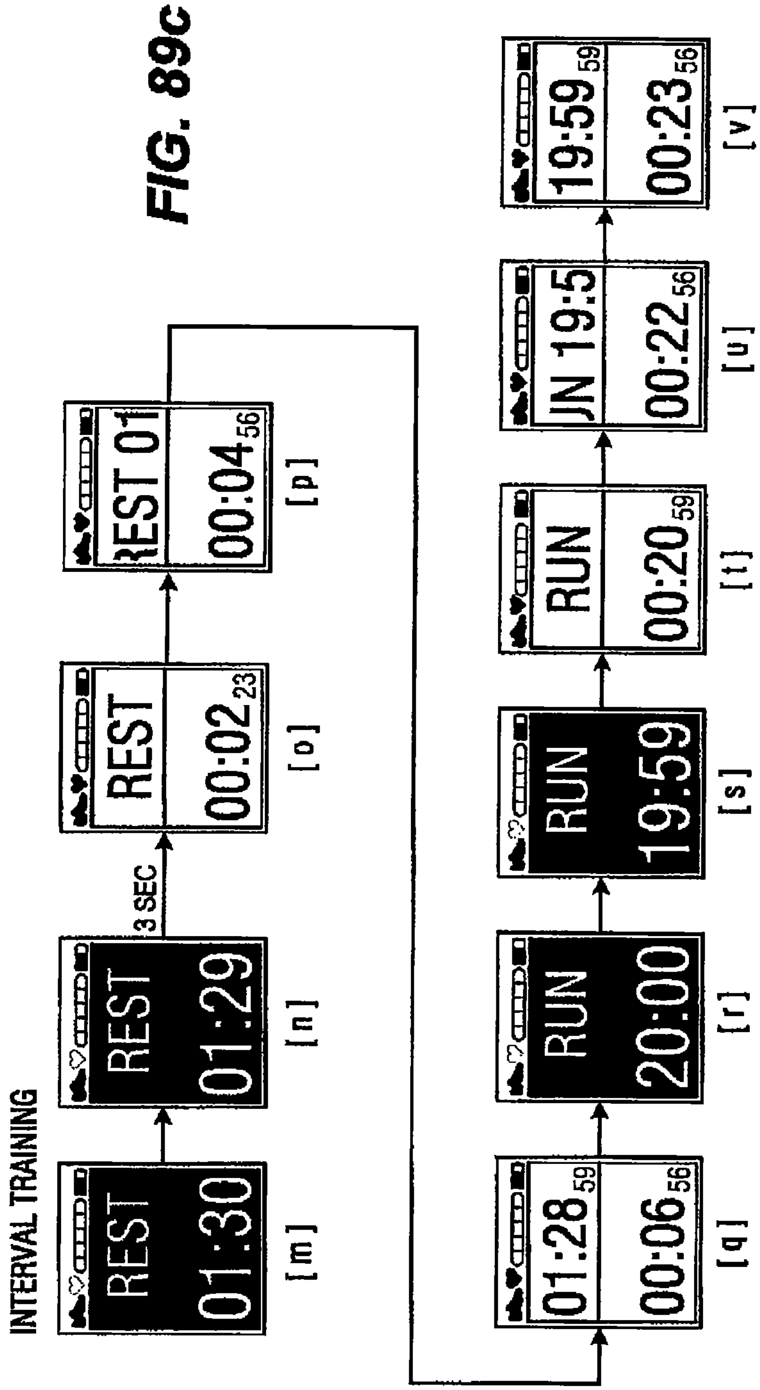

FIG. 89*b* illustrates another example series of interval training interfaces. The run interfaces may display instructions indicating whether the user is to run or rest. Additionally, the run line of the display may scroll (e.g., horizontally) to display an entirety of a message. For example, if the text "RUN 19:56" does not fit within the display area at the same time, the text may scroll to the left or right (or vertically). FIG. 89*c* illustrates additional example interval training interfaces. As illustrated, when a user is to transition from a rest to run mode (or vice versa), the interface may be initially displayed in a different manner (e.g., a first 3 seconds or other predefined amount of time). For example, the background may be backlit or displayed in a first color. After the predefined amount of time, the background might no longer be backlit or displayed in a second color different from the first.

The user can end an athletic performance or run as described above wherein the user interface displays the run ended screen. The user interface further displays the summary information such as total workout time, total distance, pace, heart rate and calories. As shown in the figures, the user interface has the capability of displaying additional information to the user. This information can be in the form of in-work-out alarms or other messages to the user. Regarding the alarms, an audible sound is emitted and the backlight is illuminated for a predetermined time such as 5 seconds. In an exemplary embodiment, the alarms at not subject to timeouts wherein the user must press the end button to dismiss the alarm.

As shown in FIGS. 90*a*, 90*c*, 92*a* and 92*b*, after a run is ended, if the level of recorded performance data nears a memory capacity of the electronic module, the user interface displays the screen Low Memory as shown in FIG. 90*a*. As discussed, the user must select the OK option by pressing the end button to dismiss the alarm. In this instance, the user is prompted to upload recorded performance data to the remote site as discussed. This alarm can also be displayed when a user seeks to commence a workout.

As shown in FIG. 90*a*, the user interface may display a MEMORY FULL alarm may at certain instances. For example, this alarm may be displayed when a user attempts to initiate a run with no memory remaining. In that case, the user interface may display the Run/Enter screen, Time of Day screen or some other screen of the user interface. The MEMORY FULL alarm may also occur during an athletic performance. In such case, the alarm screen may not be immediately displayed at that moment (it is understood that the user would have seen the LOW MEMORY warning upon starting the workout and ignored it). The system may stop recording data except for the total length and duration of the run. When the run is complete, the user may see this alert as part of the end of run sequence.

Figure 90C:
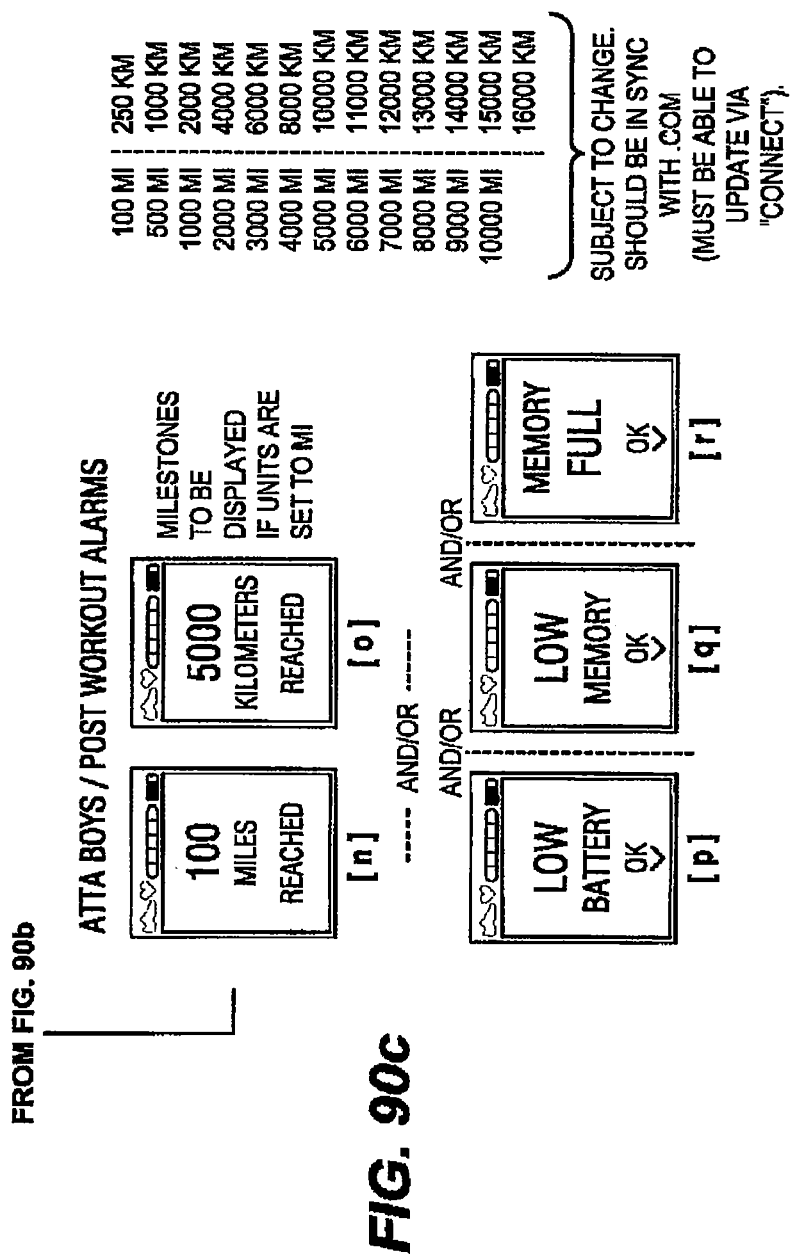

As shown in FIG. 90*a*, the user interface may display a Low Battery alarm. This alarm may be displayed when the user initiates and ends a run with the battery level equal to or below the reserve threshold. The reserve threshold should allow the user to run for at least an hour in an exemplary embodiment. FIG. 90*c* illustrates other example low battery and low or full memory alarm messages.

FIG. 90*a* discloses additional messages the user interface may display to the user. As previously discussed, athletic performance data is transferred between the electronic module and the remote site dedicated to storing and displaying the athletic performance data. Thus, certain data can be compared and stored in the electronic module to assist in displaying additional messages to the user. For example, as shown in FIG. 90*a*, the user interface can display personal records associated with the user. As previously described, the display can be reversed wherein the background of the display screen is darkened with the indicia shown in white lettering or perceptively different text. Thus, the electronic module is capable of storing the user's best personal times for certain categories and then comparing the current athletic performance data once the user ends an athletic performance or a run. If the user surpasses a previous time, the user interface can be configured to display a message to the user such as "PERSONAL RECORD" for a predetermined amount of time. The user interface may then display various different screens showing the user's personal data such as fastest mile with time data (FIG. 90*a*), fastest 5 k with time data, fastest 10 k with time data, or longest run with time data. Other personal record categories can also be displayed. FIG. 90*b* illustrates example achievement messages for congratulating the user on the goal achieved (e.g., best time, longest run, best pace, etc.). For example, the interface may display a message such as "RECORD SMASHED!" or "CROWD GOES WILD!"

Additionally, there may be post workout alarms, as further shown in FIG. 90*a*. During the RUN ENDED screen, if alarms need to be displayed, a black pop-up may take over the screen growing from the center. If a goal was reached during the workout, the title screen "GOAL REACHED" is shown. If several goals were reached during the workout, the title screen "GOALS REACHED" uses the plural and is only shown once (not prior to each goal that is displayed). Goals such as, total distance, total workout times, pace, and calories burned may be displayed as reached and ahead of target. For example, as shown in FIG. 90*a*, goal messages may be displayed such as running 120 miles in 12 weeks; running 15 times in 4 weeks; burning 1800 calories in 8 weeks; having 5 runs under 7'35" in one month; or 5000 miles reached. The user interface can also display a message to the user that another user has left the user a message wherein the user can review the message at the Remote Site. After all alarms are displayed, the black pop-up screen may retract itself and disappear. As soon as the pop-up screen disappears, the user is lead to the summary screen for that run. FIG. 90*b* illustrates additional example goal messages.

Figure 91A:
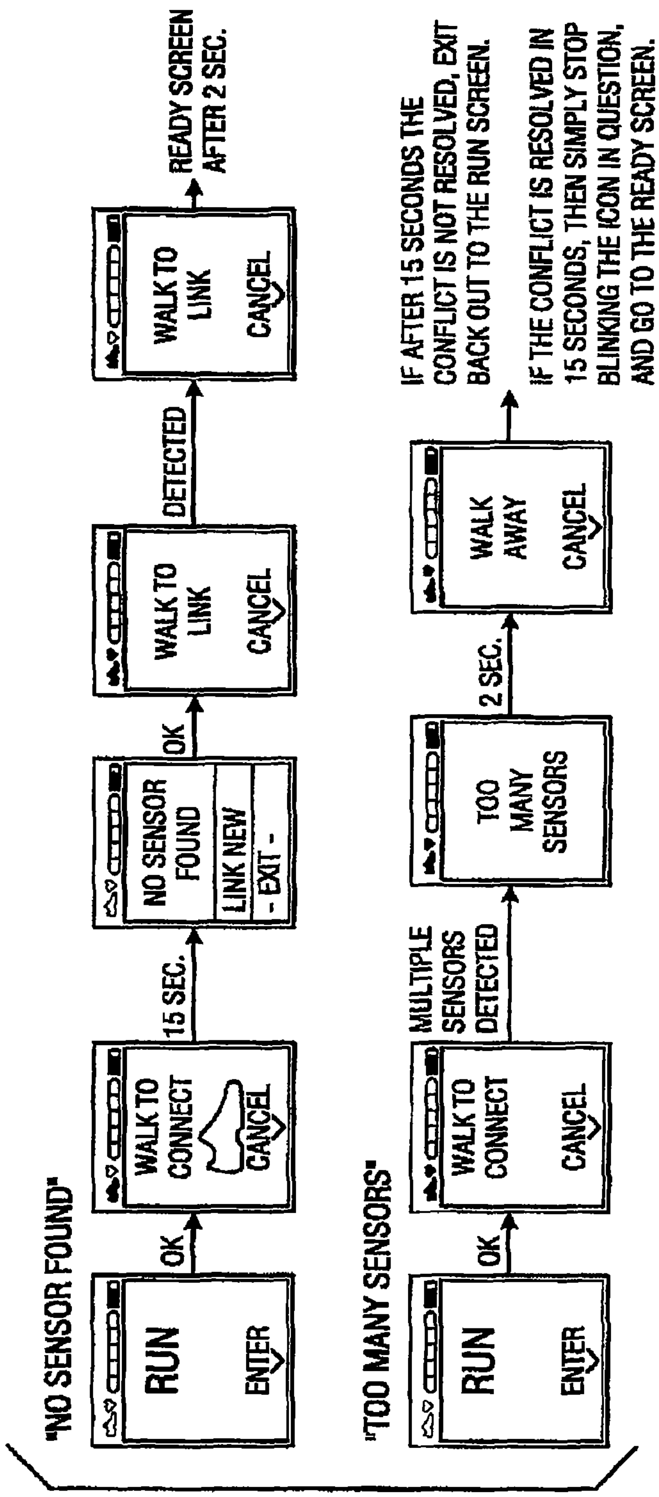

As shown in FIG. 91*a*, the user interface may also display additional messages to the user. As discussed above when the user prepares to commence an athletic performance, the user navigates through the user interface wherein the user is instructed to so that the watch 10 can detect and connect to the appropriate sensor. It could occur that the watch does not detect a sensor. As shown in FIG. 91*a*, after the watch 10 searches or attempts to detect the sensor for a preset time, such as 15 seconds, and the watch 10 fails to detect a sensor, the user interface displays a NO SENSOR FOUND message. The user has the option of either linking a new sensor by selecting the LINK NEW option, or by exiting by selecting the EXIT option. If the user selects the LINK NEW command, the user will be instructed to walk to link and after a predetermined amount of time, the sensor may then be detected and an OK screen will then be displayed for 2 seconds. The controller will then display the READY screen and the user can proceed with the workout as previously described. If the user selects the EXIT command, the user interface will display some other screen such as the Time of Day screen.

During the sensor detect and connect process, it can be possible for the watch to sense multiple sensors such as when linking sensors while in close proximity to other athletes also wearing sensors (e.g., at the start of a race competition such as a 5 k, 10 k or marathon race). Thus, as shown in FIG. 91*a*, the watch 10 of the user may detect too many sensors. In this situation, the user interface displays a "TOO MANY SENSORS" message for a predetermined amount of time wherein then the user interface displays a message to "WALK AWAY" in order to resolve the sensor detection problems. If after a preset time, such as 15 seconds, the conflict is not resolved, the controller will exit back out to the RUN screen. If the conflict is resolved within the preset time, such as 15 seconds, then the controller will stop blinking the icon in question and go to the READY screen.

Figures 91B, 91C:
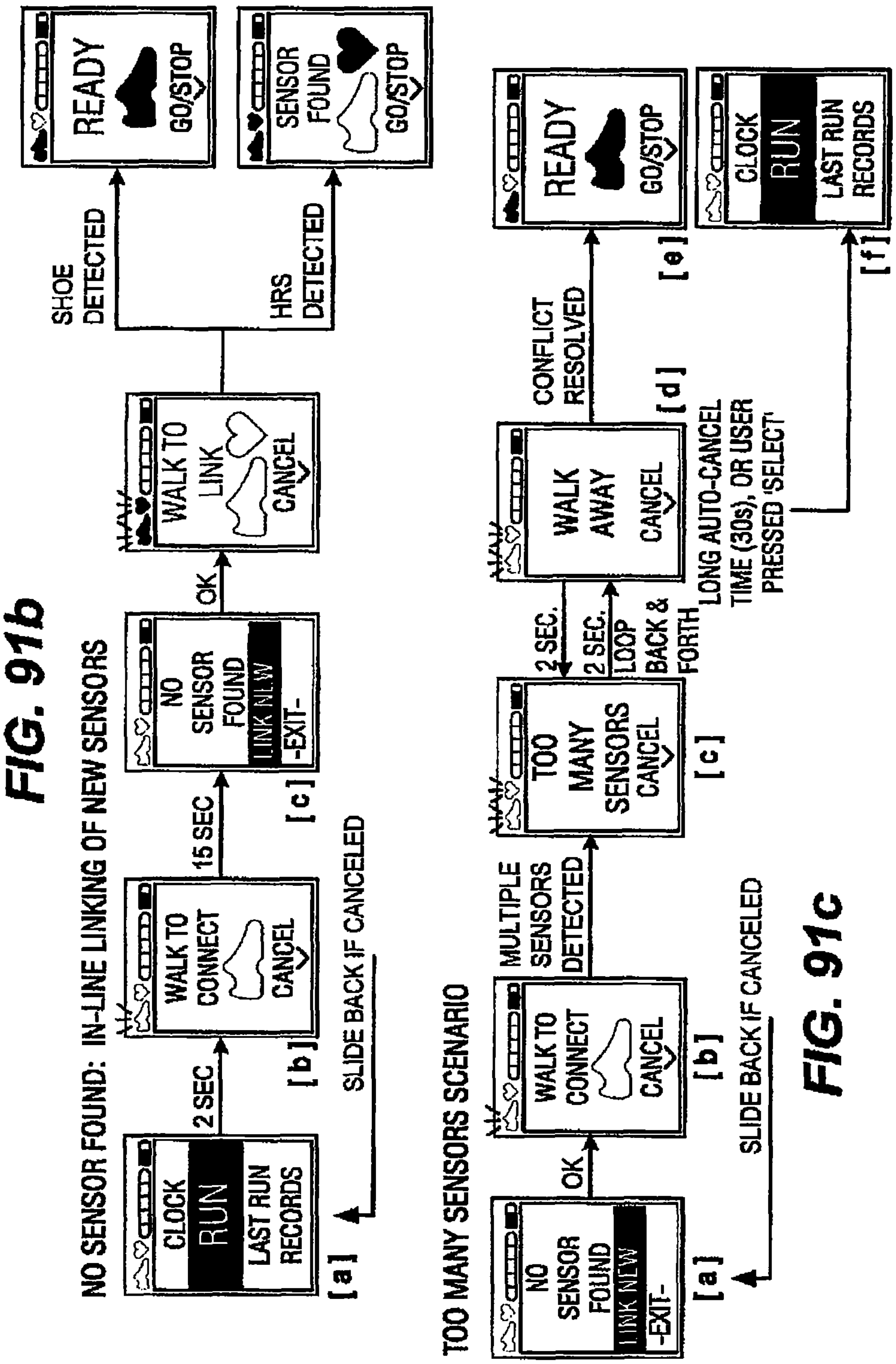

FIGS. 91*b* and 91*c* illustrate additional example interfaces for linking new sensors. For example, FIG. 91*b* illustrates interfaces for linking a new sensor when no sensor is initially connected and FIG. 91*c* illustrates interfaces for linking a new sensor when multiple sensors have been detected.

Figure 93A:
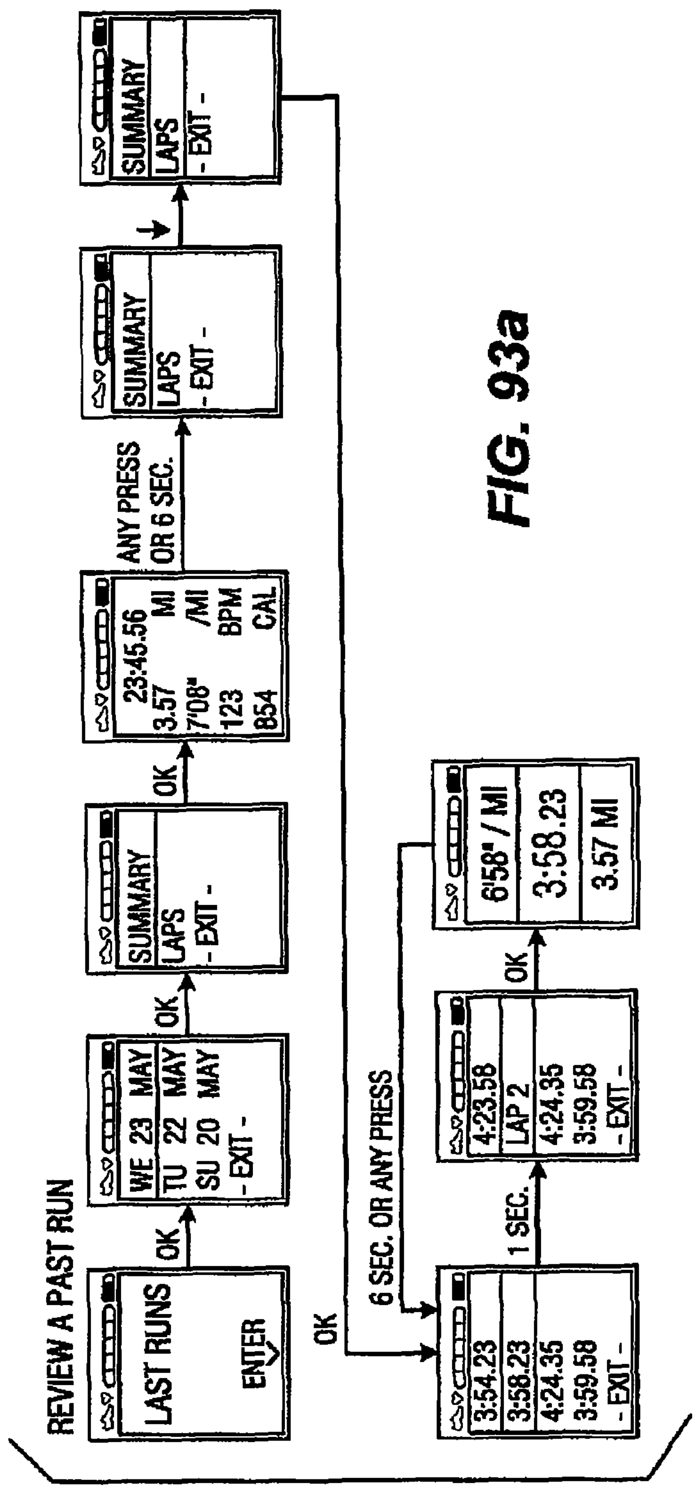
Figure 93B:
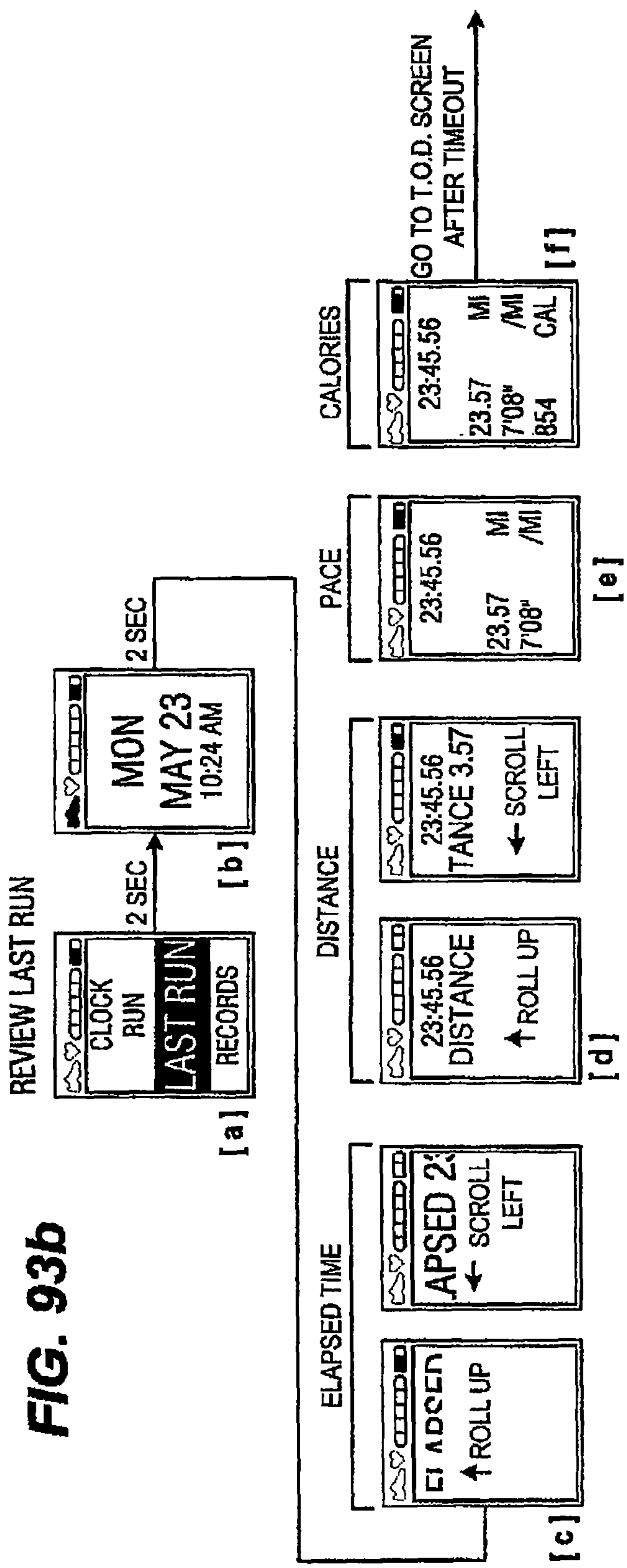

The user interface allows a user to review past athletic performances or runs. As discussed, the user can upload run data recorded by the module 12 to the Remote Site as well as download run data, or other data maintained on the Remote Site. As shown in FIG. 93*a*, in the out-of-workout-mode (OOWO), the user selects the LAST RUNS option using the side button. The user interface then displays the dates of the user's latest runs. The user can then select a particular date of run to review. The user interface then displays a pair of options, allowing the user to select "SUMMARY" or "LAPS." If the user selects "SUMMARY" by pressing the end button, the user interface displays any or all of the following information: total workout time, total distance, pace, average heart-rate, and/or total calories burned. After a predetermined amount of time, the user interface may then return to the previous Summary/Laps/Exit screen. If the user selects the Laps option, the user interface displays the general elapsed times for each lap of the run previously selected. The user can then use the side button to scroll among the lap data and select a particular lap. As shown in FIG. 93*a*, additional information for the selected lap is displayed such as pace, elapsed time for the selected lap, and distance of the lap. FIG. 93*b* illustrates another example series of interfaces through which a user may review information associated with the last run.

Figure 94:
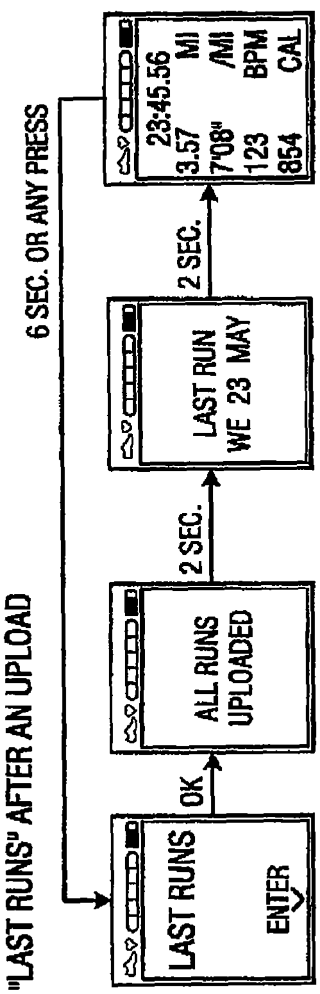
Figure 95:
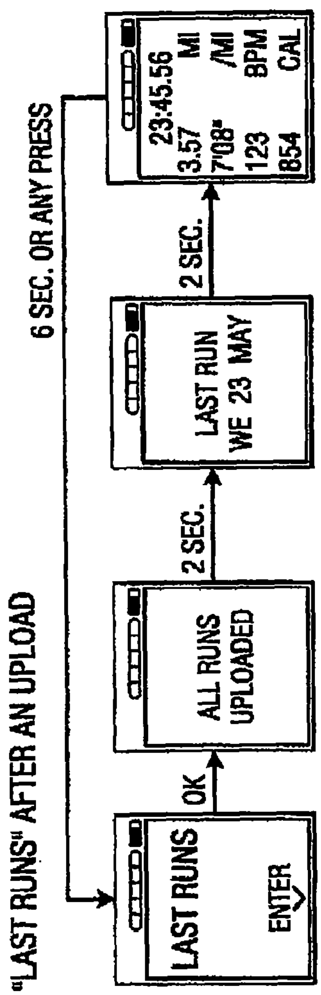

Once a user uploads athletic performance data to a remote location and the user selects the Last Run option, the user interface will display a message, "All Runs Uploaded" as shown in FIGS. 94 and 95. After a predetermined amount of time, the user interface displays the date of the user's last run. After a further predetermined amount of time, the user interface displays the summary data for the last run as described above. Thus, as shown in FIG. 94, the user interface displays the following information relating to the last run: total time, total distance, pace, average heart rate and calories burned.

Figure 9:
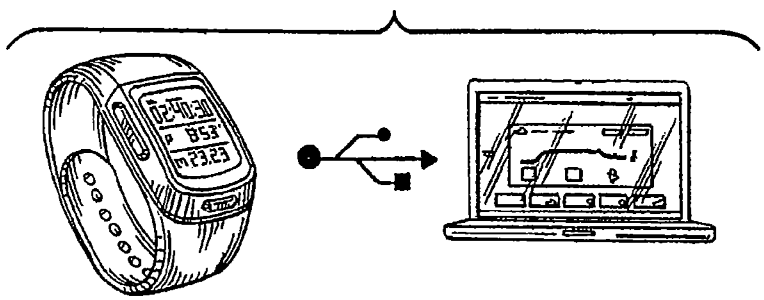
Figure 13:
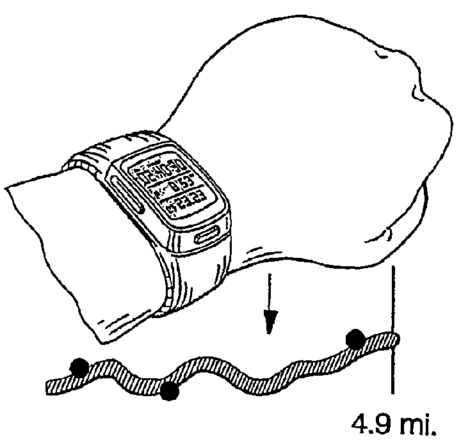
Figure 19:
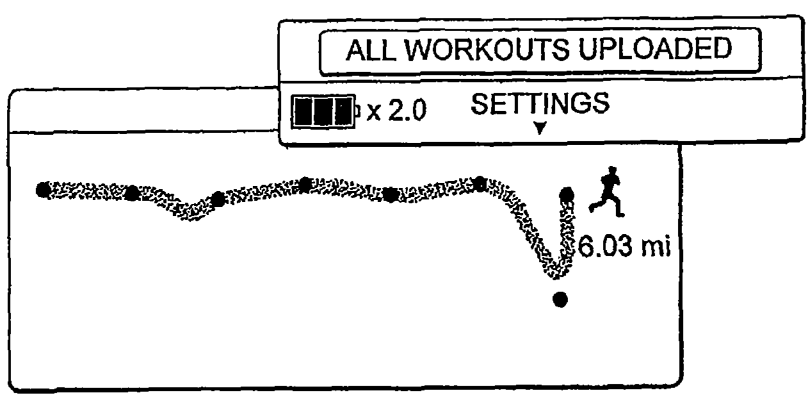
Figure 20:
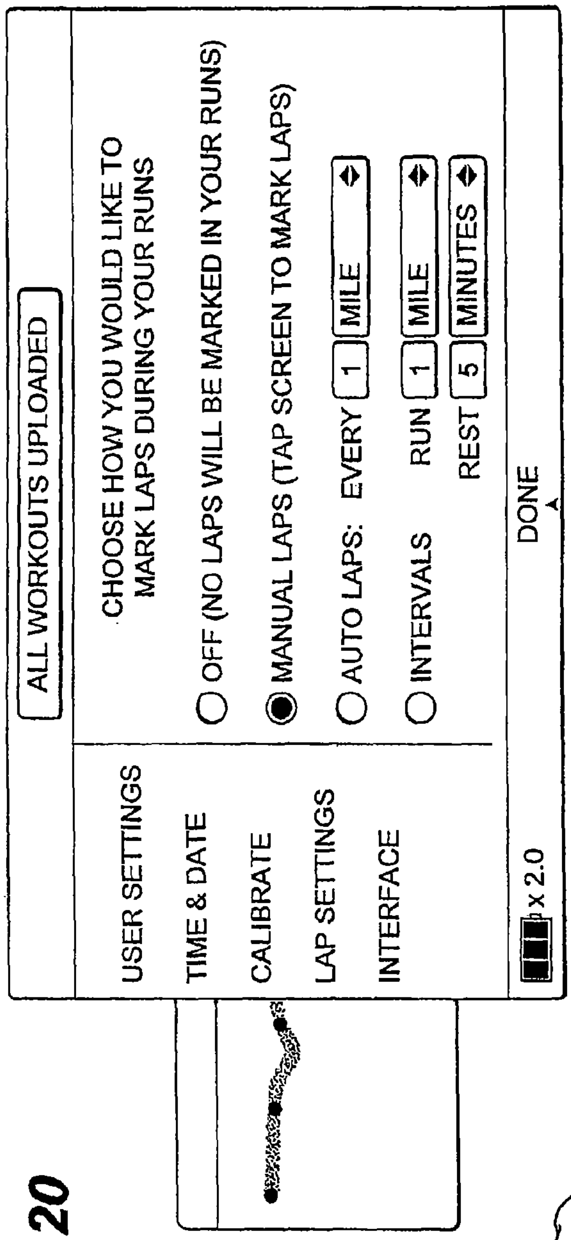

As discussed, the watch 10 also has the Remote Site mode (FIG. 86*a*). As previously discussed, the electronic module 12 is removable from the wristband 14 and plugged into the user's personal computer or other device such as gym equipment. Athletic performance data recorded by the watch 10 during a run can then be uploaded to a Remote Site such as a site dedicated to the storage and display of athletic performance data. FIGS. 16-20 disclose additional features regarding communication with the Remote Site. The Remote Site may display the athletic performance data in certain formats useful to the user. For example, the remote site may display a plurality of run data for the user in a bar graph format. In addition, the remote site may display run data in a line graph format (FIGS. 9, 13 and 19). The Remote Site mode of the watch allows the user to download certain features of the Remote Site onto the watch 10. Thus, the watch 10 is capable of displaying certain amounts of athletic performance data and in a format useful to the user.

Figure 114:
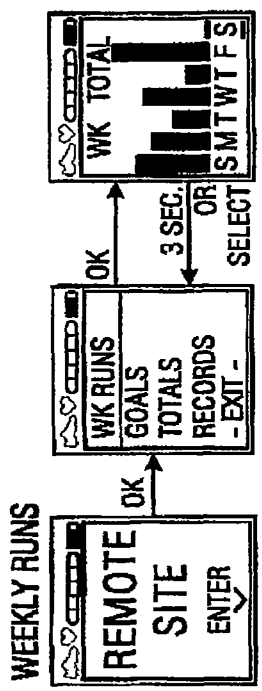

As shown in FIG. 114, the user can scroll through the main menu using the side button and select the Remote Site option using the end button 52. The user interface displays the Remote Site screen and the user can select enter using the end button 52. The Remote Site mode provides a plurality of menu options to the user. As shown in FIG. 114, in an exemplary embodiment, the user interface provides the following menu options: Weekly Runs (abbreviated "WK RUNS" on the display); Goals, Totals, Records and Exit. It is understood that when the electronic module is plugged into the user's personal computer and connected to the remote site via, for example, the desktop utility, user athletic data previously recorded by the electronic module and uploaded to the remote site can be downloaded to the electronic module to be displayed to the user as discussed herein.

The user can select the Weekly Run option. As is shown in FIG. 114, the Weekly Run menu option displays a chart in the form of a bar graph representing the run data for the past week, e.g., seven data entries for Sunday through Saturday. It is understood the display can be customized wherein the seven display can start with a different day. The display could also be modified to display data for a lesser amount of days such as Monday through Friday. As further shown in FIG. 114, the tallest bar represents the longest run for the current week thus far. All other bars have a height relative to the tallest bar. If there is no run data for a day of the week, the corresponding bar will be a single pixel tall, even if that bar represents today. It is understood the data display can be animated building from left to right, wherein the first bar line is displayed, such as Sunday data, followed by Monday data and so on. The data is displayed at a rate allowing the user to read each day of data as its being displayed. As data is displayed for each day, an underscore follows each day. Once the data is displayed for the current day, the underscore remains under the current day of data. The "WK TOTAL" heading then scrolls on the display from left to right. The user can press the side button scrolling up and down to control the animation of the weekly display. Thus, the user can review data corresponding to a week of runs. It is understood that this weekly data is constantly updated as the user uploads data to the remote site as well as download data from the remote site. It is also understood that the weekly display of data can be built as data is recorded and stored on the watch 10 as the user progresses through the week run by run. As explained in greater detail below, the weekly data can also be displayed as part of the Time Of Day display to be described in greater detail below.

Figure 115:
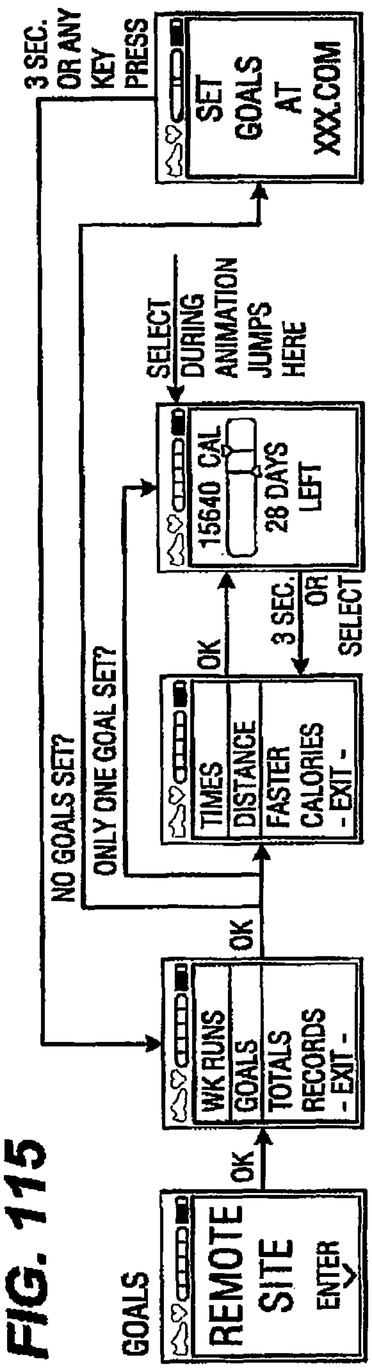

As shown in FIG. 115, the user may select Goals in the menu selections for the Remote Site mode. Once the user selects Goals, the user interface displays a further menu of different Goals including: Times, Distance, Faster, Calories and Exit. The user can set such goals relating to these metrics, for example, at the remote site wherein data related to such goals is downloaded to the electronic module from the remote site when the module is plugged into the user's computer and connected to the remote site. With reference to FIG. 115, the user had previously set a goal on the remote site to burn a certain # of calories in a certain # of days. Data related to this goal is downloaded to the electronic module in previous operations consistent with the previous description. It is understood that this data is updated upon successive uploads and downloads of information regarding the remote site. As shown in FIG. 115, the user selects Calories from the menu selections. In response to this selection, the user interface displays information relating to this goal such as current number of calories burned, a gauge member indicia and the amount of time that remains to reach the goal. Thus, a particular value for the goal selected is displayed at an upper portion of the display, such as "15640 CAL" (calories goal). Following the stated goal, a gauge member is shown in bar graph type format to indicate whether the user is "ahead" or "behind" the goal at this time. The gauge member may be displayed using a horizontal bar with two arrows or calipers, a lower caliper and a top caliper. The lower caliper may also have an upwardly extending line extending into the horizontal bar. The lower caliper indicates the target level of the goal as of the current day. The target level is where the user should be today in order to complete the goal on time. The top caliper (and the filled in portion of the bar) indicate the user's actual level as of today. The user interface also displays an indication as to how much time remains to complete the goal, e.g. "28 DAYS LEFT." The user interface is further configured to display this goal information in animated form which provides suspense to the user and a current sense of accomplishment to further motivate the user to reach the goal. Accordingly, it is understood that in response to selecting the CALORIES selection goal, goal information is displayed to the user in animated form. First, the goal is displayed to the user such as, "Burn # calories in # wks/days." This message scrolls off the display and the calorie data is displayed at the upper portion of the display counting up from 0 to, for example, 15640 calories. Simultaneously, an outline of the gauge member is displayed. The lower caliper and the top caliper move from left to right while the gauge member is darkened from left to right until the lower caliper and top caliper reach their final positions. An additional message is displayed at the lower portion of the display such as, "# Ahead/Behind Target." This message scrolls off of the display and the additional message "28 DAYS LEFT" is displayed. The data shown in FIG. 115 is displayed for a predetermined time such as 3 seconds wherein the display returns to the Remote Site menu. The user can repeat this animation sequence in order to see this additional information again. If no goals have been set by the user and the user selects the GOAL selection in Remote Site menu selection shown in FIG. 54 FIG. 115, the user interface is configured to display a message to the user such as "SET GOALS AT REMOTE SITE.COM". In addition, if the user has only set a single goal, after selecting the GOAL menu selection, the user interface proceeds directly to the animated goal data display thus skipping the additional goal menu shown. Goal information can also be displayed in the Time Of Day screen as described in greater detail below. In one or more examples, goal information may be displayed in the time of day screen when the user is not performing athletic activity.

Figure 116A:
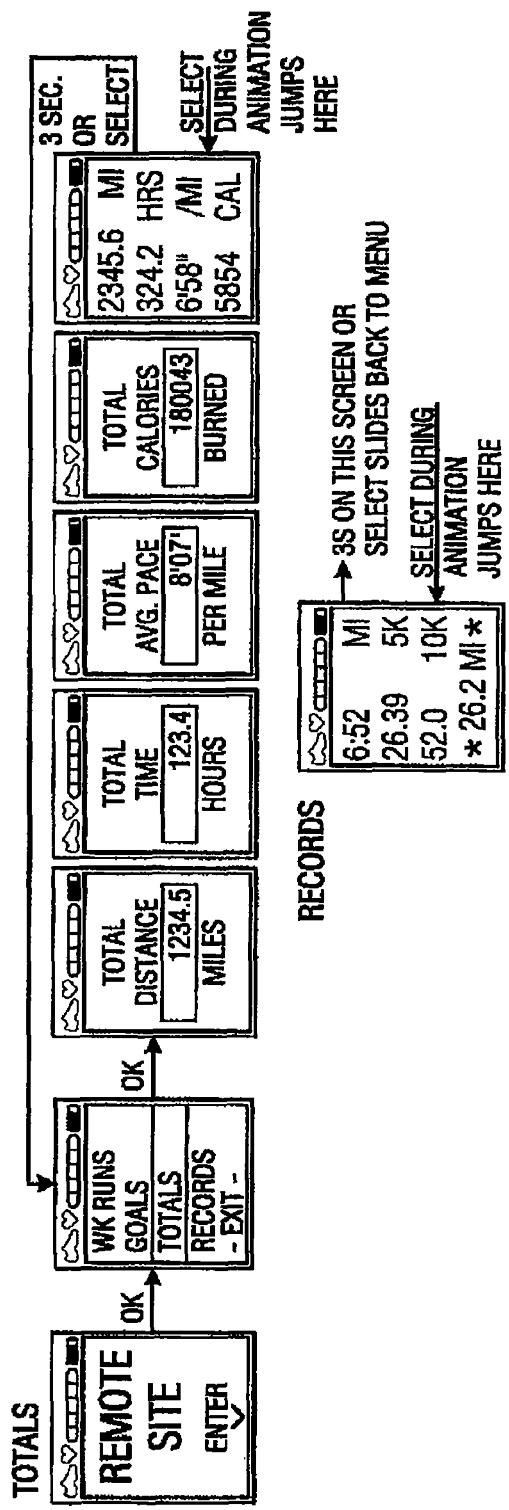

The Remote Site mode further has the TOTALS feature that acts as activity meters or running odometers on the watch 10. As shown in FIG. 116*a*, the TOTALS feature may display various metrics over a user-selected time. In an exemplary embodiment, the metrics may include, but not be limited to, total distance (in miles), e.g. total mileage run ever, total work-out time (in hours), e.g. total hours run, average pace, and total calories burned. The TOTALS data is displayed in response to selecting the TOTALS selection on the REMOTE SITE menu. The TOTALS data is synchronized with existing totals stored at the remote site. Accordingly, updated TOTALS data is downloaded onto the watch 10 when the electronic module is connected to the remote site via a computer. In an exemplary embodiment, the data is displayed in an animated fashion. Thus, the display configuration includes an odometer-type bar at a central location of the display, a metric value at a top portion of the display and a unit value at a bottom portion of the display. Thus, in response to selecting the TOTALS menu selection, and as shown in FIG. 116*a*, the controller displays "TOTAL DISTANCE" and "MILES" scrolling upwards and wherein the odometer member scrolls various numbers to the current total distance value, e.g. 1234.5 miles. This data is displayed for a predetermined amount of time wherein "TOTAL DISTANCE" and "MILES" scroll upwards off the display and wherein, as shown in FIG. 55 FIG. 116*a*, the controller displays "TOTAL TIME" and "HOURS" scrolling upwards and wherein the odometer member scrolls various numbers to the current total time value, e.g. 123.4 hours. This data is displayed for a predetermined amount of time wherein "TOTAL TIME" and "HOURS" scroll upwards off the display and wherein, the controller displays "TOTAL AVG. PACE" and "PER MILE" scrolling upwards and wherein the odometer member scrolls various numbers to the current average pace value, e.g. 8'07" per mile. This data is displayed for a predetermined amount of time wherein "TOTAL AVG. PACE" and "PER MILE" scroll upwards off the display and wherein the controller displays "TOTAL CALORIES" and "BURNED" scrolling upwards and wherein the odometer member scrolls various numbers to the current number of calories burned, e.g. 180043. This data is displayed for a predetermined amount of time wherein the controller then displays a summary screen of the total distance, total time, total average pace and total calories burned. The summary screen is displayed for a predetermined amount of time wherein the controller then displays the Remote Site menu selections and then proceeds to the Time Of Day screen. The display of the data in the described animated form provides a build-up of suspense for the user enhancing the user experience. It is understood that the controller is configured such that pressing the end button during the animation sequence halts the animation and displays the summary screen of data. Pressing the side button allows the user to proceed directly to the individual screens shown in FIG. 116*a*. The user may also configure the controller to display a selected metric continuously on the display following the animation of this additional information.

Figure 116B:
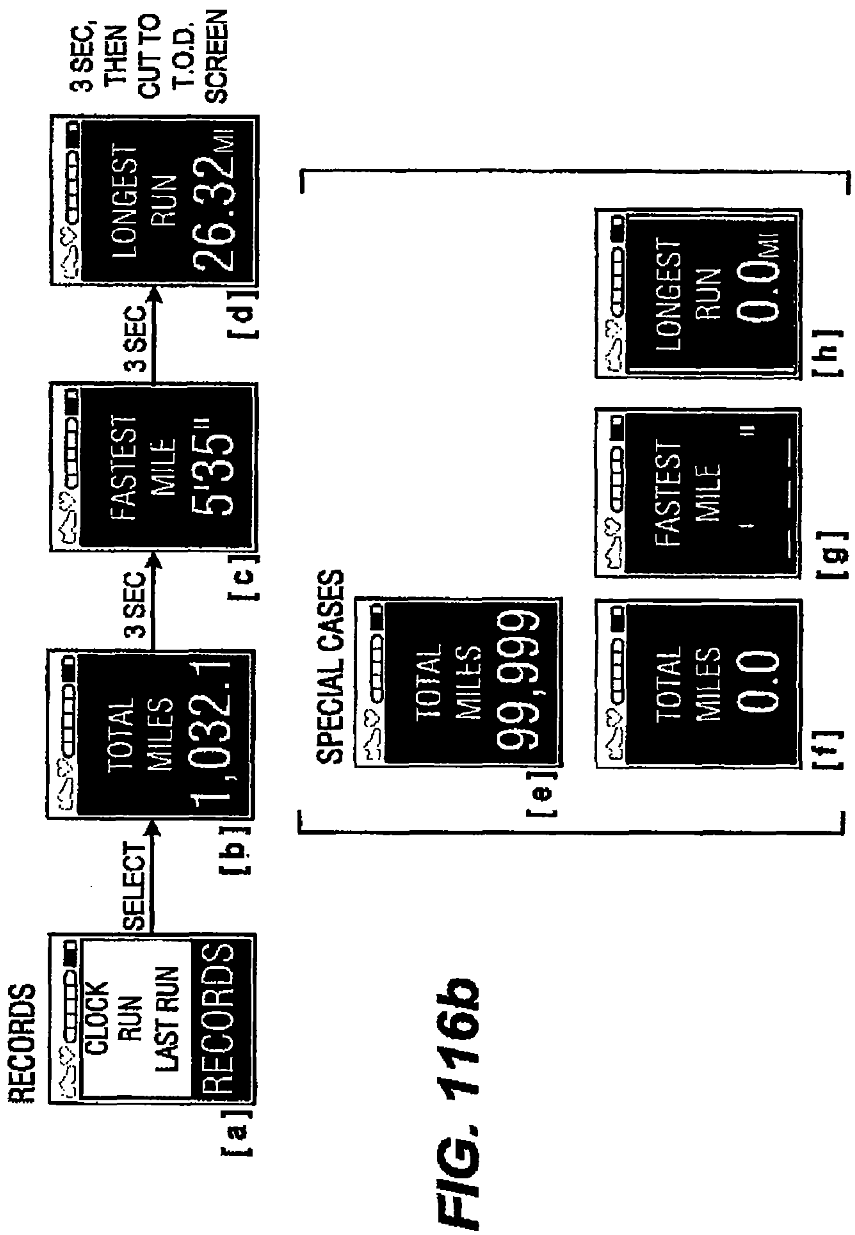

The Remote Site mode further has the RECORDS feature wherein the controller displays certain metrics corresponding to personal records of the user. This data is displayed in similar fashion s the Totals data referred to in FIG. 116*a*. In an exemplary embodiment, the RECORDS data displayed may include, but not be limited to, the user's: Fastest Mile, Fastest 5 k, Fastest 10 k and Longest Run. The RECORDS data is similar to the post workout alarms and motivational messages displayed to the user after a run is ended. The RECORDS data is displayed in response to selecting the RECORDS selection on the REMOTE SITE menu. The RECORDS data is synchronized with existing data stored at the remote site. Accordingly, updated RECORDS data is downloaded onto the watch 10 when the electronic module is connected to the remote site via a computer. In an exemplary embodiment, the data is displayed in an animated fashion similar to the animation described above regarding the TOTALS feature. Thus, the controller may display a "FASTEST MILE" heading along with a value, e.g. 6:52, for a predetermined amount of time. The controller then scrolls this data from the display and displays a "FASTEST 5K" heading along with a value and so forth for each record metric. At the conclusion of the RECORDS data, a RECORDS summary screen is displayed as shown in FIG. 116*a*, listing each record data for the user's fastest mile, fastest 5 k, fastest 10 k and longest run. This animation also provides a building suspense for the user. FIG. 116*b* illustrates other example interfaces through which a user may view current workout records set. In one or more arrangements, if no longest distance, fastest mile or longest run record has been defined, the interface may display 0.0 for the longest distance or longest run. Additionally, the fastest mile may be displayed with no pace information.

Figure 117:
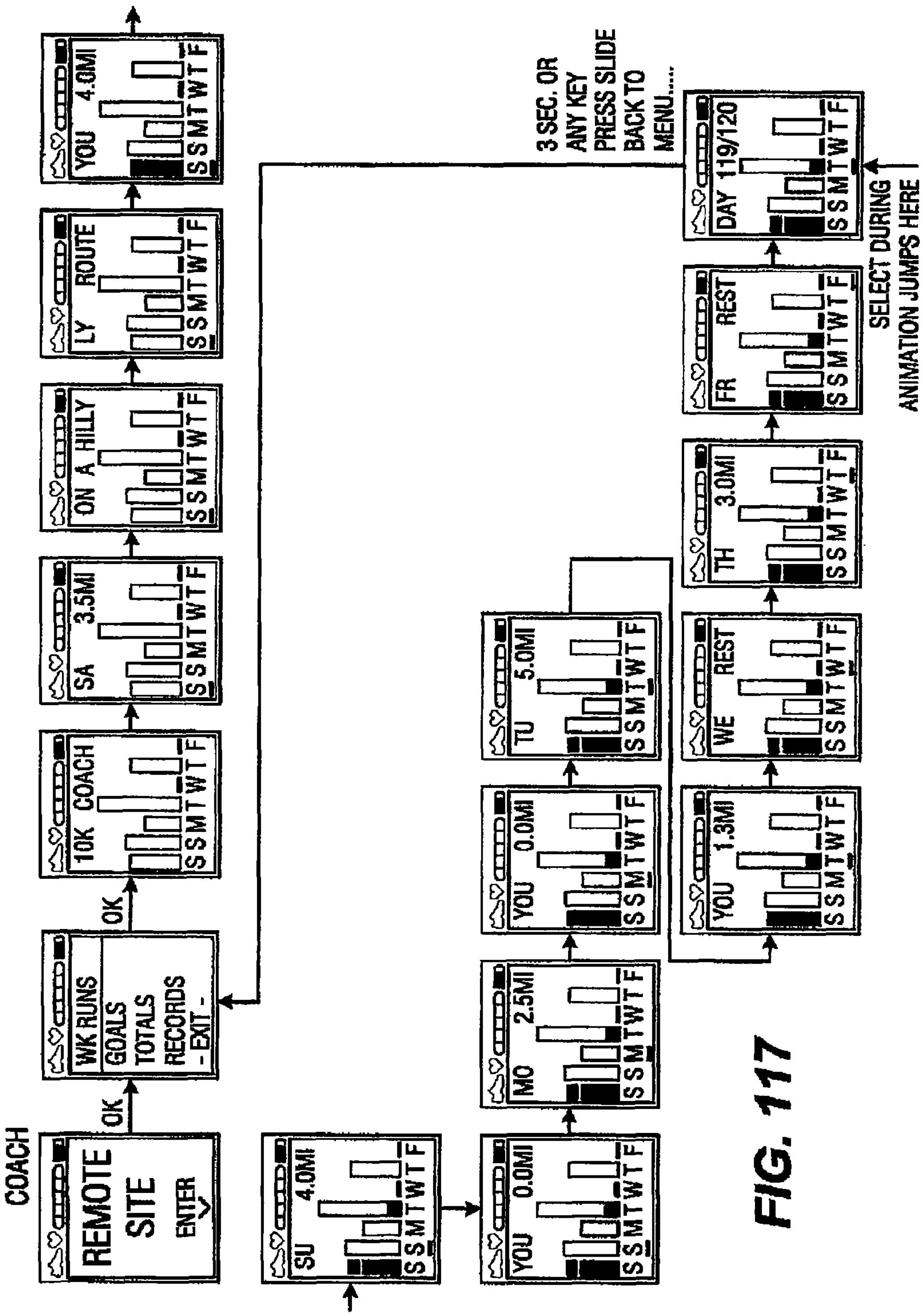

As previously discussed, the watch 10 is capable of communicating with the Remote Site dedicated to athletic performance monitoring. The Remote Site may include a training aid that provides training programs for users to assist users in achieving certain goals. For example, as shown in FIG. 117, a user may seek assistance in training for a 10 k race. The Remote Site receives certain data inputted from the user wherein the training aid then provides a set training program recommendations for how far the user should run each day and which days the user should rest etc. The training program typically has a certain duration, e.g., a certain number of days.

If the user sets a training program on the Remote Site, the program parameters are downloaded to the watch 10 consistent with the description above. The user can access the training program on the watch via the Remote Site menu and under "WK RUNS." As further shown in FIG. 117, the controller is configured to display the training program parameters for the current week. In an exemplary embodiment, the parameters are displayed in animated fashion similar to the descriptions above regarding the weekly runs description but with some differences. The training program data is represented by bar members wherein empty bars represent runs to be completed and solid bars represent runs already completed. The tallest bar represents the user's longest run for the current week thus far or the user's longest target run, whichever is greater. All other bars have a height relative to the tallest bar. If there is no run data for a day of the week, the corresponding bar will be a single pixel tall, even if that bar represents the current day. In addition, the weekly display is arranged to that the current day is always in the center position. Thus, the weekly display shows the training schedule for three days prior to the current day and three days following the current day.

In response to the user selecting "WK RUNS" on the remote site menu, the animated display of data commences. As shown in FIG. 117, the first screen shows the entire training week with empty bars instantaneously (no animation) along with the title, e.g. "10K COACH." As shown in FIG. 117, the animation builds from left to right providing data for each day of the week. FIG. 117 shows the animation for the first day, e.g., Saturday wherein a solid cursor is positioned under the Saturday heading. The day and target mileage first scrolls up and onto the display while flashing (on/off) the empty target bar. Certain training days may have notes from the training program wherein the note is scrolled at a readable pace across the screen. For example, FIG. 117 shows that the Saturday 3.5 mile run was to be completed "ON A HILLY ROUTE." The heading "YOU" is then displayed along with the user's actual run mileage for that day, e.g. 4.0 miles. The run bar is then darkened. FIG. 117 shows the remaining days for the training program. The data for the next day is displayed wherein the cursor moves to the Sunday heading wherein the user was to run 4.0 miles on Sunday. The "YOU" heading is displayed along with 0.0 miles indicating the user did not run on Sunday. The target bar remains empty. The Monday run data is then displayed wherein the user was to run 2.5 miles. The user did not run on Monday and the target bar remains empty. The run data for the current day, e.g., Tuesday is then displayed wherein the user was to run 5.0 miles. The data recorded indicates that the user ran 1.3 miles and the target bar is partially darkened in proportionate fashion. The target bars for the future days will remain empty by definition and will not require the "YOU" headings. As shown in FIG. 117, the training program indicates that the user is to rest on Wednesday, run 3.0 miles on Thursday and rest on Friday. The final training program data is then displayed as shown in FIG. 117 with the darkened/empty target bars along with an indication that the current day represents Day 119 of the 120 day training program. Pressing the end button during the animation takes the user to the final screen shown in FIG. 117. The user can also control the animation using the side button wherein the user can interactively move the blinking cursor to any desired day. The run/target bars do not animate in that case but the title text rolls up and down for a predetermined time showing target mileage and actual mileage as appropriate.

Figure 117A:
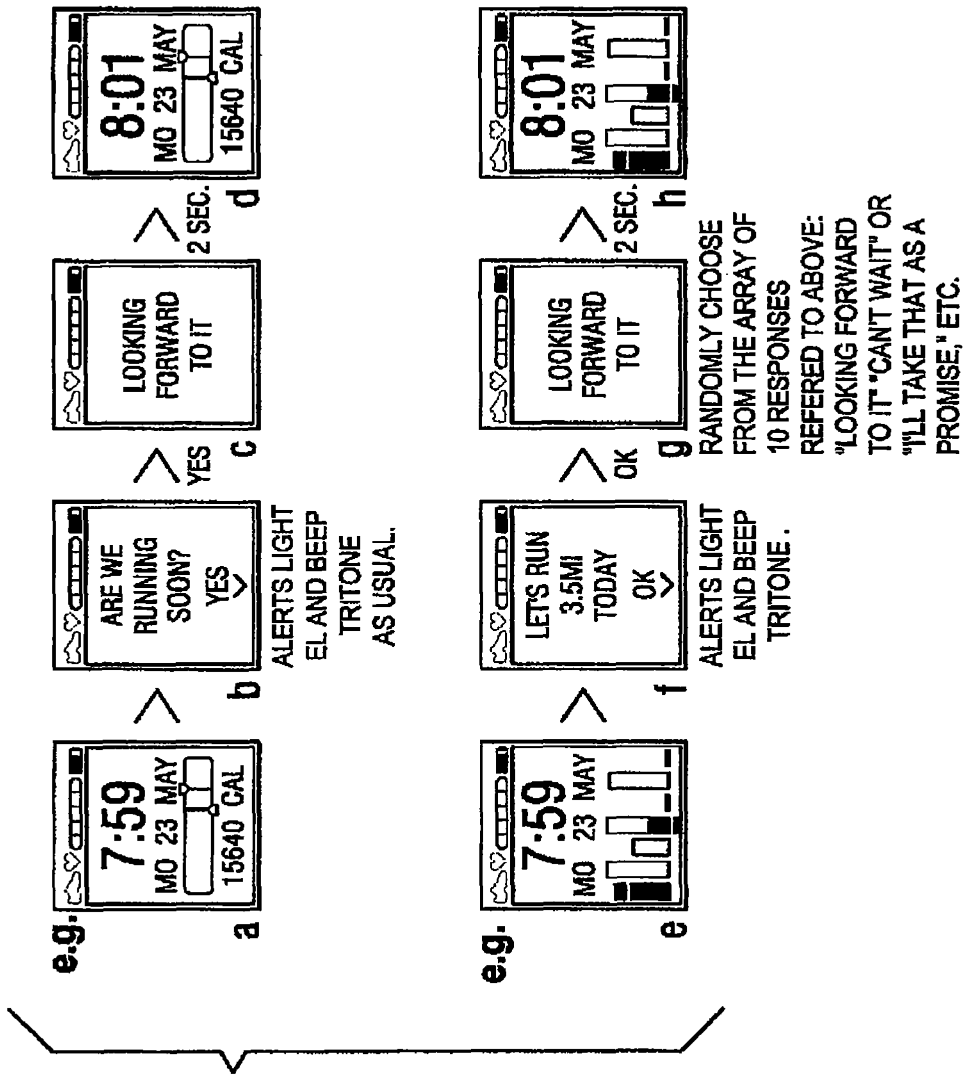
Figure 118:
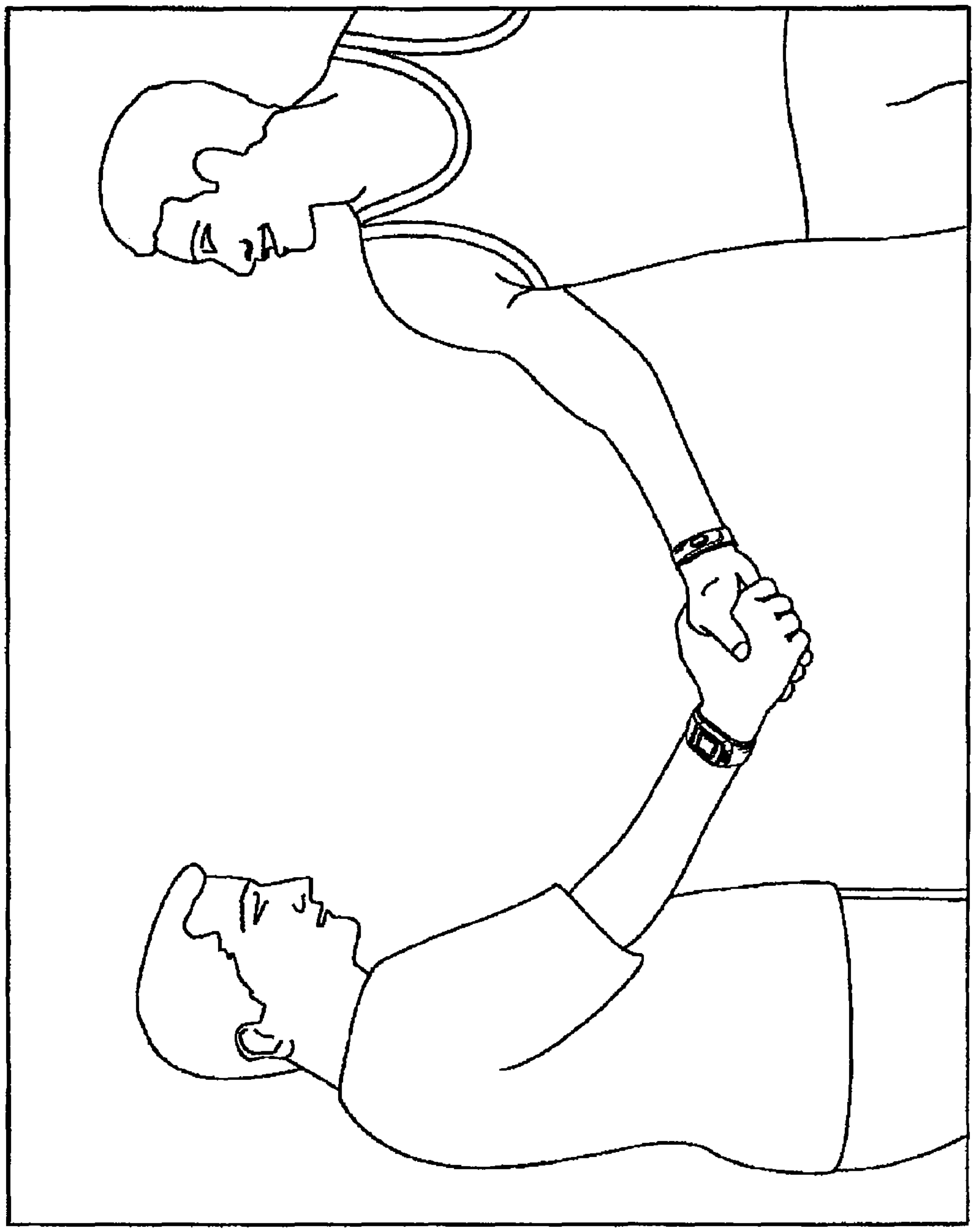
FIGS. 118-125 show additional features associated with the user interface of the watch of the present invention.

FIG. 117*a* disclose additional features of the user interface. These features may be incorporated specifically when the user has implemented a training schedule via the Remote Site as describe above, but can also be utilized with the user in general operation. In one or more arrangements, the training schedule may be defined based on or correspond to a defined goal. For example, if a user sets a goal to run 10 miles a week, a training schedule may include sub-goals of running 2 miles a day for 5 days of a single week. One feature may be in the form of two part messaging utilizing an input from the user. For example, the user interface (or "the coach") each day at some arbitrary time, may check the watch data to determine how many days have passed since the user last ran or exercised. If after a certain number of days set by the user interface there has been no activity by the user, the user interface may provide a message to the user. The days set might be three days although a different number can be set. In another example, the user interface or device (e.g., watch 10) may determine whether the user has completed a daily goal or is on track to complete an overall goal. Thus, if the user has only run 4 miles and there are only 3 days left until a week from the first run expires, the user interface or coach may provide a message to the user encouraging or reminding the user of his sub-goals and the remaining time allotted for completing the overall goal. Alternatively or additionally, a reminder or encouraging message may be displayed upon determining that the user is not on track to complete the goal (e.g., if the user is only average 1 miles a day over the last 4 days and the user's overall goal is to run 10 miles in a week).

As shown FIG. 117*a*, the watch may have a Time Of Day display. If the user interface detects that the user has not run in three days, a pop up message may be displayed, "Are we running soon?" Also displayed is a desired answer such as "Yes". When the user selects "Yes" using the end button 52, a response message is displayed to the user such as "Looking Forward To It." After a predetermined amount of time, the display returns to the Time Of Day display set by the user. If the user does not answer the first message after a certain amount of time, such as midnight of that day, the message is dismissed. Other two-part messages can also be displayed such as "I feel like running today." If acknowledged by the user by selecting a "Yes," the user interface can display a "Can't Wait" message. Other messages can also be displayed. These messages can be set at the Remote Site and further be changed/modified over time to regularly provide new messages. Such messages provide additional motivation to the user to exercise and offer the impression that the activity monitoring device is responding directly and personally to the user's answer. These messages may also provide the impression that the device is able to offer more humanistic responses rather than simply electronic, machine feedback. The frequency of the messages can also be set via the Remote Site or user interface etc. A set of messages can be provided for each month wherein a different message is provided at certain times during the month. Messages can be altered for the next month. FIG. 117*a* further shows a two-part message that can be used specifically when the user has a training program implemented. The Time Of Day screen may be displayed with the Coach information displayed as described herein. The user interface may provide messages that correspond to the user's training program. For example, the user interface may display a message "Let's Run 3.5 MI (miles) today." When the user acknowledges the "Yes" option, the user interface responds with the second part of the message, "Looking Forward To It." After a predetermined amount of time, the user interface returns to the Time Of Day screen. If the training program has a rest day, no pop-up messages are displayed. If there is a note attached to a certain day of the training program, the note can be incorporated into the two-part message. Again, the messages can be modified or changed at the Remote Site. Such messaging provides additional motivation to the user and a sense of the watch operating in real-time with the Remote Site. FIG. 113 illustrates other example coaching pop up interfaces for prompting the user to perform another workout.

As previously discussed, the watch 10 has a Time of Day (T.O.D.) screen that can be set by the user utilizing the desktop utility software. In one exemplary embodiment as shown in FIG. 107*a*, the Time Of Day screen is configured to show the time of day more prominently proximate a top portion of the display as well as the date and day of the week proximate a bottom portion of the display. The user can also set the Time Of Day screen in different "dashboard" configurations to show variations of athletic performance data such as weekly runs, goals, totals, records and coaching information. These various Time Of Day screens can be set using the desktop utility software as desired by the user.

Figure 108A:
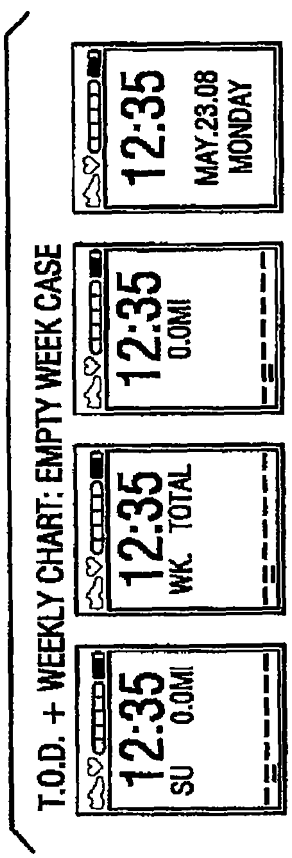
Figure 108B:
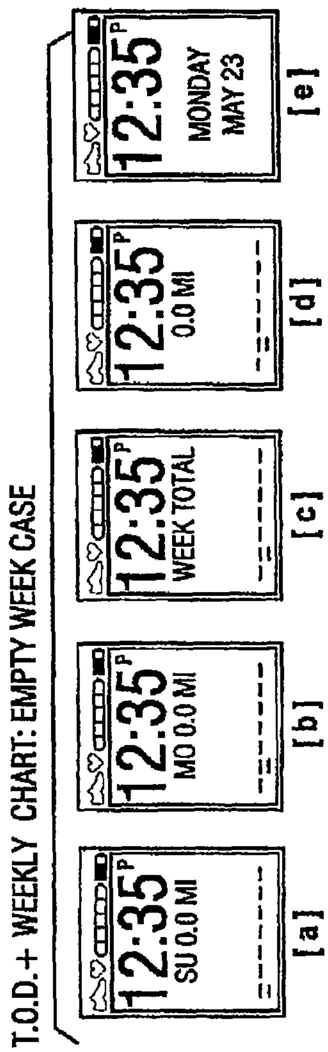

As shown in FIGS. 108*a* and 108*b*, the Time Of Day Screen can be set to show the current time of day at a top portion of the display as well as the date and day of the week at a central portion of the display. Finally, indicia representing the user's weekly run data can be displayed at a bottom portion of the display. In an exemplary embodiment, the indicia is in the form of vertical bars. The tallest bar represents your longest run for the current week thus far. All other bars have a height relative to the tallest bar. If there is no run data for a day of the week, the corresponding bar will be single pixel tall, even if that bar represents the current day.

The Time Of Day screen utilizing weekly runs can also utilize animation as described above. In this configuration, the user can press the end button to commence the animation which builds from left to right in an exemplary embodiment. The animation starts with the user's preferred week-start-date (e.g., Sunday or Monday as set at the Remote Site). Thus, as the first bar extends upwards at the left of the display, the day is displayed, e.g., "MO" for Monday, with the mileage value adjacent thereto. This data is displayed for predetermined time allowing the user to readily read the data. A cursor is positioned below the first bar. Once displayed for the suitable time, the cursor moves to the right wherein the next bar extends upwards, and the day is displayed, e.g. "TU" for Tuesday, with the mileage value adjacent thereto for that day. This sequence continues for each day of the week. At the conclusion of the seven days, a weekly total ("WK TOTAL") heading scrolls from right to left at the central portion of the display followed by the total mileage value for the week of runs. This heading and weekly total value scrolls off the display and the day and date is again displayed. The bars remain on the display wherein the Time Of Day with weekly runs display is shown on the watch 10 as shown in FIGS. 107*a* and 107*b*. Additionally or alternatively, a run information display line (e.g., located below the time of day) may display the day total, a week total, a date and the like as shown in FIG. 107*b*. For example, the interface may automatically scroll through the various information. Alternatively, the user may toggle the workout information line to select the desired information. If the user fails to record a run for an entire week, the Time Of Day screen with weekly runs is slightly altered (FIGS. 108*a* and 108*b*). The animation as described above still occurs wherein the cursor moves along the display from left to right wherein a single bar is shown for each day while each day mileage total is shown as "0" including the weekly total. Rather than continuing to show a blank space for the seven single bars, the month, day, year and day are displayed as shown in FIGS. 108*a* and 108*b*.

Figure 109:
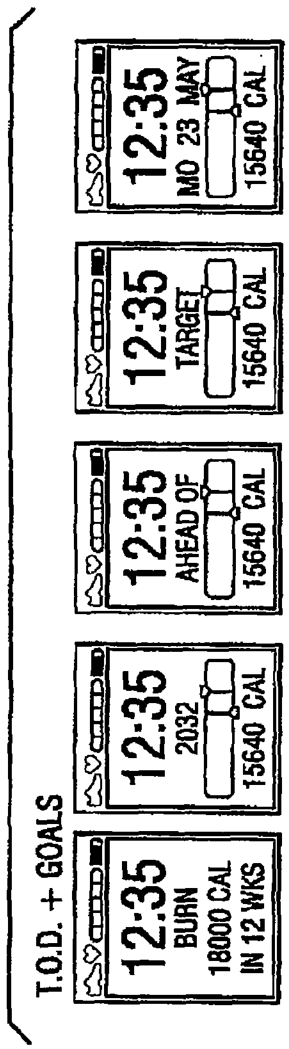

FIG. 109 discloses a dashboard configuration having a Time Of Day screen with Goals information. As discussed above, the user can set goals using the Remote Site wherein the goals data can be shown in animated form on the Time Of Day screen. When Goals is the selected dashboard view utilizing the desktop utility, goals are displayed on the display in animated form as shown in FIG. 109. For example, a goal is displayed to burn 18000 calories in twelve weeks. The gauge member is shown and darkened along with the moving calipers as described above. "Ahead/Behind" text also is scrolled across the display, e.g., "2032 Ahead Of Target. Once the goal information is displayed, the day, date and month is displayed beneath the time of day. The user may set multiple goals at the Remote Site. In this dashboard configuration, all user goals are displayed in sequence. The goals that are expiring soonest are shown last (e.g., order is from least urgent to most urgent so that the most urgent goal remains showing at the end of the animation). Each goal animation ends with the current date rolling down into place, and displayed for predetermined amount of time such as 3 seconds before the next goal sequence is started. As with other dashboard views, pressing the end button, jumps to the end of the current animation sequence. In the case of multiple goals, e.g. three active goals, pressing the end button would jump to the next goal animation, if a goal animation was already in animated sequence. If the sequence is in the last goal, the display proceeds to the last screen as shown in FIG. 109. Specifically, the animation jumps to the moment just before the day, date and month rolls down. If the user presses the end button after all animation sequences are complete, the full goal animations are restarted (e.g., just as if the user left the Time Of Day screen and returned to the screen).

In one exemplary embodiment, the user can set four different goals on the Remote Site. The user can set one goal per type as described above. For example, the user can set one calorie burn goal, one run more often goal, one run faster goal and one run further goal. Each goal has an expiration date. If no goals are set, or all goals are expired, a default Time Of Day screen can be shown. The Time Of Day plus Goals dashboard display is still maintained as the user's preference in case the user subsequently sets new goals at the Remote Site.

Figure 110:
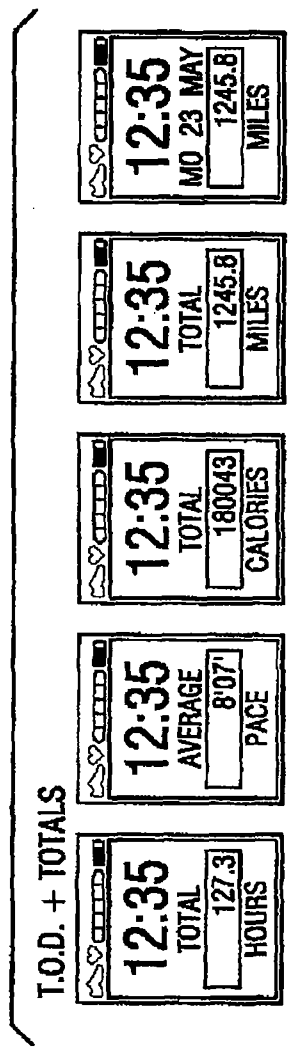

FIG. 110 disclose a dashboard configuration having a Time Of Day screen with Totals information. As discussed above, the user can show Totals information at the Remote Site menu. As shown in FIG. 110, the odometer member is displayed wherein numbers scroll therein until total values are shown for total hours, average pace, total calories, total miles. The last Total metric displayed remains displayed in the Time Of Day screen as shown in FIG. 110. Thus, the Totals metrics animate by rolling like odometers in the odometer member, one after each other. This animation is similar to the animation as described above regarding the Remote Site menu. In this dashboard configuration, however, the distance metric is the last metric to be displayed so that the distance metric is the metric that remains visible. Pressing the end button during the animation jumps the animation to the last screen showing the time of day, date and total distance metric. If the animation was complete, the animation is replayed.

Figure 111:
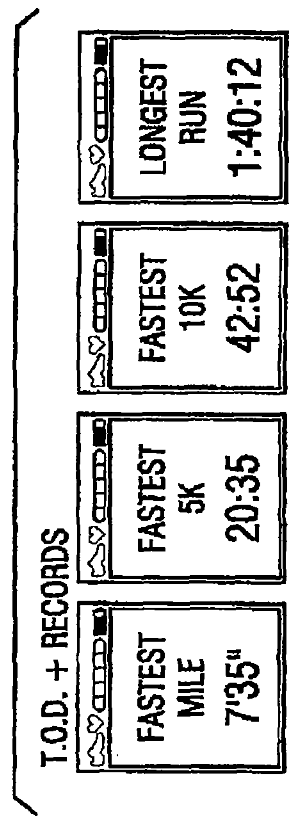

It is further understood that user can select a dashboard configuration having a Time Of Day screen with Records information as shown in FIG. 111. This data is displayed in animated form similar to the Totals information described above, except showing the user's personal records as the metrics. The following four records are saved from the user's best runs and displayed: Fastest Mile, Fastest 5 k, Fastest 10 k and Longest Run. To leave the final screen in a good final state, the heading "LONGEST" will scroll further down below the odometer member (replacing "RUN") simultaneously as the date rolls down into the display.

FIG. 112 disclose a dashboard configuration having a Time Of Day screen with a variant of weekly runs triggered by the user having an active training program set on the Remote Site as described above. Generally, this display is the same as the training program view, or "COACH" mode as described above, but smaller and without Days of Week labels. Accordingly, additional specific description of the data display and animation will not be repeated as the prior description applies to this particular Time Of Day dashboard configuration. As shown in FIG. 112, the Time Of Day with coaching/training information includes the current time, day, date, month as well as the weekly run data utilizing run/target run bars. Once a user commences animation, the "10K COACH" scrolls up on the display with the run bars. As shown in FIG. 112, the training program indicated the user was to run 4.0 miles on Friday wherein the user ran 5.3 miles. The entire run bar is darkened and an additional bar segment is placed over the Friday run bar. The user did not run on Saturday and Sunday, but ran a certain distance on the current day, Monday. The data further indicates that the user is to rest on Tuesday (single pixel run bar), run 4.2 miles on Wednesday, and rest on Thursday (single pixel run bar). An additional screen is displayed showing the complete run bars and indicating that the user is at Day 78 of the 90 day training program. Once displayed for a predetermined amount of time, the Time Of Day screen shows the current time, day, day, month and the run/target run bars.

As appreciated from FIG. 86*a*, the controller and user interface are configured such that additional or extendable features can be added to the watch as such features become available. Thus, the menu selections on the watch 10 can be expanded to provide additional headings and functionality for the new features. For example, additional features can be provided to the Remote Site or the desktop utility. Once the electronic module 12 is connected to the user's computer or to the Remote Site via the user's computer, the additional features can be downloaded to the electronic module 12.

Additional features can also be provided with the user interface of the watch 10. Such features could be considered extendable features added to the watch 10 over a period of time.

Figure 104A:
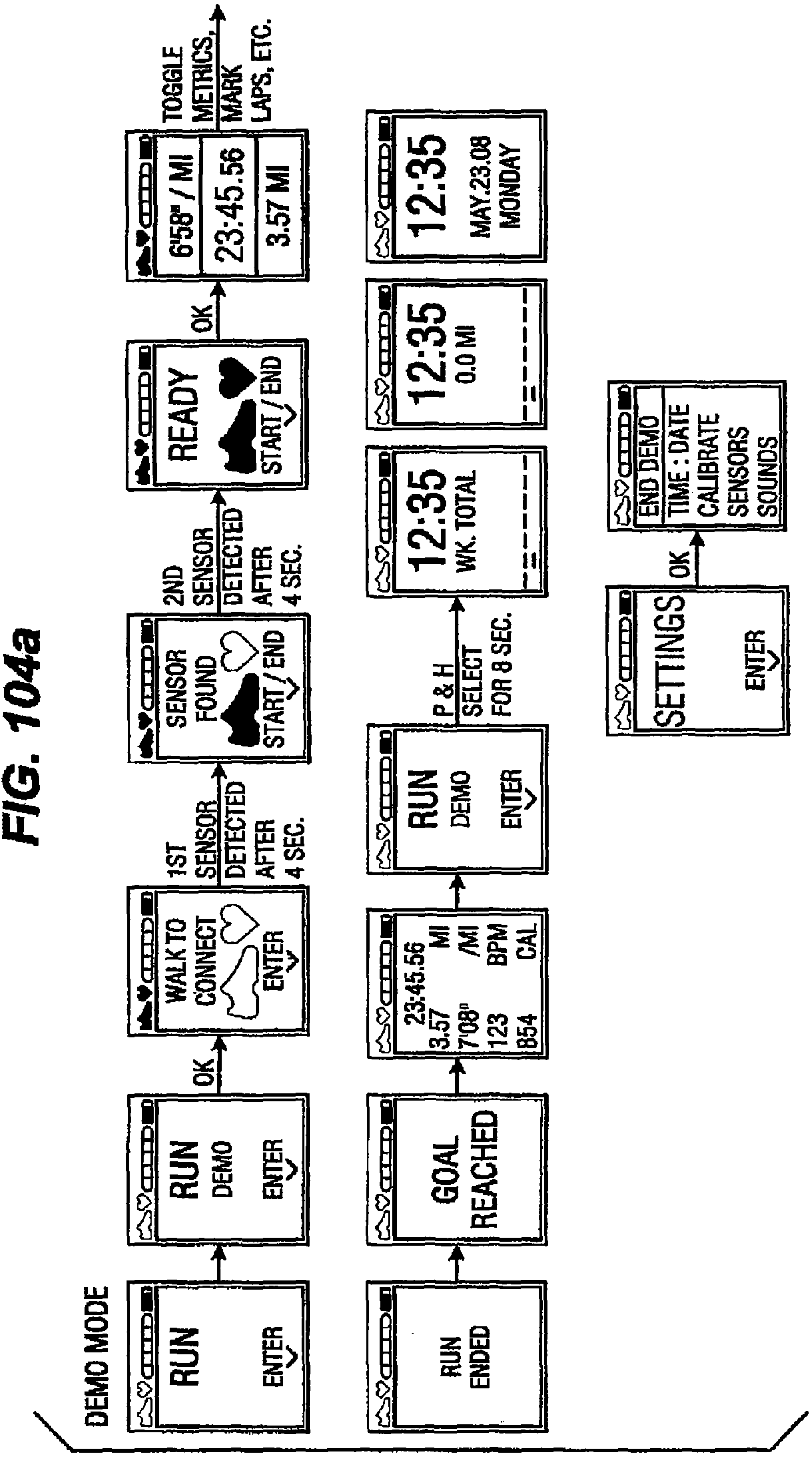
Figure 104B:
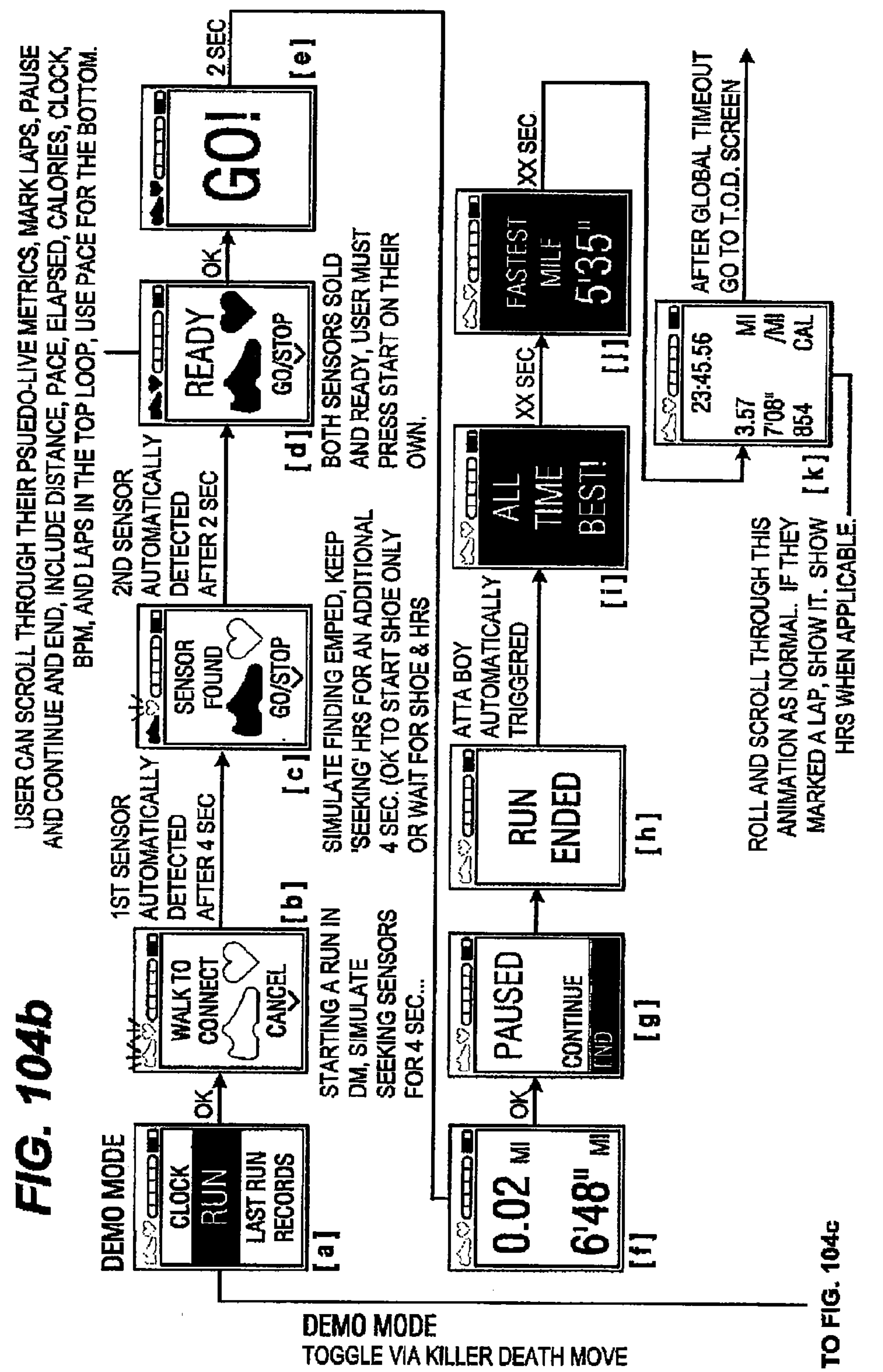
Figure 104C:
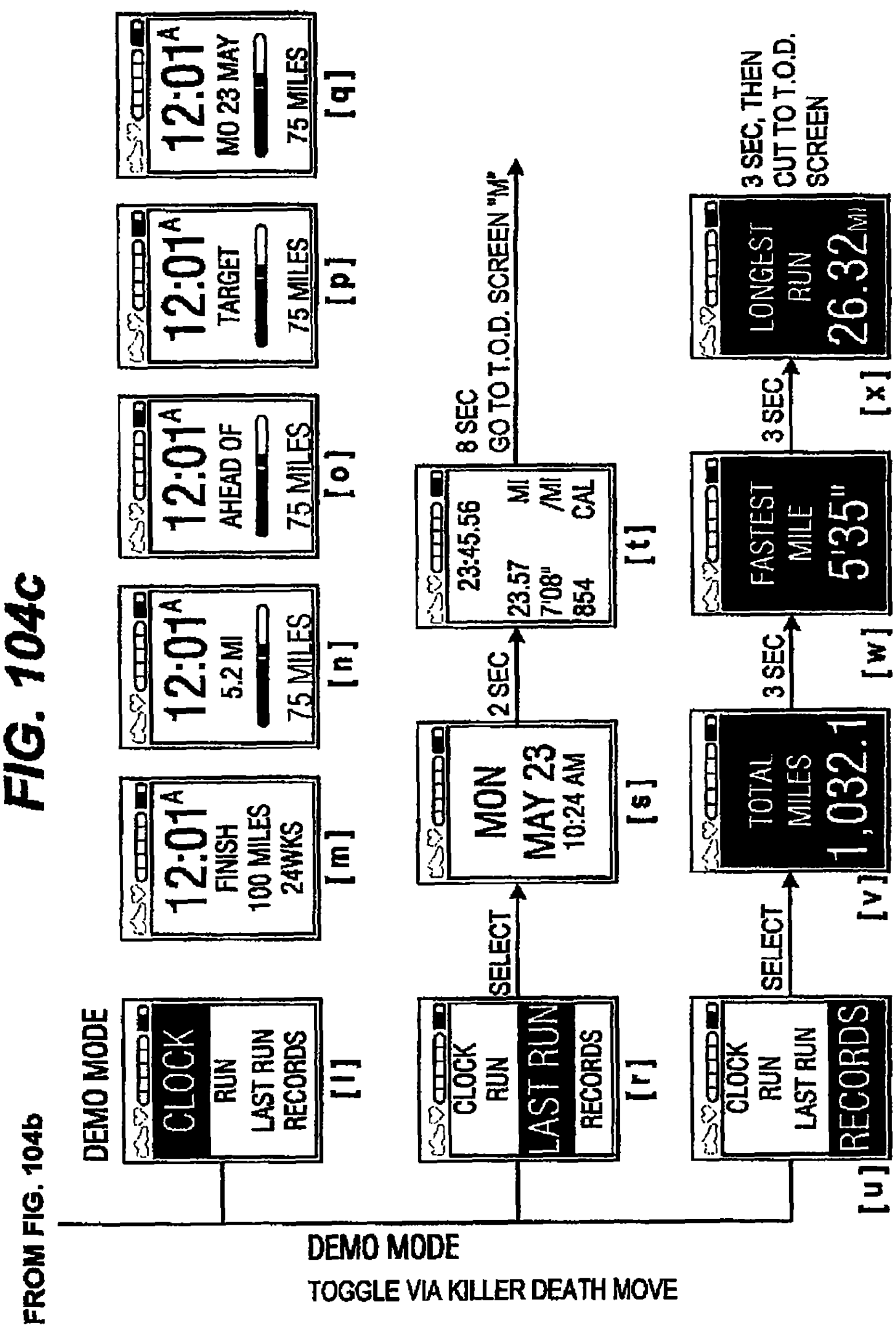

FIGS. 104*a*-104*c* disclose a "demo mode" for the watch 10. This mode can be utilized to show the full experience of the watch 10 for prospective purchasers without the need to link to actual shoe-mounted sensors, heart rate monitors, or other sensors. In an exemplary embodiment, the user presses and holds the end button for an extended predetermined amount of time while on the RUN screen as shown. While in the demo mode, the heading "DEMO" shows on the Run screen and an item is added to the top of the Settings menu to allow a visible way to turn "DEMO OFF." Additionally, pressing and holding the end button for a predetermined time while on the RUN screen toggles the demo mode off wherein the Time Of Day data with any dashboard configuration is animated on the display. In the demo mode, the user can toggle through different menu items wherein the watch 10 will display fake data showing the user the operability of the watch 10. FIGS. 104*b* and 104*c* illustrate demonstration interfaces for a run including congratulatory messages, ca Time of Day mode, a last run interface and a records mode.

Figure 105:
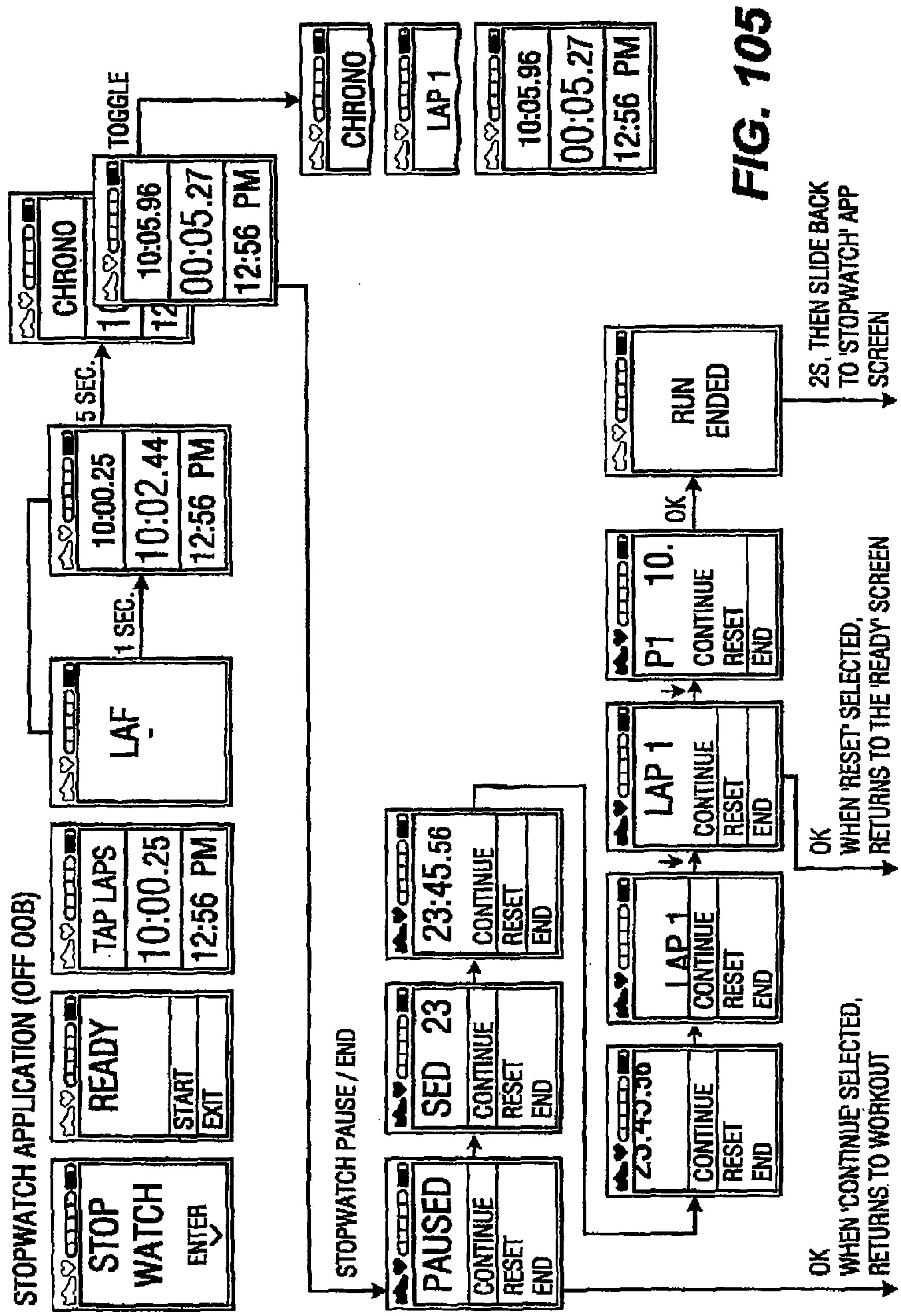

FIG. 105 shows that the user interface can incorporate a stopwatch mode. Using the various inputs on the watch 10, the watch 10 can function as a stopwatch. Laps can be marked and the stopwatch paused as desired.

The user interface of the watch 10 provides significant functionality to the user thus at times requiring several menu items. In certain circumstances, the number of menu items can be greater than the capacity of the display wherein a user is required the use the side button to scroll the plurality of menu items along the screen. The controller can be configured to slow down the scrolling of the menu selections as the last menu item is to be displayed prior to the menu proceeding to the first menu item. A audible signal can also be provided at this time. Such features provide a tactile feel, or speed bump, for the user indicating that the start or end of the menu is approaching. With this feature, the chance that a user will accidently scroll past the desired menu item is minimized. For example, the tactile feel may include vibration of the device. The vibration may get stronger or faster as a user or interface gets closer to the start or end of the menu. In other examples, combinations of audio and tactile feedback may be provided. Such indicators may also be provided to identify lap, mile or other distance markers, pace thresholds, heart rate thresholds, time thresholds and the like. Accordingly, tactile feedback such as vibration may indicate to the user he or she is approaching a mile marker. In another example, a user may be audibly alerted or be provided with tactile feedback indicating that his or her pace is reaching a predefined point.

The watch 10 of the present invention is also provided with a desktop utility software application. The desktop utility typically resides on the user's computer and interfaces between the electronic module 12 and the remote site. It is understood that the user can customize functions on the watch 10 via the desktop utility. For example, certain programs may reside on the desktop utility such as Personal Bests data, a Marathon training program or Interval Training programs. These programs could be moved to reside on the watch 10. Similarly, programs residing on the watch 10 could also be moved to the desktop utility. The order of display of functions on the watch 10 could also be modified by the user utilizing the desktop utility. Such modifications are implemented once the user connects the electronic module 12 to the user's computer where the desktop utility resides.

Figure 106:
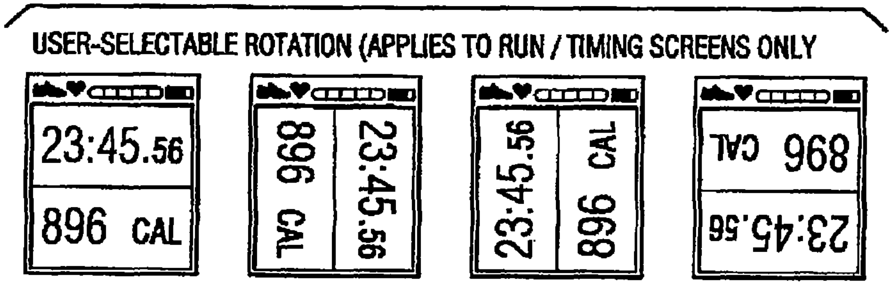

As shown in FIG. 106, the user interface can also be configured for user-selectable rotation. Thus, data can be displayed in general vertical fashion. Data can also be displayed in a 90 degree rotated configuration, either clockwise or counterclockwise. In an exemplary embodiment, the user interface can be configured such that the user-selectable rotation is only active on run/timing screens. While FIG. 106 shows the rotations in a Run screen in two-tier format, the rotation feature can also apply in the three-tier format described above. The user can set this feature using the desktop utility software.

Figure 119:
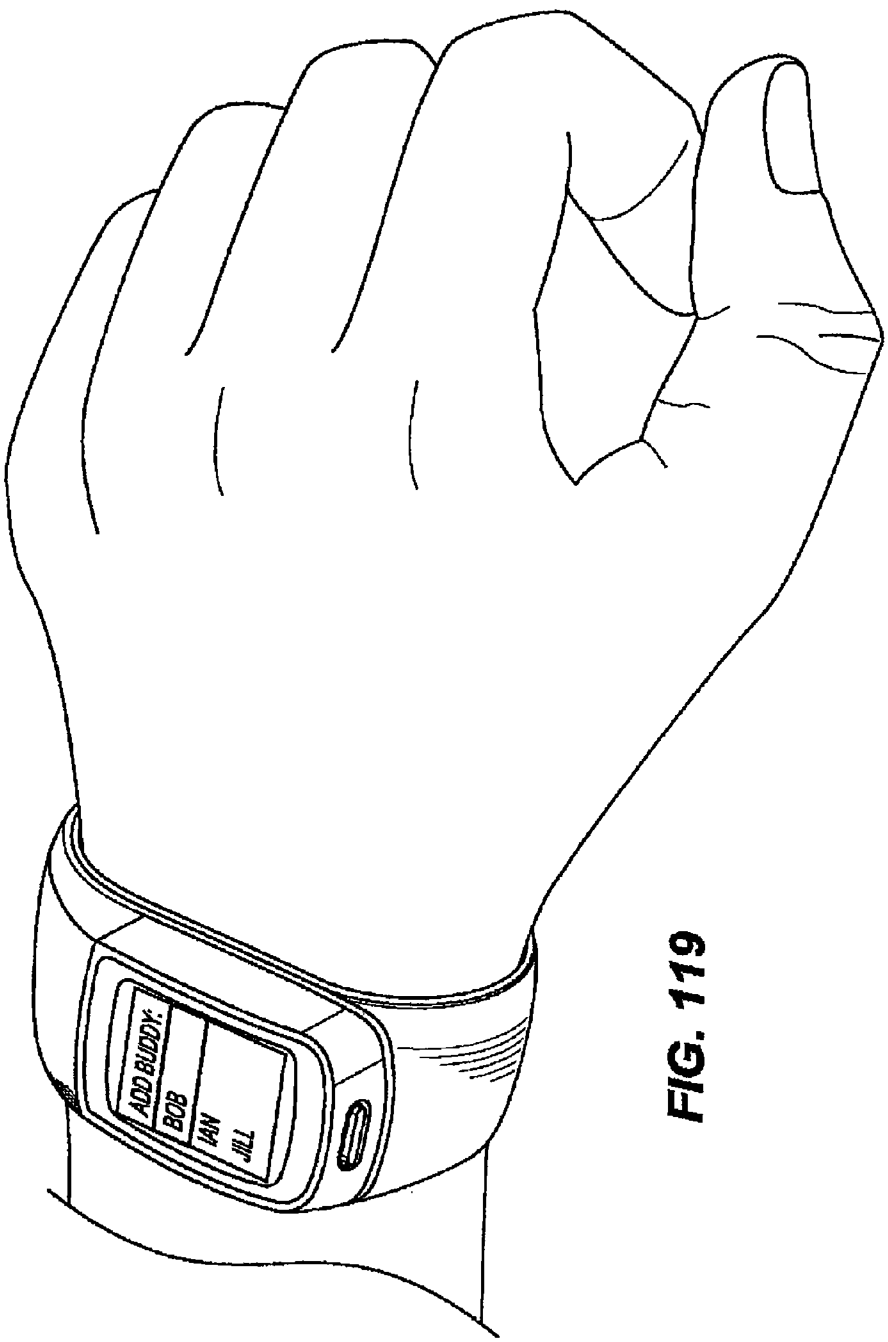
Figure 120:
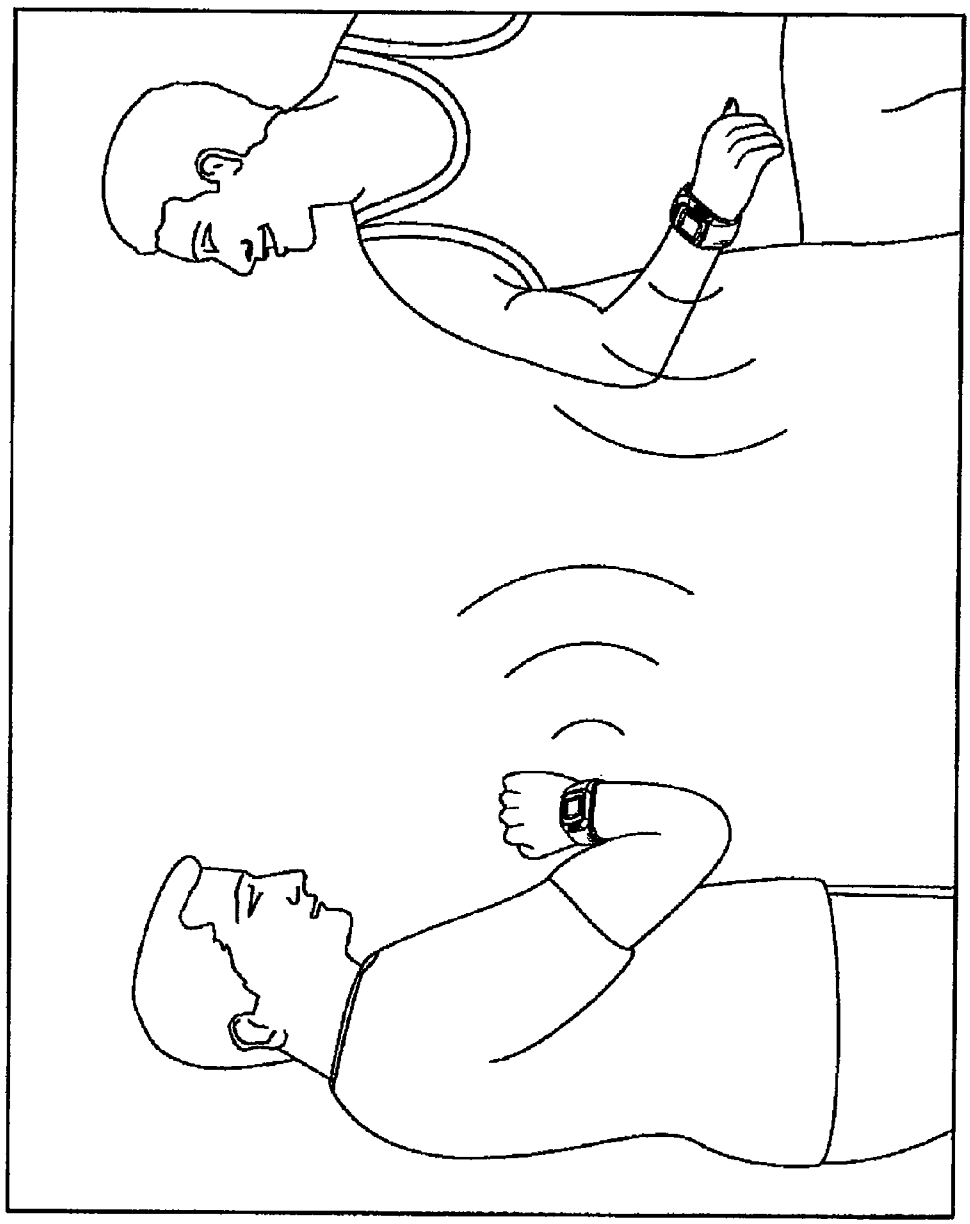
Figure 121:
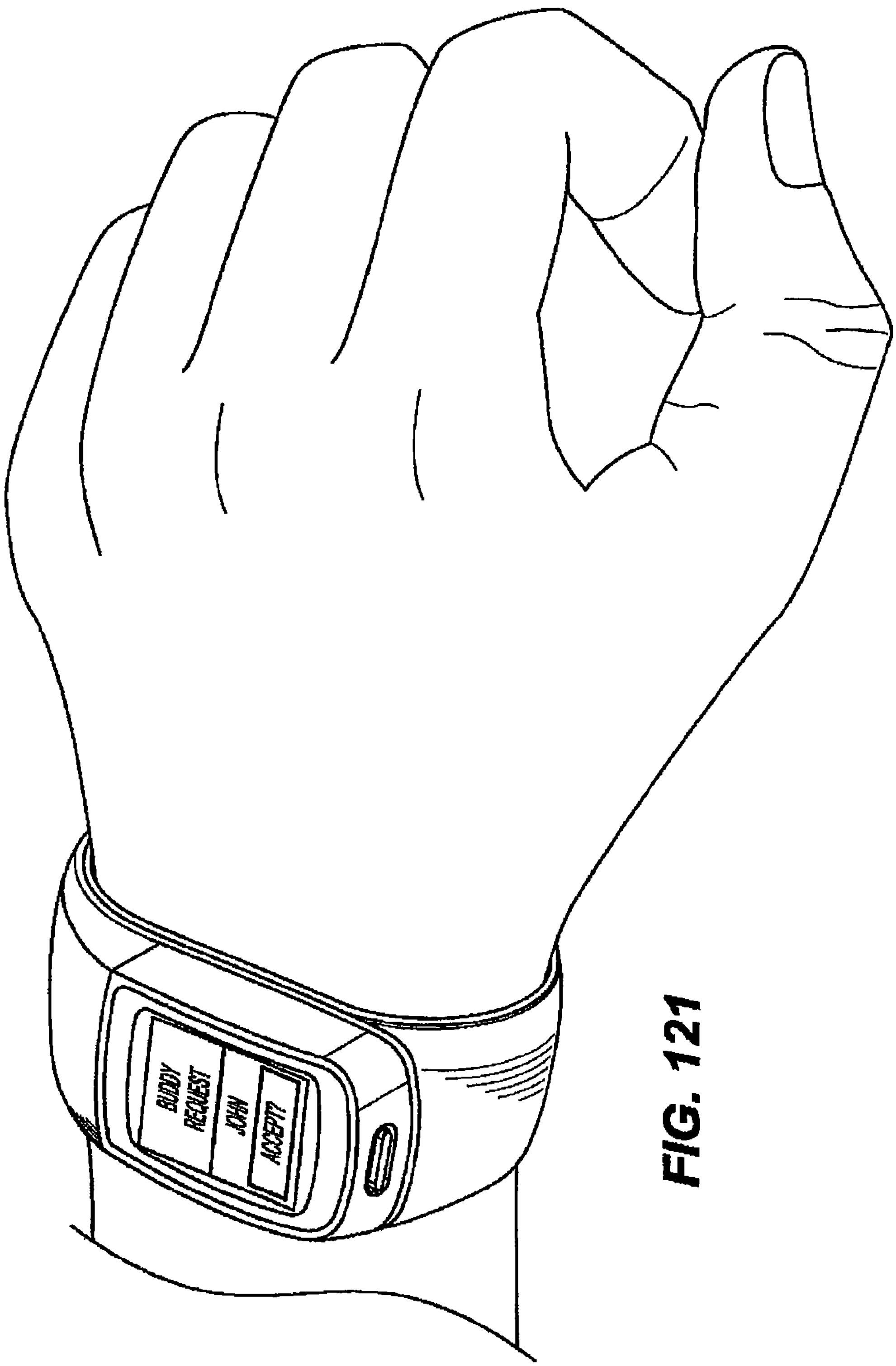
Figure 122:
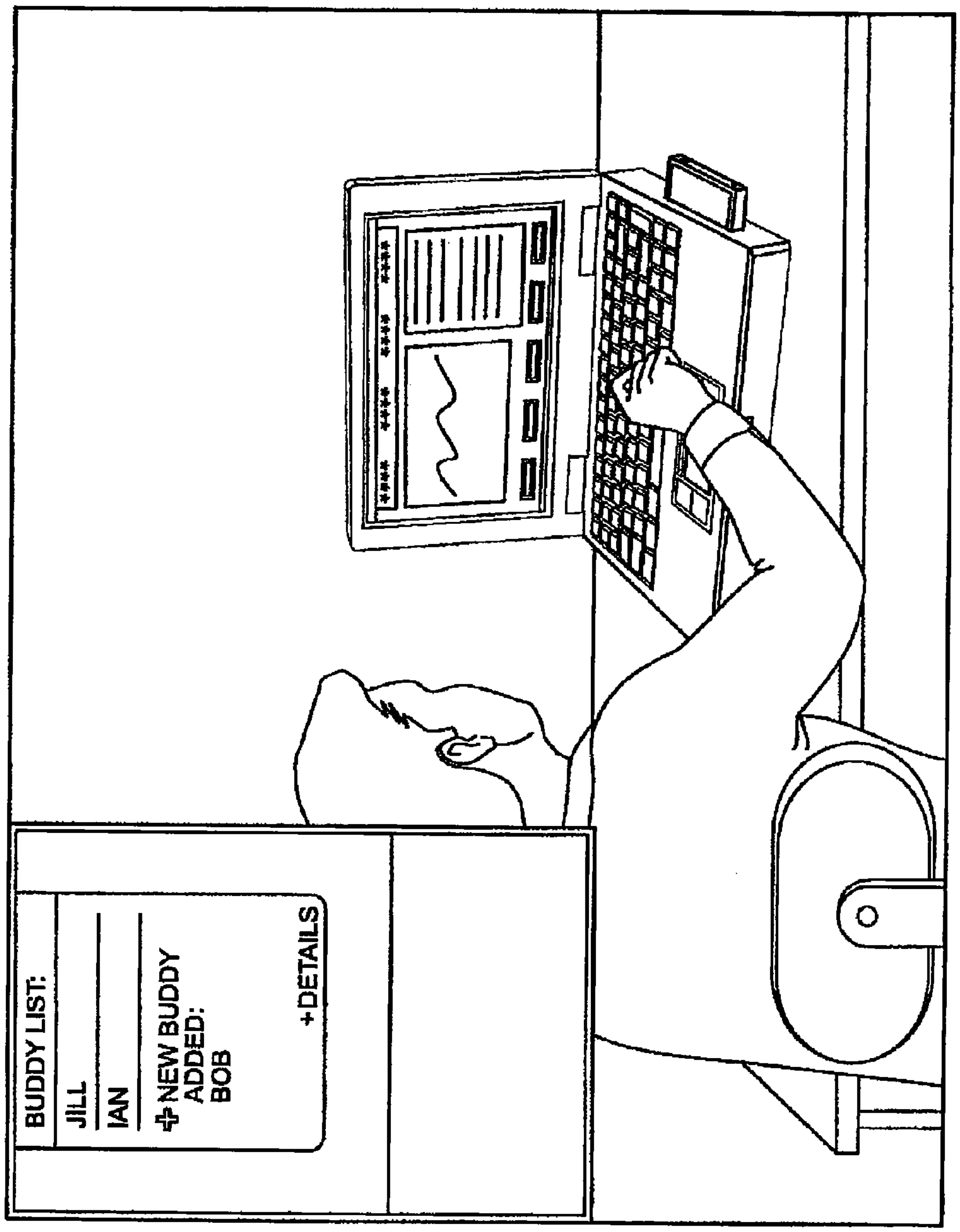

The user interface can also be configured with additional features as shown in FIGS. 118-125. The user interface can be configured such that user wearing the watch can communicate with another user wearing the watch. For example, a first runner may see another second runner numerous times as both runners often run the same route at the same time. If each runner is wearing the watch, the runners can place the watches in close proximity such as when shaking hands (FIG. 118), wherein the user interface provides a message of "Add Buddy" (FIG. 119). The other user can accept wherein the runners are now linked. FIG. 120 illustrates another example manner in which runners' devices may be linked. For example, the users may place their arms (on which the devices are worn) in proximity to one another, at which time a prompt may be displayed asking each user whether to accept a friend or buddy request (as shown in FIG. 121). Friends and buddies may further be added through a remote network site using a computing device or watch 10 as illustrated in FIG. 122. Accordingly, a user's device and a buddy's device might not need to be in proximity to one another to add the friend.

Figure 123:
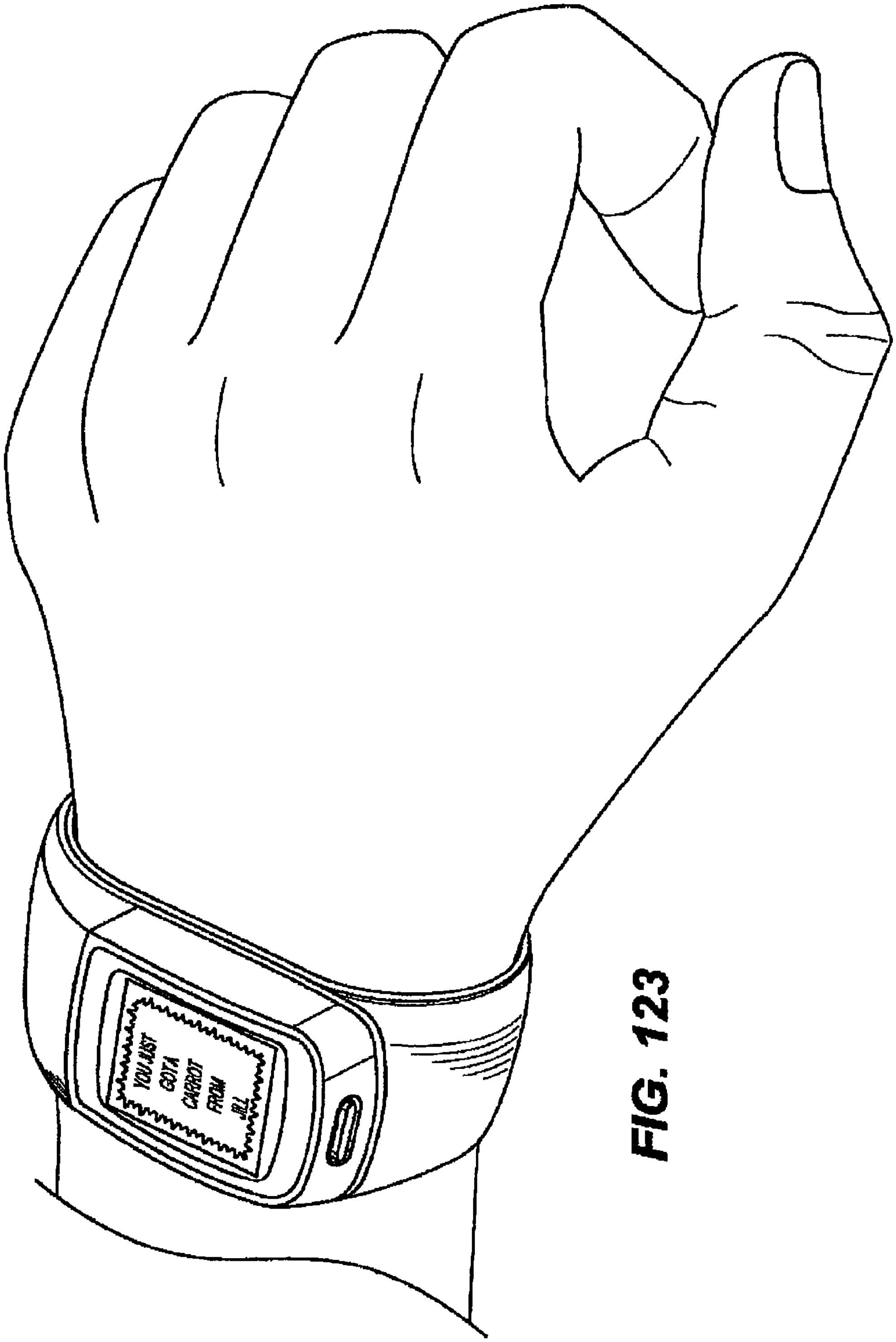
Figure 124:
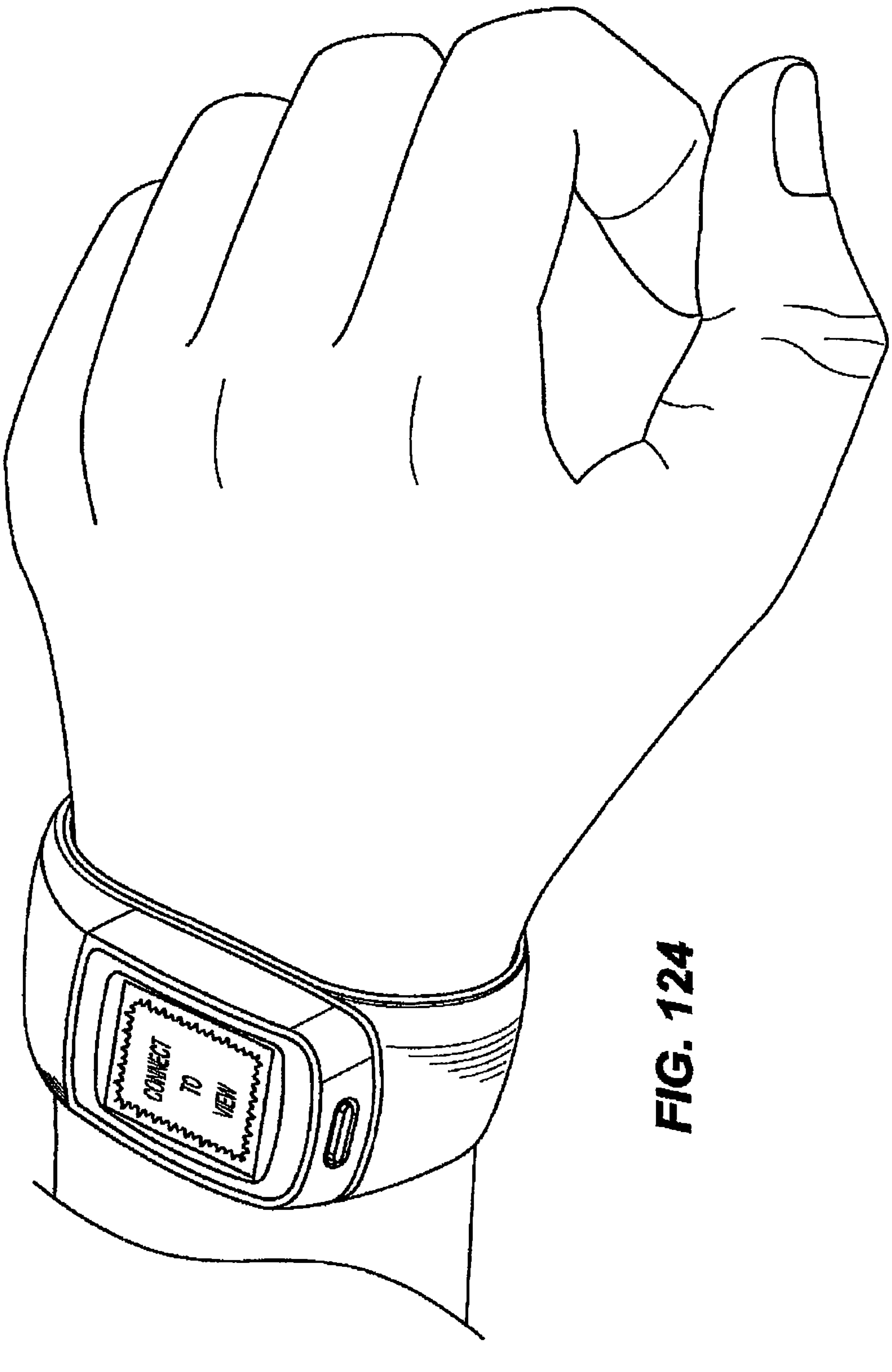
Figure 125:
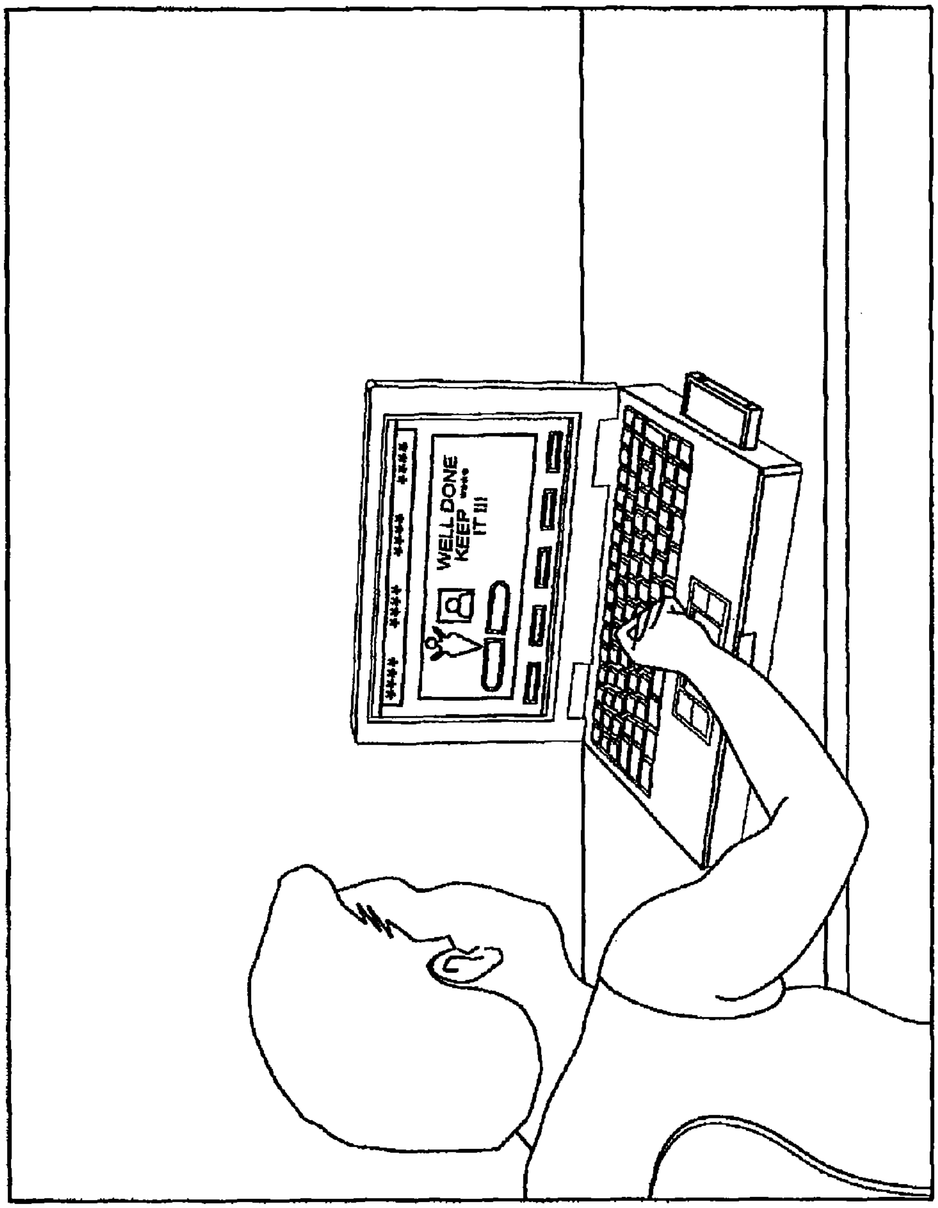

Each runner may have a list of other persons they are linked to. Further messaging capabilities are possible such as by using the Remote Site. For example, one runner can leave a message for another runner such as via the Remote Site. The message may be conditioned such that the runner receiving the message must meet a certain metric before being notified of the message. For example, a first runner may send a message to a second runner in the form of a motivational message once the second runner achieves a certain goal, such as running a certain amount of miles. Such message is sent to the second runner via the Remote Site and downloaded to the watch of the second runner when the second runner is connected to the Remote Site. The message, however, is hidden on the watch and does not appear until the watch records data and senses that the metric is met. Thus, once the second runner runs a certain distance, a message appears on the display of the watch worn by the second runner, such as "You Just Got A Carrot From Jill" (FIG. 123). The message may be referred to as a carrot and a corresponding carrot icon can be utilized on the watch display or on the Remote Site display. The user may further be provided with instructions to connect to a site in order to view the message (FIG. 124). A further message can be displayed to the second user on the watch. When the second user connects the watch to the computer and connects to the Remote Site, the message appears such as shown in FIG. 125. As previously discussed, the user interface can receive training programs from the Remote Site. Such training programs can include an actual race day program such as for a marathon, 10K, 5K etc. The race day program can convey to the user appropriate pace levels to maintain during the race to achieve a finish time as set by the user. The user interface can also be configured to provide shortcuts for certain functions. For example, depressing and holding one of or a combination of the buttons can automatically exit a current menu and return the user to the Time Of Day screen or other menu screen. Another button or combination can automatically take the user to the screen for commencing a run.

As discussed, certain shortcuts can be provided with the user interface such as pressing certain buttons for a predetermined amount of time to provide a certain function. Pressing certain buttons for a predetermined amount of time can also provide an expedited exit from the menu selections in the various menus of the user interface. Also, the user interface can monitor information regarding, for example goal information. If the user interface determines the user is close to a goal, the user interface may provide an additional message to the user. Such message may be designed to give the user further motivation in reaching the goal. As such information may be maintained in the Remote Site and downloaded to the watch periodically when the user connects the module 12 to the Remote Site via the computer, such features give the user a sense of real time functioning of the watch 10.

When connected to the Remote Site (via the computer), the watch 10 periodically polls the Remote Site to determine whether the user has changed anything relevant to the watch (i.e., has the user made any changes through the Remote Site that need to be downloaded to the watch 10 such as the various metrics, parameters and features discussed). If the Remote Site indicates changes have been made, the watch 10 will then request the changes from the Remote Site which will then send the updates or changes to the watch 10. As the user begins the log off process or seeks to disconnect the watch from the computer that connects it to the Remote Site, systems and methods according to at least some examples of this invention may prompt the user to wait until all updates have been received or to wait until the watch has a final chance to check for updates (so that any last minute changes are not lost). Alternatively, if the user abruptly terminates the watch's connection with the Remote Site (or the connection is lost in some other manner), any last minute changes that were not updated at the watch may be stored for the next connection session, if desired. In connecting to the Remote Site, the Remote Site can be configured to show examples of the watch display screens as customized by the user such as by the desktop utility. Thus, a user can see on the computer what the watch display will look like. It is further understood that the Remote Site can receive connection and data from multiple devices such as the watch 10, other athletic performance monitoring devices include those manufactured by competitor entities or music devices. The Remote Site is configured with the ability to distinguish among such devices. It is further understood that the watch 10 is used to monitor athletic performance data where an exemplary embodiments includes run data. Other data can also be recorded and monitored by the watch 10 including data generated in a gym setting such as a treadmill or other gym equipment including stair climbers, elliptical machines, rowing machines, bike machines. Other types of data can also be included such as heart rate, biking data or other physiological data. Communication by the watch 10 with the computer and/or Remote Site (or other network connections) can take other forms such as other USB connections, radio, cellular, 3G, other wireless connections or other general connection systems. The various user interface features can be implemented on any type of portable device described herein.

Figure 126:
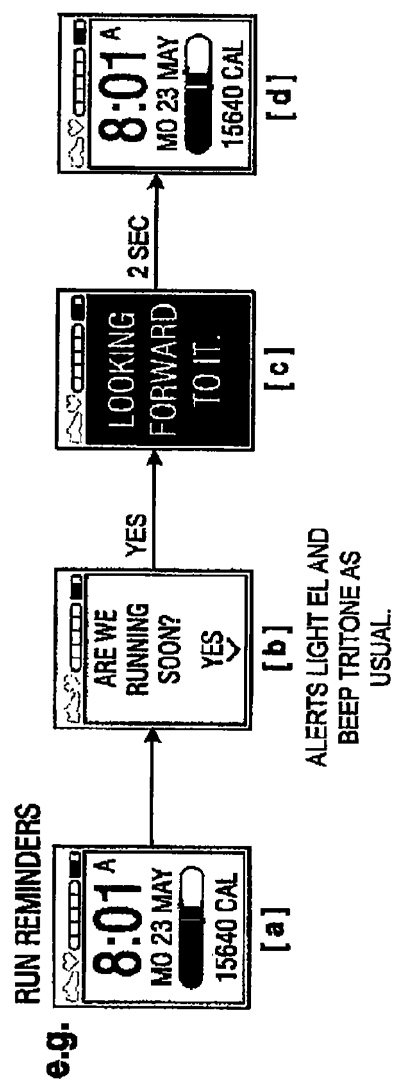
FIGS. 126-140 show additional example screen displays generated by a user interface operably associated with the watch of the present invention that a user may select for display according to various embodiments of the invention.

FIG. 126 illustrates run reminder interfaces in which a user may be reminded of an upcoming workout or to schedule a workout if none have been planned. For example, the user may be prompted to confirm that the user will be performing a workout soon. If the user does confirm the an upcoming workout, the interface may display an encouraging message such as "LOOKING FORWARD TO IT." The interface may then return to a time of day display.

Figure 131:
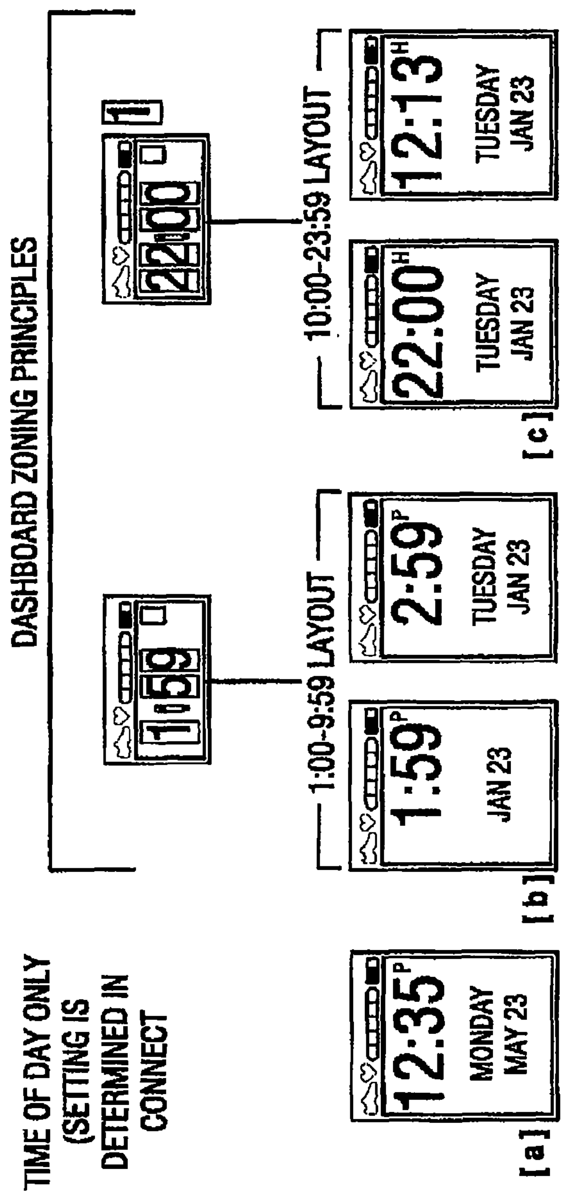
Figure 132:
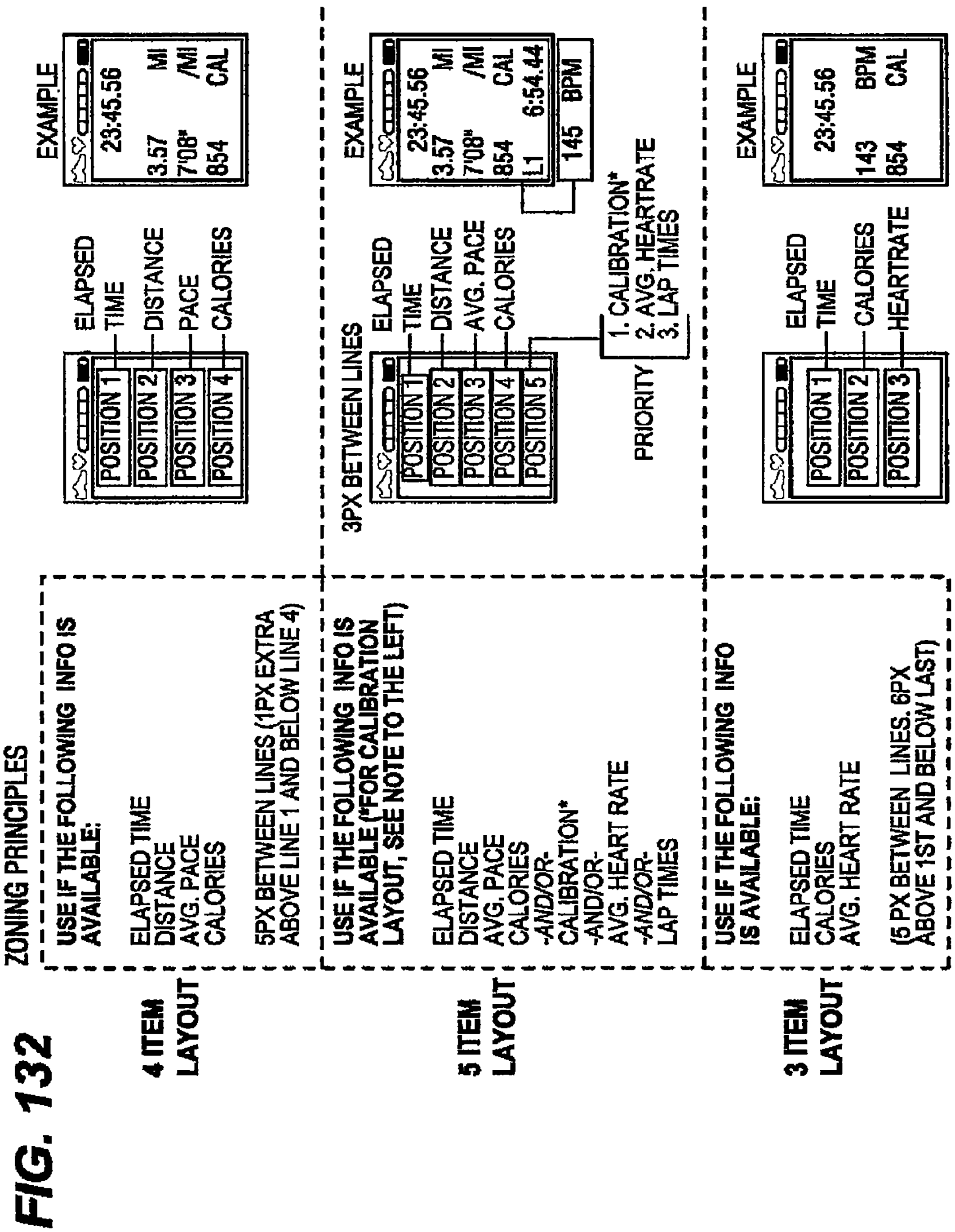
Figure 133:
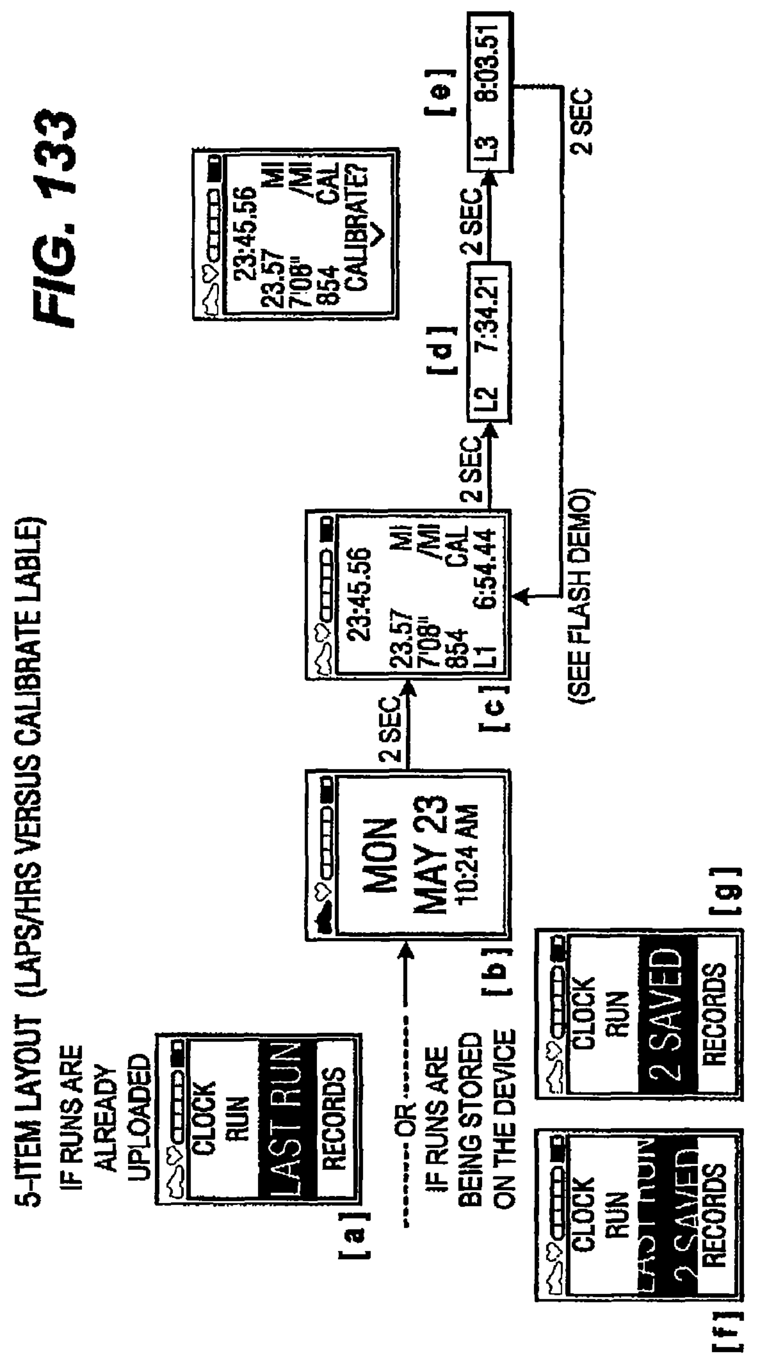

FIGS. 131 and 132 illustrate zoning principles for defining a manner in which information is displayed on a display such as that of watch 10. For example, in FIG. 131, the information may be positioned and sized differently if the time is 4 digits instead of 3. In FIG. 132, a layout may be defined based on the number of items to be displayed. For example, in a 4 item layout, the elapsed time, distance, average pace and calories may be displayed with 5 pixels between lines. In another example, a 5 item layout may include elapsed time, distance, average pace, calories calibration, average heart rate and/or lap times. Instead of 5 pixels between each line as in a 4 item layout, there might only be 3 pixels between lines. FIG. 133 illustrates example 5 item layout interfaces.

Figure 134:
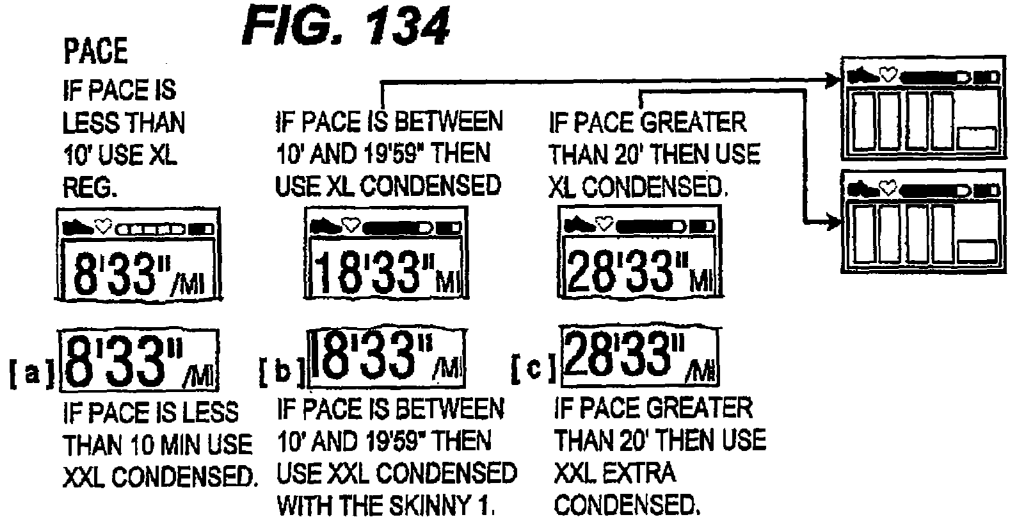
Figure 135:
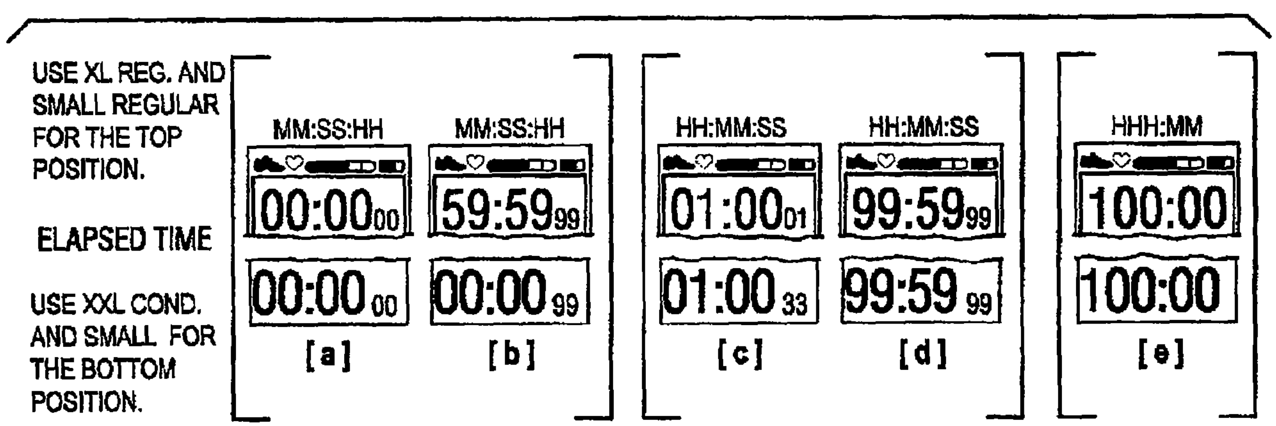
Figure 136:
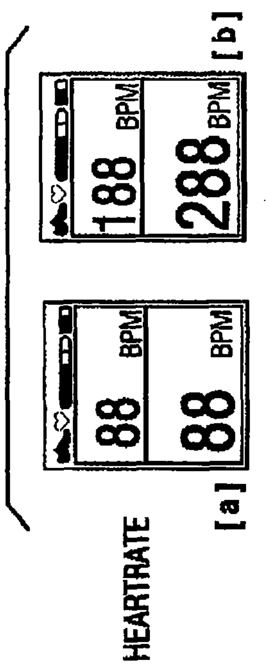
Figure 137:
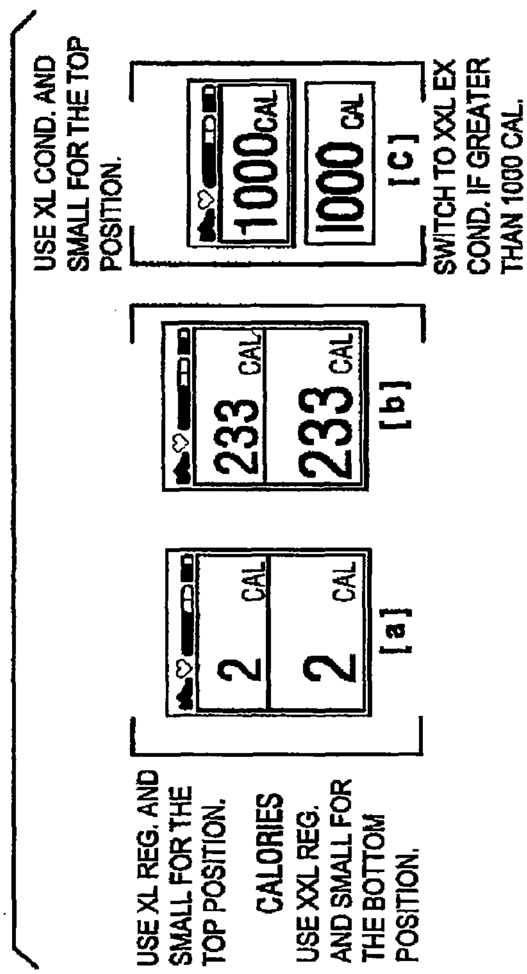
Figure 138:
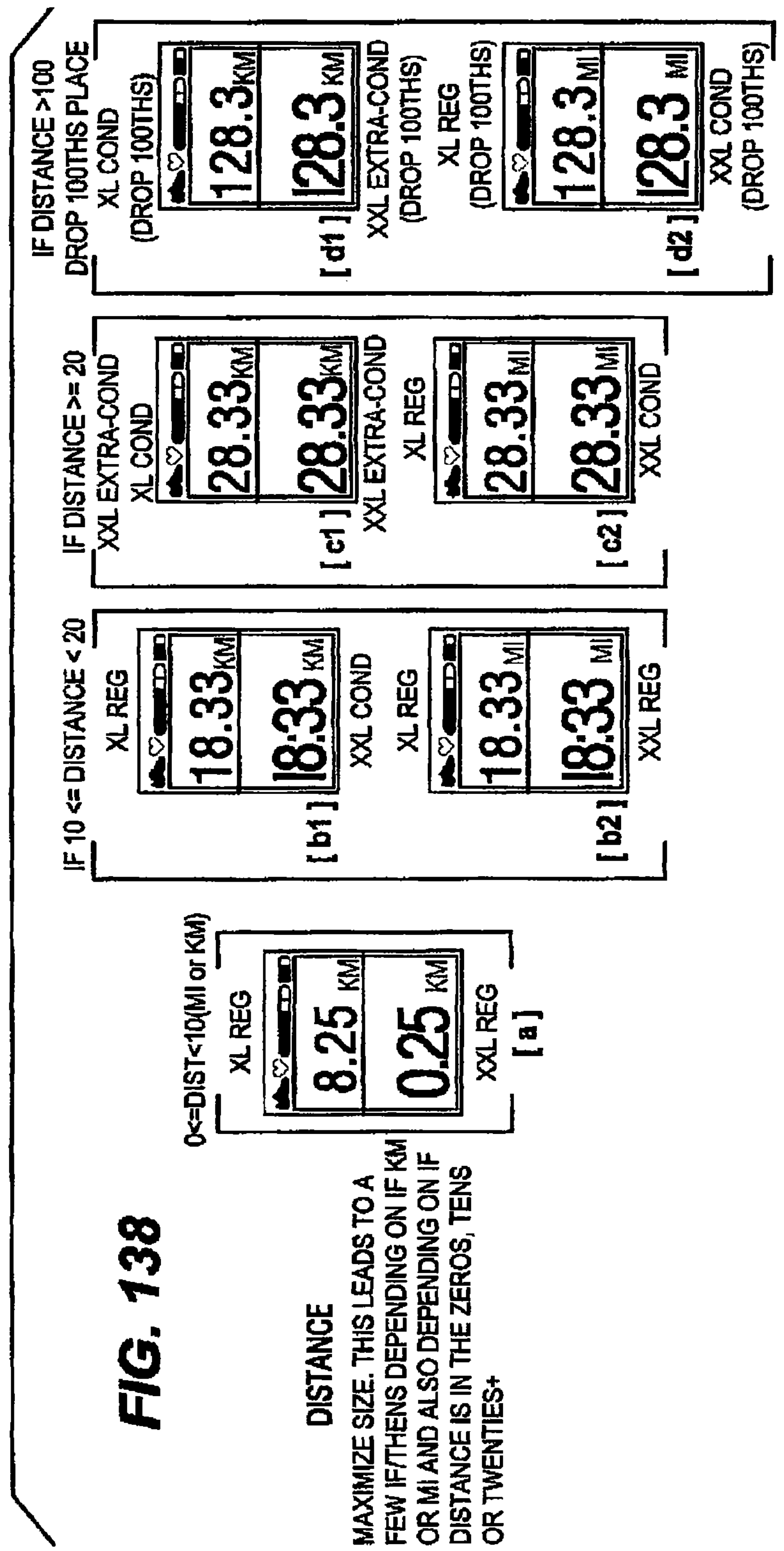

FIGS. 134-138 illustrate display configurations for different type of information including pace information, elapsed time, heart rate, calories burned and distance. In FIG. 134, pace information may be displayed in different font sizes depending on the pace. For example, if the pace is less then 10 minutes, the font may be displayed in a first font size. If the pace is between 10 minutes and 19 minutes and 59 seconds, the pace may be displayed in a second font size (e.g., a condensed font size).

Figure 139A:
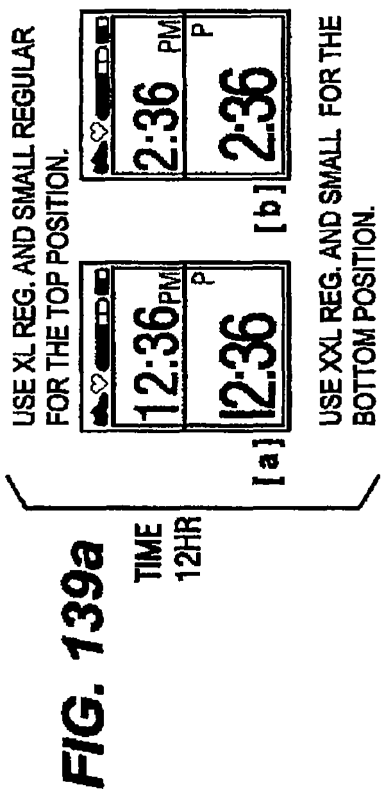
Figure 139B:
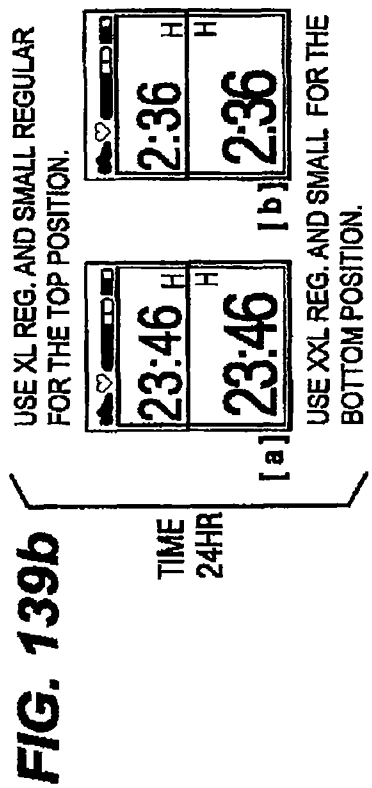

FIGS. 139*a* and 139*b* illustrate example interfaces for displaying a time of day. The size and position of the time of day may differ depending on whether the time of day is displayed in a top portion or a bottom portion.

Figure 140:
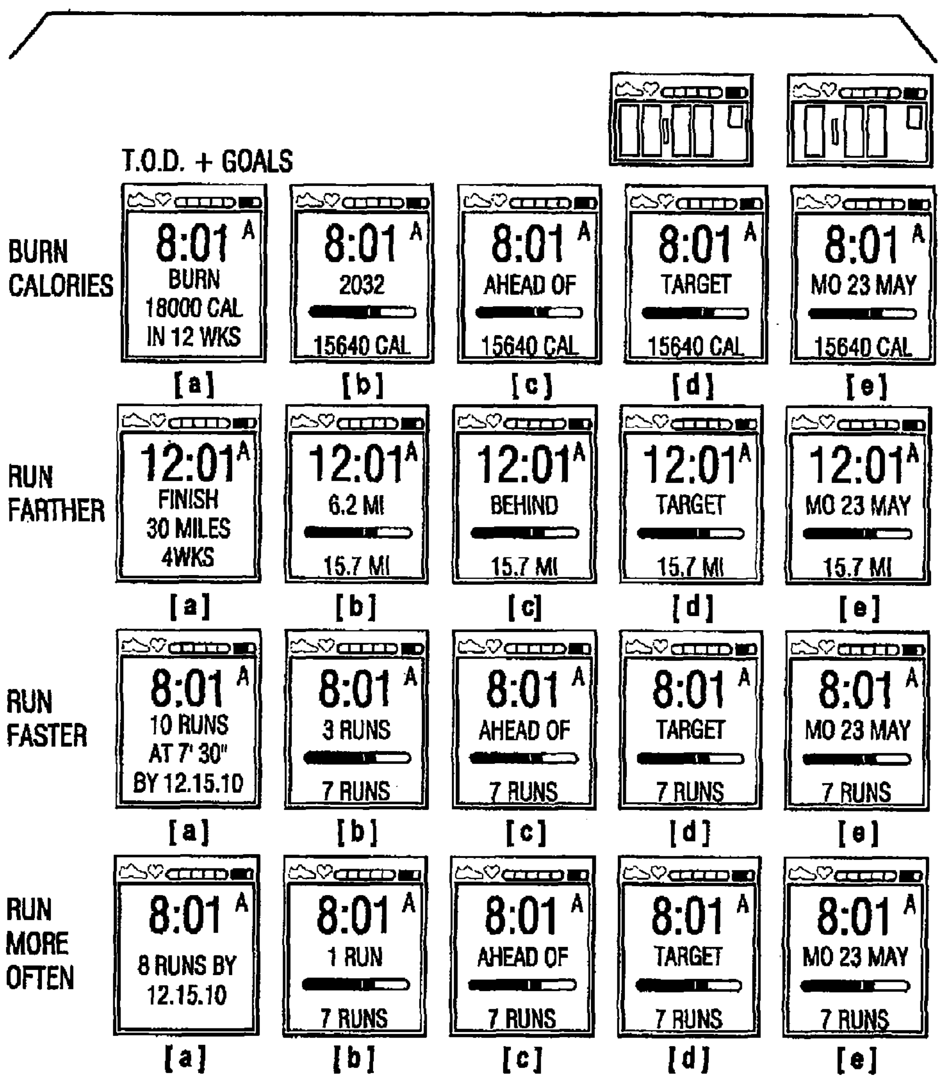

FIG. 140 illustrates example user interfaces that displays a time of day in addition to a goal. Goals may include burning a certain number of calories, running farther than a previous distance, running faster or running with greater frequency. The display may be organized or configured using different fonts, positions and font sizes depending on the amount of space needed (e.g., an amount of text that needs to be displayed).

GPS System Functionality

It is understood that all of the embodiments of the watch disclosed herein can have global positioning satellite ("GPS") system functionality. To this end, the watch may incorporate a GPS assembly as part of or in operable connection with the controller. The GPS assembly will be contained within the housing of the watch and may generally include a GPS receiver chip and an associated GPS antenna. The GPS receiver chip is capable of a certain level of signal processing and is in operable communication with the main controller of the watch. The GPS antenna is connected to the GPS receiver and may take the form of a sheet metal antenna in an exemplary embodiment. In one exemplary embodiment, the watch 10 may incorporate separate antennas wherein the GPS antenna communicates with the GPS receiver and external GPS signals and the chip antenna previously described communicates with the external sensors 1 such as the shoe sensor and heart rate sensor.

Figure 141:
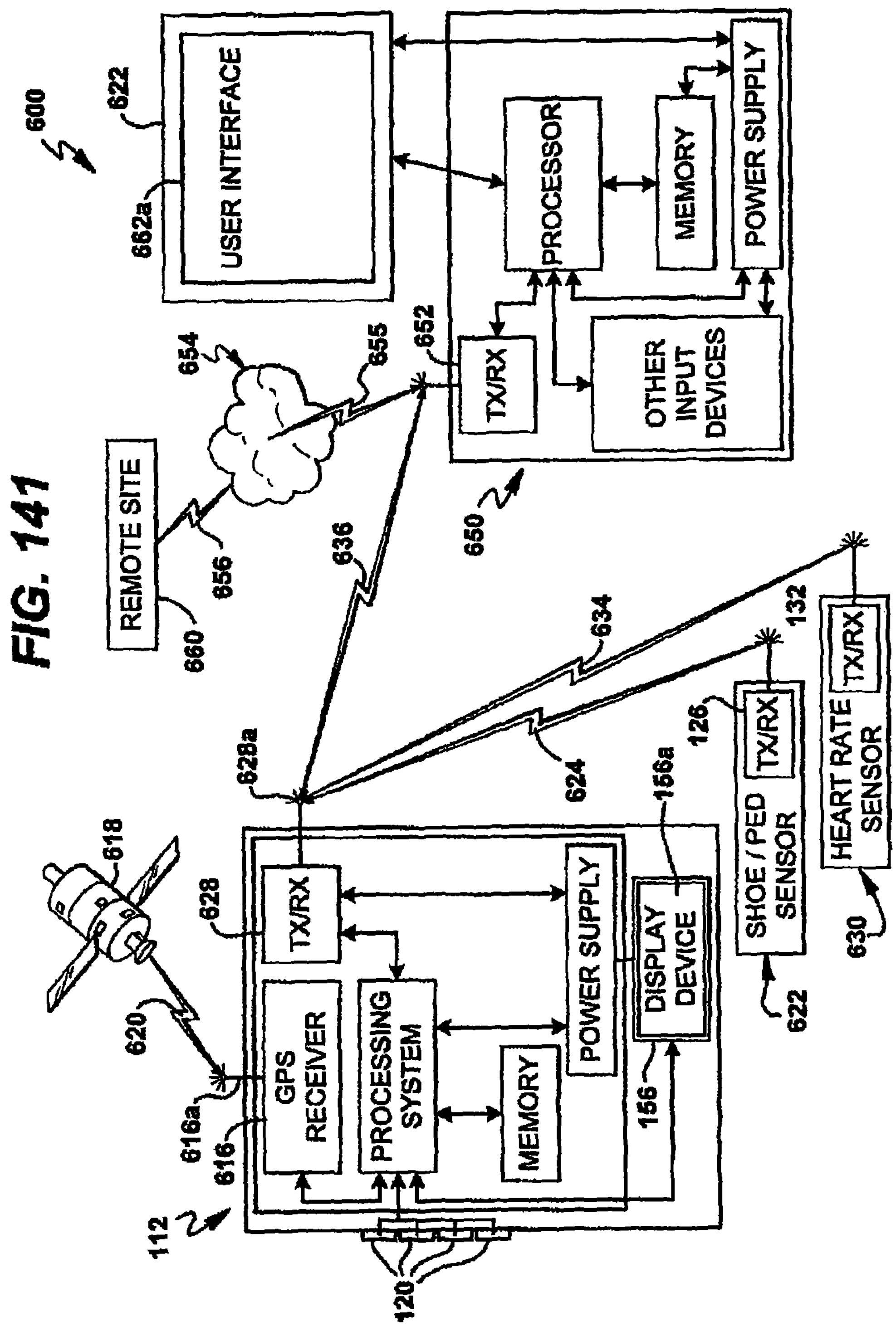
FIG. 141 illustrates an example overall system in which aspects of the invention may be utilized and/or practiced.

FIG. 141 provides a schematic block diagram of an overall system 600 in which aspects of the present invention may be used and/or practiced. Certain components including the electronic module of the watch are referenced herein schematically. Similar structures will be referenced with similar reference numerals of an embodiment of the watch and additional components operably associated with the watch will be designated with additional reference numerals. It will be understood that any of the components referenced can be from any of the embodiments disclosed herein and it is further understood that any of the embodiments of the watch disclosed herein can have the GPS functionality discussed herein. The system 600 may include various sensors that monitor some physical or physiological aspect of a user's motion or an athletic performance. As shown in FIG. 141, this example system 600 includes the electronic module 112, which, as noted above, may include one or more input buttons 120 for receiving user input in the X, Y, and Z-axis directions and a display device 156 (e.g., for displaying information to the wearer, including a user interface 156*a*). The electronic module 112 (or some other device carried by the user during the athletic performance) also may include a GPS receiver 616 for interacting with a GPS satellite 618, e.g., in a conventional manner as is known in the GPS and navigation arts (shown by communications icon 620 in FIG. 141).

The electronic module 112 may receive input data from other sources as well. For example, as shown in FIG. 141, the electronic module 112 may receive input data from a shoe based sensor 622 (e.g., for receiving pedometer type speed and/or distance information, such as an accelerometer, including a one, two, or three axis accelerometer) (e.g. corresponding with shoe sensor 1 in FIG. 1). This is illustrated in FIG. 141 by the data transmission icon 624 from a transmission device 626 associated with the shoe sensor 622 to a receiver device 628 operatively coupled with the electronic module 112. Data from a remote heart rate monitor 630 also may be sent from transmission device 632 to and received at an input receiver device 628 for the electronic module 112 (shown in FIG. 141 by transmission icon 634). Any desired types and/or numbers of sensors may be connected with the electronic module 112, in any desired manner (e.g., wired, wirelessly, etc.), using any desired type(s) of communications protocols, without departing from this invention. The data from the various sensors and other inputs may be received at one or more input devices on the electronic module 112 (such as transceiver 628) without departing from this invention. In some example systems, the GPS receiver 616 will be separate from the input device(s) for the other sensors, such as the input device 628 for the shoe sensor 622 and/or the input device 628 for the heart rate monitor 630 (e.g. corresponding to heart rate monitor 1 in FIG. 1). The various communications devices, e.g., devices 616, 626, 628, and 632, may be capable of both transmitting and receiving data from one or more sources (e.g., transceivers).

The electronic module 112 according to this illustrated example of this invention further includes a processing system, a memory, a power supply, and a display device 156 on which a user interface **156*a* is displayed and on which user interaction with the module 112 (or other components of the system 600) may be displayed and/or received. Other features and functionality may be provided in the electronic module 112** (or other portion of the overall system), such as time keeping and display capabilities, calendar display capabilities, chronographic capabilities (e.g., for measuring and displaying a stop watch, providing split times, etc.), alarm capabilities, etc.

The transceiver 628 (or other hardware) of the electronic module 112 is capable of exchanging data with another computer system 650 (e.g., such as a personal computer, laptop, palmtop, cellular telephone, personal digital assistant, etc.; like computer in FIG. 10), using, for example, a transceiver module 652 included with a personal computer 650, e.g., via a wired or wireless connection (shown in FIG. 141 by transmission icon 636). This connection also may be accomplished, if desired, by a hard connector, such as a USB type connection 124 as shown in prior figures of the embodiments of the electronic module. As shown in FIG. 141, the computer 650 may be engaged with a network 654 (such as the Internet), shown by communications icon 656, to provide access to additional data, information, and functionality for the overall system. As a more specific example, the computer 650 may transfer the data to a remote networked site 660 (e.g., a web-based application, also called the "Remote Site" herein) via communications connections 655 and 656, optionally for use in a community setting (where data from several users is accepted, shared, stored, etc., and from which groups of users may be defined, information of common interest may be stored or shared, challenges may be issued, etc.). As an even more specific example, systems and methods in accordance with at least some examples of this invention may be used in conjunction with hardware and software like that used in the systems and methods commercially available from NIKE, Inc. of Beaverton, Oreg. under the trademark NIKE+™. At least some of the systems and methods according to this invention will include GPS features and functionality, e.g., as described in more detail below.

The computer 650 further may include a data processing system (e.g., one or more microprocessors), other input devices (e.g., a keyboard, a mouse, a track ball, a touch pad, a touch screen, a microphone, a joystick, etc.), a power supply, and a memory system. A display device 662 is provided on which a user interface **662*a* may be displayed and engaged by a user, e.g., in conventional manners as are known and used in the art. Examples of GPS based features of user interfaces 156*a* and 662*a*** and examples of the user experience with GPS using systems and methods according to examples of this invention will be described in more detail below.

As noted above, the watch 100 (and other watch embodiments disclosed herein) disclosed herein has global positioning satellite ("GPS") system features and functionality. To this end, the watch 100 may incorporate a GPS assembly as part of or in operable connection with the electronic module 112. The GPS assembly will be at least substantially contained within the housing 116 of the watch 100 and may generally include a GPS receiver chip 616 and an associated GPS antenna **616*a*. The GPS receiver chip 616 is capable of a certain level of signal processing and is in operable communication with the main processing system of the watch 100. The GPS antenna 616*a* is connected to the GPS receiver 616 and may take the form of a sheet metal antenna in an exemplary embodiment. As shown in the illustrated example of FIG. 141, the watch 100 may incorporate separate antennas wherein the GPS antenna 616*a* communicates with the GPS receiver 616 and external GPS signals and the antenna 628*a* of the transceiver 628 communicates with the other external sensors, such as the shoe sensor 622 and the heart rate sensor 630**.

As mentioned above, aspects of this invention may be practiced using data from global positioning satellite ("GPS") systems 616, 618 to assist in providing athletic performance data and enhancing the user experience. The hardware for collecting and using the GPS data and information may be incorporated into the watch structure 100, as described above and in the other Related Applications identified above (as used herein and unless otherwise specifically noted, the term "watch" is used generically to include any portable electronic device, including, for example, MP3 and/or other portable audio or video playback devices, cellular telephones, stand alone and portable athletic performance monitoring devices, etc., whether or not such devices include features for securing to a user's wrist). GPS data, information, control and functionality may be incorporated into a user interface **156*a* displayable on the watch 100. Additionally, GPS data, information, control and functionality may be incorporated into a user interface 662*a*** available to the user on the computer, website, or other computing device for long term data storage and analysis. Moreover, many of the GPS related features described in more detail below relate to or expand on the GPS based systems and functionality described in: (a) U.S. Pat. No. 7,254,516 issued Aug. 7, 2007 in the name of Charles W. Case, Jr., et al., (b) U.S. Pat. No. 7,603,255 issued Oct. 13, 2009 in the name of Charles W. Case, Jr., et al., and (c) U.S. patent application Ser. No. 12/552,958 filed Sep. 2, 2009 in the name of Charles W. Case, Jr., et al. These prior U.S. patents and this pending U.S. patent application each is entirely incorporated herein by reference.

Figure 142A:
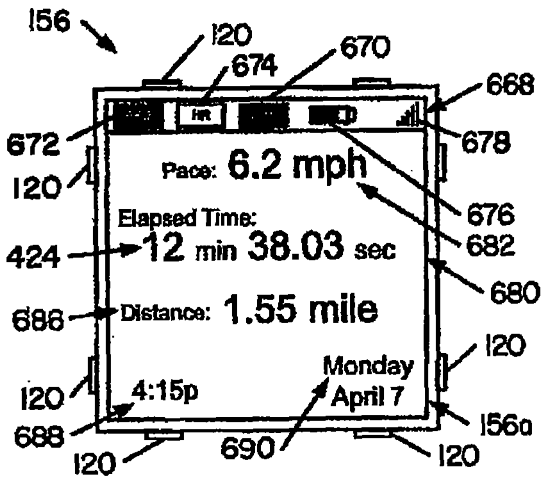
FIGS. 142-166 illustrate various example watch and/or computer interfaces, features, and functionality including GPS features in accordance with aspects of the invention.
Figure 142B:
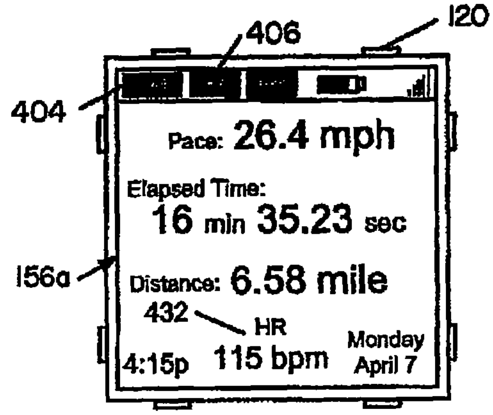

In addition to the various features of the hardware and/or firmware described above, additional features of the hardware and/or firmware will be described below as they relate to incorporation and use of GPS features in the system 300. Advantageously, in systems and methods in accordance with at least some examples of this invention, the watch 100 will be capable of receiving athletic performance data from multiple sources, and information regarding the incoming data and the performance results can be displayed on the watch display 156. FIGS. 142*a* through 142*d* illustrate various examples of watch displays 156 and information that may be included in the display 156. For example, as shown in FIG. 142*a*, the watch 100 may receive athletic performance data as monitored by a GPS based system 616, 618 and as monitored by a pedometer type speed and/or distance sensor (e.g., a shoe mounted pedometer based speed and distance monitor 622, such as those provided in systems commercially available from NIKE, Inc. of Beaverton, Oreg. under the trademark NIKE+™). Information regarding the available sensor systems may be displayed, for example, using icons 670 and 672, respectively, in a system bar 668 provided on the watch display 156. This system bar 668 may include additional information, such as information and status regarding other potentially available monitoring systems, such as the heart rate monitor status (via heart rate monitor "HR" icon 674), battery status (via battery status icon 676), and GPS (or other) signal strength (via signal strength icon 678). As shown in FIG. 142*a*, the icons for the active systems are shown highlighted (like icons 670 and 672 in FIG. 142*a*) and the icons of inactive or undetected systems are not highlighted (like icon 674). Alternatively, if desired, systems and methods according to examples of this invention may simply not display information in the system bar 668 regarding inactive or unused performance measuring systems (e.g., icon 674 could be omitted from system bar 668 if no heart rate monitor is detected). Any desired number, arrangement, and/or combination of different system status icons (including icons for systems other than those specifically described above) may be provided in the system bar 668 without departing from this invention.

The main display portion 680 of this interface 156*a* may include various performance metrics and other information. For example, as shown in FIG. 142*a*, this example interface 156*a* includes an instantaneous pace display area 682, an elapsed time display area 684, an overall distance display area 686, a current time display area 688, and a current day/date display area 690. Any desired number and types of display areas, in any desired arrangement, configuration, or orientation, may be provided on the display 156 without departing from this invention.

Figure 142C:
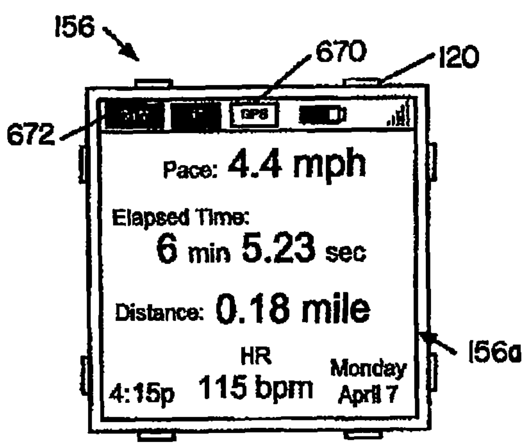

Systems and methods according to at least some examples of this invention also may be programmed and adapted to receive athletic performance data from other sources, such as gym equipment; bicycle speedometers; sensors built into skis, snowboards, mountain climbing equipment, or other athletic equipment; heart rate or pulse monitors 630 (or other physiological sensors); etc. As some more specific examples, the interface display 156*a* of FIG. 142*b* differs from that of FIG. 142*a* in that icon 672 corresponds to bicycle based speedometer data and the heart rate monitor is active (as shown by the activated icon 674). Activation of the heart rate monitor and detection of this data also induces display of instantaneous heart rate data in a heart rate display area 692 in this example. The interface display 156*a* of FIG. 142*c* differs from that of FIG. 142*b* in that icon 672 indicates that sensors relating to gym equipment (e.g., a treadmill, rowing machine, elliptical machine, ski simulator, stationary bicycle, etc.) are being detected at the watch 100 and data relating thereto is being displayed. FIG. 142*c* further illustrates that the GPS detection system is inactive (note the un-highlighted state of icon 670), which may be typical for an indoor gym setting.

Figure 142D:
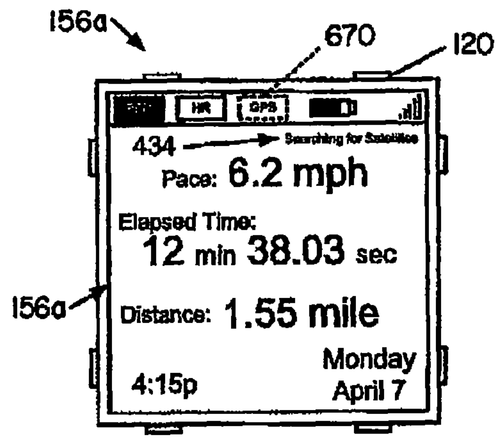

The ability to collect data from multiple athletic performance monitoring devices using a single user-carried athletic performance monitoring system can provide numerous advantages. For example, the pedometer type speed and distance sensor 622 (or other speed or distance sensor) can be relied upon at various times during a workout or other athletic performance when GPS data is not available for some reason. The pedometer based data alone can be relied upon when GPS data is compromised or unreliable, such as in heavily wooded areas, near large buildings, in extremely cloudy conditions, indoors, etc. Any time that the GPS satellite 618 data proves unreliable for any reason, systems and methods according to these examples of the invention can rely on the pedometer based data (and optionally other sensor data, such as compass data, altimeter data, speedometer data, etc.) to provide athletic performance monitoring data and to help fill in any holes or gaps in the GPS based data. When GPS data is unavailable or temporarily lost (or some other sensor signal has been lost), systems and methods according to at least some examples of this invention may provide indicators on the interface display 156*a* to advise the user of the lost sensor data. For example, as shown in FIG. 142*d*, the GPS icon 670 may start blinking (shown by dashed icon lines in FIG. 142*d*) when the connection to the GPS satellites 618 is lost and/or the main display portion 680 may provide an appropriate message, such as the "Searching for Satellites" message 694 shown in FIG. 142*d*. Systems and methods according to this invention may be able to determine which data is most accurate for a given performance (or even for portions or segments of a performance) and then piece together the most accurate data available (from any available sensor) to provide the most accurate overall speed and/or distance information for a given performance. Suspect data may be automatically eliminated, if the perceived inaccuracy or unreliability is too great.

As some more specific examples, systems and methods according to at least some examples of this invention may consider the reliability or accuracy of the data from the various sources (e.g., pedometer, GPS, etc.) repeatedly throughout a performance, and then choose the most likely reliable or accurate data over all portions or portions of the performance for making final data determinations, such as movement distance for a segment of a performance, overall movement distance for the performance, pace for a segment of the performance, overall pace for the performance, calories burned for a segment of the performance, overall calories burned for the performance, etc. Any desired algorithm and/or information may be considered in determining which data source (e.g., pedometer, GPS, etc.) is likely most reliable. For example, if desired, systems and methods according to the invention may evaluate the GPS reliability by considering the unit's exposure or connectivity to the various satellites (data that can be stored and geographically tagged throughout the performance). Then in making distance or pace determinations, systems and methods according to the invention may: (a) rely on GPS data (over pedometer or speedometer data) when the reliability is above a first threshold value, (b) rely on pedometer or speedometer data when the reliability is below a second threshold value, and (optionally) (c) consider other features of the data if the reliability is between these threshold values (if the first threshold value differs from the second threshold value). The other features of the data that might be considered may include, for example, the presence or absence of rapid changes in the GPS coordinates somewhat before or after the time of interest (which might indicate issues with the GPS data), battery power of the pedometer (which might indicate issues with the pedometer data), weather conditions (that might affect satellite exposure), route conditions, etc.

As another example, if desired, input from another sensor may be considered to evaluate which data source (e.g., pedometer, GPS, etc.) is likely most accurate. For example, if a user carries an accelerometer (e.g., body mounted, within the portable electronic device, etc.) along with the pedometer and GPS sensor systems, turns may be easily detected by the accelerometer while it may take the GPS system some time to relocate the user carried GPS antenna system and again track it after a turn is made. Thus, in situations where a turn has been made (as sensed by the accelerometer, which may be a one-axis, two-axis, or three-axis accelerometer), systems and methods according to this invention may determine that the pedometer data is more accurate for a time, especially if the GPS data indicates a continuing straight path and/or loss of connection at that same time period in the performance.

As another example, systems and methods according to this invention might compare the output of the two sensors (e.g., pedometer and GPS) and make some determination as to which is likely most accurate. As a more specific example, when working out on a treadmill, even indoors (such as in a gym), the user's GPS system may still have exposure to the GPS satellites. Thus, during this workout, the pedometer might register a great deal of activity while the GPS satellite indicates little or no movement. A similar situation may arise, for example, when a user runs in place (e.g., when stopped at a traffic light, while talking to someone, etc.). Systems and methods according to examples of this invention might compare the outputs to determine which sensor's output to use (at least for a portion of the performance). For example, if the workout is on a treadmill, the GPS sensor will not register significant latitudinal and/or longitudinal movement over long periods of time, whereas when stopped at a corner and running in place, GPS movement will be evident both before and after the temporary (and relatively short) stop in latitudinal and longitudinal movement. Additionally, running in place will have a different ground contact force profile over the surface area of the foot and/or contact angle as compared to actual running on a road or on a treadmill, and foot contact pressure changes over the area of the foot or other foot contact data may be looked at to determine if the user is actually running (even on a treadmill) as compared to running in place. As another example, if desired, map data may be consulted, e.g., to help determine if the user is inside or outside. In such situations, the appropriate data source can be selected for various portions or segments of the run, and the calculations can be made (e.g., distance, pace, calorie burn, etc.) using the most accurate data available for each segment of the run.

Calculations of the types described above (e.g., to determine the most accurate data available for various segments of the run) may be conducted on the watch 100, on the personal computer 650 to which the performance data is downloaded, and/or on a remote computer site 660 to which the performance data is transmitted for storage and/or analysis. In some example systems and methods according to the invention, the performance data provided on the watch display 156 during the performance may be from one (or more sources), and data correction may take place later, after the performance data is downloaded to the personal computer 650 and/or remote computer site 660.

Figure 143A:
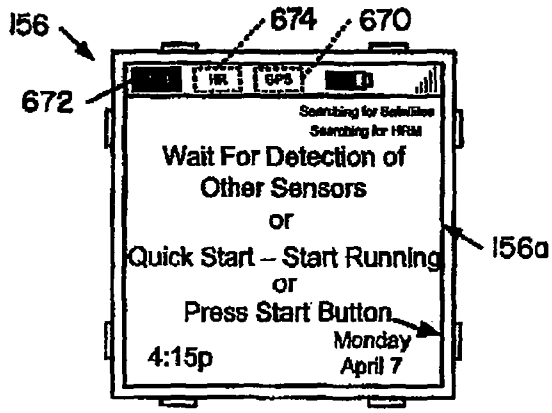
Figure 143B:
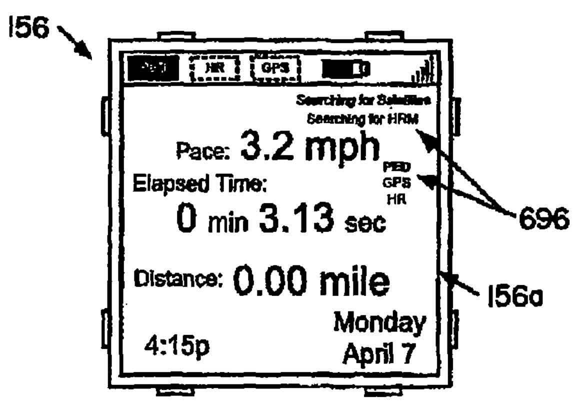

The use of multiple speed and/or distance sensors in a single athletic performance monitoring system 600 may have other useful benefits as well. For example, during an initial phase of a workout, GPS data may not be available because the GPS system 616, 618 has not yet fixed the location of the athlete with respect to the satellites 618. Locking on the satellites 618 can take several minutes, in some instances. Some users may not wish to spend a great amount of "down time" before their workout (e.g., after getting ready, stretching, etc.) waiting for the performance monitoring system to fully boot up (specifically, waiting for GPS signals to be available). Typically, however, the pedometer based sensors 622 are readily detected and immediately available for use. Therefore, the inclusion of the pedometer based speed and distance sensor 622 in the overall system allows for a "quick start" feature, using the pedometer based data while the GPS system initializes and becomes active. FIGS. 143*a* and 143*b* illustrate one example of information conveyed to the user via the watch display 156 in systems and methods according to this aspect of the invention. As shown in FIG. 143*a*, as soon as the pedometer based sensor is detected (shown by the highlighted icon 672 in FIG. 143*a*), the system displays a message to the user asking if they prefer to wait for detection of the other sensors (heart rate monitor and GPS, in this illustrated example) or whether they want to utilize the "quick start" feature. If the user prefers to wait, they can wait until the desired sensor(s) are detected, which, in this illustrated system, could be indicated by a change in icons 670 and 674 and/or a change in the "searching" or other messages. Alternatively, if the user prefers to start the workout, they can either interact with a "start" button (as shown, the interface display 156*a* may "remind" the user of which button is the "start" button) or simply begin running (or other workout activity), which would be detected by a change in the pedometer sensor output (or other sensor output). FIG. 143*b* shows an example of the manner in which the display screen 156 may change if the quick start option is selected (e.g., the display of the pace, time, distance, and/or other information may begin while indicators 696 show the sensor data being received and the sensors for which detection is still being sought).

GPS data also can be used extensively in correcting the data collected by and calibrating the watch 100 described above, including calibration of pedometer based speed and/or distance monitors 622 (and/or other speed or distance monitors) used in a common system with the GPS based athletic performance monitoring system. For example, the actual athlete movement distance as determined using the GPS system 616/618 can be used to provide calibration data for the pedometer based speed and/or distance monitor 622 and/or to correct the data collected by such sensors under a plurality of different conditions of use. As some more specific examples, different calibration conditions and/or calibration or correction data may be used under different pace conditions (running paces v. jogging paces v. walking paces), different temperature conditions, different wind conditions, different elevation change conditions (uphill v. downhill v. flat, steep slope v. moderate slope, etc.) and/or under any differing conditions where a user's step size might be expected to change. Using the GPS generated data along with map or other topographical data, speed and distance calibration or correction data for use under a wide variety of different performance conditions can be developed automatically, in the background, with little or no user input and/or awareness of the feature. As a more specific example, systems and methods according to this invention may keep a log of recorded distances from the pedometer v. actual distances as measured by the GPS system over a wide range of paces, elevational changes, or other conditions. Then, for future performances, the noted pace (and optionally other conditions, such as elevation change, specific location along a route, location within the workout, time into the workout, etc.) can be compared against the conditions cataloged for the various calibration data sets, and a best fit for the calibration or correction data can be selected and used to adjust the recorded pedometer distance, even if the actual GPS measured distance data is not available for that performance. GPS information can be used in calibrating any desired type of sensor (e.g., bike speedometer, rowing speed/ distance monitor, etc.), including multiple types of sensors capable of communicating with a single watch device 100.

In some example systems and methods in accordance with this invention, pedometer based data and GPS based data may be used together to estimate elevational changes, which may be used to provide more accurate distance measurements and/or calorie burn measurements when a user is moving on a hill. GPS systems 616, 618 essentially detect and measure overhead changes in position (e.g., changes in latitudinal and longitudinal positions of the GPS receiver/transmitter 616), while pedometer based speed and distance sensors 622 typically detect and measure features of foot contact with the ground (e.g., step count, foot loft time, foot impact force, etc.). Relying on GPS data alone may provide inaccurate distance information on a hill (e.g., due to a relatively small overhead latitudinal and longitudinal position change as compared to actual ground distance traveled along the slope), and relying on pedometer data alone may provide inaccurate low or high distance information on a hill (e.g., due to the changing step count and step size when moving up or down a slope). Using both pedometer step data and GPS data (and optionally topographical map data), however, elevation changes and slopes for hilly areas may be better determined or estimated, which may provide better actual distance data (i.e., along the slope direction) for use on hills. For example, relatively small GPS latitude or longitude data changes coupled with several steps (and optionally other characteristics of the step, such as step contact force, step force application profile over the foot surface area, step angle, etc.) may be determined by systems and methods according to at least some examples of this invention as constituting an uphill climb area. As another example, relatively small GPS latitude or longitude data changes coupled with few but relatively high force or long foot loft time steps (and optionally other characteristics of the step, such as step force application profile over the foot surface area, step contact angle, etc.) may be determined by systems and methods according to at least some examples of this invention as constituting a downhill area. This type of information can be used to estimate the steepness of the hill and provide correction factors for various finally determined metrics, such as actual distance traveled, calories burned, pace, etc. Moreover, this data can be used to develop calibration data for use in future situations (e.g., when similar combinations of GPS positional change and step characteristic features are encountered). As another potential option, this type of data may be used to trigger systems and methods according to examples of this invention to consult topographical map data for the location (as noted by the GPS coordinates) and to obtain elevation change information for the noted location from that source.

As another potential feature in at least some systems and methods in accordance with this invention, data may be input to the watch 100 from additional sources, such as a compass or an altimeter. Such additional data can be used in various manners without departing from this invention. For example, if compass functionality is provided (e.g., incorporated into the watch structure 100), the compass data along with the pedometer based speed and distance data may be used to help continually determine the athlete's position (latitudinal and longitudinal coordinates) even if GPS data is unavailable for some time during the athletic performance. Altimeter data also can be used in various ways, e.g., to help develop calibration data for the pedometer based speed and distance data, optionally at various different paces, for use in uphill and/or downhill conditions as described above. Altimeter data also may be used to provide more accurate calorie burn counting algorithms.

User Experience on a Portable Device (Such as Watch 100)

The inclusion of GPS based features in systems and methods in accordance with at least some examples of this invention will result in the inclusion of various features in the various user interfaces 156*a*, 662*a* associated with the systems and methods, e.g., both on the portable watch device itself 100 and/or on a computing device 650 with which the portable device 100 may be eventually connected, if necessary (e.g., to exchange data, receive firmware updates, etc.). While the description below may relate to example features of the user experience as it relates to the display and function of the watch device 100 (or other portable electronic device carried by the user during the workout), those skilled in the art will recognize that these various features (or similar features) also may be provided, used, and/or controlled through a user interface 662*a* provided for use with the computing device 650 with which the watch 100 may be eventually connected to upload the workout data.

Figure 144:
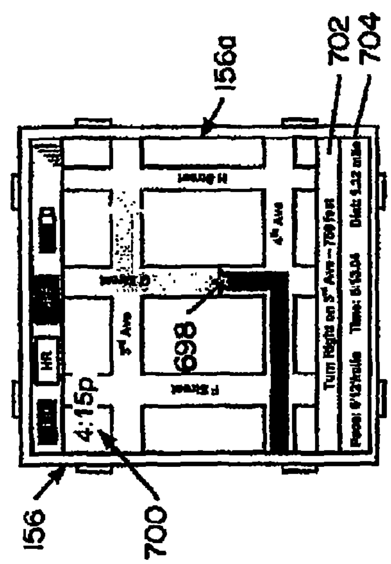

In some example systems and methods in accordance with this invention, the watch display 156 may include, at least some of the time, a video, pictorial, topographical, or other graphical representation of the route to be covered (or being covered) during the athletic performance (e.g., a circuit or other representation of the athlete's path on a map or satellite image of the route). One example of such a display 156 is shown in FIG. 144. Utilizing the GPS features, the athlete's location along the route (shown as a star icon 698 in FIG. 144) may be displayed on the display screen 156 of the watch 100, in real time, as the performance is taking place. Notably, in this illustrated example display screen 156, the portion of the route that has been covered is shown in a different manner (e.g., a different color) from the portion of the route being approached (although this is not a requirement). FIG. 144 further shows that the display screen 156 includes additional information, such as the current time in time display area 700, approaching route information in route bar 702 (such as a "next turn identifier"), and various performance metrics in performance bar 704 (such as pace, elapsed time, distance, heart rate, and/or other physical and/or physiological data). Any desired type of information and orientation or arrangement of information may be displayed in the interface display 156*a* without departing from this invention.

Additionally or alternatively, if desired, information from the interface display 156*a* (or other desired information) also may be presented to the user in another manner during the athletic performance, such as via an audio output (e.g., through headphones or a speaker).

Figure 145:
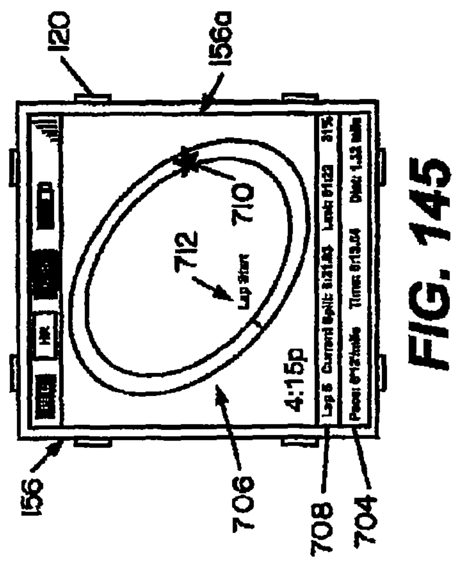

For routes that include multiple trips around the same circuit or path (e.g., laps), the athlete's position within the lap may be displayed on the screen 156 of the watch 100 (optionally along with an audio, visual, or tactile based lap counter), in real time, as the performance is taking place. One example of such an interface display 156*a* is shown in FIG. 145. As shown in this figure, such an interface display 156*a* may include a representation of the route 706 (an oval track, in this example), a performance bar 704, and a current lap bar 708 for providing various metrics relating to the current lap (or other information), such as current lap number, current time within lap, last lap time, percentage of lap completed, etc. The interface 156*a* further may include an indicator 710 showing the user's present location within the lap. More, less, or different information may be provided on the display 156, also in different orientations and relative positionings, without departing from the invention.

As additional potential options, if desired, using the GPS features, systems and methods according to examples of this invention may automatically record lap times and/or split times (or other time subset features) based on the athlete passing a specific geographic location. For example, as shown in FIG. 145, the representation of the route 706 may include an indicator 712 of a lap start/stop location, which may be determined automatically by the system (e.g., using GPS and by detecting a location where running began) or by user input (such as by the user manually interacting with a watch button 120 to mark the start/end line). This automatic lap or split timing feature (which can be preset by the user prior to the workout, if desired, e.g., using the computing device interface 662*a*) can help the athlete avoid numerous interactions with the watch during the event to manually mark laps (which can slow the user down) and/or avoid inaccuracies (by failing to manually mark one or more split times).

Figure 146A:
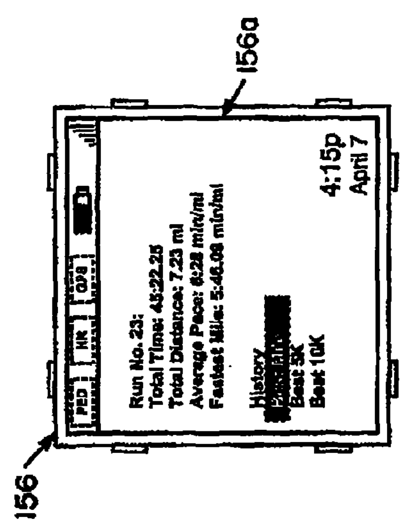
Figure 146B:
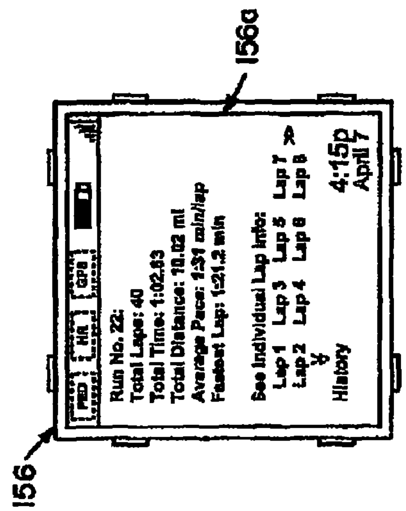

The watch interface 156*a* in at least some example systems and methods according to this invention also can be used to review various workout metrics, e.g., during a workout or after a workout is completed. See, for example, FIGS. 146*a* and 146*b*. In the example of FIG. 146*a*, a watch display screen 156 shows data for various metrics and/or other features of that run, as well as an interface 156*a* that allows the user to select historical information relating to other runs (e.g., by interacting with buttons 120, by a touch screen system, etc.). The example information in the interface display 156*a* of FIG. 146*a* relates to data for a "free form" run. FIG. 146*b*, on the other hand, provides an example interface display 156*a* relating to a run of multiple laps around a circuitous pattern. Notably, the example interface 156*a* of FIG. 146*b* allows the user to see information about specific laps within a given run, as well as historical information relating to other runs (whether free form or circuitous lap type runs).

Using the GPS data, the metrics for a given workout, such as pace, heart rate, distance, etc., can be associated with a specific location along a lap, route, or portion of a route at which that metric was measured or determined. GPS tagging the data may be accomplished automatically by systems and methods in accordance with this invention and/or may be selectively activated by the user at specific locations along the route. These features can also be used (and possibly expanded upon) when reviewing workout metrics on the watch 100 and/or on a separate computer device 650 (e.g., to which the watch 100 may be connected for data uploads) after the workout is completed (e.g., on a website akin to the present NIKE+™ website and computer interface), e.g., by providing a way for a user to input a request for more information for a given location. This feature will be described in more detail below in conjunction with the descriptions of FIGS. 161*a* and 163*a*.

As additional potential features, systems and methods in accordance with at least some examples of this invention may be programmed and adapted to provide specific, geographically tied messages to the athlete as he or she moves along a route and/or participates in an athletic performance. While any desired type of information may be provided in any desired form or format (e.g., audio, video, textual, tactile, etc.), in systems and methods in accordance with at least some examples of this invention, the messages may include messages predefined by the user; messages provided to the system by a third party, such as friends or colleagues of the athlete, coaches or trainers, and the like; and/or system generated automatic messages. Optionally, if desired, the user can "opt out" of received such messages from any of the noted sources, e.g., using the "settings" or "configuration" capabilities of the system.

Figure 147:
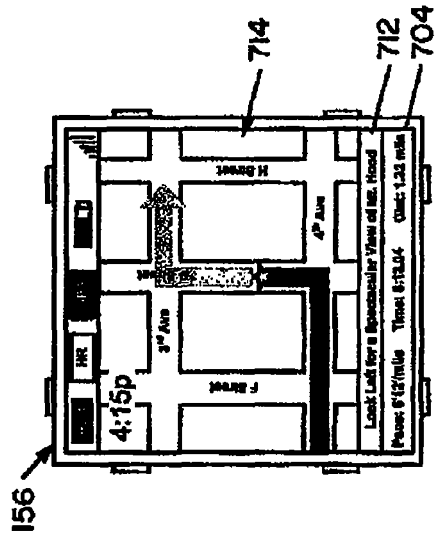

FIG. 147 illustrates one more specific example of this type of geographically tied messaging. In this example, a geographical information bar 712 is provided (e.g., either full time or in a temporary manner, such as a temporary replacement of the route bar of 702 of FIG. 144 and/or the performance bar 704). In this example, the geographical information bar 712 advises the user to "look left for a spectacular view of Mt. Hood," although any desired message content can be provided. As another alternative, if desired, the geographically tied message may be overlaid on some or all of the map portion 714 of the main display (optionally in a partially transparent manner) or it may replace all or some of the map portion 714. Any desired way of displaying or otherwise providing the geographically tied message may be used without departing from this invention. Additionally, if desired, an "alert" could be provided (e.g., a beep, other audio output (from a watch speaker, through headphones, etc.), or tactile output) to advise the user that a new message is being displayed on the watch display 156.

Figure 148:
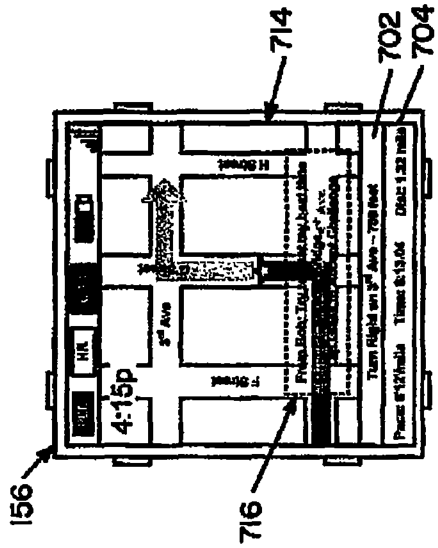

These geographically tied message features of systems and methods in accordance with at least some examples of this invention also may relate to the "community" aspects of the invention, such as the ability to share workout data, routes, and other information relating to one's workout program with friends, colleagues, coaches, trainers, etc., e.g., using an online or networked environment. In such a community arrangement, a third party (such as a friend, coach, trainer, celebrity, etc.), using his or her computing device connection, may insert a locational "cookie" along another athlete's typical workout route (or at any desired geographical location). For example, Friend A may leave a "verbal" or "textual reward" or other reward information for Athlete A at a certain geographical location, such as the top of a big local hill. FIG. 148 illustrates a display screen 156 including display of such information in a partially transparent overlaid message display box 716. Notably, this message 716 indicates the user from which the cookie was received (although anonymous cookies also could be sent, if desired). This partially transparent type of overlay message box 716 is advantageous because the user does not even temporarily lose sight of the other information provided by the watch 100, such as the information in the route bar of 702 or the performance bar 704. If desired, the overlay message box 716 could be initially displayed at one transparency level (e.g., up to and including 0% transparent) and gradually fade to lower levels until it finally disappears. Additionally or alternatively, if desired, the watch 100 may allow the user to provide input (e.g., via buttons 120, via a touch screen, etc.) to allow redisplay of and/or scrolling through the various cookie messages received during an athletic performance.

FIG. 148 illustrates another feature that may be provided using the GPS features of systems and methods according to at least some examples of this invention. As shown, the message 716 from "Bob" in this example includes an "on-the-fly" performance "challenge" to the user and prompts the user to "accept" the challenge by providing input to the system (e.g., by tapping the glass of the watch display 156 in this example). Triggering of this message may be initiated by a geographic location tag as described above (and in more detail below) Once the user accepts the challenge (or optionally automatically), using the GPS features, the system may record the user's time over the challenge area ("to the bridge" in this illustrated example), and compare the user's time with Bob's challenge time. Feedback information may be given, to both the user and the challenger, over the course of the challenge (e.g., on the watch display 156) and/or after the challenge is completed (on the watch display 156 and/or on one or both user's computer interface 662*a*). If necessary, the GPS functionality of the watch 100 may re-program the user's route to cover the same route as that used in presenting the challenge (e.g., if the user's initial route differs from the challenger's route) and/or to assure that the same route is covered by each user. In this way, the challenger need not know in advance the route(s) that the user selected for his or her workout.

Figure 149B:
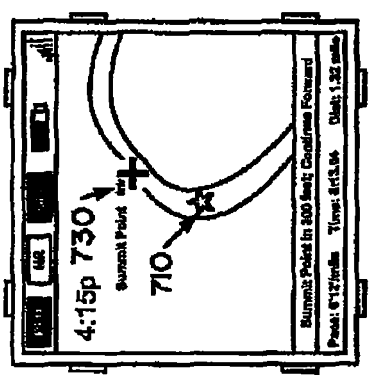
Figure 149C:
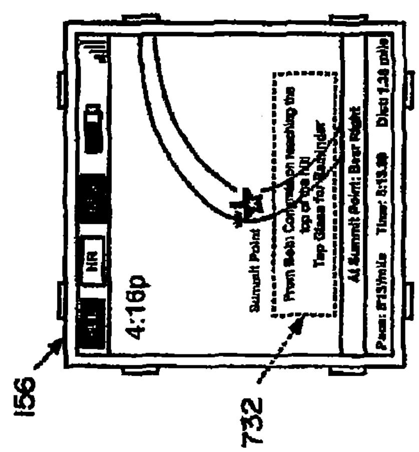
Figure 149A:
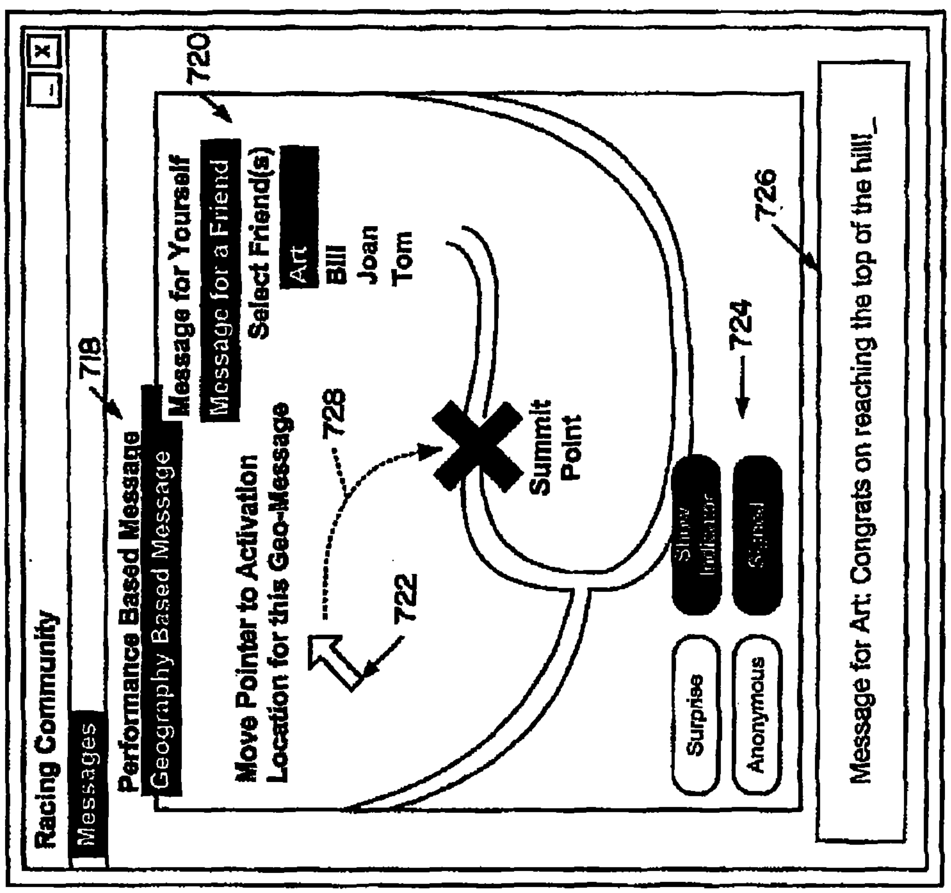

FIGS. 149*a* through 149*c* illustrate examples of user interfaces, both on the computer display 662 (FIG. 149*a*) through which the location cookie may be initially entered and on the watch display 156. As shown in FIG. 149*a*, any member of a "community" may leave geographic and/or performance based messages for other members (including themselves), and the interface 662*a* will provide interface elements for doing so. As shown in FIG. 149*a*, this example interface 662*a* provides interface elements and icons that allow the user to select: (a) the type of message (e.g., performance or geography based, see interface elements 718), (b) the recipient of the message (see interface elements 720, (c) the location at which the message will be triggered (see interface pointer element 722), and (d) various features of the message (see interface elements 724). The user may interact with the various interface elements in any desired manner without departing from this invention, including through the use of a mouse, keyboard, touch screen, touch pad, roller ball, stylus, joystick, etc. Additionally, the various interface elements may be activated and interacted with via the input device in manners that are conventionally known and used in the computer arts. The interface 662*a* further includes an input panel 726 through which the message may be entered (e.g., via a keyboard (hard or soft) or other input device). This message (or other data delivered to the athlete's watch) also is called a "message payload" herein. If desired, the interface 662*a* may allow selection of other features of the message payload, such as type (e.g., audio or tactile features to signal that a message has arrived), duration, graphics, etc.

While FIG. 149*a* shows an example interface display 662*a* for creating and leaving a message or "cookie," FIGS. 149*b* and 149*c* show example interface displays 156*a* on the watch 100 received by the recipient user as the location of the cookie is approached. FIG. 149*b* shows the interface display 156*b* shortly before the user arrives at the location of the cookie. This is shown in FIG. 149*b* by the user location icon 710 approaching "Summit Point," the place where the geographically tagged message was left (notably, FIG. 149*a* shows that the pointer element 722 was moved to the Summit Point location by pointer track arrow 728). Because the geographical cookie was created in a manner so as to be displayed to the recipient (as shown in FIG. 149*a* by the highlighting of the "Show Indicator" icon as opposed to the "Surprise" icon), the user's interface display 156*a* includes a geo-tag icon 730 at the cookie's location. Any desired way of displaying the existence and location of a geo-tag may be used without departing from this invention, including color changes, other icons, etc. The inclusion of a geo-tag icon on the athlete's interface display 156*a* can provide motivation for the athlete to get to the noted location to collect the "cookie." Alternatively, if the "Surprise" icon is selected in input area 724, the geo-tag icon 730 can be omitted from the displayed information.

FIG. 149*c* shows the athlete's interface display 156*a* at a time when the geo-tag location is reached. As shown by this example, the geo-tag activated a textual display 732 on the user's display 156 to display the message input at location 726 of interface 662*a* (i.e., delivering the message payload). Any desired manner of displaying the message may be used without departing from this invention, including the various manners described above, e.g., audio, textual, as an overlay (fading), in one of the other "bars," etc. In this example, the message display 732 indicates that the message is from a specific user ("Bob" in this example). Notably, as shown in FIG. 149*a*, the input used in creating the message indicated that the message should be "signed" as opposed to "anonymous." Optionally, if desired, the interface 662*a* could include the ability for the message generator to sign the message in any desired manner (e.g., "Your Secret Admirer," etc.) or to include no identifying "signature."

Notably, using this downloaded message configuration, the watch 100 appears to the user to be network (e.g., WiFi, WAN, cellular, etc.) connected during the performance (e.g., by getting messages from third parties based on current location), but there is no need for a networked connection during the athletic performance to provide these geographically tagged messages.

As noted above, systems and methods according to the invention may or may not advise Athlete A of the existence of at least some of these types of locational cookies (e.g., to either provide an incentive to reach the geographic location or to provide a "surprise" reward when the location is reached), but the necessary information (e.g., the geographical location and the desired reward data) may be downloaded to the athlete's watch 100 when he/she connects to the community system (e.g., through the computing device). Then, when the athlete is working out, whenever he/she reaches the predetermined geographical location (as determined by GPS), the pre-established message will be presented (e.g., an encouraging message; a congratulatory message; a further challenge message; an audio, video, or textual message; etc.). If desired, presentation of the message will be triggered only if other monitoring systems associated with the athlete (such as a pedometer based speed and distance monitoring system 622, a bicycle speedometer, a force sensor in a shoe, pedal, or oar lock, etc.) indicate that the athlete reached the geographic location as a result of a workout (to prevent "cheating" or inadvertent triggering of the message), and not as a result of driving a car or otherwise reaching the location. The "cookie" also could be structured so that the message is triggered only as a result of a specific type or types of workout (e.g., by a run workout, by a biking workout, etc.).

FIG. 149*c* illustrates another feature that may be included in systems and methods according to examples of this invention that include this type of geo-tag (or performance tag or other) messaging capability. Display of message 732 activates a feature that allows the message recipient to enter input "reminding" him/her that they received this message (e.g., by tapping the watch face glass, by making a gesture, by pressing a hard button, etc.). Over the course of a workout, a user may forget that they received such a message, and they may desire this type of reminder (e.g., on the watch display 156, on their computer display 662, etc.) so that they can take appropriate action (e.g., send a "thank you," issue a challenge to others, talk "trash," etc.). This interface 156*a* further provides the user with an easy opportunity to generate and receive such a "reminder" without significantly interrupting his/her workout to input data for the reminder.

Systems and methods in accordance with this invention also may provide GPS information, e.g., within the "settings" feature of the watch device 100. For example, at a specific location, information regarding satellite exposure (e.g., number of satellites viewing the device, strength of signal, reliability of signal, etc.) may be provided by the watch device and optionally stored as a workout is conducted. This information may be collected periodically over the course of an athletic performance. Such information may be useful, before, during, or after a workout, to determine which data set may be more reliable on a given date and/or at a given location (e.g., GPS data, pedometer data, pedometer data optionally coupled with other data, such as compass or altimeter data, etc.). In this manner, systems and methods in accordance with this invention can determine (automatically and/or through user input) the most accurate speed and distance information available during any given athletic performance (or portion thereof).

Figure 150:
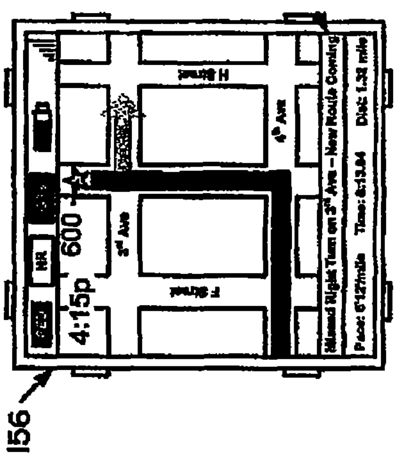

As noted above, in some modes of operation, systems and methods in accordance with at least some examples of this invention may provide live, real-time, "turn-by-turn" directions or instructions on the watch display 156 to help keep the athlete on a desired route during the performance. One example of such an interface display 156*a* is shown in FIG. 150. These directions and instructions may be based, at least in part, on GPS data available during the athletic performance. The directions or instructions may be provided to the user in any desired manner or combination of manners without departing from this invention, such as via graphical or textual information provided on the watch display 156, via audio or video information (e.g., played on headphones, from a speaker on the watch, on the watch display, etc.), via tactile information (e.g., vibrational indicators, etc.), and the like. Various additional features also may be provided, such as a countdown to the turn, different audio sounds for approaching left turns v. right turns, different vibrational responses for approaching right turns v. left turns, etc.

Also, if desired, as shown in FIG. 150, systems and methods according to the invention may provide updated directions on the fly during the athletic performance (e.g., through the watch display 156) to get a runner back on the desired route (should they stray from the pre-planned route), or to provide "detour route" determination capabilities, should the suggested route be unavailable or unused for some reason (e.g., road construction, flooding, etc.). As shown in FIG. 150, when the user missed the turn on the initial route (as shown by icon 698 passing the desired 3rd Avenue turn), the system provided an indicator to the user that a "new route" is being determined (see the information in route bar 702). An audio indicator also may be provided. Systems and methods according to the invention can determine a new "route" in any desired manner, e.g., the shortest route to get the user back to this originally planned route, a route to get the user to the same ultimate destination in the same (or a similar) overall distance, or a new route that will travel the same (or similar) overall distance as the initially planned route.

Figure 151A:
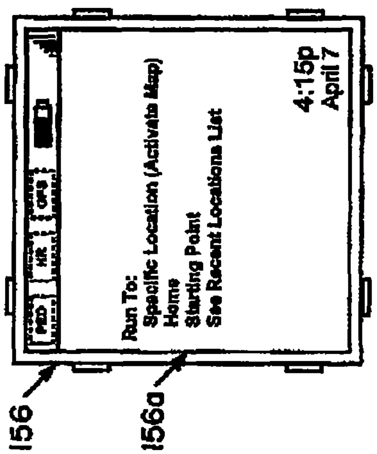
Figure 151B:
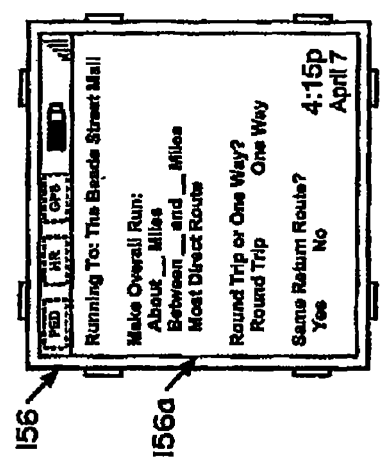

Another useful feature that may be included in systems and methods in accordance with at least some examples of this invention relates to the use of GPS for "to location" type navigation. FIGS. 151*a* and 151*b* illustrate example interfaces 156*a* on watch displays 156 that may be useful with this feature. In one example, as shown in FIG. 151*a*, a person may decide that they wish to run to a specific landmark (e.g., to the top of the hill on 4th Street, to a specific intersection, to home, to their initial starting point, to a recently used location, to a specific business locale, etc.). By setting up their system to allow input of this locational target (e.g., using the website features through computer 650 and/or features available on the watch 100), systems and methods in accordance with this invention may use GPS and mapping capabilities to develop a route for the user that will get them to the desired location. This route determination feature may be further enhanced with various features, such as by having systems and methods according to the invention determine a route to the desired location that may include various features, such as a route to cover an overall targeted distance, a route to provide the most direct route, a one way or two way route, a route having the same or a different return trip route, etc. Note, for example, the various options provided in the interface display 156*a* of FIG. 151*b*. As another example, systems and methods according to the invention may develop a route to reach the desired location at a particular time within the overall run route (e.g., about ½ hour into the run that may last for 2 hours, or at about the halfway point) or at a particular distance within an overall run route. The route(s) also could be developed so as to minimize or maximize various features of the run, such as: minimize intersection crossings, maximize (or minimize) time on trails, maximize areas with scenic "views," minimize (or maximize) elevational changes, minimize urban areas, etc. These systems and methods in accordance with the invention may utilize input from a more global community regarding the routes, so as to better identify routes with certain characteristics, such as scenic views, water or rest room facilities, etc., as will be described in more detail below. Again, the watch 100 may be programmed and adapted to be capable of giving the user directions back to the desired route, should they stray, or detour directions, as described above in conjunction with FIG. 150.

"To location" navigation can work in other ways as well. For example, a user in an unfamiliar city (e.g., on vacation or a business trip) could begin a run (e.g., at the hotel front door) by tapping his or her watch, such as with the shock button, (or otherwise entering input) to store a "marker" or "way point" (e.g., to store the GPS coordinates associated with this location or marker point) in a memory contained in the watch 100. Alternatively (or in the absence of other input), the starting point of a workout may be automatically identified by systems and methods according to this invention as being a "home" or "starting" point. Then, at some time during the run, the user could enter a command into the watch (e.g., by pressing a button, by a predetermined gesture, by touch screen input, etc.) to "take me home," and the GPS system, through the watch, could give the user directions taking him or her back to the initially noted (or automatically detected) home marker or way point location. If desired, systems and methods according to examples of this invention may allow any location to be marked (not just a home base) for a potential return during the workout. The system could default to provide the shortest route to return home, although other options may be made available if desired (e.g., reversing the outgoing route, minimal road crossings, etc.).

The type of "to location" navigation also could be used to help users locate, on-the-fly, various facilities, such as the closest public restrooms, drinking fountains, etc., using the GPS capabilities. Any desired information of this type could be conveyed in this manner, in real time, as the performance is taking place.

Figure 152:
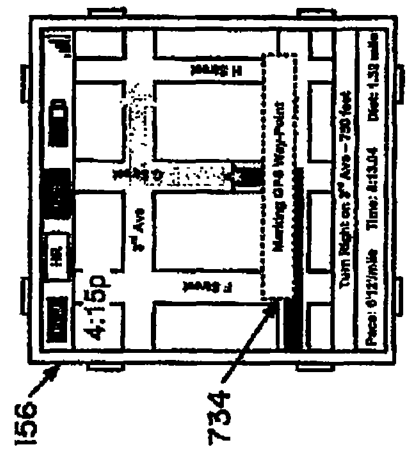

In some example systems and methods in accordance with aspects of this invention, users may mark the GPS coordinates of any locations passed during the course of the athletic performance using the watch device 100. For example, as shown in FIG. 152, during a run, a user may pass an interesting shop or other landmark to which they may wish to return (either later, during the course of the run, as a finish line for the run, or just at some later time (e.g., even when not running)). The user may interact with the watch 100 in some manner (e.g., tapping the screen or crystal, pressing a hard button, making a predefined gesture, etc.) to record the GPS coordinates for that location (also called a "way point" herein). This is shown in FIG. 152, for example, by display of a dialog box 734 indicating that the GPS way-point coordinates are being stored. Then systems and methods in accordance with examples of the invention may provide information to assist the user in returning to that location. For example, on the watch device itself, GPS could be used at any desired time to provide turn-by-turn directions to return the user to the selected location and/or provide address information for that location. Additionally or alternatively, from the computing device 650 (e.g., that has access to the website or community features of this invention and to which the watch device 100 or module 112 may be connected for data exchange), the systems and methods could be programmed and adapted to provide maps or directions to the selected location, to provide information about the businesses or other items of interest at or near the selected location, to direct the user to a website of the noted business(es) or other items of interest at the selected location, etc.

"Markers" and "way points" of the types described above may be used for other purposes as well. For example, during a run, a user might interact with the watch device 100 in a predetermined manner (e.g., as described above) so as to "mark" one or more segments of a run route or locations along the route. For example, a single marker or way point may be entered at an appropriate location to mark the beginning and ending point of a lap (e.g., for a circuitous route run plural times during a performance, such as a run around a lake or a run around a block). Then, systems and methods according to this invention could automatically store data relating to the lap time (or split time) and provide this information to the user. Once entered, the same lap start/stop point marker also can be used for future runs around the same circuit (alternatively, different start/stop points could be entered whenever desired). The lap timing data also may be stored and used to provide challenges (e.g., challenging a user to beat his/her best lap time, beat the best lap time of a third party (e.g., friend, community member, others), etc.). Such "best time" data may be stored by the user or another (e.g., within the community or on the website, when uploading data to the website, when downloading data to the watch, etc.) and downloaded to the watch 100 for use when a particular route is run, or it may simply be stored on the watch 100 (e.g., for the watch user's best time).

Figure 153A:
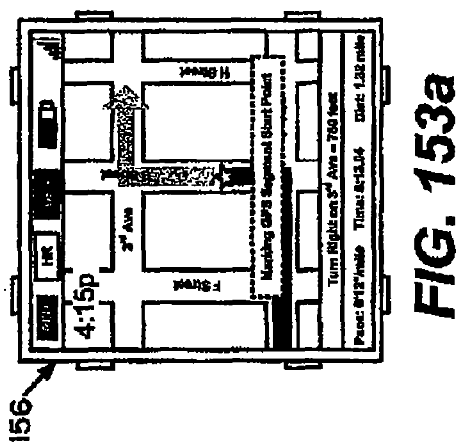
Figure 153B:
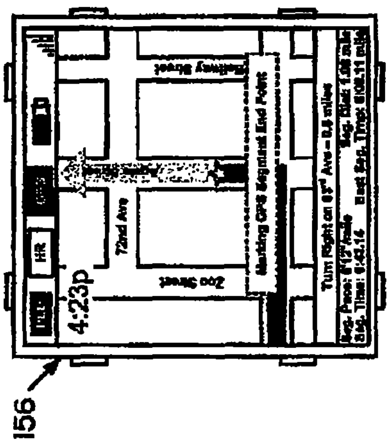

As another example, multiple markers could be entered to define segments of a route (e.g., portions of a route), and the challenges and/or other features as described above may be applied to these segments as well. FIGS. 153*a* and 153*b* illustrate examples of such marking. As shown in FIG. 153*a*, a GPS Segment Start Point is being marked, and in FIG. 153*b*, a GPS Segment End Point is being marked (e.g., by appropriate user input to the watch 100 during the run). If desired, systems and methods according to the invention may allow users to create their own name(s) for specific segments of a route (e.g., "Killer Hill") and/or for an entire route (e.g., "the lake run"). Alternatively, these segment marker locations could be made on the computer 650 prior to the run, e.g., using map or other features available through the computer interface 662*a* and then downloaded to the watch 100 during data exchange. The user's timing data over this selected segment can be compared over the course of many runs and/or with data from other users over this same route segment.

The stored marker locations and run segments may be used in other ways as well. For example, the locations and segments may be used to generate public or private challenges that other users of systems and methods according to this invention may receive when they interact with the on-line or networked community (e.g., via the website). If a user runs a regular route (or a few regular routes), systems and methods according to examples of this invention may look for segments along that route that are run by others within the community and/or determine whether any challenges or best times for a route or segment are present on the website. Using the GPS data, such segments also could be determined by systems and methods according to the invention without the need for a user to specifically enter or mark beginning and ending points for the segment. This segment and challenge data could be downloaded to the user's watch 100, optionally without the user knowing, and then the challenge could be presented to the user through the watch display 156 as he or she is involved in the athletic performance. For example, when GPS data indicates that the user is approaching 1$^{st}$ Avenue, the controller within the watch 100 may be programmed and adapted to prompt the user for the challenge (e.g., "Your friend Bob's best time from 1$^{st}$ Avenue to 20$^{th}$ Avenue is 13:32. Want to see if you can beat that time?"). If the challenge is accepted (or optionally, automatically, without the need for acceptance), the user's time can be recorded for that segment, and optionally, other parties within the community or a user's predefined group can be informed of the user's attempt to break the best time mark and his/her results (e.g., after the run is completed and the watch data is uploaded to the community website system). Users, their friends, the general on-line or networked community, coaches, trainers, system operators, and/or others may make up challenges and store them in an accessible manner for use by themselves or others.

As noted above, one way of generating a "marker" or "way-point" (which stores GPS positional data associated with the marked location) involves a user interacting with his/her watch at the desired geographic location (e.g., by tapping the display, pressing a button, making a gesture, etc.). If desired, markers or way-points also may be generated using the computing device during an on-line or networked session (e.g., using the website). In either instance, systems and methods in accordance with at least some examples of this invention further may allow the user to insert or otherwise modify information associated with a marker or way point (e.g., using the networked resources after a workout is completed). For example, users could add notes, tags, pictures, audio, video, text, etc. associated with the various markers or way-points. These additions may be used for various purposes, for example, to provide reminders to the user who originally entered the information or to provide information to others that might be considering using the same route or a portion thereof (e.g., to help then select a route or determine whether a given route is appropriate), to other users on the route or segment, etc. As one example, a user may approach a complex intersection during the course of a run, and it might not be perfectly clear to him or her which road should be followed to stay on the desired route or to continue on to the desired location. If a previous user of this route stored some information associated with this location or marker, such as a picture (a highlight or pointer), a recorded message ("take the far left road"), a textual message, or the like, this may help that user later, as well as other users of the route, to better stay on the desired route path. Any desired information could be stored and associated with way-points or markers without departing from this invention, such as route condition information, shopping or other stop recommendations, local facility information, tourist information, etc. The stored information also could provide strategy for running along the approaching portion of the route (e.g., "really push it for the next half mile because an easy downhill section is coming up soon").

Because the watch 100 can be programmed to store various noted markers, way-points, or segments (e.g., by tapping the screen to activate the shock button or another user interaction), the watch 100 also can be programmed to take action the next time the user approaches that location. For example, systems and methods according to at least some examples of this invention could challenge the user as he/she approaches a previously marked segment (marked by the user or another)

to beat the previous "best time" or to reach a predefined "goal" on that segment (e.g., to beat the actual user's best time or another user's best time). Such features, after the data is uploaded to the community website, allow systems and methods according to this invention to generate and receive public challenges, run virtual races (e.g., using data from one or more runners that ran the route or segment at different times), and/or provide rewards or positive feedback when challenge attempts are successful.

If desired, different types of gestures or interactions with the watch device may be used to mark different types of markers or way-points. For example, types of way-points may be distinguished from one another by creating one way-point using a single tap, another using a double tap, another using a triple tap, another using an arm motion gesture, another using a combination of taps and/or gestures, another using a press-and-hold action on the crystal, etc. These different types of input may allow a user (as well as systems and methods according to this invention) to later distinguish one marker or way-point from another (e.g., to provide a reminder to the user when they wish to enter data about the way-point), so that different and the correct types of data can be associated with a given marker or way-point. For example, if all way-points entered on a route were a single tap type except one (which was a double tap type), a difference in appearance or other feature of that way-point when displayed may trigger the user's memory and remind him or her why that way-point was entered (e.g., "oh yes, I saw this great little coffee shop across the street," etc.). Such information may help the user find the location at a later time (or otherwise associate the proper information with the specially marked way-point), as described above.

Figure 154:
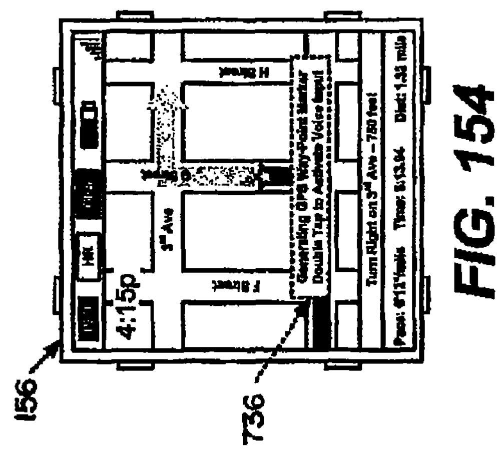

FIG. 154 illustrates another example feature that may be associated with GPS based markers or way-points. As shown, when a user interacts with the watch 100 to create a GPS marker, the system may provide the user with an opportunity to immediately enter input information, e.g., using voice or audible input. In this illustrated example, when a GPS way-point marking procedure is activated, the display screen can ask the user if he/she would like to activate a voice recording or input system (see dialog box 736). A suitable response to this inquiry could activate a microphone operably incorporated into the electronic module 112, and enable the user to record information and associate the recorded information with that way-point. This information could be played back to the user when he/she interacts with the community website system via the computer 650 and/or when the user later again passes this same way-point location (as determined by GPS).

Figure 155:
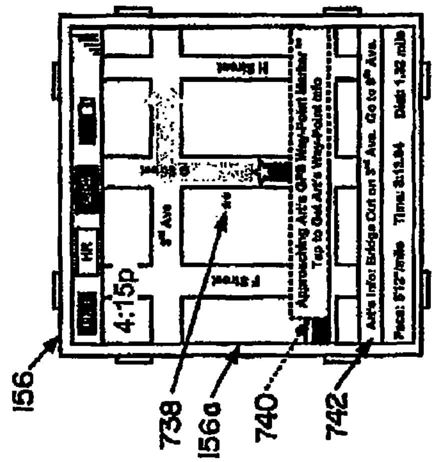

As noted above, the watch 100 (or other portable device carried by the user during the performance) may include an interface display 156*a* that shows features of the route (e.g., like a map, a satellite (or other) image, etc.). The interface display 108*a* also may include graphics to show the locations of markers left by the user (or by others), particularly markers that include some desired information relating to the route associated with them. This feature is shown, for example, in FIG. 155 by icon 738. As the user approaches the location associated with a geographical marker (e.g., as determined by GPS), information relating to the marker could be provided to the user, either automatically or after the watch 100 receives a reply to a prompt presented to the user during the performance. For example, as shown in FIG. 155, as the user approaches the way-point marker 738 location, the watch could beep or vibrate and display in a dialog box 740 a prompt such as "Want way-point info?" If the answer is affirmative (or automatically), the way-point information (which may be left by anyone in the community) may be displayed, at least temporarily, for example, in the display bar 742 (e.g., temporarily replacing the route bar 702).

Figure 156:
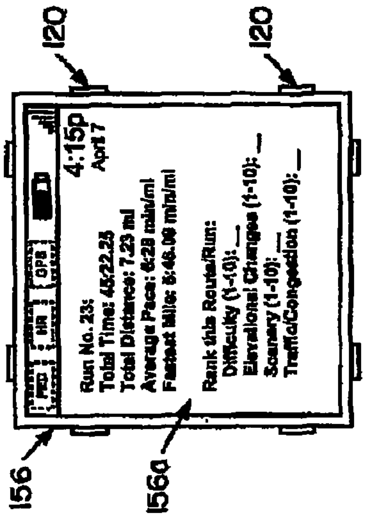

Systems and methods in accordance with at least some examples of this invention may be programmed and adapted to give the user an opportunity to enter information into the watch, e.g., upon completion of the performance. For example, as shown in FIG. 156, the system and method could be programmed and adapted to accept input (or prompt the user via display interface 156*a* to enter input) rating various features of the route just completed. The rated features may include, for example, the user's subjective rankings of various features of the route, such as difficulty, views (aesthetics), notable elevational changes, availability of facilities (e.g., drinking stations, public restrooms, child care, public transportation, etc.), road conditions, lighting conditions, remoteness, etc. As one more specific example, if a user decides to enter rating information at the completion of a performance, the watch 100 may prompt the user to rank (e.g., between 1 and 5) the various categories noted above, e.g., stepping the user through each specific category and asking for his/her ranking for that category. The user may input data using buttons 120, a touch screen, etc. This information can be stored locally on the watch 100 and then later uploaded to the website or other community interface (if desired) so that others can take advantage of this user's experience with, opinion of, and knowledge of the route. Optionally, after the ranking information is uploaded, the user could be prompted to add more information or comments, if desired, that may be made available to the overall community or at least some portion thereof (e.g., to a user predefined group). The user's rankings may be saved with other information, such as the time of day ran, the weather conditions, the direction ran, etc.

Figure 157:
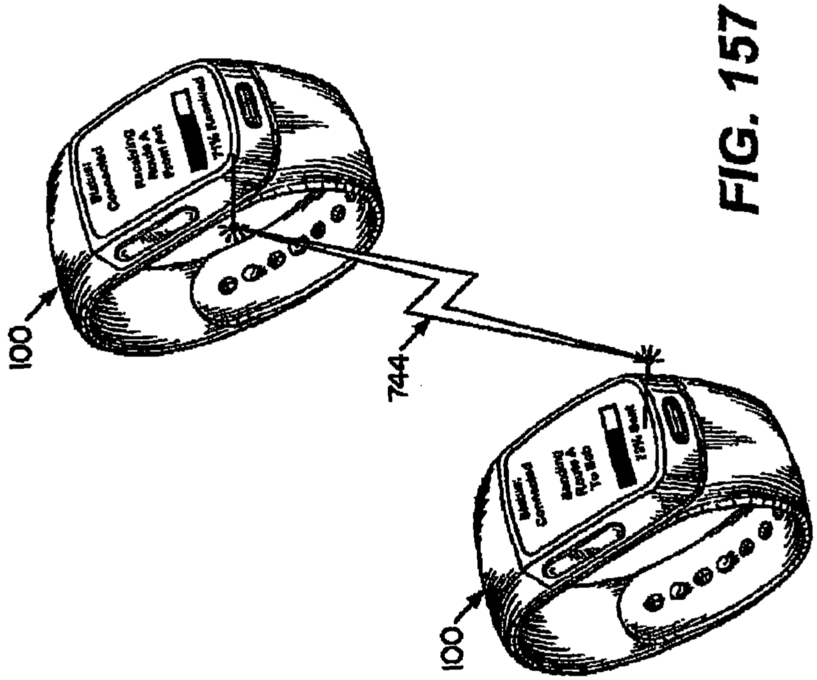

The actual portable device (e.g., watch 100) carried by the user during the athletic performance optionally may include other hardware and features as well. For example, as illustrated in FIG. 157, if desired, two watches 100 (or other portable devices) may include hardware and software to allow them to directly communicate with one another without the need for the website, network, and/or any intermediate equipment (e.g., a peer-to-peer communication type system, such as an IR beam transmitter and receiver, instant messaging capabilities, etc.). This is illustrated in FIG. 157 by the communications connection icon 744. In this manner, two users of systems and methods according to this invention may communicate directly with one another, e.g., to exchange routes, GPS based locational markers or way-points, GPS based challenges, GPS triggered route information, etc. If desired, when a route is conveyed in this manner, the beaming party's best time on that route (or one or more segments thereof) could be beamed as well and used to automatically set up a challenge to the receiving party. If desired, a wired connection also may be used to facilitate this data transfer.

Figure 158:
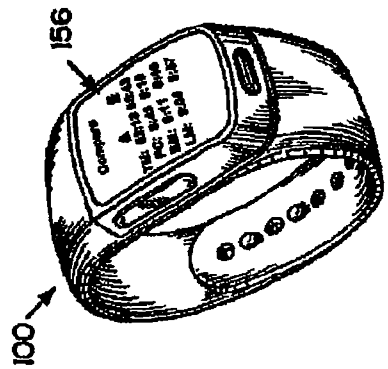

Direct watch-to-watch communication as shown in FIG. 157 may be used in other situations as well. For example, after a race is completed or after two (or more) users have completed the same route, one user could transmit his or her performance data to another user's watch 100. Then, the receiving watch 100 may be programmed and adapted to provide some type of comparison of the two parties' performance data. This comparison may take on any desired form without departing from this invention. For example, as illustrated in FIG. 158, the display screen 108 may display a comparison of the two parties' various race metrics (e.g., overall time, average pace, top pace, best mile, lap times, split times, times between markers or way-points, etc.), e.g., in a side-by-side relationship, in a table, in a scrolling or rolling fashion, in a graph, in a "results board," etc. As another example, if desired, the receiving watch 100 could be programmed and adapted to display a virtual race between the two users, for example, by moving different icons (representing the different racers) around a graphical representation of the route displayed on the device 100. Such systems and methods can be very useful to allow racers to make a direct comparison of their results, optionally while still at the event, even if their starting times were staggered or even if the users ran the route at completely difference times. While FIG. 158 shows a comparison of the results of two users, any number of results can be compared without departing from this invention.

Figure 159B:
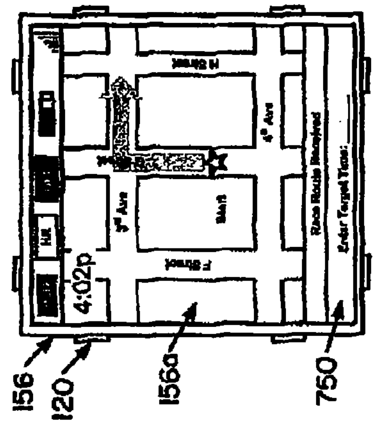
Figure 159C:
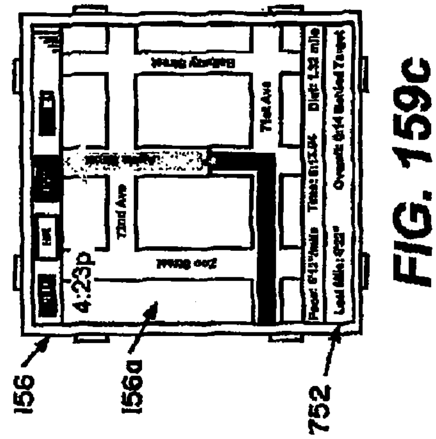
Figure 159A:
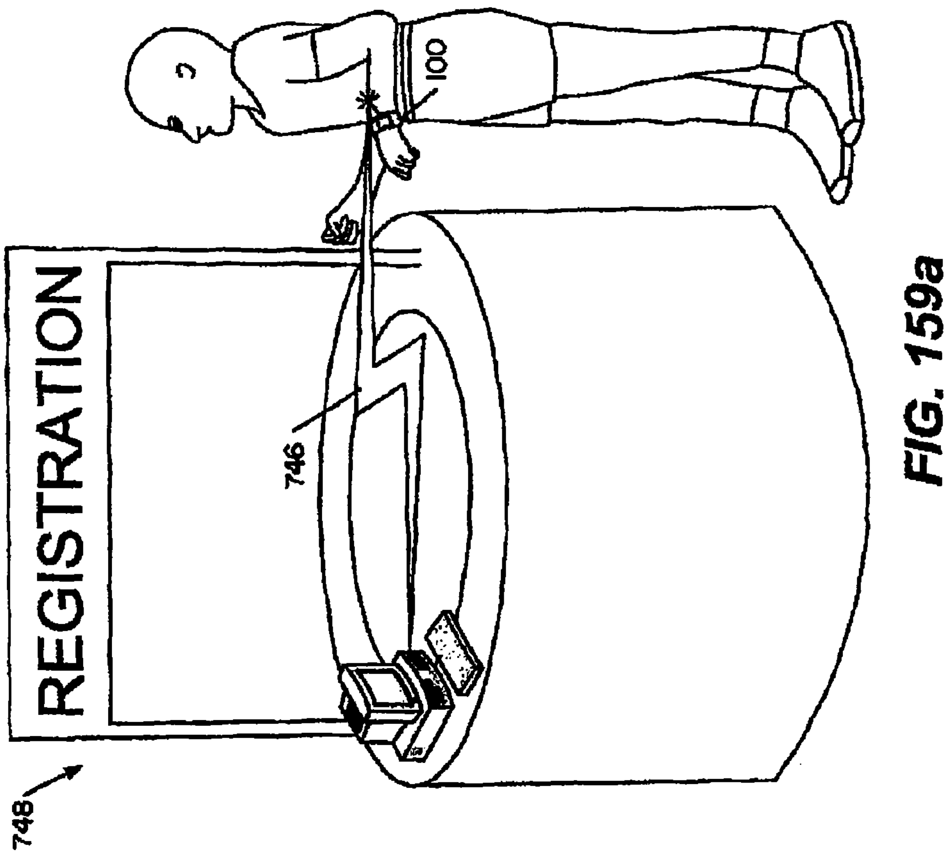

As other potential features, as shown in FIGS. 159*a* through 159*c*, watch devices 100 in accordance with at least some examples of this invention may be equipped, programmed, and adapted to receive data at an event, such as data relating to a race course directly transmitted to the watch 100 when registering for the event on the day of the event. This is illustrated in FIG. 159*a* by the transmission icon 746 (wired or wireless communication) at a registration kiosk 748 sending information to the watch 100. Once received, the watch 100 could be programmed and adapted to prompt the user to enter a target time for the event (see interface element 750 in FIG. 159*b*, which represents the watch interface 156*a* at a pre-race time), or a target time could be pre-stored in the watch 100, such as through watch inputs 120 or user input downloaded to the watch 100 from the website system. The watch 100 then could be programmed and adapted to help the user pace himself or herself to meet the desired timing goal, set up desired split times to reach the goal, produce an estimated time for completion of the race or segment based on the current and past paces, etc. See, for example, the information provided in dialog box 752 in FIG. 159*c*, which represents the watch interface 159*c* during the race. Optionally, if desired, the pacing and/or timing data could be determined taking into account stored information about the user's recent training performances and geographic characteristics of the race route and the user's training performances (e.g., to more accurately predict pace and estimated times for running hilly or flat sections of the race day course or for early in the event v. late in the event, the pace and target split times generated by the watch's controller may take into account stored data generated by the user when running similar terrain or similar race lengths while training).

As noted above, watches 100 (or other portable devices carried during an athletic performance) in accordance with at least some examples of this invention further may include hardware and functionality so as to allow the watch to receive user input in various forms (e.g., buttons, touch screen, gesture recognition, stylus input, roller ball input, etc.). If desired, these portable devices 100 also may be equipped to accept verbal or audio input. During an athletic performance, a user could speak into a microphone (e.g., provided as part of the watch hardware as operatively coupled to the watch 100, engaged with an input port on the watch 100, etc.), and the watch 100 could store the audio message. Also, as noted above, this type of audio input may be tagged to the specific geographic location at which it was entered (as determined using the GPS data). The user could use the recorded message during later review or upload of the performance data (e.g., on the website), e.g., to produce route tips (e.g., "run on the north side of Jefferson Road to avoid the big dog"), to produce reminders or encouragement (race related or other), to identify points of interest along the route, etc. As another example option, the recorded audio could be stored on the watch and played back to the user the next time he or she approaches the same geographic location.

Watches or other portable devices in accordance with this invention may include any feature, combination of features, or all of the features described above, as well as other features and functionality, including features and functionality described below.

User Experience on the Computer (e.g., Computer 650) Connected to the Network The inclusion of GPS based features in systems and methods in accordance with at least some examples of this invention will result in the inclusion of various additional features on the user interface 662*a* for a website, such as the Remote Site 660 described above, or other computing environment in which the athletic performance data can be reviewed, processed, or the like and in which enhanced or other functionality can be accessed (e.g., a website feature similar to that publicly available at www.nikeplus.com). Some more specific examples of these features and functionality will be described in more detail below. Also, if desired, some or all of these features and functionality (or a somewhat modified or reduced version of these features and functionality) may be made available directly on the watch device 100 and its interface 156*a* and display 156 without departing from this invention.

As one more specific example, systems and methods in accordance with at least some examples of this invention may include various calibration features that are available to users. As noted above, athletic performance monitoring systems that include both GPS capabilities (616/618) and pressure or impact sensing pedometer type functionality (e.g., sensors 622) or other speed/distance measurement functionality may be programmed and adapted to use the GPS data and information to provide and produce calibration or correction data for the pedometer based sensor 622 (or other sensors).

Figure 160A:
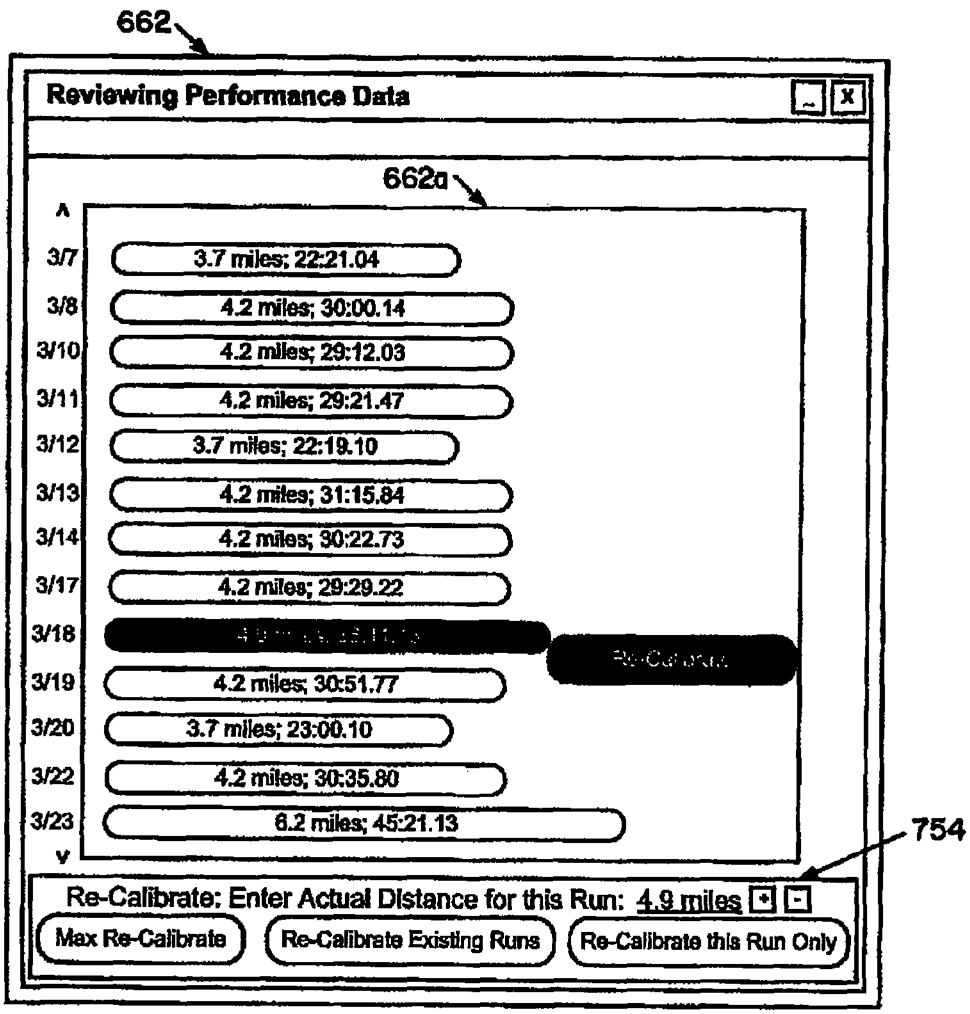
Figure 160B:
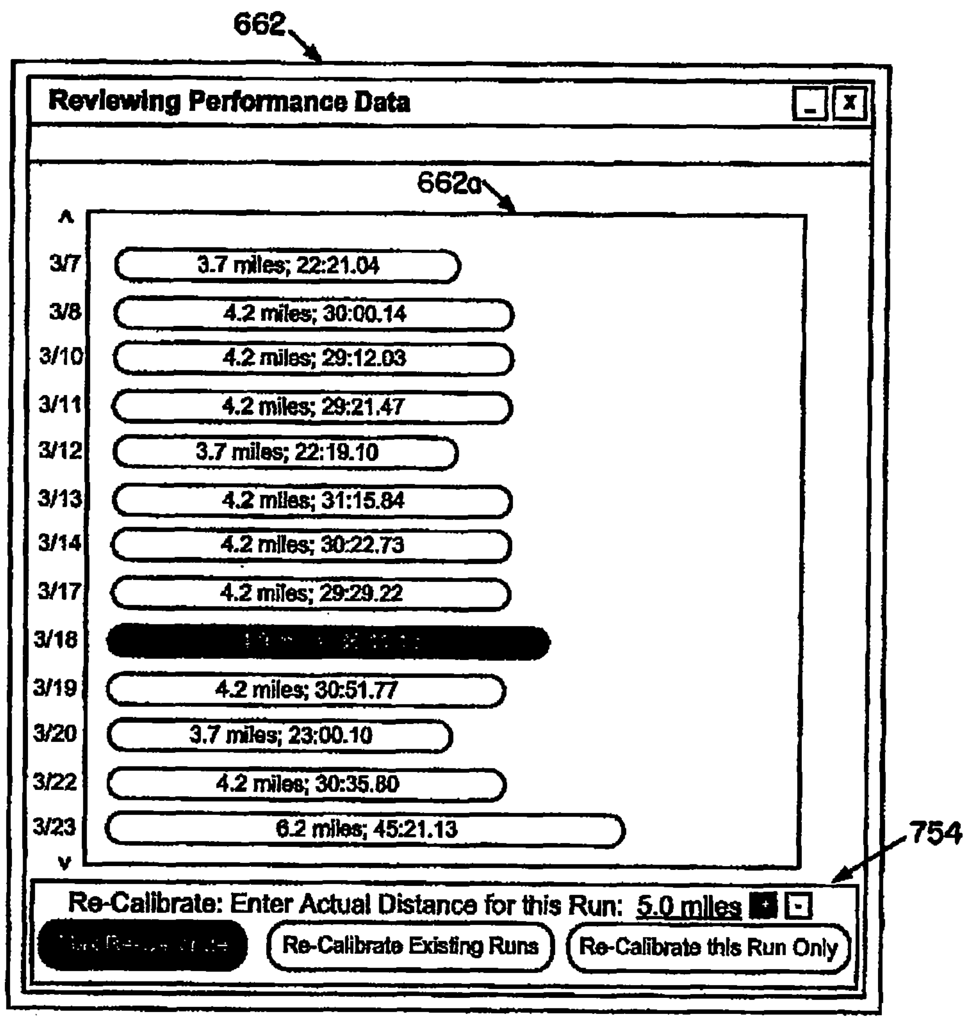

Additional calibration or correction functionality is possible with systems and methods in accordance with examples of this invention. For example, systems and methods in accordance with examples of this invention may allow a user to use data from newly posted runs for calibration or correction of other earlier runs. At a given time of an athletic performance, the user may not have known the precise distance of the run (e.g., if a run was made without GPS availability). That distance may later become known to the user in some manner (e.g., by measuring it, remembering it, obtaining it from another source, obtaining it from later GPS readings on the same route, etc.). If desired, through the interface 662*a*, as shown in FIGS. 160*a* and 160*b*, the user could go back to the data relating to that run and insert the now known distance for that run. As shown in the example interface 662*a* of FIG. 160*a*, the user has selected the 3/18 run (4.9 miles; time: 36:11.13) for calibration or correction. This selection provides an interface box 754 in which the user can adjust the distance for that run. As shown by a comparison of FIGS. 160*a* and 160*b*, in this example, the user changed the distance of the 3/18 run from 4.9 miles to 5.0 miles. Then, in this example arrangement, the user must decide the extent to which to use the data for this run for recalibration or correction purposes. For example, as shown in input interface box 754, the user could use this data to recalculate the distances and other metrics for this run only, for any existing uncalibrated runs, for any existing runs (calibrated or not), for "maximum recalibration" purposes (i.e., use this data for past runs as well as for future runs), for correction only of data that included this same route, etc. Moreover, if necessary or desired, information from this recalibration or correction command may be downloaded to the watch 100 and/or to the sensors 622 to recalibrate their output. Once the desired level of use of this recalibration data is selected, systems and methods according to this example of the invention could then make corrections to the data for that run, as well as other applicable runs (e.g., at least those runs made on the same or similar routes, under the same or similar performance conditions, etc.), and adjust the pace, speed, and/or distance data for the applicable run(s).

Data for this type of "after the fact" calibration or correction of pedometer data may be received from sources other than the original runner of the route (i.e., other than the person with whom the run data is associated and whose data is being corrected). For example, if Runner A runs a route (e.g., without benefit of GPS) and learns that another runner (Runner B) with GPS has run the same route (at the same or a different time), then Runner B's distance information via GPS may be used to correct the distance of the Runner A's data and/or to calibrate Runner A's pedometer data for future use. If desired, systems and methods according to at least some examples of this invention may collect distance data from multiple users associated with a specific route and use this collection of data (e.g., an average, a median, etc.) as the standard or default distance for that route and for calibration purposes, for multiple and future users of that same route. The data for calibration can be applied after the fact, on historical data, and/or for forward use for multiple users.

Figure 161A:
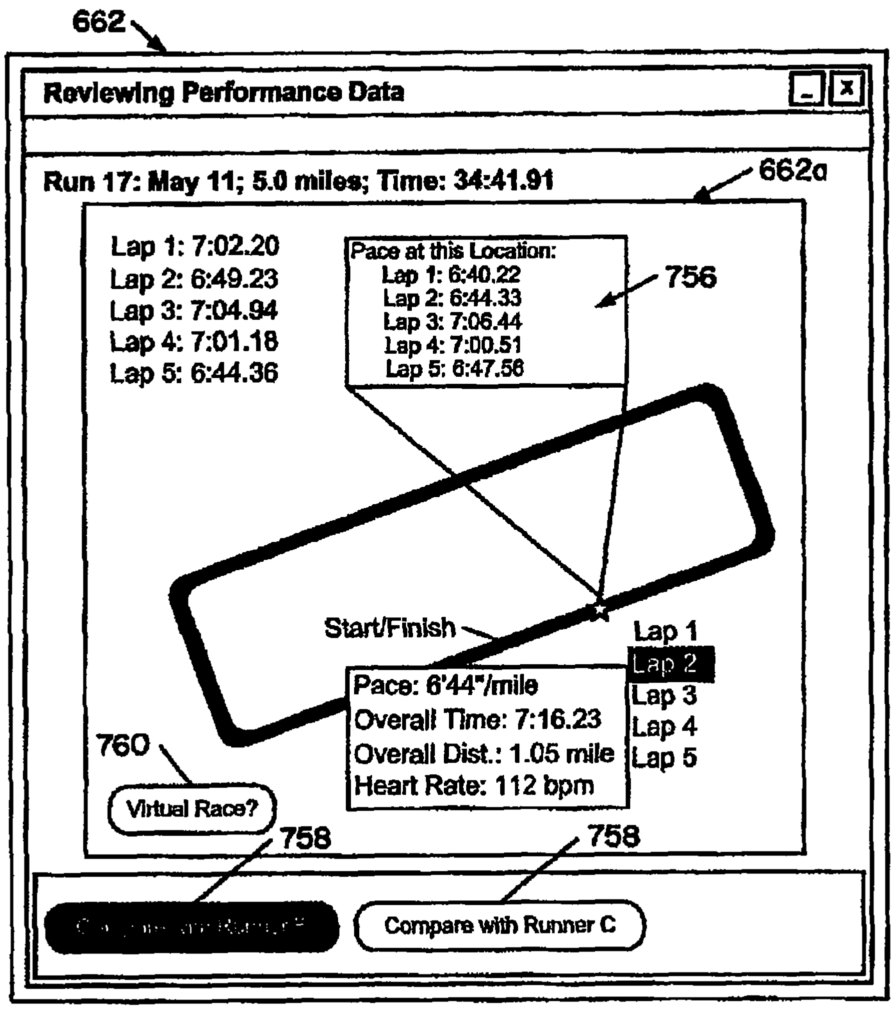

Using GPS, systems and methods according to at least some examples of this invention can automatically record and display data relating to laps around a circuitous route, such as a track. One example of such a display interface 662*a* is shown in FIG. 161*a*. In such a display, instantaneous speed, distance, pace, or other data associated with the athletic performance may be geographically and chronologically tagged (using the GPS and chronograph data), so that data at various different locations around a lap can be saved, compared, etc. Moreover, data at specific locations over plural laps can be saved, compared, etc., e.g., as shown by interface element 756, to give the user a better idea of the changes in his or her performance at various different locations, over the course of the performance (e.g., as the distance grew longer, as the overall running time increased, at the same "top of the hill" location, etc.). Such data may be useful for training, coaching, etc. In the same manner, information associated with various user created markers or way-points (such as pace data between markers, etc.) also may be viewed and otherwise interacted with through the website (e.g., to add data, pictures, photos, audio, video, text, graphics, animation, etc.).

Figure 161B:
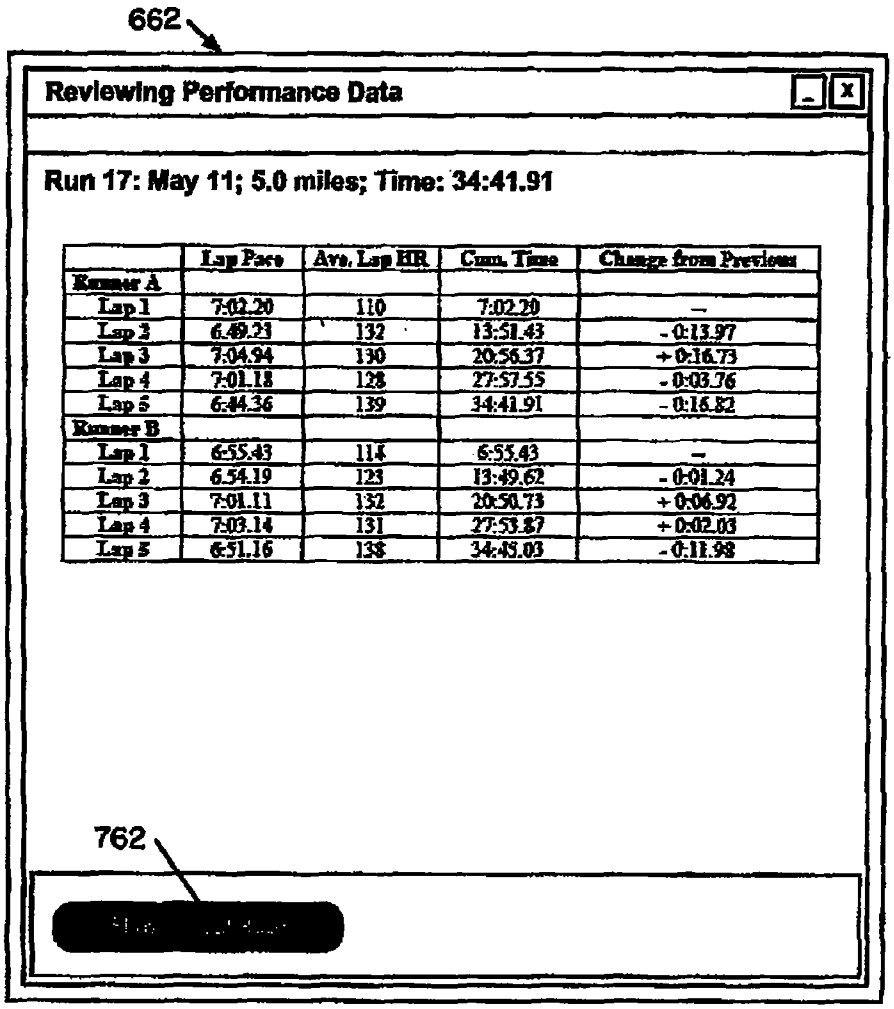
Figure 161C:
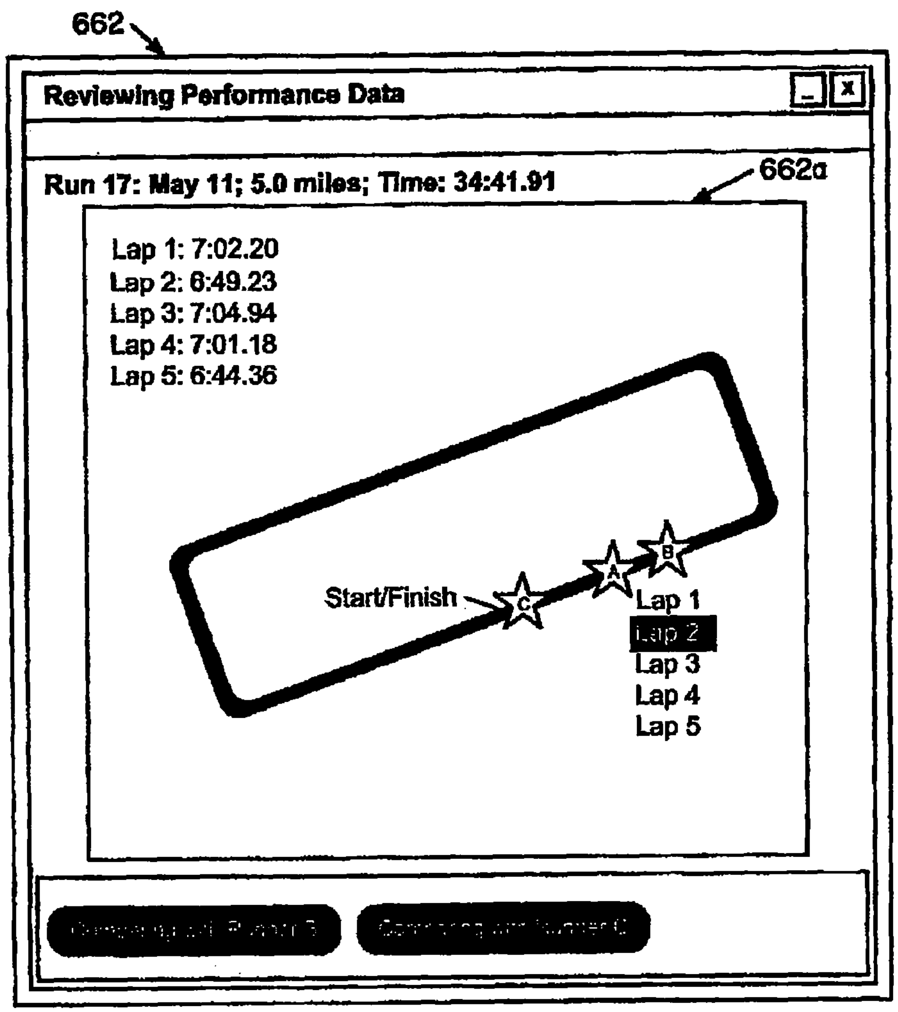

Multiple trips between the markers or way-points, by one or more users of systems and methods according to this invention, may be viewed, compared, and/or otherwise processed, e.g., by other users on their watch or through the website. One example display 662 of such information over multiple laps for multiple users is shown in FIG. 161*b*. The information in FIG. 161*b* may be launched, for example, by user interaction with one or more comparison icons 758 shown in FIG. 161*a* (the data for any desired number of runners may be compared without departing from this invention). Additionally or alternatively, if desired, a user may interact with a "virtual race" icon 760 shown in FIGS. 161*a* and 161*b* to display the virtual race between any selected time sets (e.g., race timing data of multiple users, race timing data for two different performances by the same user, etc.). Different icons or avatars representing the various virtual race participants may be displayed on the race route (e.g., a map or other representation of the route) with the locations of the virtual race participants (and desired number of participants) controlled by that participant's athletic performance data. An example of such a virtual race between three runners is shown in FIG. 161*c*. Such virtual race data may allow users to compare their performances against others at any desired time, even when the races were run at different times (or optionally, even at different locations).

Figure 162B:
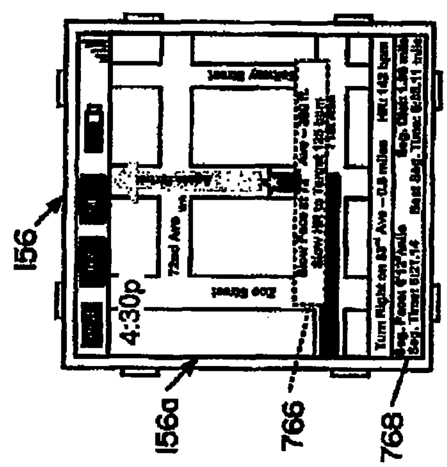
Figure 162A:
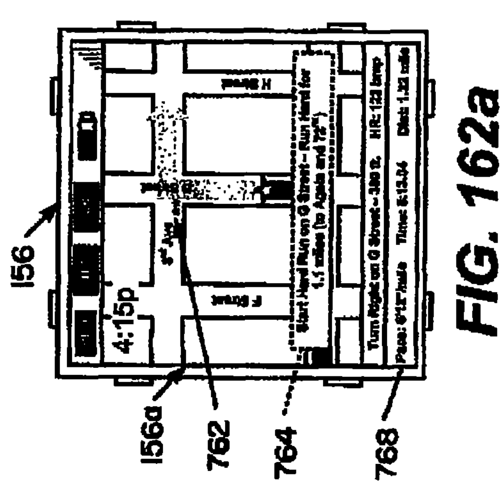

GPS functionality also may be useful to set up (e.g., on the website via interface 662*a*) and automatically provide to the user (using the watch 100) an "interval" or other coaching or training program, which would provide the user with prompts (via the watch 100) as to when to begin a run, begin a hard run, stop the hard run, begin another hard run, etc. One example is shown in FIGS. 162*a* and 162*b*. As shown in FIG. 162*a*, as the user approaches one predetermined location (illustrated by icon 762), the watch display 156 will include a dialog box 764 to provide coaching or training instructions (this information also could be conveyed audibly, for example, over headphones). In this illustrated example, dialog box 764 prompts the user to begin a hard run at G Street which will last for 1.1 miles. At the end of this segment, the watch display 108 will include a dialog box 766 to provide different instructions to the user. In this illustrated example, dialog box 766 prompts the user to slow his/her pace and to slow the heart rate to a target of 125 bpm. Notably, in this example, at least toward the end of the high pace segment, the performance bar 768 changes from providing instantaneous pace, overall time and overall distance information (FIG. 162*a*) to providing segment based information (see FIG. 162*b* and the displayed segment pace, segment time, segment distance, best previous time on this segment information). Any desired type of information and changes to the displayed information may be provided (including no changes in the displayed information) without departing from this invention. Additionally or alternatively, if desired, any of this information may be provided in another manner, such as audibly (e.g., over a speaker or headphones, etc.). The various steps in the interval or coaching program may be set up by the user; the user's coach, trainer, and/or physician; and/or by a computer algorithm.

Systems and methods in accordance with at least some examples of this invention may allow users to control various settings and features of the GPS system, the collection of GPS data via the watch, and its use of the data in data processing available through the watch or website, etc. For example, appropriate interfaces and data may be presented to the user, via the website, that will allow them to control various GPS related features of systems and methods according to this invention, including the various features described above. Some more specific examples of GPS features that may be controlled via the website include: GPS data polling frequency (e.g., to control battery usage); activation or deactivation of GPS features on the watch (such as turning on "turn-by-turn" route instructions, automatic marker placement, etc.); GPS assisted calibration features; marker or waypoint insertion, editing, or control; GPS assisted challenges or rewards (such as messages for third parties with a geographic tag, messages for oneself with a geographic tag, etc.); etc.

Figure 163B:
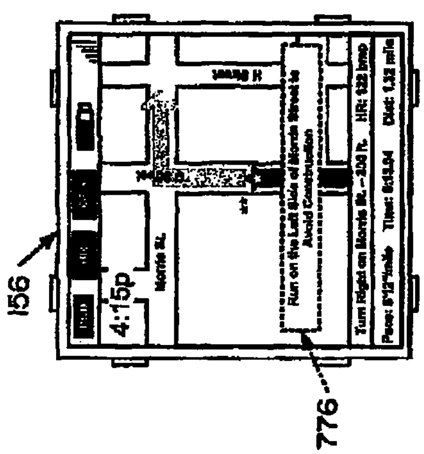
Figure 163A:
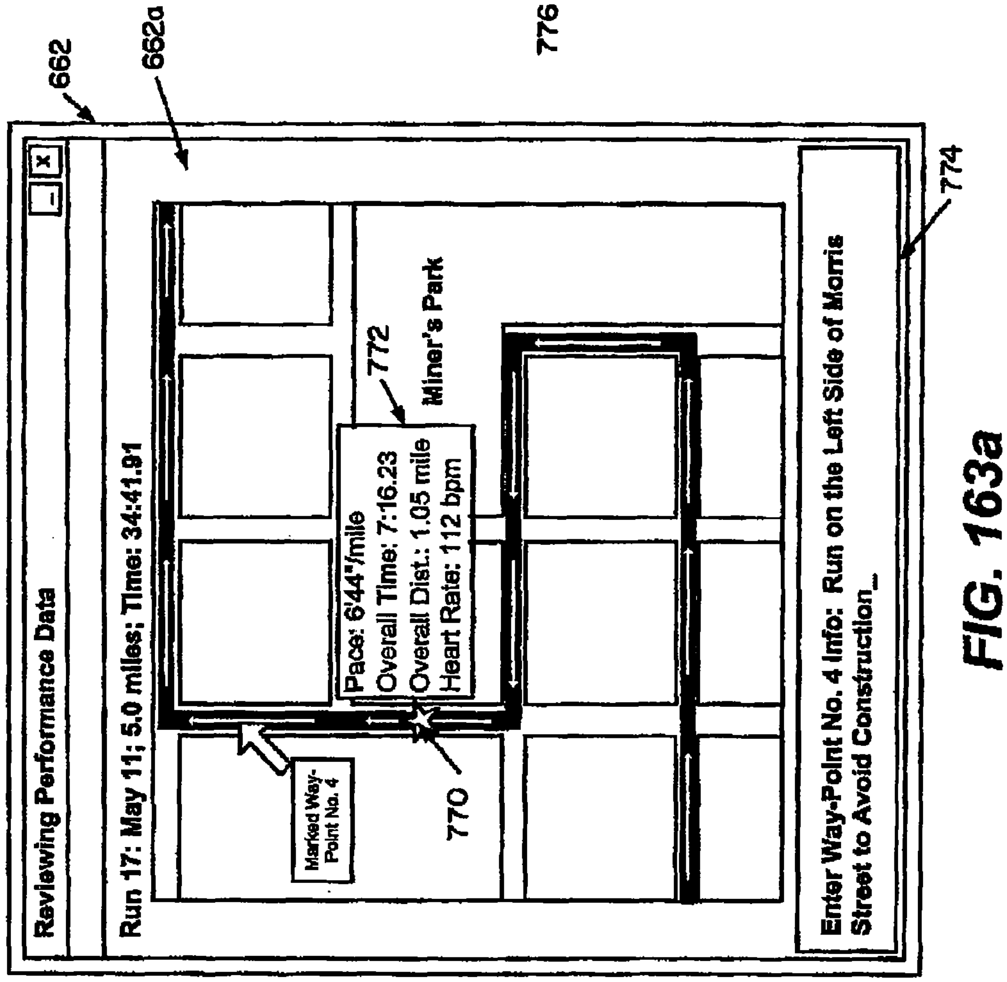

The inclusion of GPS data relating to the run routes also allows viewing of the run data on the watch (or other portable device) to be enhanced in various ways. For example, data and visual indicators relating to the runs may be superimposed or otherwise incorporated into renderings of maps, satellites pictures (e.g., Google Earth street view type pictures, etc.), or other graphical or pictorial representations of the appearance of the route. This is illustrated, for example, in the example display screen 662 of FIG. 163*a*. The user interface 662*a* of this example, including the presentation of the route on the display 662 (e.g., and optionally on the watch display 156*a*), may include map or other visual representations of the route in which the user is presented with "nodes" or other ways of interacting and/or "drilling down" at specific locations to get athletic performance data relating to that location (e.g., instantaneous pace, heart rate, pulse rate, pace up to that location, time into the race, time remaining, deviation from target pace, etc.). FIG. 163*a* shows one of these "nodes" 770 with the data (e.g., timing, physical, and/or physiological data) associated with that location displayed in interface box 772.

As noted above, the website features of systems and methods in accordance with at least some examples of this invention allow multiple users to share information, such as timing data, route data, challenges, etc. The systems and methods further allow users to share subjective information about routes or portions of routes, such as path type (trail, road, asphalt, concrete, stony, narrow, etc.), changes in path type, path condition information (e.g., "road construction has closed this block, go around it"), route difficulty information (and possibly different route difficulty information for one way around a route v. another or other ways around the route), scenic view information, running tip information (e.g., "run on the north side of the road for this block," etc.), facility information, etc. Any desired information may be entered by users and associated with a route, marker, way-point, route segment, or the like, without departing from this invention. For example, as shown in FIG. 163*a*, the website interface 662*a* may allow a user to enter information for the various marked way-points, such as Way-Point No. 4 illustrated in FIG. 163*a*. The information to be associated with this geographic tagged way-point may be entered, for example, via appropriate user interaction at input box 774. In this illustrated example, route suggestion information is provided via input box 774. Then, when this user (or other users) approaches this tagged way-point location (either on the same run route or a different run route from that used by the initial user that entered the geo-tagged information), their watch display 156 will display the suggested route information at box 776, as shown in FIG. 163*b*.

The information entered by users (e.g., associated with markers, way-points, marked route segments, routes, etc.) may be searchable by others (e.g., keyword searchable) to help better inform potential users of a route of the general characteristics and/or other information associated with that route. If desired, users can keep their individual information entered into the system private or available to only selected other users (e.g., persons designated as "friends," etc.).

As noted above, when several parties use athletic performance monitoring systems and methods according to this invention, a community of users and a collective knowledge and information database can be uploaded, stored, and maintained (e.g., at one or more separate servers, akin to the community aspects of the athletic performance monitoring systems and methods available from NIKE, Inc. of Beaverton, Oreg. under the trademark NIKE+). If users take the time to input information into the system, the knowledge and information from one user can benefit other users. For example, systems and methods according to examples of this invention may automatically, or through purposeful user input, collect data relating to various features of routes and users that ran the routes, such as the time when various individuals ran the route, the days on which they ran the route, the gender of the runner, the conditioning level of the runner, the direction that they ran around the route, the distance of that route from a specific location, route difficulty information, route elevational change information, subjective information (such as scenic beauty, facilities information, runner comfort information, etc.), etc. This type of information may be entered into the data system in various ways, such as by rankings, using predefined colors or code words ("black diamond," etc.), or simply as textual words or information. Such information (which then may be searchable) can be helpful for users that are traveling or new to a location (or new to running).

Other interesting features and advantages of the community aspects of systems and methods in accordance with this invention relate to the ability of persons to define groups of friends or training partners that may be granted at least some level of access to one another's performance data. The community and data sharing aspects of this invention can lead to a wide variety of challenges and other interactions between friends and partners that may be entered into systems and methods according to examples of this invention via the website or other networked user interface (e.g., available through a computing device to which the portable watch is connected for data upload and download). As some more specific examples, user's can develop challenges between one another that can help motivate and maintain interest in a workout program (e.g., most miles this month, most consecutive days staying on a specific training program, challenges on specific routes, challenges to make an elevational climb or run to a specific location, etc.). Also, as noted above, through systems and methods in accordance with at least some examples of this invention, user's can leave geographical based "rewards" or "carrots," such as verbal messages of encouragement or congratulation, that are downloaded onto a user's watch 100 (either with the user knowing of this download (as a motivational tool) or not knowing it (and will be surprised when the reward is activated)). Then, when the user reaches the predetermined location, as determined by GPS, the reward or carrot message will be activated (e.g., the watch may display, "Congratulations—way to get up that hill!"). As noted above, triggering of such a reward may be controlled so as to require at least some threshold workout performance so that the user cannot "cheat" to get the reward or otherwise inadvertently get the reward (e.g., by requiring pedometer sensor data output indicating a predetermined workout time or distance, etc.).

Users also could make up motivational games that rely on GPS locational information. For example, systems and methods according to this invention might track the number of times each individual within a group (e.g., a group of friends) reaches a goal, such as completing a 6 mile run, running to the top of a hill (optionally within a predefined timing and/or distance parameter), etc., and the system and method could identify those that accomplish the goal and provide this information to other members of the group (e.g., by a display, audio/video output, etc., when users within the group log in on the network, etc.). As another game, users could play "geo-tag" wherein the most recent user within a group to reach a geographical destination goal (e.g., the top of the hill, "King of the Hill," etc.) is identified for the group. A wide variety of GPS, geographical based motivational games and challenges may be developed for individuals, selected or predetermined groups, or the entire overall community of users without departing from this invention. Again, other sensor output may be monitored to assure that the goals are reached via actual workouts and not accidentally or in some other manner.

The inclusion of GPS data relating to the run routes also allows viewing of the run data on the website to be enhanced in various ways. For example, as noted above, data and visual indicators relating to the runs may be superimposed or otherwise incorporated into maps, satellites pictures (e.g., Google Earth street view type pictures, etc.), or other graphical or pictorial representations of the appearance of the route. The systems and methods also may be programmed and adapted to provide a "fly-through" preview of a route, e.g., on a map (e.g., street level, topographical, etc.), on satellite or other photos, etc. As additional examples, the systems and methods also may be programmed and adapted to provide a "fly-through" review of an actual run along route, e.g., on a map (e.g., street level, topographical, etc.), on satellite or other photos, etc., optionally with an avatar, picture, animation, or other graphical representation of the runner on the route. If desired, users may be allowed to add their own pictures or other data to enhance the depiction of the route (e.g., by uploading pictures or other images of themselves, of the scene (e.g., for non-road views, such as trails, etc.), etc.).

The website and networked aspects of this invention also are advantageous, along with the repeated connection of the watch device with the network to upload performance data, because these features allow users to readily receive software and firmware updates for the user interface to the computing device (e.g., downloadable to and through the computing device to which the watch is connected) and to the watch that connects to the computing device. These features can help keep the users up to date and provide the most recent advantages and features for both the interface and the watch.

Using the website and user interface features 662*a* from the computing device 650, users can also predefine various location based markers, way-points, or segments on a route of interest to them. For example, using the website features, systems and methods according to examples of this invention may be instructed to always mark a segment from one locational position to another (e.g., "from the end of the bridge to my house") and automatically take timing information for that segment. During the run, if desired, the user could be prompted when approaching this predefined segment and/or optionally challenged to beat their best time for the segment (or the best time of another who ran the segment, etc.). Providing the capability to mark such segments on the website and automatic activation of the desired functionality when these segments are approached helps the user avoid the inconvenience of marking segments using the watch device 100 and/or repeatedly marking the same segments or otherwise interacting with the watch 100 time after time when the route is run. This capability also makes the comparison of data for the segment more meaningful and accurate because the same starting and ending points are always used.

Another advantageous feature that may be provided in systems and methods in accordance with at least some examples of this invention is the ability to develop "one way routes." In some instances, a user may wish to run to a location that is beyond their normal one way run distance or beyond their capabilities for reaching in a round trip workout. In other words, if the user ran to that desired location one way, it may be beyond their ability or desire to also run back on the return trip (or the return would take a long time should they walk, etc.), for example, due to distance, elevational changes, available time, etc. This can hinder a runner's ability to challenge himself or herself and/or may adversely impact his/her enjoyment of the outing (e.g., if scenic views are located more toward the end of the route). Systems and methods according to at least some examples of this invention may allow a user to create a route via the interface 662*a* including a starting location and an ending location and then have the systems determine suitable public transportation directions or information (e.g., bus routes and schedules, subway routes, taxi calls, etc.) for the return trip to the starting location (or to another desired location).

Systems and methods in accordance with at least some examples of this invention also may be programmed and adapted to allow insertion and storage of information relating to workout "types" (either automatically or through user input). Much of the above discussion utilizes running as an example of the type of workout conducted. Systems and methods according to examples of this invention, including various GPS features and functionality as described herein, may be used for other types of workouts, such as biking, swimming, walking, hiking, mountain climbing, rowing, driving, skiing, yachting, etc. If desired, for an individual workout, the workout type may be defined or input into the system (e.g., on the watch 100 before the workout begins or after it ends, on the website after the workout data is uploaded, etc.). This may be accomplished, for example, by providing the user with a list or "drop down" type menu from which the workout type may be selected. As another example, the workout type may be automatically detected, e.g., by considering the GPS location of the event (e.g., if on water, it is defined as a swimming, rowing, or yachting event, depending on the movement speed as determined by GPS or other; if on land, running or biking, depending on the movement speed as determined by GPS; if during the winter, skiing if at a mountain location, etc.). In at least some instances, the type of path also may be automatically detected using GPS and map data (e.g., road, sidewalk, trail, water, ski hill, park, etc.). The workout type also may be automatically detected based on various features, such as the type or characteristics of the non-GPS sensor output generated to measure the speed and/or distance (e.g., sensor output indicating a running step will appear different from sensor output indicating movement on an elliptical machine, a bicycle, a rowing machine, etc.), etc. Automatic detection of workout type also may be made possible by interaction or data exchange between the watch 100 and the equipment being used during the workout wherein the watch is able to discern the identity of the type of equipment being used by ID data transmitted to the watch (e.g., different ID data from a bicycle v. oar locks v. skis v. elliptical machine v. pedometer, etc.). If errors in workout type determination are made by the automatic detection system, a user may be given the ability to override and correct the data.

Systems and methods according to at least some examples of this invention also may allow users within a community setting (e.g., among a group of friends) to automatically discover routes or segments of routes run by others in the overall community or group. As a more specific example, routes run by some of a user's community or group also may be downloaded to the user's watch during a networked session. If that user later runs in a location close to a location of a friend's route (or segment of a route), as determined by the GPS data during the run, the watch may be programmed and adapted to advise the user that he or she is near the friend's route (or segment) and ask the user if he or she would like to run the friend's route (or segment) (e.g., the watch may display, "You are near a route that Friend A runs. Want to run it?"). Additionally, the friend's best time on that route or segment may be provided to the user as a "challenge." In at least some examples of this invention, the users need not take any action to have these routes downloaded to their watch (e.g., this could occur automatically during the data exchange while the user is uploading workout data from the watch to the website). As another example, systems and methods according to the invention could be programmed and adapted to automatically suggest other routes to a user (optionally having similar characteristics), e.g., from the watch or during a post-workout on-line analysis time period, based on a currently or recently run route and/or based on one or more previously stored routes. The suggestion and use of different routes can help keep the user from getting bored with their workout routine.

Figure 164:
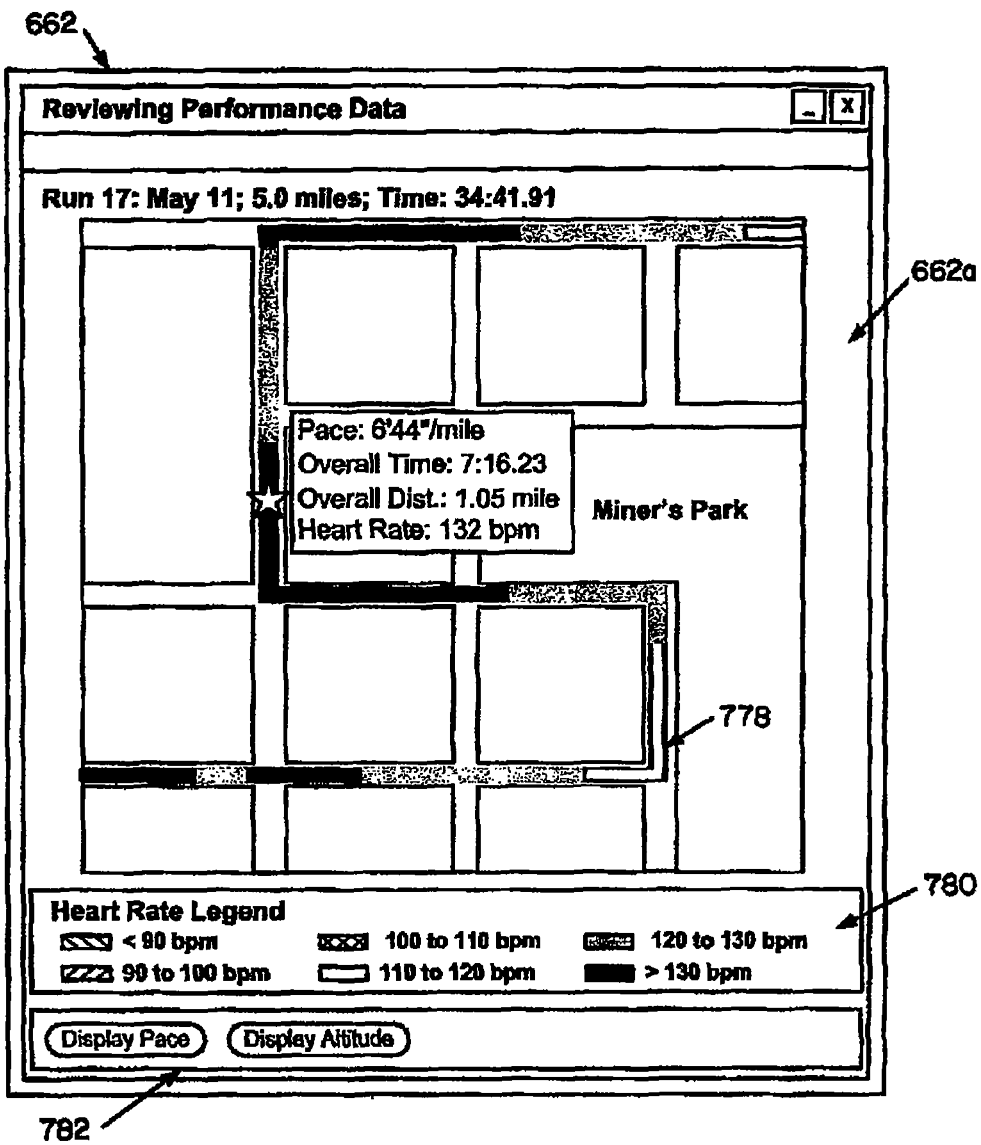

One potential feature of systems and methods in accordance with examples of this invention relates to the display of the workout data on the user interface (e.g., optionally overlaid on map or photo data, as described above). If desired, characteristics of the displayed run line may be coded to provide information to the user regarding the workout. FIG. 164 illustrates one more specific example. As shown in this figure, the color (or other appearance characteristics) of the route 778 ran may be changed over the course of the displayed run route to indicate different physical or physiological features or characteristics of the route and/or the athletic performance. Additionally, the legend 780 provides information to allow the user to correspond the displayed color to one or more specific features of the run, such as heart rate range in this example. While FIG. 164 illustrates that the route color is changed based on the determined heart rate at various locations along the route, other data and information may be provided. For example, the changes in route color may on the interface 662*a* may correspond to changes in pace, changes in altitude, etc. If desired, a user could have the ability to switch between different monitored metrics (or this could be accomplished automatically, such as by a periodic switch between parameters over time) so that at one time the representation of the route 778 may be color coded for one metric (e.g., pace) and at a later time the route 778 may be color coded for another metric (e.g., heart rate or altitude). An example of this feature is illustrated in FIG. 164 by the interface elements 782 that allow the user to selectively change the displayed route 778 between one parameter and another. As another alternative, if desired, the representation of the route 778 could be split so as to simultaneously provide information relating to more than one parameter. Providing this information to the user along with the representation of the route 2600 can help provide valuable training or coaching information that can help the user improve his or her performance.

Additional Potential Features of Systems and Methods According to Examples of the Invention The inclusion of GPS or other athletic performance monitoring features in systems and methods according to this invention provides the capability of including still other features and functionality. Various examples of such features and functionality will be described in more detail below.

For people that perform certain activities (e.g., golf) or that run within a city or more populated areas, their “active time” during the performance may be of more interest than the overall total time spent in the activity. More specifically, during any given workout (including runs), the workout time may include at least two different time frames of interest, namely, a “total time” (e.g., from the time the workout mode is activated until it is ended) and an “active time” within that total time. These two time periods may differ for any of a variety of reasons, such as: stopping at crosswalks or red lights, pausing to talk to someone along the route, stopping to check or get directions, stopping to look at something along the route, stopping to hit a golf shot, waiting between plays or periods (e.g., in football, baseball, basketball, hockey, etc.), timeouts, sitting on the bench, resting, etc. These delays may cause undesired inaccuracies in the recorded data (e.g., not stopping the time counter during an unintended or unavoidable delay could substantially lower the pace determination). Accordingly, using the GPS system 616/618 and the pedometer type sensor 622 (or other sensors for other types of athletic activities), systems and methods according to at least some examples of this invention may determine when a user has stopped moving and stop the “active time” clock, but the “total time” clock may be allowed to continue running In this manner, more accurate “pace” determinations can be made using only on the “active time” clock. Such a system may report to the user both the active time and the total time and give the user a choice of which time to use for the various calculations (e.g., “Your workout lasted 2 hours, but you only ran for 1.75 hours. Which time is more accurate for pace calculations?”).

In some instances, when stopped (e.g., at a stop light, to talk, etc.), a runner will run or jog in place. Systems and methods according to at least some examples of this invention also can detect such action automatically, e.g., by noting that the GPS location has not changed substantially but output from the pedometer sensor continues to be generated indicating foot contacts with the ground. Optionally, a change in characteristics of the foot contact with the ground (such as a change in the dynamic foot pressure profile or the angle of foot impact with the ground) may be detected to indicate a difference between actual running and running in place. In such instances, to maintain more accurate data, the “active time” clock could be stopped (so as to maintain more accurate “pace” calculations), but the overall calorie burn count may be continued (perhaps with a different calorie burn rate) and the total time may continue accumulating.

This “auto-pausing” of the “active time” clock feature, however, may not be desired in all situations. For example, for races or other competitions (as opposed to general training or workouts) one would not want the “total time” clock to differ from the “active time” clock Accordingly, systems and methods according to at least some examples of this invention may allow the user to selectively switch on and off the “auto-pausing” feature. Alternatively, if desired, systems and methods according to at least some examples of this invention may automatically switch this feature on and off, at least in some instances. For example, if a race was being held at over a certain time frame and at a certain location and this information was downloaded to the watch, the watch could automatically detect if the user is at the specified location (using GPS), moving along the specified route (using GPS), within the noted time frame. If these features of a performance are detected and the expected performance metrics are measured or present at the given time, then the watch may be programmed and adapted to automatically turn off the “auto-pause” feature and only track the “total time” that the user participates. If the user’s athletic performance takes place at a different time, at a different location, and/or along a different route, then the “auto-pause” functionality may be maintained (if the user desires it). In a multi-event workout, such as a triathlon, the auto-pause feature may be disabled so that all time is counted, even the time between active participation in the multiple events. Also, if desired, a “triathlon mode” may be provided so that the watch will automatically look for and switch between collecting swim type data, biking type data, and then running type data (or other data types for a specific combination of events).

Figure 165:
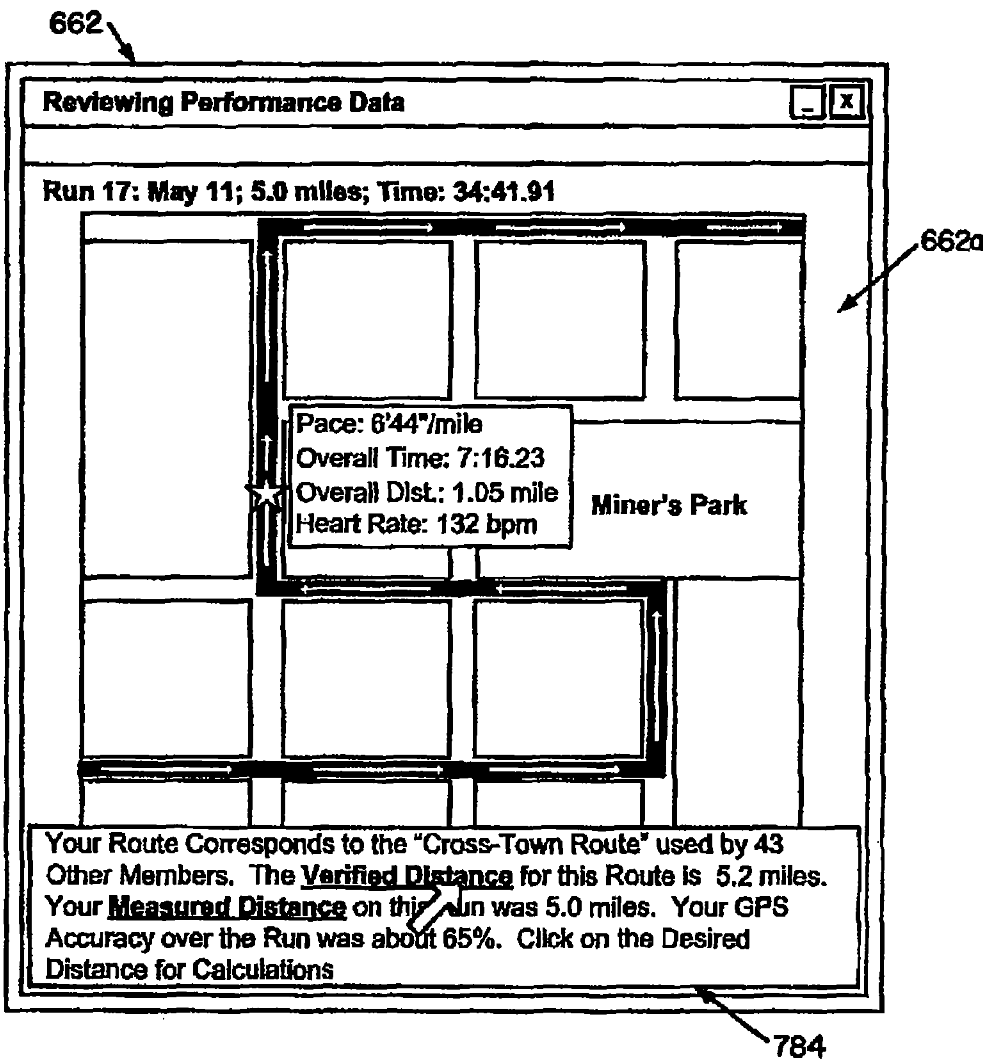

Various calibration features and functionality are described above. Even for a given route or route segment, however, the overall distance measured by the GPS system 616/618 or a pedometer system 622 may vary from one time to the next, e.g., due to where a person crosses streets, whether a person runs the inside or outside of a curve, GPS availability, etc. Systems and methods in accordance with at least some examples of this invention may use multiple sets of GPS and/or pedometer workout data for a given route or route segment (e.g., collected from one person or several people) to define an average or median “distance” for that specific route or segment (optionally a different average or median distance may be maintained for each direction in which the route or segment may be run). Once a desired level of data is collected for a given route or segment, the finally determined average or median distance may be used by systems and methods according to this invention as the "verified distance" for that route or segment for future calculations (for any users of systems and methods according to this invention, even users that did not have GPS data and only ran the route using the pedometer (assuming that they advise the systems and methods of the route taken)). FIG. 165 illustrates an example user interface 662*a* that includes such features. The data collected by the pedometer 622 and/or GPS 616/618 also may be checked and calibrated against this "verified distance" (even for users that did not run using GPS data, as noted above) so that more accurate data may be reported for that run and/or so that more accurate pedometer measurements may be made in the future, e.g., to provide better data when pre-determined routes are not traveled and/or when GPS data is unreliable or not utilized.

As another potential feature, systems and methods according to at least some examples of this invention may allow users to select a distance for a specific run or route (after the fact) from one of multiple potentially available sources. For any given run or route, several different sources of distance data may be available, e.g., the GPS system 616/618 data generated for the user during the run, the pedometer 622 data generated for the user during the run, community GPS or other data relating to prior measured data along that route (as described above), map data relating to that route, the "verified distance" described above, etc. After the run data is uploaded, the user may be queried as to which data source to use for measurement of distance on the route (and, optionally, which source is believed to be the most accurate). An example of this feature is shown by the user interface box 784 of FIG. 165. If cloud cover, trees, or tall buildings may have compromised the accuracy of the actually measured GPS data for a given run, a user may decide that his or her pedometer data or independent map data is more accurate for that day's run. If the user believes he or she may have strayed somewhat off the assigned route at some point or if their run included several non-linear segments (e.g., zigzags, etc.), he or she may decide that their actually generated pedometer and/or GPS data is most accurate for that day's run. The presentation of measurements from several different distance measurement sources to the user may enhance the user's confidence in the data and the overall system. Users also could be polled (e.g., when using the website) to comment or rate the accuracy of the route distance as determined by GPS or the pedometer, the route directions, or other features of the route. This information may be used by the system operator to identify portions of their routes and the distances correlated to these portions that may need to be reconsidered or remeasured to enhance accuracy.

In some instances, the system may track the perceived accuracy level of various data, such as the GPS data (e.g., by marking a "confidence level" or GPS signal strength level at various geographically tagged points along the way), and automatically use other data (or the most "confident data) when the GPS data falls below a threshold level. Confidence levels of this type may determined for any type of sensor and other data may be used at appropriate times to assure that the most accurate results possible are being obtained.

To encourage use of calibration features and to improve the overall accuracy of the data, systems and methods according to at least some examples of this invention may mark or display uncalibrated or uncorrected data on the website display different from data that has had its accuracy improved, e.g., via the various correction or calibration techniques described herein. FIG. 28 provides an example of such features. As shown in this figure, uncalibrated or uncorrected data could be presented in a different color (or other appearance feature) from calibrated or corrected data, a pop-up could appear advising that the data is uncalibrated and suggesting a calibration procedure, an audio or video indication could be provided, etc. As described above, various procedures may be made available in systems and methods according to this invention to calibrate or correct the data even after a workout is completed, and systems and methods according to this invention may use data generated outside of the actual workout and/or data generated by other parties to enhance any user's data accuracy. Therefore, when uncalibrated or uncorrected data is uploaded to the website, the interface 662*a* could prompt the user to correct the data (e.g., by displaying a message, such as "Want to auto-correct your measured data?"), and the user may be given a final opportunity to accept or reject the changes made by the auto-correction or calibration system.

Figure 166:
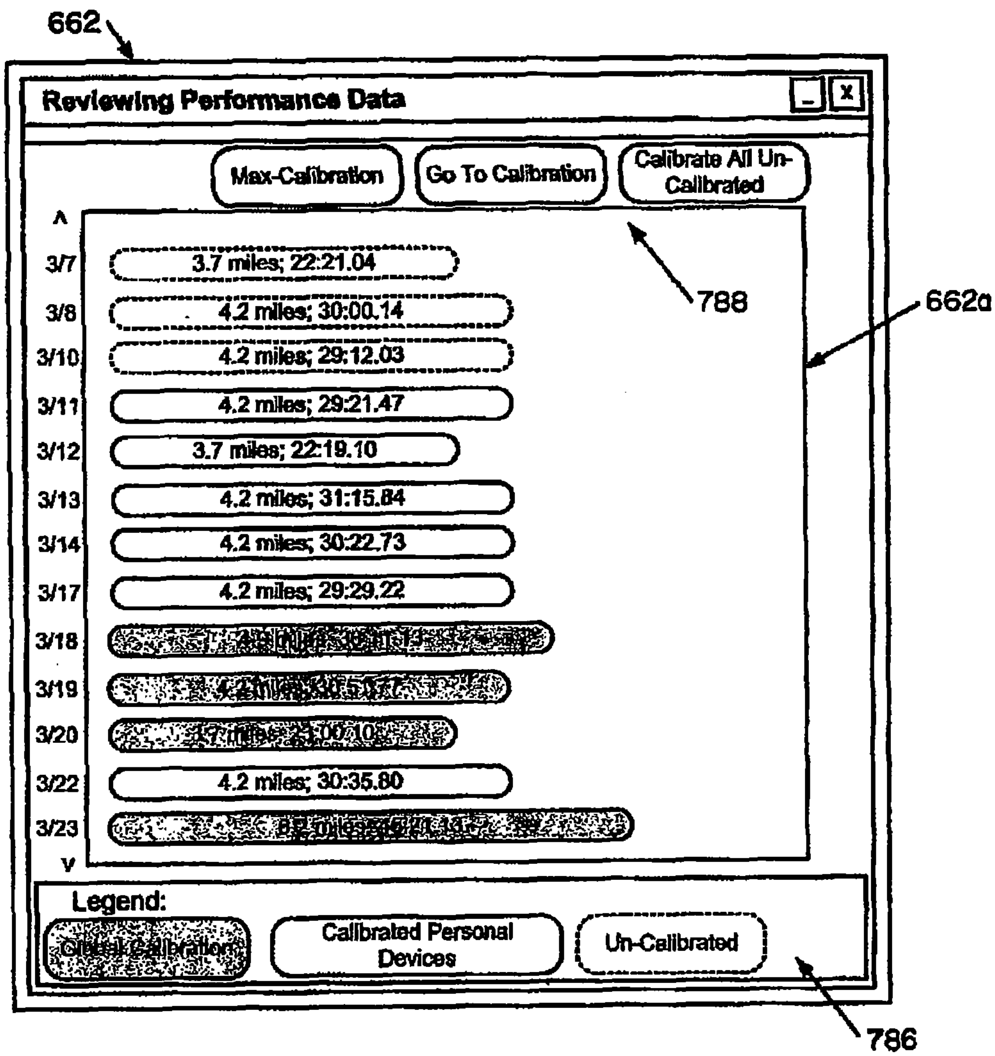

FIG. 166 illustrates an example interface 662*a* in which the degree of calibration or correction of various runs is displayed (e.g., as shown in the legend 786, the data may be un-calibrated, calibrated using the individual user's calibration technique, calibrated using global community information, etc.). The interface 662*a* may further provide various options to the user to calibrate the data, such as shown in interface area 788, which may provide options such as: calibration or correction of all using global data, calibration or correction of all previously un-calibrated data, calibration or correction of one or more individually selected runs, etc. Any desired interface and interaction options may be provided for these types of data calibration/correction features without departing from this invention.

Moreover, such auto-correction or auto-calibration features may allow systems and methods according to this invention to build a profile of correction factors for measured distance data (e.g., as measured by the pedometer 622 or other sensors) based on various characteristics of the run. As a more specific example, calibration or correction information may be stored for a variety of different paces, altitudes, elevation changes, early in a run v. late in a run, user heights (which will correlate to stride length), user inseam measurements (which will correlate to stride length), user weights, etc. Then, for a new run, the conditions of that run (or various portions of that run) may be considered against the conditions noted for the various stored calibration or correction factors and the most appropriate calibration or correction factor(s) for the run (or a portion of the run) may be used in the correction procedure. Thus, plural correction or calibration factors may be applied to correct the data for a single overall run (e.g., one correction factor used for flat portions, another for uphill portions, another for downhill portions, etc.), and different calibration or correction factors may be applied at the same location for different users.

Another feature that may be available on systems and methods in accordance with at least some examples of this invention relates to downloadable event packages. More specifically, for public (or other) events, such as marathons, triathlons, or other races, the course for the event may be downloaded to the user's system (e.g., via the website or networked computing device). These events may be located anywhere in the world. Using GPS, map, or other data, systems and methods according to this invention may be programmed and adapted to look for running courses or routes within the user's geographic area (or other areas, such as when the user is travelling) that will help train the user for the event. As some more specific examples, specific segments of the actual event course may be matched to specific locations within the user's local area. As a more specific example for elevational changes, if the actual event has a 0.5 mile hill that climbs an elevation 125 feet, systems and methods according to this invention may present to the user one or more local routes that have similar characteristics, optionally at a similar overall time in the race process (e.g., early in a training run, in the middle of a training run, late in a training run, etc.). Route path type and change in path type for the actual event also can be considered and mimicked by proper selection of routes in the local area. Such local training routes may better help the user prepare for the actual race.

Training of this type (e.g., using mimicked route information for a future event) may be useful to the runner in other ways as well. Data relating to the training at these specific mimic segments may be used during the actual event to help better estimate the user's time of finish as he or she is running in the actual event. When the event time and date arrives, the watch 100 will automatically know whether the user is at the event (e.g., from time, calendar, and GPS data), and it can enter a "race" mode for the event. For example, the watch 100 may be programmed and adapted to provide the user with course directional data or other previously stored information relating to the event. Also, data from the above-noted mimic training runs may be useful to help systems and methods according to this invention to automatically determine better pace target and/or split times for various locations and segments in the race to allow the user to finish the race within a pre-defined target time. The watch 100 also may be programmed and adapted to display an estimated finish time (absolute time or race timing information) as the race progresses (taking into account past pace during the race and predicted pace on approaching segments, optionally based at least in part on the mimic training data). These pace target and/or desired split times may be provided to or calculated by the watch 100 and used to give the runner feedback during the course of the event (e.g., to provide real-time feedback as to the need for pace changes to meet a time goal, etc.).

Rather than (or in addition to) determining local routes that mimic the event route (or portions thereof), downloadable event packs of this type also may be used to program a treadmill to provide a suitable training run or program for the user. For example, the incline profile of the treadmill may be changed to match or train the runner for the actual event, and/or the speed of the treadmill may be adjusted to the desired or target pace for the actual event (e.g., to meet a predetermined time goal). As an additional feature, if desired, the treadmill may be equipped with a video display that shows movement through the actual event location as the runner "runs the course" on the treadmill.

As noted above, if desired, systems and methods according to this invention may prompt users or others to rate, rank, or provide information relating to various routes or portions of routes. Various rating, ranking, or other information may be collected, such as elevation change on the route, direction of travel on the route, length of the route, surface(s) on the route, availability of facilities, environmental factors (e.g., windy, scenic, wet, etc.), construction information, route detour information, etc. A common ranking or rating system may be provided so as to allow an easy comparison of different routes and/or to allow users to better select appropriate new routes for their capabilities. Any desired ranking or rating system may be used, such as a "star" rating (e.g., 3 star difficulty), a numerical rating (e.g., a class 4 route for elevation changes), a color-coded rating (e.g., a black diamond rating), etc. The data from plural individuals on a given route may be collected and the finally assigned rating or ranking may be determined from the overall sample of ratings or rankings (e.g., an average, a median, etc.). The community system also could provide a rating system for the user's conditioning so that users could look at route ranking information from the point of view of other users having similar conditioning characteristics. The individual users' conditioning also may be taken into account in determining the system rankings for various routes (or different ranking rates may be provided by the system for different levels of conditioning).

Even if a common ranking system is not developed that takes into account data from numerous individuals, ratings and rankings from individuals may be useful to others. As another possible feature, systems and methods according to examples of this invention may allow one user to compare his or her rankings or thoughts about a route to another party's rankings or thoughts about that same route. By seeing how this other party ranked a route known to the user, the user may have a better idea of the characteristics of other routes that were also ranked by this same party (e.g., it may allow the user to compare his or her characterization of a route to another's characterization of that route to see if they have similar rankings of route difficulty). The route ranking information also may be searchable, if desired.

As described above, using the community environment features of systems and methods according to examples of this invention, a great deal of data relating to many different workout routes may be generated and collected. Some users may not wish for the overall community to have access to information about the routes he or she runs, at least not on an individual level. Accordingly, systems and methods according to examples of this invention may give users the opportunity to "opt out" of having its route data collected and shared, or at least provide anonymity and/or control and limit the amount of data and/or the number of users with which the data is shared.

As additional potential examples, if desired, systems and methods according to this invention could provide routes to various users as rewards for certain achievements and/or as workout incentives. For example, persons that cover a certain mileage or distance (optionally within a specified time period) may be sent a "reward route" in their geographical area and invited to post a time to that route. Other features may be included with the reward, such as gifts, etc. Such routes could be sent to the watch 100 either directly or through the community network connection described above.

If the portable device carried by the user (such as watch 100) has direct communication capabilities (e.g., via cellular telephone, WiFi, WAN, or other communications technology), if desired, users could receive real time updates regarding various routes, e.g., based on their current location as determined by GPS. Such information could include weather information, emergency information (either local or personal emergencies, such as information transmitted by the user's spouse or another), local police activity information, etc.

Systems and methods according to examples of this invention further may provide an "effort" metric that will allow users to compare activities on different routes. For example, one user's run data may indicate a 2 mile asphalt route having a 200 foot elevation gain completed in 18 minutes, while another user's data may indicate a 1.9 mile trail route with a 252 foot elevation gain completed in 21 minutes. Metrics could be developed to determine which user expended more "effort" in their respective workout. In addition to distance, timing, path type, altitude, and elevation gain, other factors may be taken into consideration in determining the effort metric, such as the various user's weights, heights, conditioning history, etc., to arrive at a common metric by which these different routes and activities can be compared. Challenges could be developed using such effort metrics, e.g., such as challenges as to who can gain the most "effort metric" points within a given time period, etc. Effort metrics of this type could be used in a manner akin to handicapping in golf (or other activities), e.g., as an effort to provide a level playing field or a common scoring system for direct comparison to others of different capabilities.

As noted above, the stored routes and community aspects of examples of this invention also can be useful to help users select new routes and gain information about existing routes (e.g., to locate popular routes) within the database. Some of the information that may be stored relating to a particular route or portion thereof and may be made available to users may include, but is not limited to: the number of people who have run the route, the most popular time(s) of day the route was run, the most popular day(s) on which the route was run, the type of activity or activities on the route (e.g., biking, running, walking, swimming, boating, rowing, driving, etc.), navigational information relating to the route, the most popular direction to run the route (e.g., clockwise, counter-clockwise), the percentage of people running each direction on the route, etc. This information can help users determine when they may prefer to run a particular route and/or how they may wish to run it.

When running or participating in other athletic performances, many users like to listen to the radio or recorded music, watch videos, and the like, to help keep them entertained during the performance. The inclusion of GPS in systems and methods according to examples of this invention may be used with this audio or video information to provide various options and functions. For example, during an athletic performance, songs or other information presented to the user during a run may be tagged with locational information from the GPS data. During later workouts, a user may desire to skip a song (or other information presented) and request the "next" song (or other information) be presented. Systems and methods according to at least some examples of this invention may be programmed and adapted to select the "next" song (or other information) from the songs (or other information) previously presented to the user at this same geographic location. Also, if desired, systems and methods according to the invention may mark the skipped song (or other information) so that it will not be presented to the user again, at least not at that specific location (or near it) or at least not during similar workout conditions.

Users of systems and methods according to examples of this invention may craft a song (or other media) playlist to match specific routes and/or specific paces. These playlists may be made available, e.g., to a user's specific group of authorized "friends," to the community at large, etc., and users of the system can search or browse the available playlists (optionally targeted to a specific route and/or targeted to a specific pace). If desired, others could download the playlist and/or purchase the playlist or the songs that make up the playlist, optionally, through the community interface accessed via computer 200. The GPS system could assure that the proper song is being played at the proper location along the route (e.g., assuming that the same general pace is run by the new user as was run by the original playlist creator).

As another feature, systems and methods according to at least some examples of this invention may be programmed and adapted to send the user run reminders (e.g., that appear on the watch display; audio, video, or textual; via email or instant messaging; etc.). If a user does not run for a while (e.g., for two days), the watch (or other device) may be programmed and adapted to then send a reminder. The reminders could be locational based on the GPS data (e.g., "You are near your Beacon Hill Route—Let's climb it!"), seasonal (e.g., "Spring is in the air—Let's run along the river!), humorous, scolding, goading, from a celebrity or coach, from a spouse or other person known to the user, etc. Any desired type of reminder may be provided without departing from this invention.

As yet another feature, systems and methods according to the invention could note when users consistently stray from a published route. If repeated deviations from a published route are noted, systems and methods according to this invention may at least temporarily change the stored route to correspond to the most commonly noted deviation or to develop a new route. Such repeated deviations may constitute an indicator that there is some sort of issue with the original published route, such as road construction, or the like, and this information may be used to trigger the system manager to investigate the current status of this route or segment thereof (and optionally provide updates and/or updated routes via the community website).

Other features of this invention may be developed as a result of the collected GPS data and the system knowing and/or determining the "routes" of various individuals. For example, because the system will know the routes that individuals use, it can tell those individuals of the use of that same route (or portions thereof) by others, such as who runs it, how many people run it, etc. Systems also could provide route "addendums" or "alternatives" to a person (either in real time or as part of the network connection), e.g., challenging the person to add to their route (such as by asking the user if they would like to add an extra half mile to the route and then automatically add it to the route using the GPS system if the challenge is accepted). This could be accomplished in real time (e.g., if the system can tell that an athlete is running at a good personal pace, it might suggest adding distance or picking up the pace to beat a personal best, etc.). Using the GPS features, the system could still get the athlete back to his/her home base or starting point even when routes are altered in the manner described above as an "on-the-fly" decision.

Because of the more global knowledge of routes from multiple sources, systems and methods according to at least some examples of this invention may be able to create new routes based on combinations of segments of existing routes (e.g., by combining portions of one route with another route, by adding routes together, by crossing from one route to another route, etc.). Intersecting routes or closely located individual routes (including trail routes) can be joined, in whole or in part, to make different options and different routes for the users. Making these types of alternatives available to users can help keep the scenery fresh and make workouts more enjoyable. If desired, these alternatives can be presented to the user on-the-fly, e.g., as various geographic points are approached, as determined using GPS.

If desired, systems and methods according to the invention can provide a "timing" feature. If a user inputs a time limitation to the workout (e.g., "I can only go for 45 minutes today"), systems and methods according to the invention can develop a route for the user to get him/her back to their home base or starting point within the desired time frame. This route could be developed, for example, using the runner's typical or historical pace, and furthermore, the route can be altered, on-the-fly, if necessary, to lengthen or shorten it, depending on the elapsed time and the user's current performance (e.g., including past pace). As another option, if desired, the watch 100 could accept input from the user, on-the-fly, asking to lengthen the workout or shorten the workout (e.g., a button 106 that allows the user to add or subtract time from the workout, optionally, in five or ten minute intervals). When this type of button is activated, the route can be changed automatically to accommodate the newly entered time frames (and the route presented can be modified accordingly).

Other "real-time" or "on-the-fly" features may be provided by systems and methods according to this invention involving the community and networked features of the invention. For example, if desired, the watch 100 could generate a signal that may be used to advise others in the community that an individual is currently running (or undertaking other activity). If desired, systems and methods according to this invention, using GPS data, could advise a user when he or she is geographically close to one of their friends during a run, workout, or race (e.g., "you are approaching your friend; catch her!"), optionally, only while that other person also is working out (e.g., as determined by GPS or other sensors associated with the other person). The system also could be used to schedule runs with others in the community or let others know your typical running schedule. As another option, for systems with communications capabilities on the watch device 100 itself, two geographically remote users working out at the same time may be allowed to communicate with one another (e.g., using a "push to talk" type feature or two-way radio type communications to send audio messages).

The terms "run," "workout," "performance," "athletic performance," "event," and the like are used herein in various different places. These terms are used interchangeably and should not be considered as limited to any specific type of activity, any specific type of workout, and/or any specific type of environment of use. For example, these terms may be used to describe a workout session, a training session, an actual race or event, a practice session, an individual training session, a coach or trainer monitored training session, and/or any desired type of physical activity, including indoor activities, outdoor activities, gym activities, playground activities, or the like.

Additional Embodiments of the Invention

FIGS. 167-309 disclose various alternative embodiments of the device of the present invention typically in the form of a watch similar to the previous embodiments. The embodiments of the watch generally include a portable electronic module and a carrier or wristband. The various electronic modules may incorporate a communication member that may or may not be in the form of a USB-type device similar to the embodiments of FIGS. 1-85. It should be understood that many of the features and general operation of the embodiments of FIGS. 1-85 are generally applicable to the embodiments of FIGS. 167-309. In addition, the user interface and GPS functionality discussed herein is also equally applicable to any of these embodiments of FIGS. 167-309, and thus can be used in an athletic performance monitoring system. The descriptions below will focus on additional mechanical structures of the embodiments.

FIGS. 167-193 disclose an embodiment of the watch of the present invention generally designated with the reference numeral 1010. The structure of the watch 1010 is very similar to the watch 10 of FIGS. 1-21. The electronic module 1012 has a data transfer member 1024 in the form of a USB connector that is flexible with respect to the housing 1016 of the electronic module 1012. The housing 1016 has a central opening 1026 in a bottom member 1022 thereof. The bottom member 1022 further has a recessed portion 1028 generally around the central opening 1026. The USB connector 1024 has a base 1030 and a leg 1032 extending from the base 1030. The base 1030 has a post 1034 extending generally vertically upwards from the base 1030. The base 1030 is sized to correspond in shape to the recessed portion 1028. The leg 1032 is integral with the base 1030 in an exemplary embodiment. The leg 1032 has leads incorporated therein to form the USB connector 1024. The leg 1032 is further made from a flexible material. The USB connector 1024 is operably connected to the controller.

Figure 169:
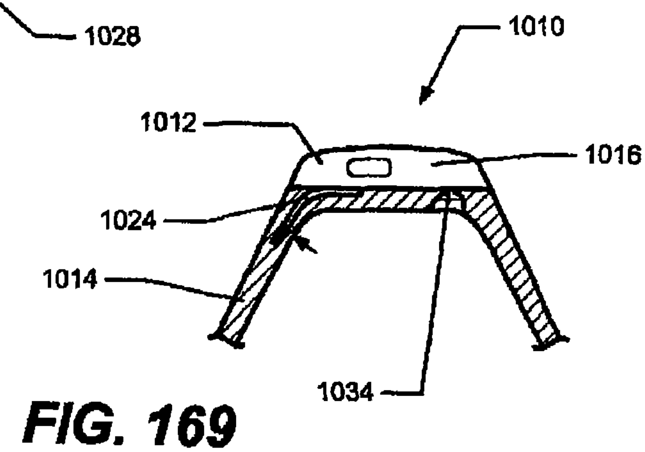
Figure 170:
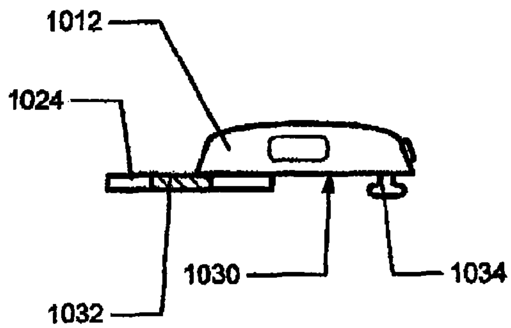
Figure 171:
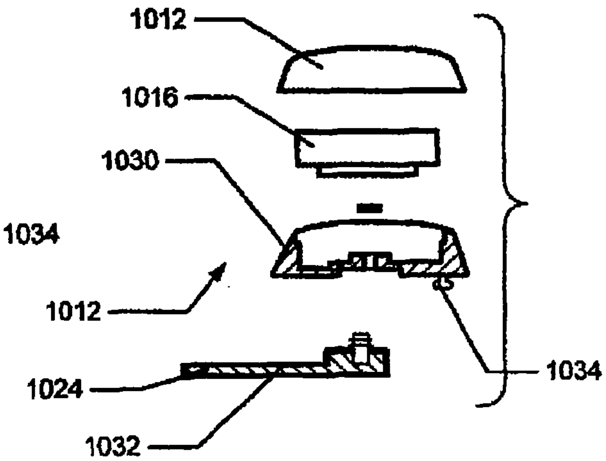
Figure 172:
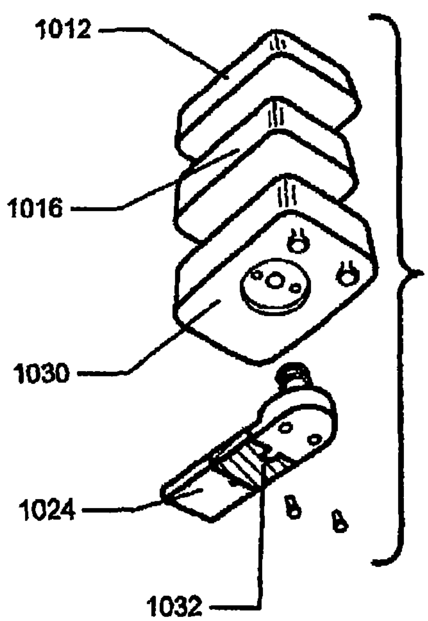
Figure 173:
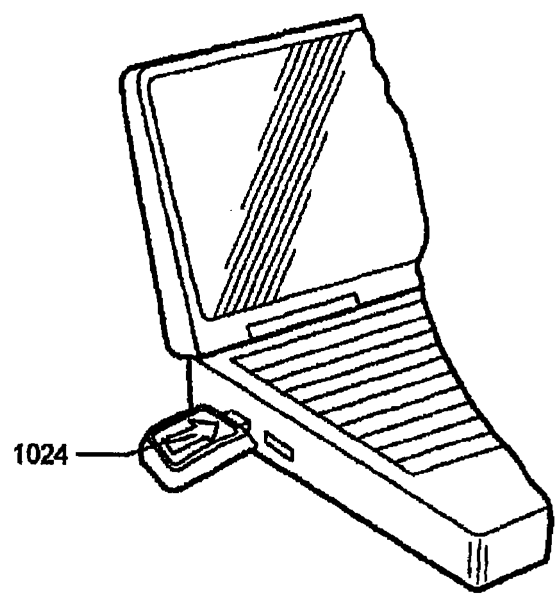

When connected, the post 1034 is received within the central opening 1026 while the base 1030 is received in the recessed portion 1028. The leg 1032 has a length such that a distal end of the leg 1032 having the USB leads extends past an outer periphery of the electronic module 1012. Similar to the embodiment described above, the electronic module 1012 is connected to the wristband 1014 wherein protrusions on the housing 1016 are received in the apertures in the wristband 1014. The wristband 1014 further has an opening 1026 to receive the USB connector 1024. As shown in FIG. 169, the flexible properties of the leg 1032 allows the leg 1032 to confirm to the curvature of the wristband 1014. This flexibility provides a user the enhanced ability to connect to a personal computer when transferring data. Personal computers vary as to where USB ports are mounted. Accordingly, with a flexible USB connector 1024, connection to the port is made easier.

Figure 174:
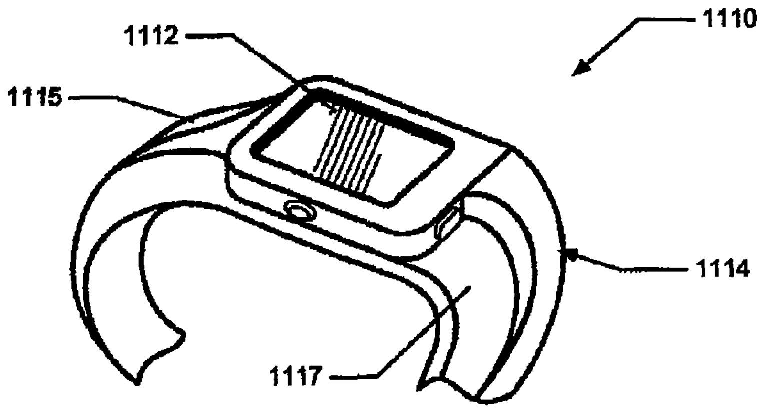
Figure 175:
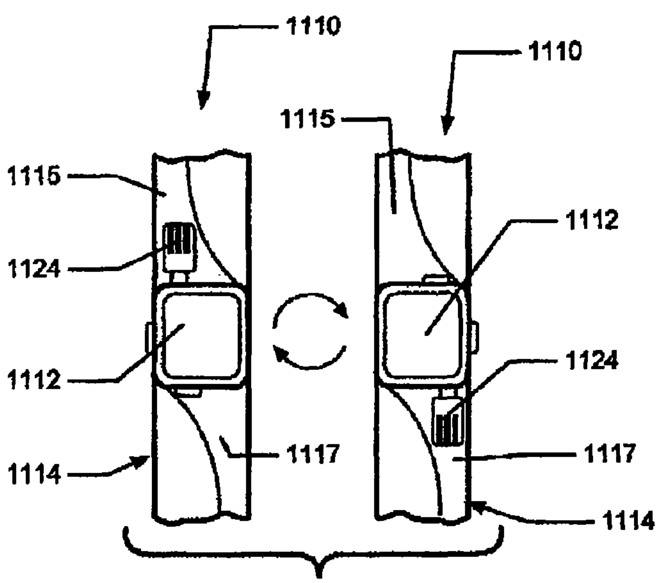
Figure 176:
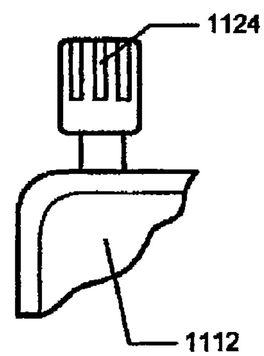

FIGS. 174-176 disclose a further embodiment of the watch generally designated with the reference numeral 1110. The watch has an electronic module 1112 connected to a wristband 1114. The wristband 1114 has a first recessed portion 1115 and a second recessed portion 1117. Each recessed portion 1115, 1117 is contoured. The electronic module 1112 has a USB connector 1124 extending from a periphery of the module 1112. The USB connector 1124 is configured to fit inside either the first recessed portion 1115 or the second recessed portion 1117. As shown in FIG. 175, the electronic module 1112 may be rotated along the wristband 1114, wherein in a first configuration, the USB connector 1124 may fit into the first recessed portion 1115 and when the electronic module 1112 is rotated into a second configuration, the USB connector 1124 may fit into the second recessed portion 1117.

FIGS. 177-201 disclose alternative embodiments of the watch of the present invention that generally disclose a more structurally integrated USB-type data transfer member.

Figure 177:
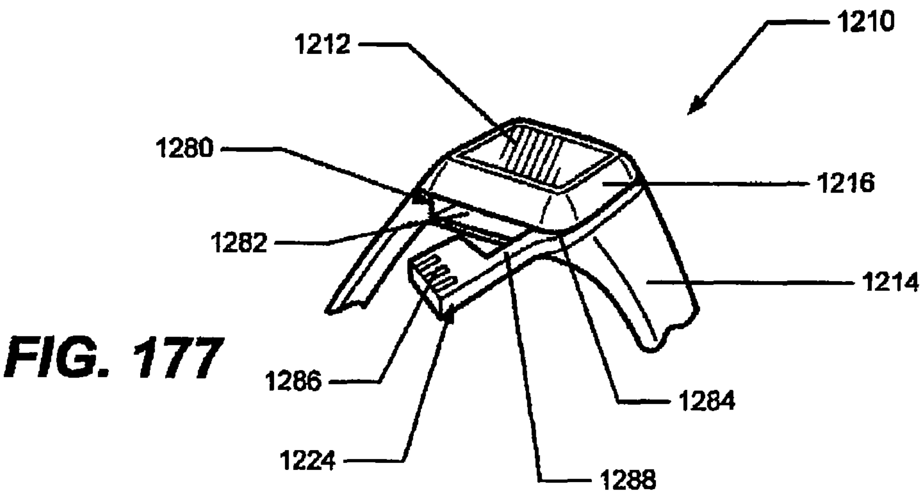
Figure 178:
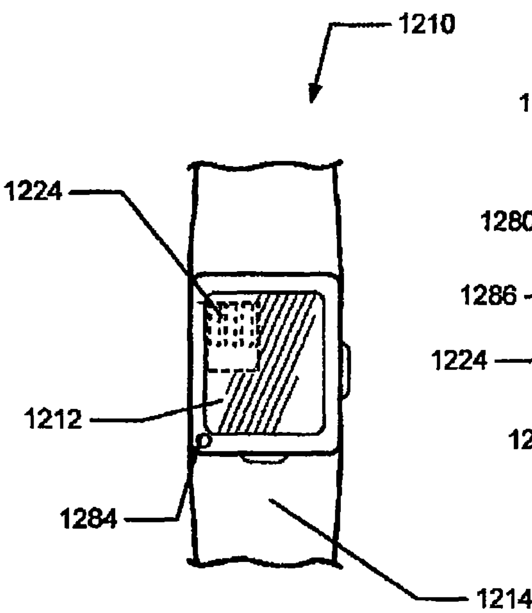
Figure 179:
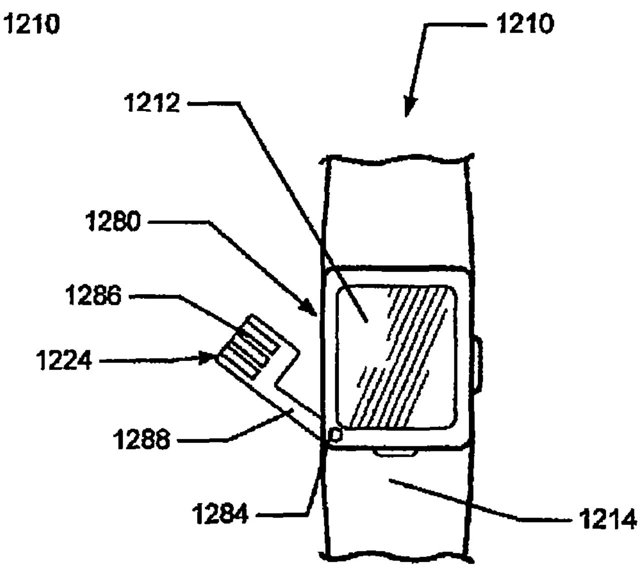

FIGS. 177-179 disclose another embodiment of the watch generally designated with the reference numeral 1210. The watch 1210 has an electronic module 1212 connected to a wristband 1214. It is understood that the electronic module 1212 can be permanently connected to the wristband 1214 or removably connected to the wristband 1214 as with the previous embodiments. This embodiment has a USB connector 1224 integrated with the housing 1216 of the electronic module 1212. The electronic module 1212 has a slot 1280 positioned in a bottom portion of the housing 1216. The slot 1280 has an opening 1282 at a side portion of the housing 1216 and extends into the housing 1216. The electronic module 1212 has the USB connector 1224 operably coupled to the electrical components of the module 1212. The USB connector 1224 has a base 1284 that is pivotally or hingedly connected to the housing 1216 of the electronic module 1212. The USB connector 1224 has a distal end 1286 extending from the base 1284 that supports to the leads that make up the USB connection 1224. The base 1284 may include an extension member 1288 between the base 1284 and the distal end 1286. As discussed, the electronic module 1212 has the same user interface as described above and operates in similar fashion as described above. To transfer data, the user pivots the USB connector 1212 about the pivotal connection wherein the distal end 1286 of the USB connector 1224 extends generally transversely from the electronic module 1212. The USB connector 1224 can then be connected to a USB port of a computer as described above. Once data transfer is complete, the USB connector 1224 is removed from the computer and the connector 1224 is pivoted back into the slot 1280 of the housing 1216 as shown in FIG. 178 wherein the USB connector 1224 is completely contained within the housing 1216. It is understood that the distal end 1286 of the USB connector 1224 may have a gripping member thereon wherein a user could grasp the USB connector 1224 with a finger to pivot. The gripping member could take various forms such as a small protrusion or textured surface. It is further contemplated that a magnetic connection could be used between the housing 1216 and USB connector 1224 wherein the USB connector 1224 could be pushed further into the housing 1216 such that the connector 1224 would be then be forced back partially out of the housing 1216 where the connector 1224 could then be further pivoted out of the housing 1216.

Figure 180:
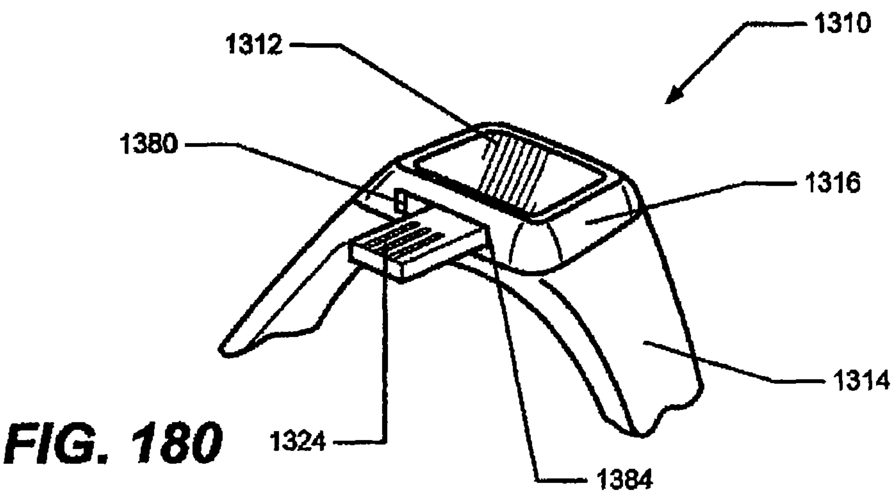
Figure 181:
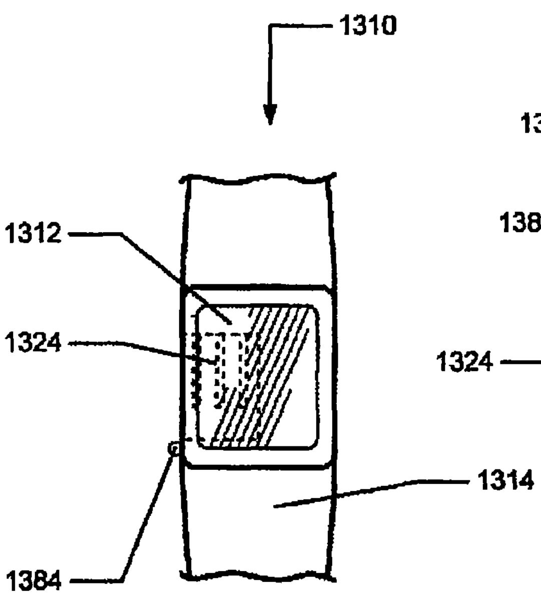
Figure 182:
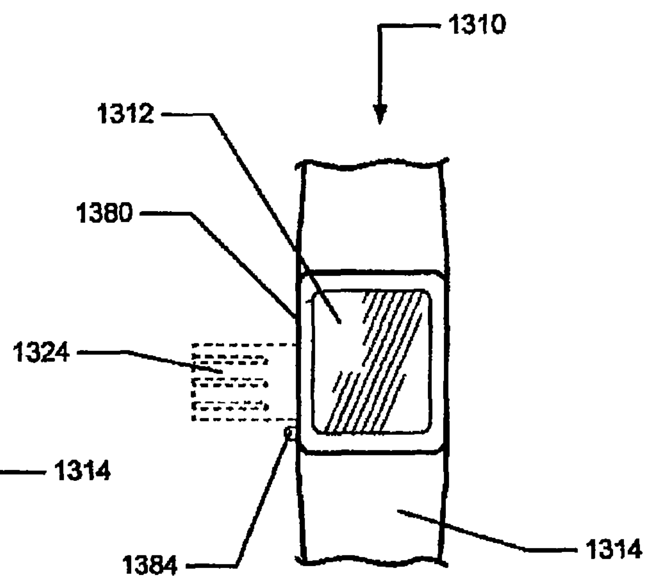

FIGS. 180-182 disclose another embodiment of the watch generally designated with the reference numeral 1310. The watch 1310 has an electronic module 1312 connected to a wristband 1314. This embodiment of the watch 1310 is similar to the embodiment of the watch 1210 of FIGS. 177-179. The watch 1310 also has an integrated USB connector 1324. Similar to the above embodiment, the housing 1316 has a slot 1380. The USB connector 1324 has a base 1384 that is pivotally connected to the housing 1316. The USB connector 1324 has a shorter configuration and eliminates the leg of the connector 1324 described above. For data transfer, a user pivots the USB connector 1324 from the housing 1316 as shown in FIG. 182, wherein the USB connector 1324 can be plugged into a computer. Once data transfer is complete, the USB connector 1324 is unplugged and pivoted back into the housing 1316 as shown in FIG. 181.

Figure 183:
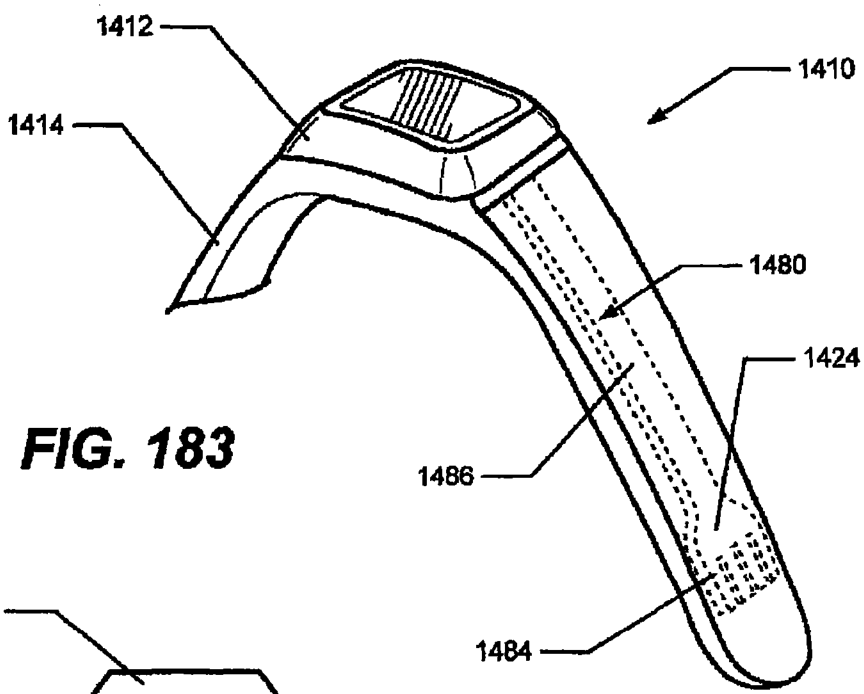
Figure 184:
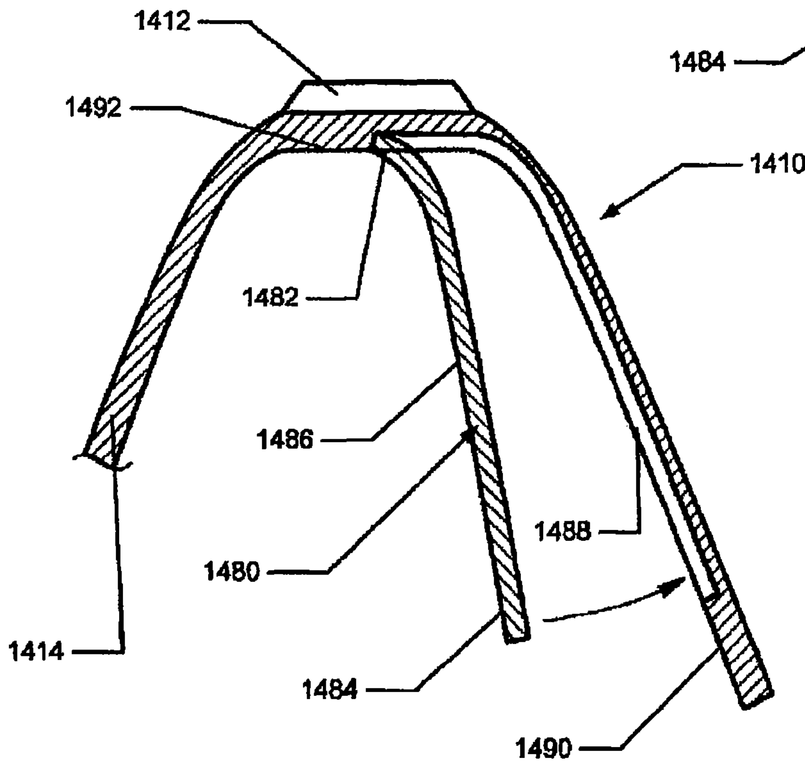
Figure 185:
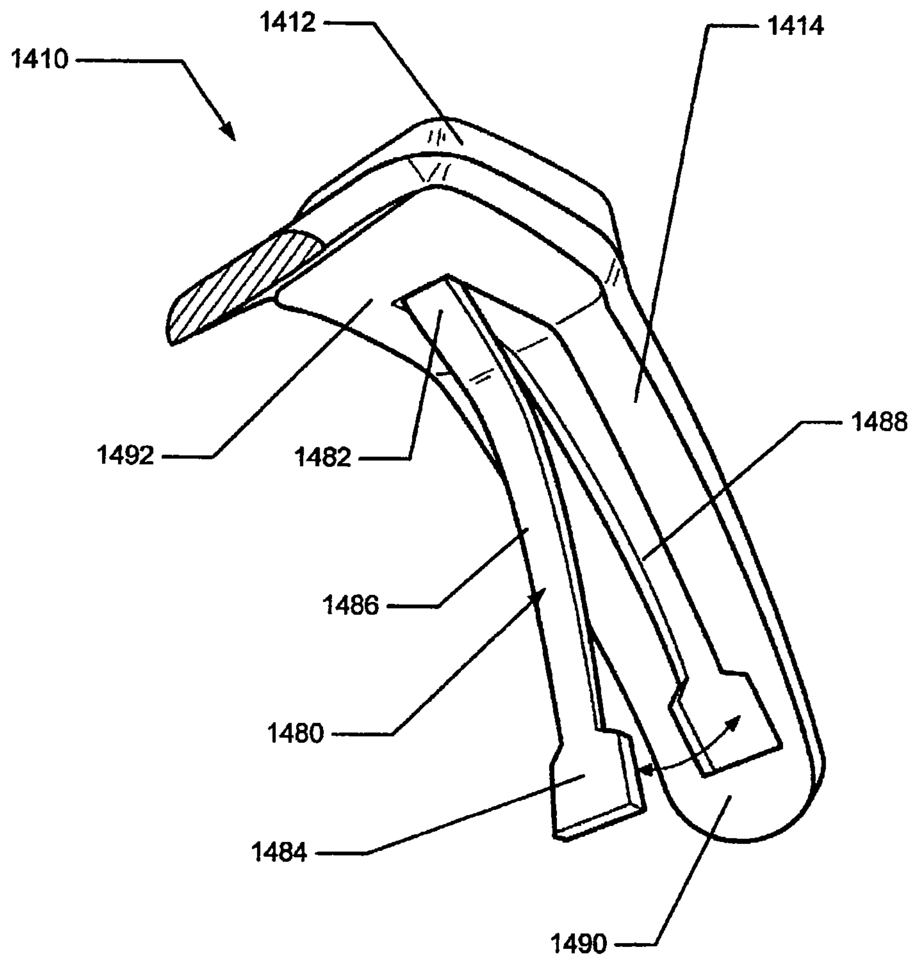

FIGS. 183-185 disclose another embodiment of the watch generally designated with the reference numeral 1410. The watch 1410 has an electronic module 1412 connected to a wristband 1414. The embodiment of the watch 1410 of FIGS. 183-185 also has an integrated USB connector 1424. The USB connector 1424 is operably connected to the electronics of the electronic module 1412. The USB connector 1424 may include an elongated member 1480 that has a base 1482, a distal end 1484, and an elongated intermediate portion 1486 extending between the base 1482 and the distal end 1484. The distal end 1484 may support the leads of the USB connector 1424. The elongated intermediate portion 1486 may be flexible.

As further shown in FIGS. 183 and 184, the wristband 1414 has an elongated slot 1488 on an inner surface 1490 of the wristband 1414. The slot 1488 may be dimensioned to generally correspond to the shape of the USB connector 1424 or the elongated member 1480. The base 1482 of the USB connector 1424 may be connected at an underside central portion 1492 of the wristband 1414. As shown in FIG. 185, the base 1482 of the USB connector 1424 may be located at the underside central portion 1492 of the wristband 1414 directly under the electronic module 1412. Additionally, the base 1482 of the USB connector 1424 may be located at various other locations, such as along the wristband 1414 on either side of the electronic module 1412. As discussed, the USB connector 1424 has flexible electrical members supported by the USB connector 1424 that are electrically coupled to the electronics module 1412. The flexible members extend through the USB connector 1424 to the leads at the distal end 1484. The USB connector 1424 fits in the slot 1488 of the wristband 1414. In an exemplary embodiment, there may be an interference fit between the USB connector 1424 and the slot 1488 of the wristband 1414. When the USB connector 1424 is positioned in the slot 1488, a user can wear the watch 1410 on the wrist as is normal. For data transfer, the distal end of the USB connector 1424 may be removed from the slot 1488 wherein the distal end 1484 can be plugged into a USB port on a computer. The flexible nature of the intermediate portion 1486 of the USB connector 1424 enhance the ease of connection to the computer. In other exemplary embodiments, there may be push connectors, button connectors, cooperative detents, spring connectors, or other type mechanical connectors between the USB connector 1424 and the slot 1488 of the wristband 1414 without departing from this invention.

FIGS. 185-187 disclose another embodiment of the watch generally designated with the reference numeral 1510. The watch 1510 has an electronic module 1512 connected to a wristband 1514 and further having an integrated USB connector 1524. In this embodiment, the USB connector 1524 is more fully incorporated into a portion of the wristband 1514. Accordingly, flexible electrical connectors are connected to the electronic module 1512 and extend within one section of the wristband 1514. The flexible electrical connectors extend to the distal end 1582 of the wristband 1514. As shown in FIG. 186, the other end 1584 of the wristband 1514 has a receiver 1580. As shown in FIG. 187, the distal end 1582 supporting the leads of the USB connector 1524 fit within the receiver 1580 for fastening the wristband 1514 around the wrist of a user. For data transfer, the distal end 1582 having the leads of the USB connector 1524 is removed from the receiver wherein the USB connector 1524 is plugged into a computer as described above.

Figure 188:
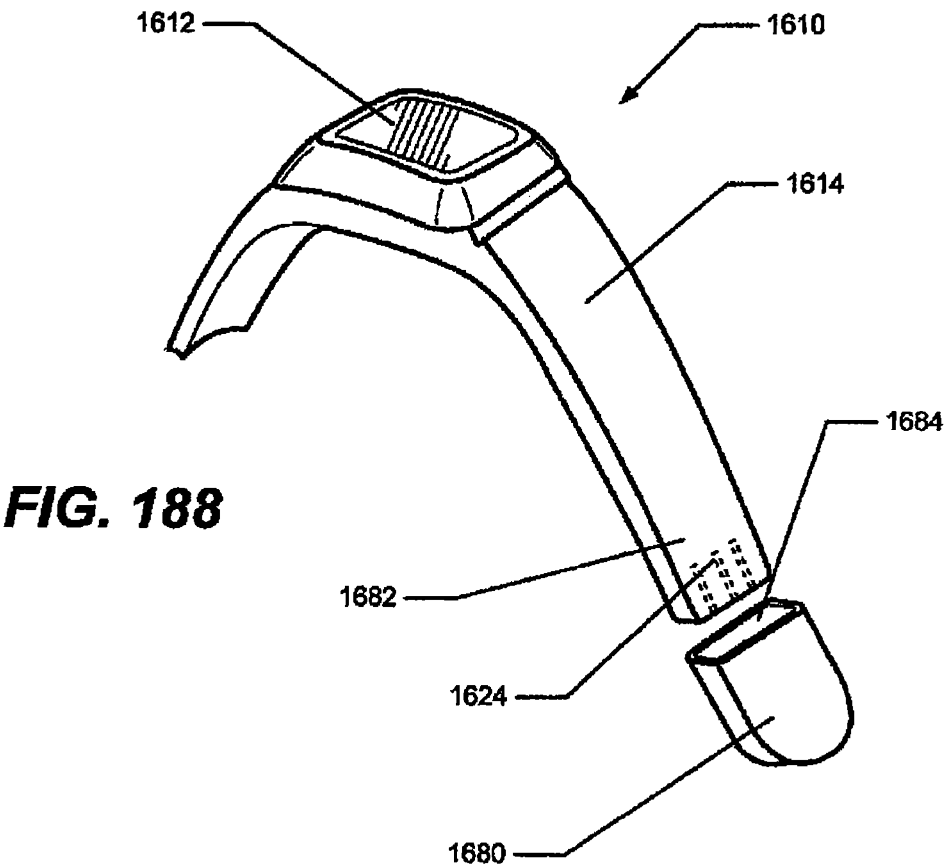
Figure 189:
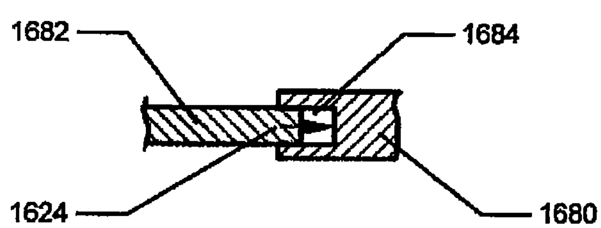

FIGS. 188-189 disclose another embodiment of the watch generally designated with the reference numeral 1610. This embodiment is similar to the embodiment of FIGS. 186-187. A cap member 1680 is provided that has an opening 1684 to receive the distal end 1682 of the wristband 1614 supporting the leads of the USB connector 1624. Other known structures such as buckles can be used to fasten the wristband 1614 around the wrist of a user.

Figure 190:
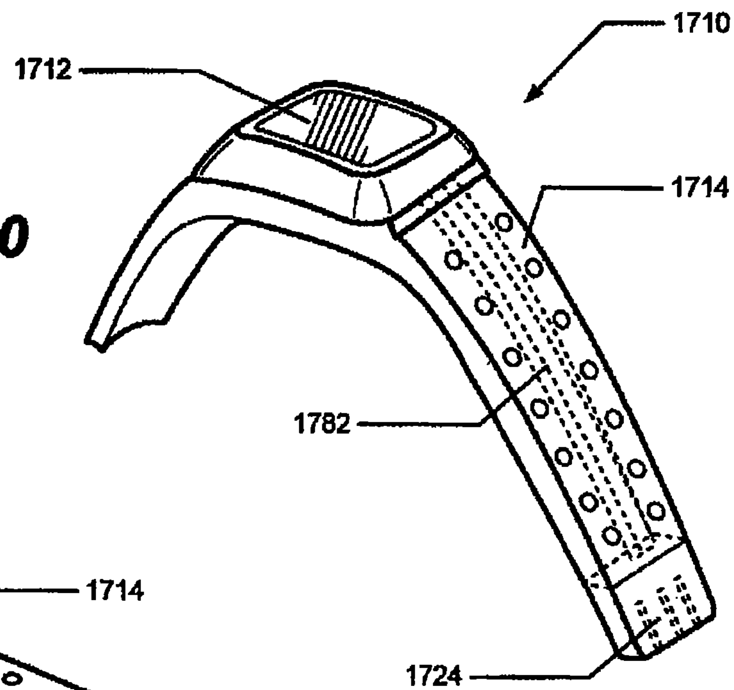
Figure 191:
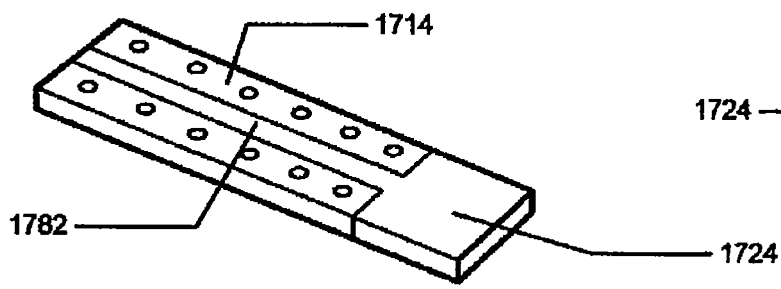
Figure 192:
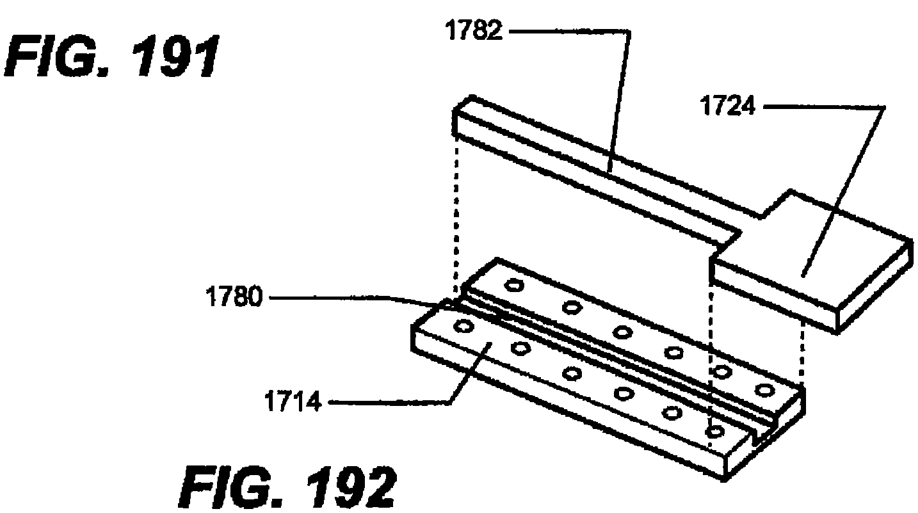
Figure 193:
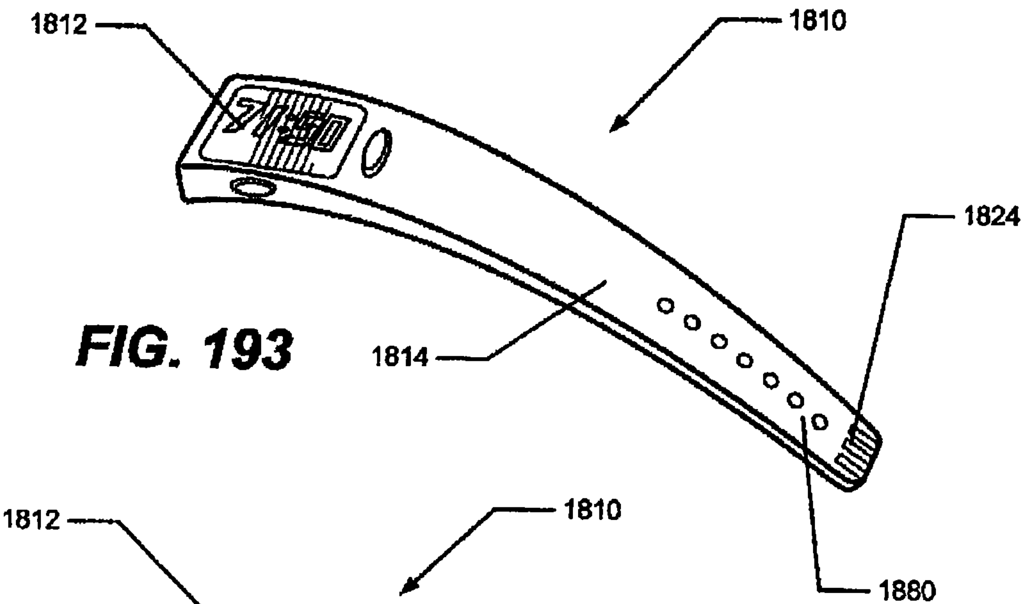
Figure 194:
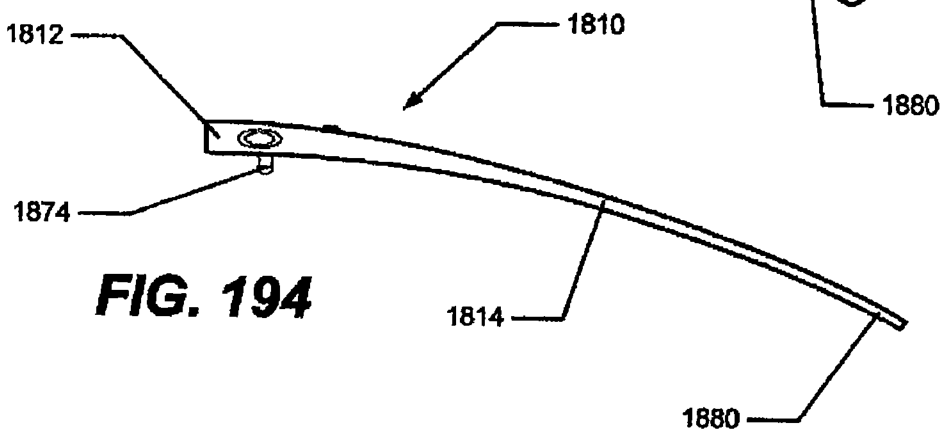

FIGS. 190-192 disclose another embodiment of the watch generally designated with the reference numeral 1710. The watch 1710 has an electronic module 1712 connected to a wristband 1714. Similar to the embodiment of FIGS. 183-185, this embodiment has an integrated USB connector 1724 having an elongated intermediate portion 1782 that fits within a corresponding slot 1780 in a portion of the wristband 1714. The base of the USB connector 1724 is connected to bottom, central portion of the wristband 1714 and is operably connected to the electronic module 1712. For data transfer, the USB connector 1724 is removed from the slot 1780 wherein the distal end is plugged into the USB port of a computer.

Figure 195:
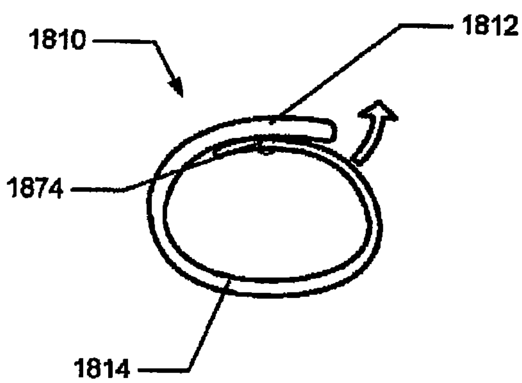
Figure 196:
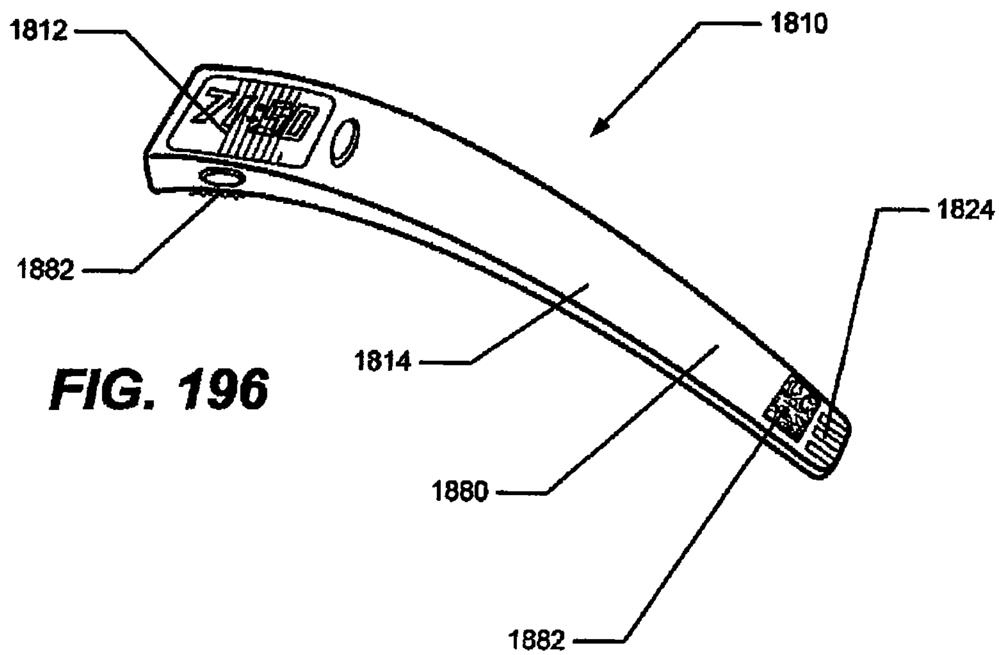
Figure 197:
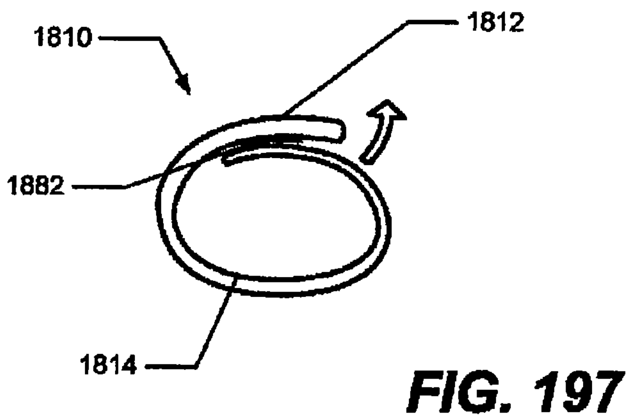
Figure 198:
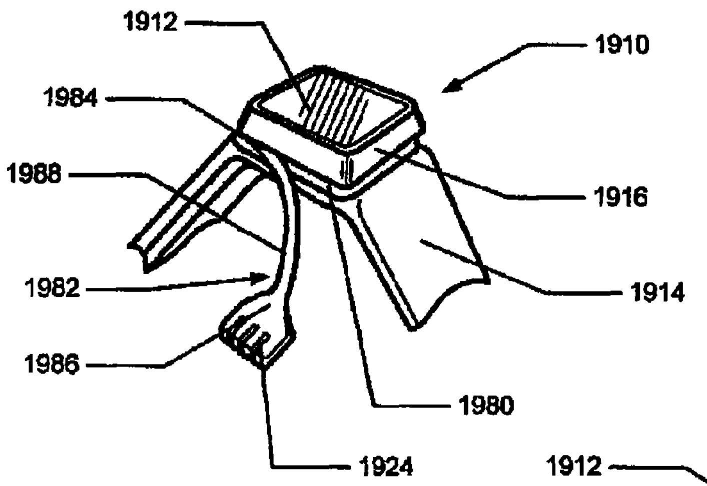
Figure 199:
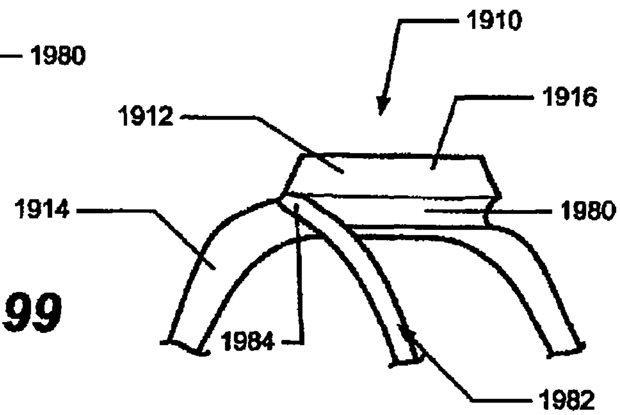
Figure 200:
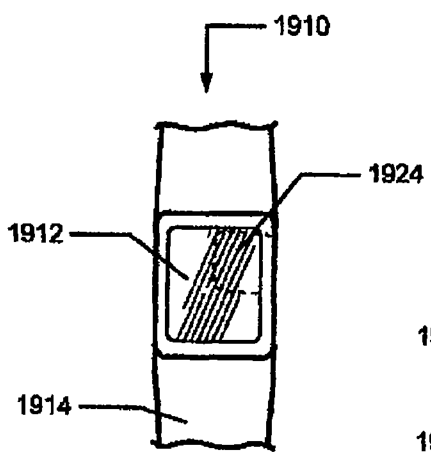
Figure 201:
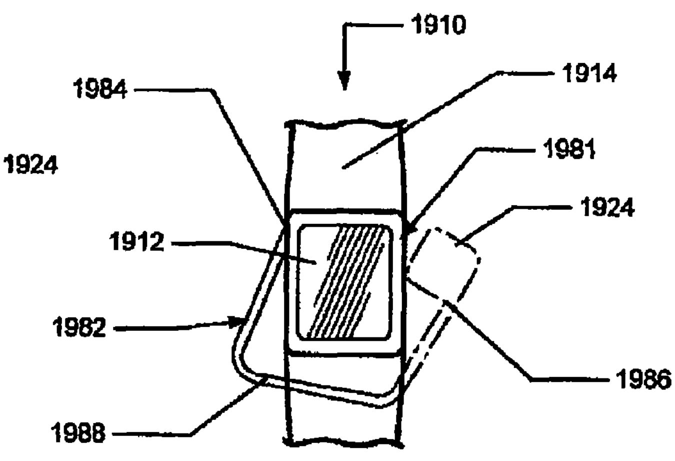

FIGS. 193-197 disclose another embodiment of the watch generally designated with the reference numeral 1810. The watch 1810 has an electronic module 1812 that is largely incorporated into the wristband 1814. The USB connector 1824 is fully incorporated into the wristband 1814 wherein the leads of the USB connector 1824 are supported at a distal end 1880 of the wristband 1814. Without departing from the invention, the USB connector 1824 may include a cap structure (not shown) covering the leads of the USB connector 1824 that fits over the distal end 1880 of the wristband 1814. As shown in FIGS. 196 and 197, the wristband 1814 is flexible wherein the band is wrapped around the wrist of a user wherein the distal end 1880 of the wristband 1814 is connected to the underside of the wristband 1814. In one exemplary embodiment, as shown specifically in FIGS. 193, 194 and 195, the distal end 1880 of the wristband 1814 may be connected to the underside of the wristband 1814 by the use of a post 1874 connection system similar to the construction as described above and shown in FIGS. 2 and 3. Additionally, in another exemplary embodiment without departing from this invention and as shown in FIGS. 196 and 197, the distal end 1880 of the wristband 1814 may be connected to the underside of the wristband 1814 by the use of hook and loop fasteners 1882, such as Velcro™ For example, the distal end 1880 of the wristband 1814 may include on hook and loop fastener pad 1882 and the underside of the wristband 1814, near the electronic module 1812 may include another hook and loop fastener pad 1882. For data transfer, the distal end 1880 of the wristband 1814 and the USB connector 1824 may be plugged into a USB port on a computer. The flexible nature of the wristband 1814 and the USB connector 1824 enhance the ease of connection to the computer.

FIGS. 198-201 disclose another embodiment of the watch generally designated with the reference numeral 1910. The watch 1910 has an electronic module 1912 connected to a wristband 1914 and further having an integrated USB connector 1924. As further shown in FIGS. 198 and 199, the housing 1916 of the electronic module 1912 has a groove 1980 positioned generally around the periphery of the housing 1916. The housing 1916 further has a slot 1981 having a peripheral opening wherein the slot 1981 extends into the housing 1916. The USB connector has an elongated flexible member 1982 having a base 1984, a distal end 1986 and an intermediate portion 1988 therebetween. It is understood that the USB connector 1924 is operably connected to the electronics module 1912. The base 1984 of the USB connector 1924 is connected at one end of the housing 1916. The intermediate portion 1988 fits within the peripheral groove 1980 on the housing 1916 and the distal end 1986 of the USB connector 1924 is received through the peripheral opening and into the slot 1981. For data transfer, the distal end 1986 is removed from the slot 1981 and is plugged into a USB port on a computer.

Figure 202:
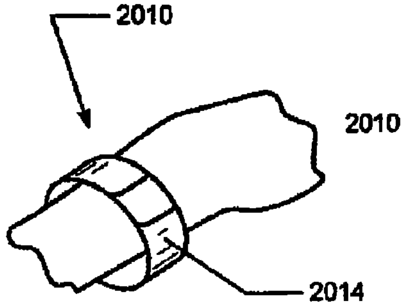
Figure 257:
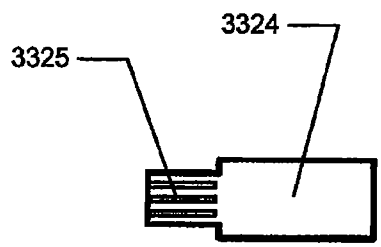

FIGS. 202-257 disclose alternative embodiments of the watch of the present invention that generally disclose a key-type USB-type data transfer member. In the following embodiments shown in FIGS. 202-257, the key member is generally a USB device with a data memory connected to a USB connector. The USB connector is received by the opening on the watch or the wristband and the watch operates as described above. Once athletic performance data is recorded on the USB device, the USB device or key member is removed from the wristband or watch. The USB device can then be inserted into a USB port of a computer wherein the athletic performance data can be uploaded to the computer and a remote location such as an athletic performance monitoring site as described above. As further discussed above, it is understood that other data and features can be transferred to the USB device from the remote site and transferred to the electronic module.

Figure 203:
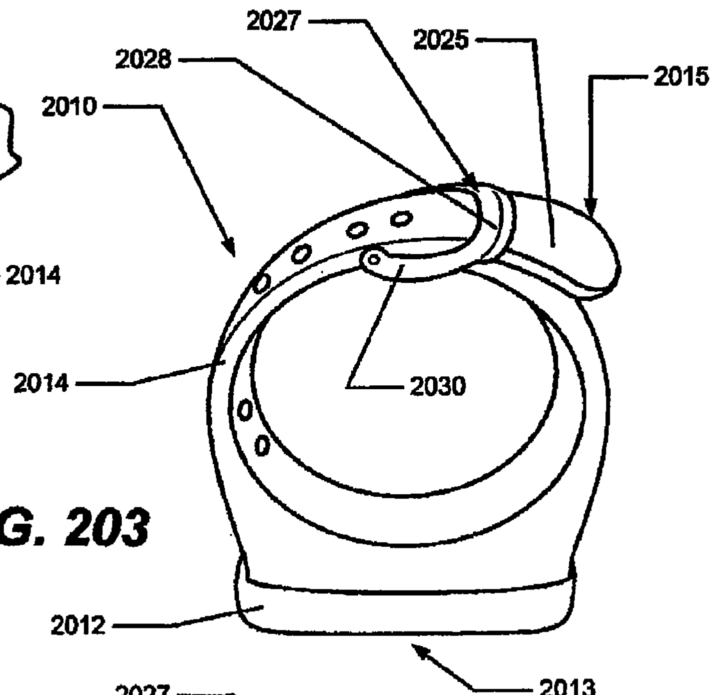
Figure 204:
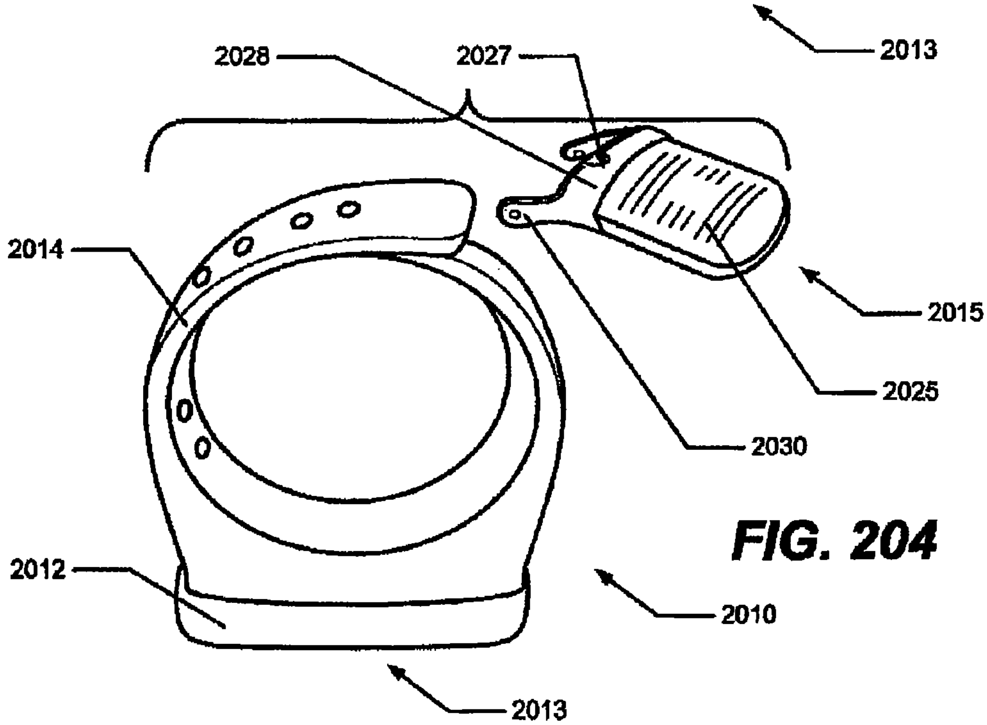

FIGS. 202-204 disclose another embodiment of the watch generally designated with the reference numeral 2010. The watch 2010 has an electronic module 2012 connected to a wristband 2014. The electronic module 2012 has a first portion 2013 operably connected to a second portion 2015. The first portion 2013 generally includes the display, pushbutton inputs, sensors and the various other components for operation of the watch 2010 as described in the embodiments above. The second portion 2015 takes the form of a key 2024 that includes a USB type-device 2025 and a connector member 2027. The connector member 2027 has a body 2028 having an opening therein and a pair of resilient legs 2030 extending from the body 2028. The USB device 2025 has a data memory connected to a USB connector. The USB connector 2025 is received by the opening of the body 2028. The legs 2030 connect to a portion of the wristband 2014. It is understood that once connected to the wristband 2014, the second portion 2015 is operably connected to the first portion 2013 of the electronic module via a flexible electronic leads contained within the wristband 2014. The watch 2010 operates as described above. Once athletic performance data is recorded on the USB device 2025 of the second portion 2015, the USB device 2025 is removed from the wristband 2014. The resilient legs 2030 are removed from the wristband 2014 and the USB device 2025 is removed from the body 2028. The USB device 2025 can then be inserted into a USB port of a computer wherein the athletic performance data can be uploaded to the computer and a remote location such as an athletic performance monitoring site as described above. As further discussed above, it is understood that other data and features can be transferred to the USB device 2025 from the remote site and transferred to the electronic module 2012.

Figure 205:
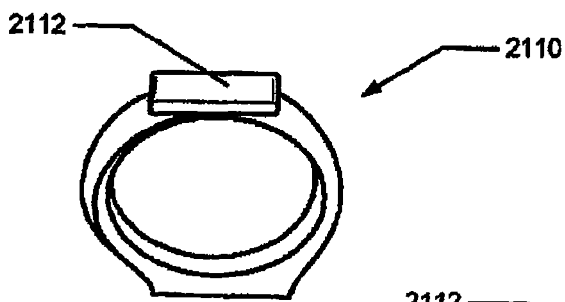
Figure 206:
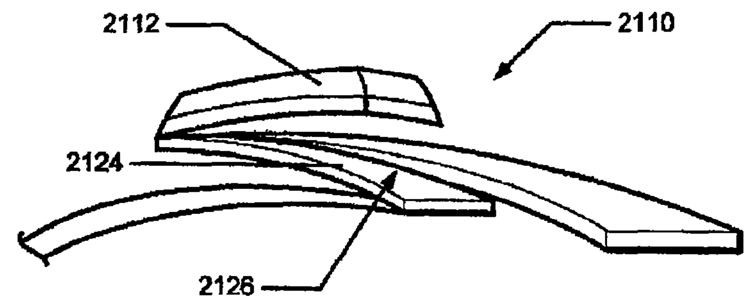

FIGS. 205-206 disclose another embodiment of the watch generally designated with the reference numeral 2110. The watch 2110 has an electronic module 2112 connected to a wristband 2114. The electronic module 2112 has a first portion operably connected to a second portion, similar to the embodiment of FIGS. 202-204. The second portion includes a key member 2124 that also functions as part of a foldable closure mechanism 2126 for the wristband 2114. Such foldable closure mechanisms are known in the art. The key member 2124 includes a USB device that can be removed from the closure mechanism 2126 and then inserted into a USB port of a computer as described above. The USB device can take different forms as shown herein, e.g. the device could be on the bottom and pivot out, or the device could be a key-type embodiment that slides out the side.

Figure 207:
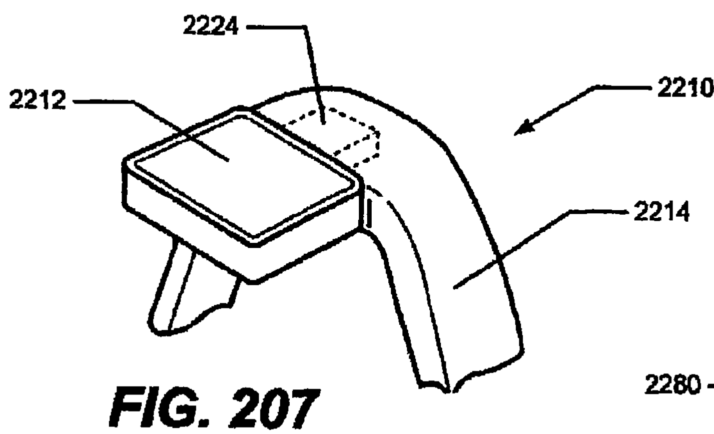
Figure 208:
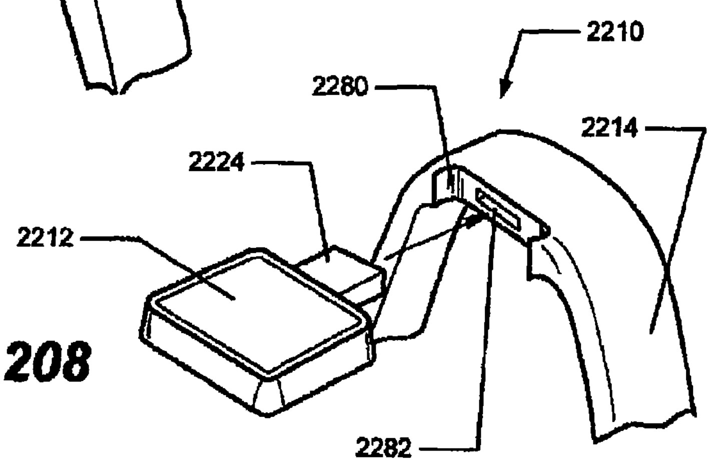
Figure 211:
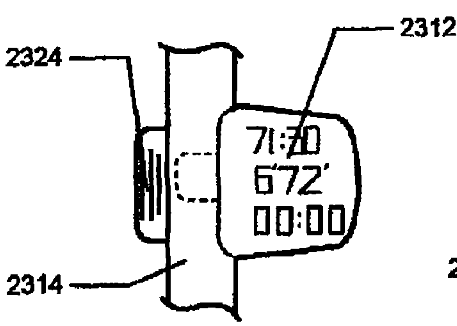
Figure 212:
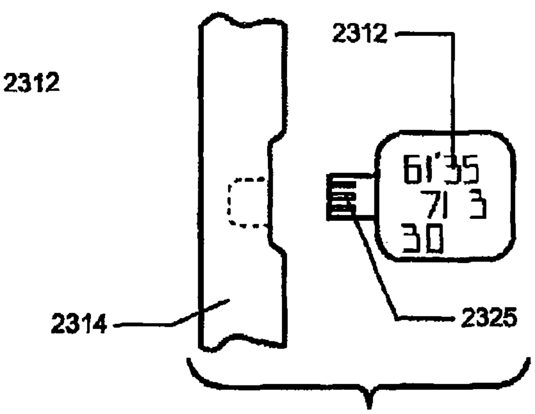

FIGS. 207-208 disclose another embodiment of the watch generally designated with the reference numeral 2210. The watch 2210 has an electronic module 2212 connected to a wristband 2214. The electronic module 2212 is similar to the electronic module 12 as described above in FIGS. 1-21. The electronic module 2212 has a USB connector 2224 extending laterally from a sidewall of the electronic module 2212. The wristband 2214 has a recessed portion 2280 at generally a central portion of the wristband 2214. An opening 2282 is further included in the wristband 2214 at the recessed portion 2280. The USB connector 2224 of the electronic module 2212 is received by the opening 2282 in the wristband 2214. Operation of the watch 2210 is identical as described above. As shown in FIGS. 211-212, it is understood that the electronic module 2212 and wristband 2214 can be configured such that the USB connector 2224 is positioned on an opposite side surface and fits into an opening 2282 on an opposite side of the wristband 2214.

Figure 209:
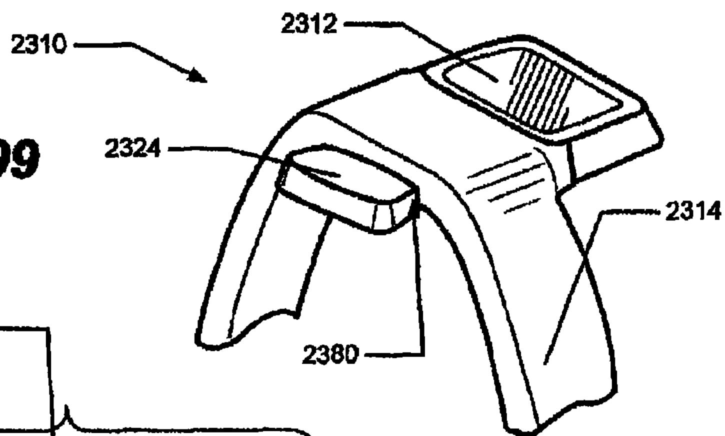
Figure 210:
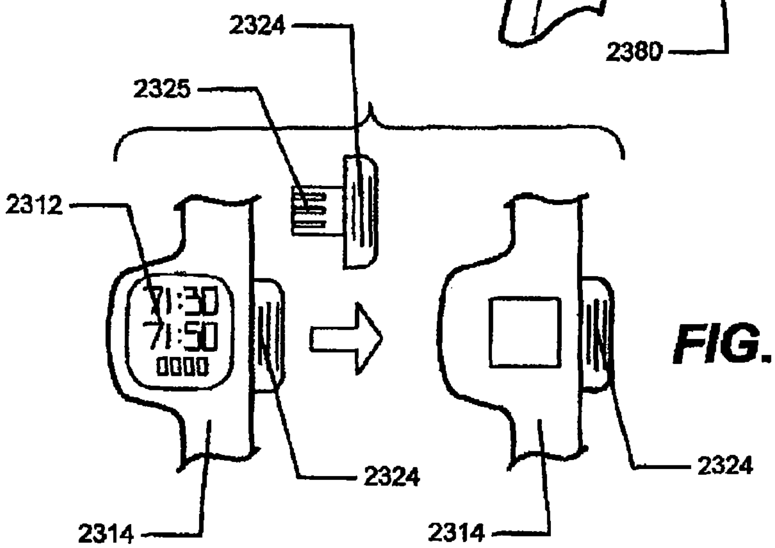

FIGS. 209-212 disclose another embodiment of the watch generally designated with the reference numeral 2310. The watch 2310 has an electronic module 2312 connected to a wristband 2314. The electronic module 2312 is similar to the electronic module 12 as described above in FIGS. 1-21. In this particular embodiment, the electronic module 2312 is generally integrally connected to the wristband 2314, or otherwise incorporates some more permanent type connection to the wristband 2314. The electronic module 2312 includes a removable key member 2324. In an exemplary embodiment, the key member 2324 takes the form of a USB device having a USB connector 2325 and memory. The wristband 2314 has an opening 2380, generally on a side adjacent to the electronic module 2312. As shown in FIG. 210, the key member 2324 is removably connected to the wristband 2314 by inserting the USB connector 2325 through the opening 2380 wherein the key member 2324 is operably connected to the electronic module 2312. Operation of the watch 2310 is identical as described above.

FIGS. 213-219 disclose additional embodiments of a watch having a key member similar to the watch of FIGS. 209 and 210. As discussed, overall operation of the watch remains the same as described above. In these embodiments, the key member is connected at different locations of the electronic module or the wristband.

Figure 213:
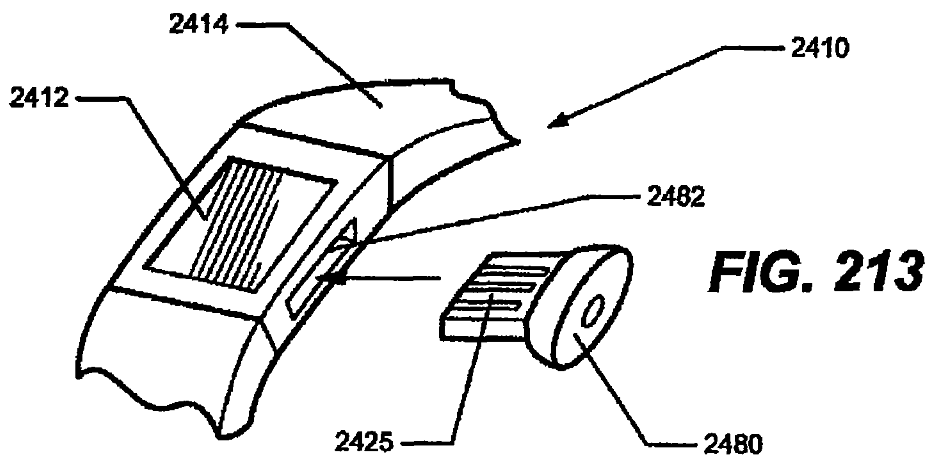
Figure 214:
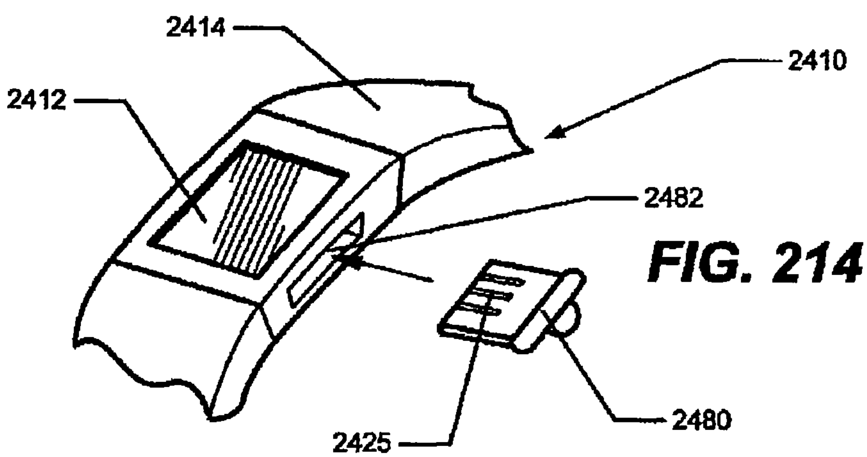

FIGS. 213-214 disclose an embodiment of the watch designated as reference numeral 2410. The watch 2410 has an electronic module 2412 connected to a wristband 2414. The electronic module 2412 is similar to the electronic module 12 as described above in FIGS. 1-21. It is understood that the electronic module 2412 can be permanently connected to the wristband 2414 or removably connected to the wristband 2414 as with the previous embodiments. The electronic module 2412 includes a removable key member 2424. In an exemplary embodiment, the key member 2424 takes the form of a USB device having a USB connector 2425 and memory. The key member 2424 shown in FIGS. 213-214 has a generally compact design. The key member 2424 may have a base portion 2480 that has a compact length and wherein the USB connector 2425 extends from the compact base portion 2480. The overall size of the compact base portion 2480 can vary as desired. The key member 2424 may be operably connected to the electronic module 2412 through a side opening 2482 in the electronic module 2412. For data transfer, the key member 2424 may be removed from the side opening 2482, wherein the USB connector 2425 can be plugged into a USB port on a computer. Operation of the watch 2410 is identical as described above.

Figure 215:
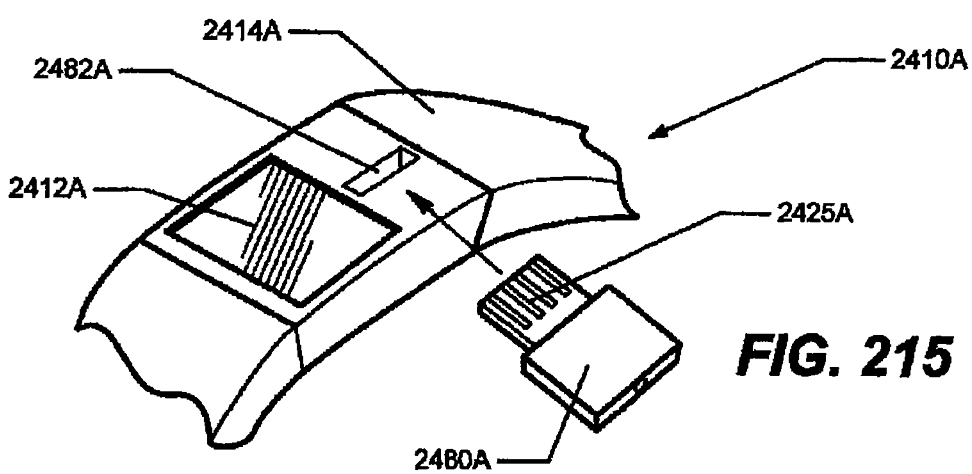

FIG. 215 discloses another embodiment of the watch similar to FIGS. 213 and 214 without departing from this invention. The watch 2410 has an electronic module 2412 connected to a wristband 2414. The electronic module 2412 is similar to the electronic module 12 as described above in FIGS. 1-21. It is understood that the electronic module 2412 can be permanently connected to the wristband 2414 or removably connected to the wristband 2414 as with the previous embodiments. The electronic module 2412 includes a removable key member 2424A. In an exemplary embodiment, the key member 2424A takes the form of a USB device having a USB connector 2425A and memory. The electronic module 2412 in FIG. 215 may have an opening 2482A proximate a top portion 2484A of the module 2412 and at generally a midpoint of the width of the module 2412. The key member 2424A, similar in size to the key member 2424 of FIG. 213 is inserted into the opening 2482A for operable connection to the electronic module 2412. The length of the key member 2424A and lateral position of the opening 2482A are dimensioned such that when the key member 2424A is fully inserted into the opening 2482A, a distal end 2480A of the key member 2424A is generally flush with the outer periphery of the electronic module 2412. The key member 2424A could also be within the outer periphery and in this embodiment, does not extend past the outer periphery of the electronic module 2412 or wristband 2414. For data transfer, the key member 2424A may be removed from the side opening 2482A, wherein the USB connector 2425A can be plugged into a USB port on a computer. Operation of the watch 2410 is identical as described above.

FIGS. 216-219 disclose another embodiment of the watch designated as reference numeral 2510. The watch 2510 has an electronic module 2512 connected to a wristband 2514. The electronic module 2512 is similar to the electronic module 2512 as described above in FIGS. 1-21. It is understood that the electronic module 2512 can be permanently connected to the wristband 2514 or removably connected to the wristband 2514 as with the previous embodiments. In FIGS. 216-219, the watch 2510 includes a key member 2524, that includes both a USB connector 2525 and a compact housing 2526. The housing 2526 may include a panel for displaying indicia if desired. Additionally, a distal end 2580 of the wristband 2514 has an opening 2582. The USB connector 2525 of the key member 2524 may be inserted into the opening 2582 on the wristband 2514. It is understood that the wristband 2514 has flexible connectors extending within the wristband 2514 wherein the key member 2524, once inserted into the opening 2582, is operably connected to the electronic module 2512. The USB connector 2525 and wristband 2514 may have cooperative structure to assure the key member 2524 remains connected to wristband 2514 as desired. This structure may include an interference fit, cooperative detents or other suitable retaining structure. For data transfer, the key member 2524 may be removed from the opening 2582 on the wristband 2514, wherein the USB connector 2525 can be plugged into a USB port on a computer. Operation of the watch 2510 is identical as described above.

Figure 220:
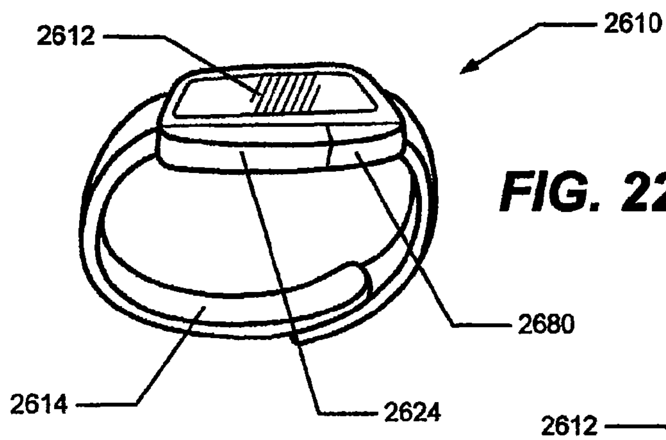
Figure 221:
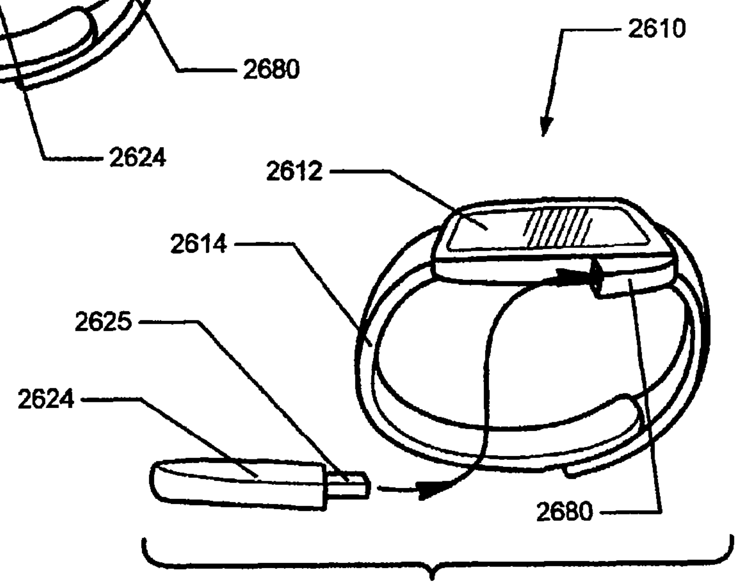
Figure 222:
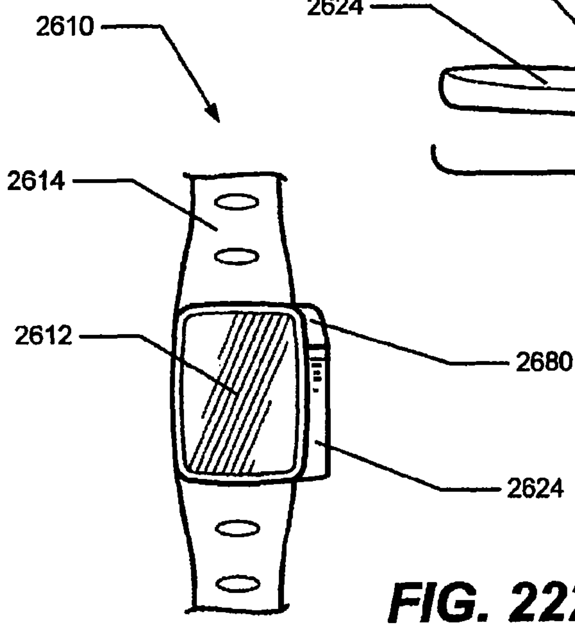
Figure 223:
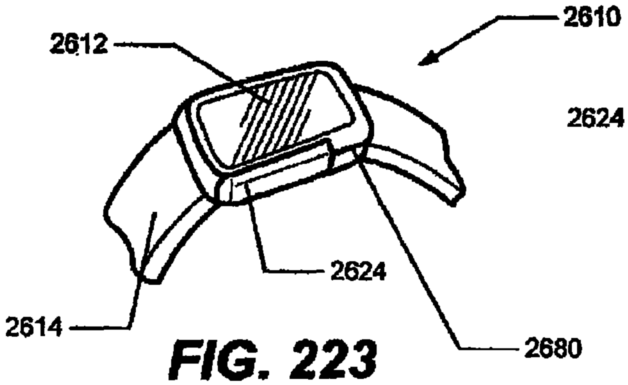

FIGS. 220-226 disclose another embodiment of the watch generally designated with the reference numeral 2610. The watch 2610 has an electronic module 2612 connected to a wristband 2614. The electronic module 2612 is similar to the electronic module 12 as described above in FIGS. 1-21. In this embodiment the electronic module 2612 may be permanently connected to the wristband 2614. The electronic module 2612 includes a removable key member 2624. In an exemplary embodiment, the key member 2624 takes the form of a USB device having a USB connector 2625 and memory. In FIGS. 220-226, the electronic module 2612 has a sleeve 2680 that extends laterally from a sidewall of the electronic module 2612. The USB connector 2625 of the electronic module 2612 is received by the sleeve 2680 on the electronic module 2612. The length and width of the key member 2624 and lateral position of the sleeve 2680 may be dimensioned such that when the key member 2624 is fully inserted into the sleeve 2680, the key member 2624 is generally flush with the outer periphery of the electronic module 2612 as shown in FIGS. 220, 222, and 223. The USB connector 2624 and sleeve 2680 may have a cooperative structure to assure the key member 2624 remains connected to electronic module 2612 as desired. This cooperative structure may include an interference fit, cooperative detents or other suitable retaining structure. Operation of the watch 2610 is identical as described above.

Figure 227:
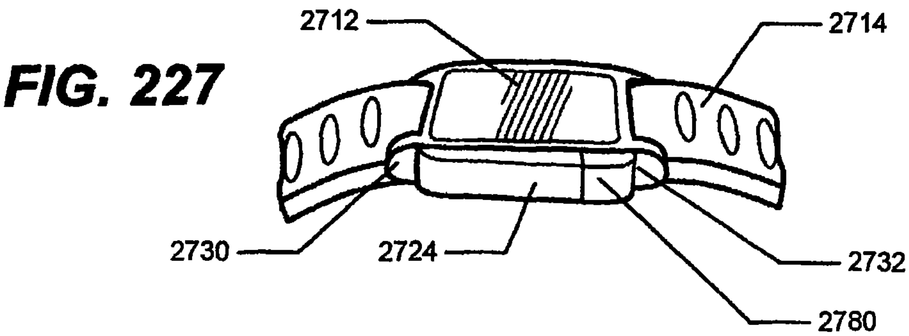
Figure 228:
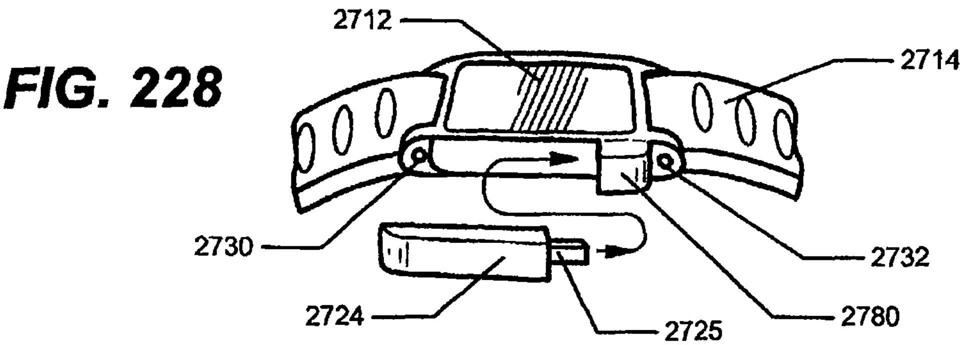
Figure 229:
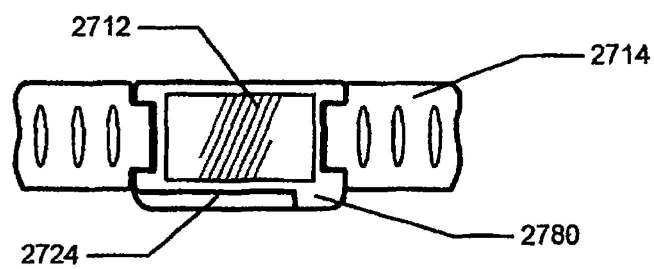
Figure 230:
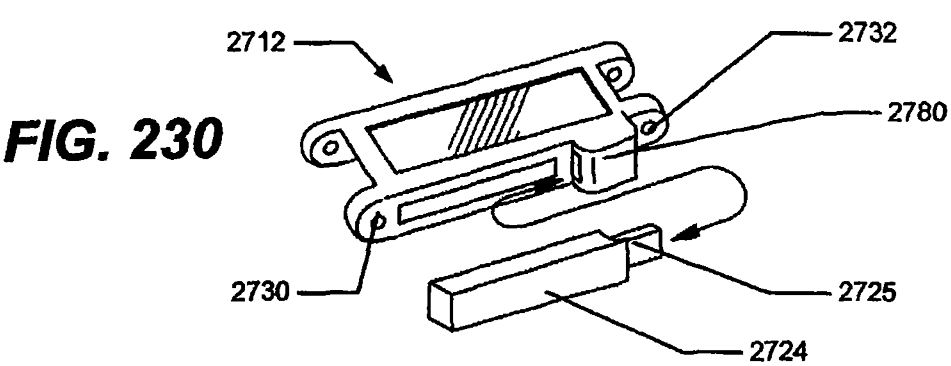
Figure 231:
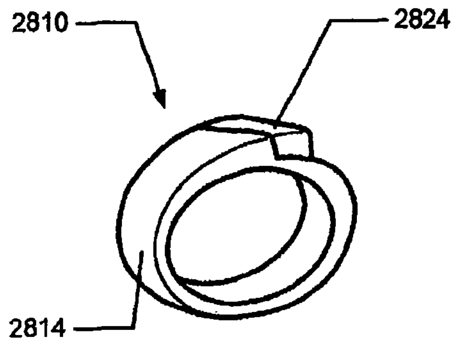

FIGS. 227-230 disclose another embodiment of the watch generally designated with the reference numeral 2710. The watch 2710 has an electronic module 2712 connected to a wristband 2714. The electronic module 2712 is similar to the electronic module 12 as described above in FIGS. 1-21. In this embodiment the electronic module 2712 may be removably connected to the wristband 2714. As shown in FIGS. 227-230, this embodiment of the watch 2710 is very similar to the embodiment as described above for FIGS. 220-226, except that the electronic module 2712 may be removably connected to the wristband 2714. The electronic module 2712 has two pairs of resilient legs 2730, 2732 extending from top end and bottom end of the module 2712. Each pair of legs 2730, 2732 connect to one of the wristband ends, thereby connecting the electronic module 2712 to the wristband 2714. In this embodiment, the electronic module 2712 includes a removable key member 2724 that takes the form of a USB device having a USB connector 2725 and memory. The electronic module 2712 has a sleeve 2780 that extends laterally from a sidewall of the electronic module 2712. The USB connector 2725 of the electronic module 2712 is received by the sleeve 2780 on the electronic module 2712. The length and width of the key member 2724 and lateral position of the sleeve 2780 may be dimensioned such that when the key member 2724 is fully inserted into the sleeve 2780, the key member 2724 is generally flush with the outer periphery of the electronic module 2712 as shown in FIGS. 227 and 229. The USB connector 2725 and sleeve 2780 may have a cooperative structure to assure the key member 2724 remains connected to electronic module 2712 as desired. This cooperative structure may include an interference fit, cooperative detents or other suitable retaining structure. Operation of the watch 2710 is identical as described above.

Figure 232:
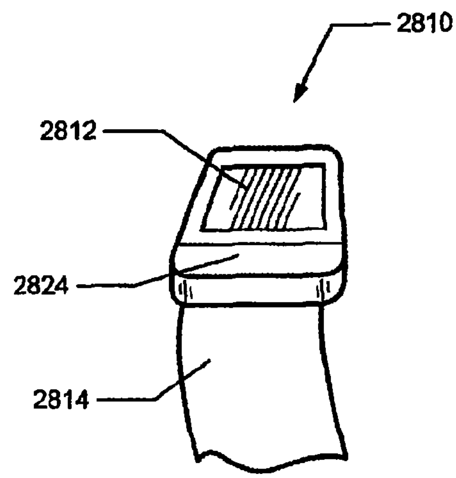
Figure 233:
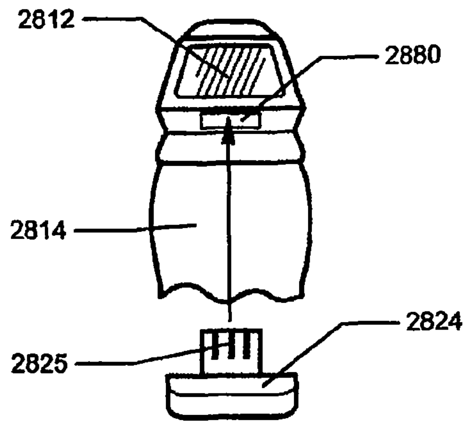
Figure 234:
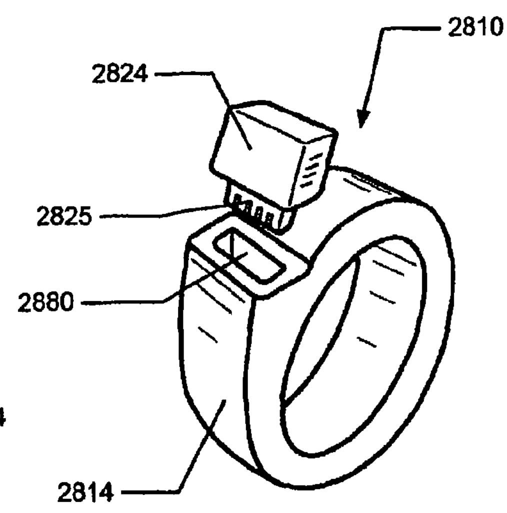

FIGS. 231-234 disclose another embodiment of the watch generally designated with the reference numeral 2810. The watch 2810 has an electronic module 2812 that is largely incorporated into the wristband 2814. The electronic module 2812 includes a removable key member 2824. In an exemplary embodiment, the key member 2824 takes the form of a USB device having a USB connector 2825 and memory. The key member 2824 shown in FIGS. 231-234 is operably connected to the electronic module 2812 through an opening 2880 in the electronic module 2812 located on the top or bottom of the electronic module 2812. The length of the key member 2824 and lateral position of the opening 2880 may be dimensioned such that when the key member 2824 is fully inserted into the opening 2880, the key member 2824 is generally flush with the sidewalls of the electronic module 2812 as shown in FIG. 232. The USB connector 2825 and the opening 2880 may have a cooperative structure to assure the key member 2824 remains connected to electronic module 2812 as desired. This cooperative structure may include an interference fit, cooperative detents or other suitable retaining structure. Operation of the watch 2810 is identical as described above.

Figure 235:
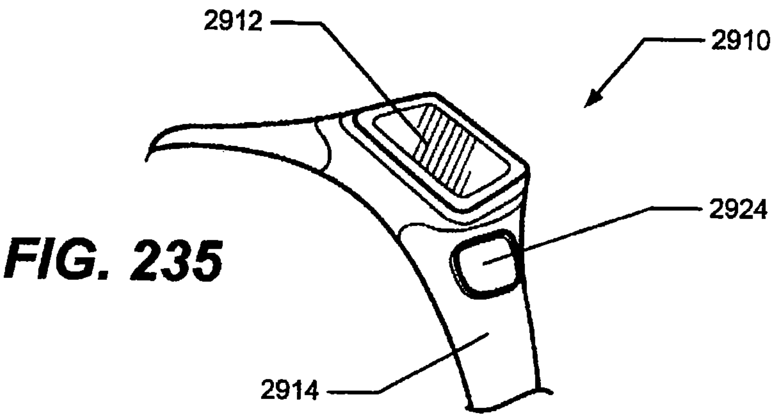
Figure 236:
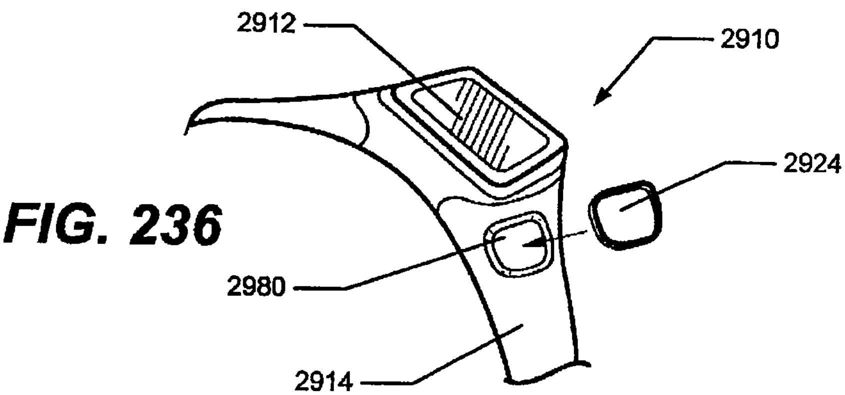
Figure 237:
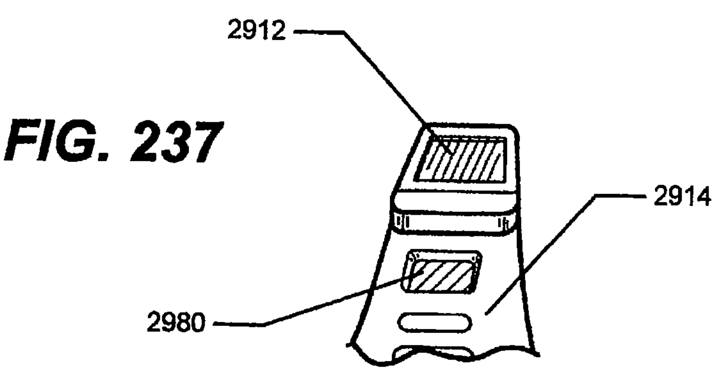
Figure 242:
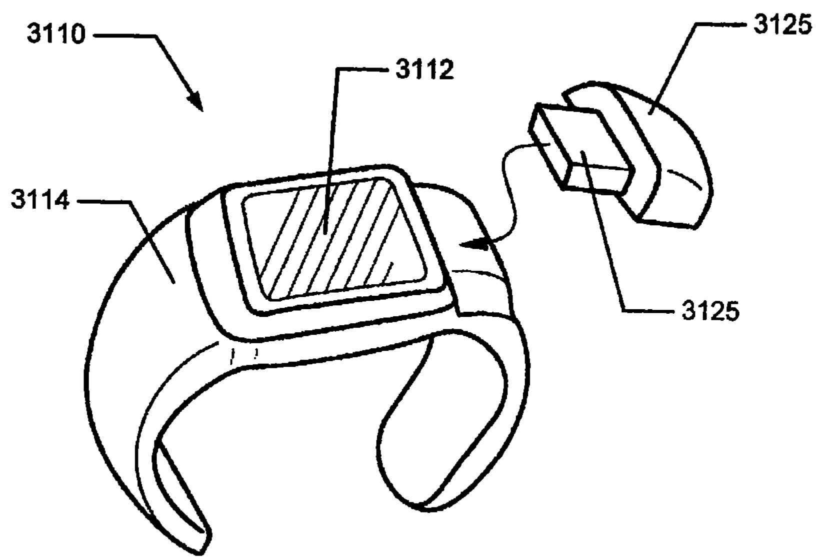
Figure 243:
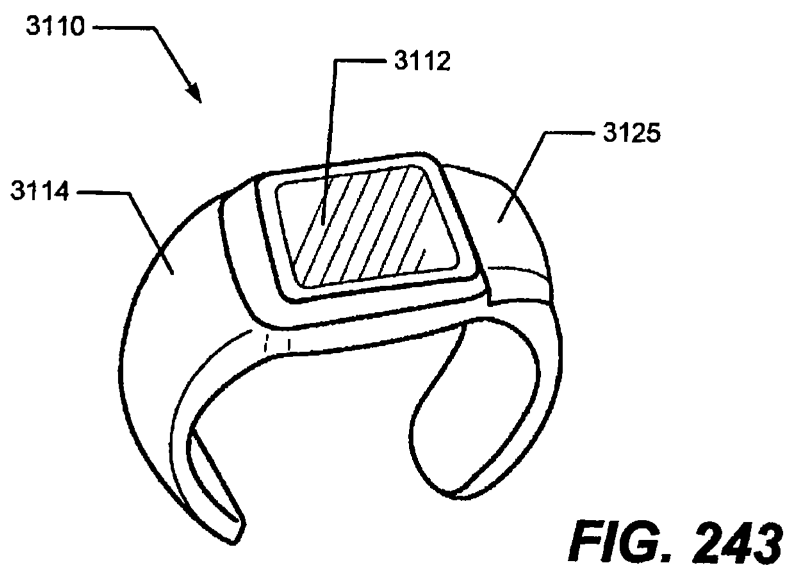
Figure 244:
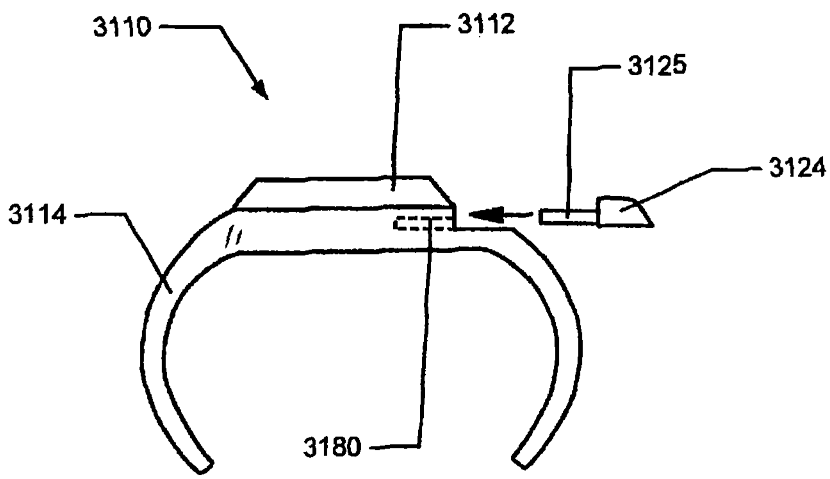
Figure 245:
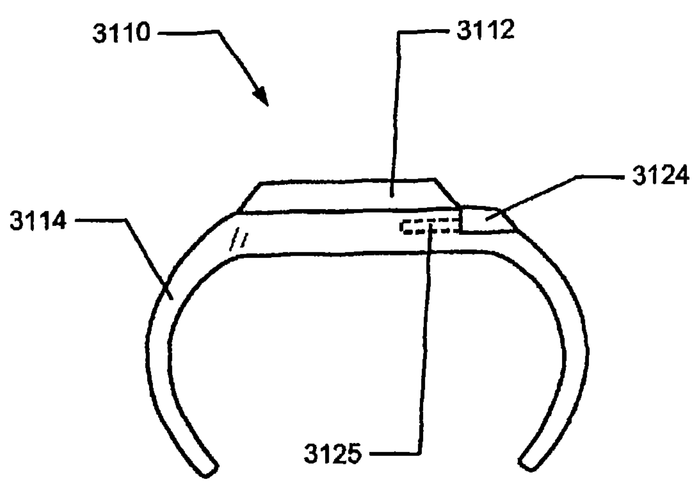
Figure 246:
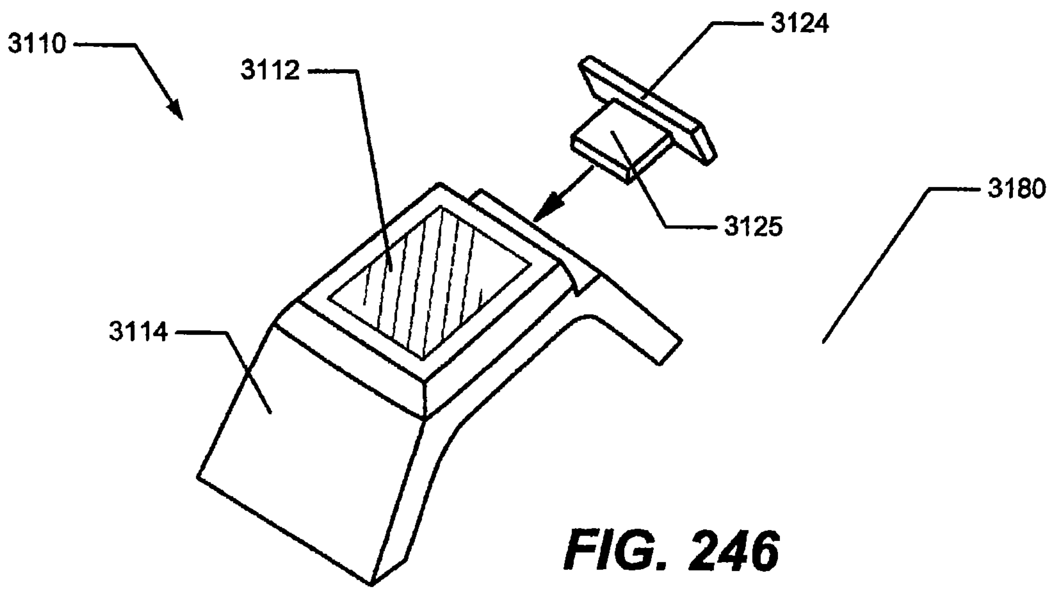
Figure 247:
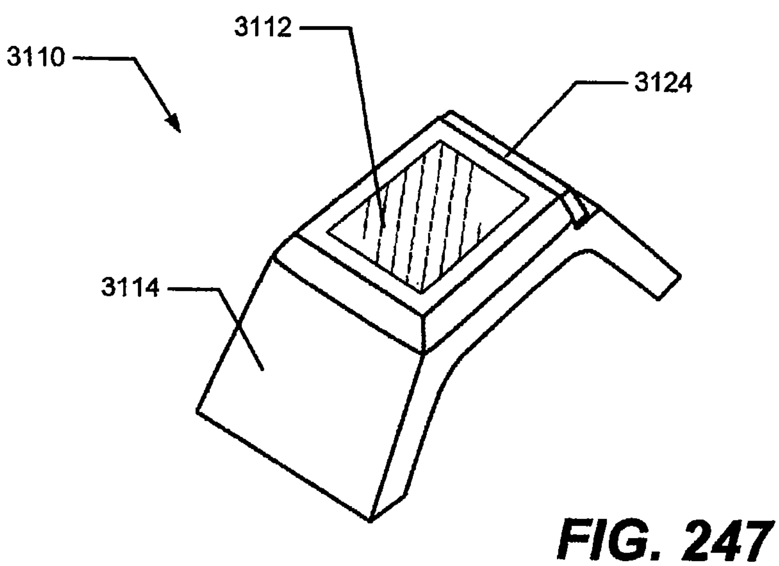
Figure 248:
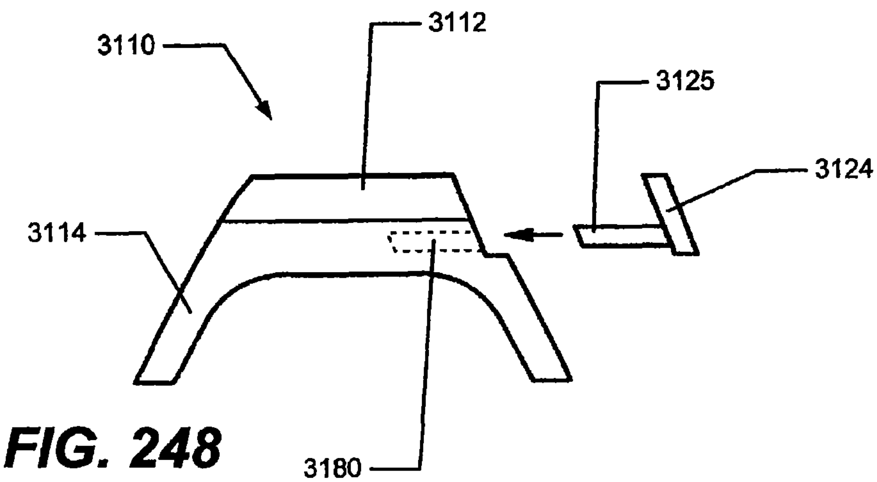
Figure 249:
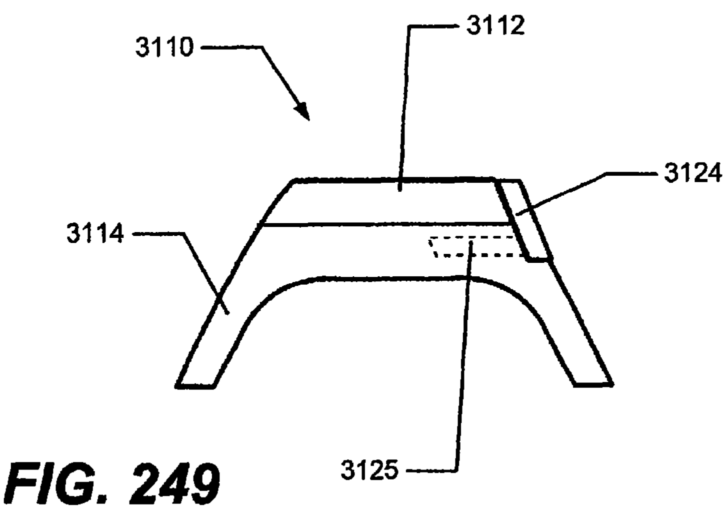

FIGS. 235-237 disclose another embodiment of the watch generally designated with the reference numeral 2910. The watch 2910 has an electronic module 2912 connected to a wristband 2914. The electronic module 2912 is similar to the electronic module 12 as described above in FIGS. 1-21. It is understood that the electronic module 2912 can be permanently connected to the wristband 2914 or removably connected to the wristband 2914 as with the previous embodiments. In FIGS. 235-237, the key member 2924 takes the form of a chip that is operably connected to the electronic module 2912 through a cavity 2980 in the wristband 2914. The chip 2924 may have leads incorporated therein to operably connect to the electronic module 2912. Once athletic performance data is recorded on the chip 2924, the chip 2924 or the key member is removed from the wristband 2914. The chip 2924 can then be inserted into a USB device configured to receive the chip 2924. The USB device can then be inserted into a USB port of a computer wherein the athletic performance data can be uploaded to the computer and a remote location such as an athletic performance monitoring site as described above. The leads on the chip 2924 provide the electrical connection in order to transfer the athletic performance data from the chip 2924 through the USB device to the computer. Operation of the watch 2910 is identical as described above.

FIGS. 238-241 disclose another embodiment of the watch generally designated with the reference numeral 3010. The watch 3010 has an electronic module 3012 that is largely incorporated into the wristband 3014. The electronic module 3012 includes a removable key member 3024. In an exemplary embodiment, the key member 3024 takes the form of a USB device having a USB connector 3025 and memory. As shown in FIGS. 239-241, a slot 3080 is formed between the wristband 3014 and the electronic module 3012. The slot 3080 is located beneath the electronic module 3012, wherein the slot 3080 has an opening 3082 for the USB connector 3025. The key member 3024 may be operably connected to the electronic module 3012 by sliding the key member 3024 inside the slot 3080 and into the opening 3082 as shown in FIG. 239. The length, width, and height of the key member 3024 and size of the slot 3080 may be dimensioned such that when the key member 3024 is fully inserted into the opening 3082, the key member 3024 is generally flush with the outer periphery of the electronic module 3012 as shown in FIG. 240. The USB connector 3025 and opening 3082 may have a cooperative structure to assure the key member 3024 remains connected to electronic module 3012 as desired. Additionally, the slot 3080 and the key member 3024 may have a second cooperative structure to assure the key member 3024 remains connected to the electronic module 3012 as desired. These cooperative structures may include an interference fit, cooperative detents or other suitable retaining structure, or any other combination thereof. Operation of the watch 3010 is identical as described above.

FIGS. 242-249 disclose another embodiment of the watch designated as reference numeral 3110. The watch 3110 may have an electronic module 3112 that is largely incorporated into the wristband 3114. The electronic module 3112 may include a removable key member 3124. In an exemplary embodiment, the key member 3124 takes the form of a USB device having a USB connector 3125 and memory. The key member 3124 shown in FIGS. 242-249 are two different exemplary embodiments of the present invention. Without departing from the invention, the shape and size of the key member 3124 may be varied similarly to FIGS. 242-249.

The key member 3124 shown in FIGS. 242-249 is operably connected to the electronic module through an opening 3180 in the wristband 3114 located in close proximity below the electronic module 3112. The dimensions of the key member 3124 and position of the opening 3180 may be dimensioned such that when the key member 3124 is fully inserted into the opening 3180, the key member 3124 is generally flush with the outer periphery of the electronic module 3124. The USB connector 3125 and opening 3180 may have a cooperative structure to assure the key member 3124 remains connected to electronic module 3114 as desired. This structure may include an interference fit, cooperative detents or other suitable retaining structure. For data transfer, the key member 3124 may be removed from the opening 3180 on the wristband 3114, wherein the USB connector 3125 can be plugged into a USB port on a computer. Operation of the watch 3110 is identical as described above.

Figure 250:
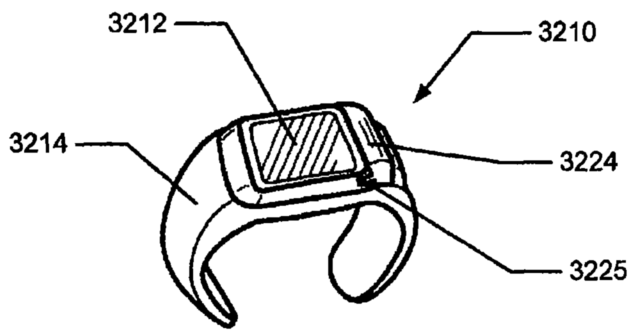
Figure 251:
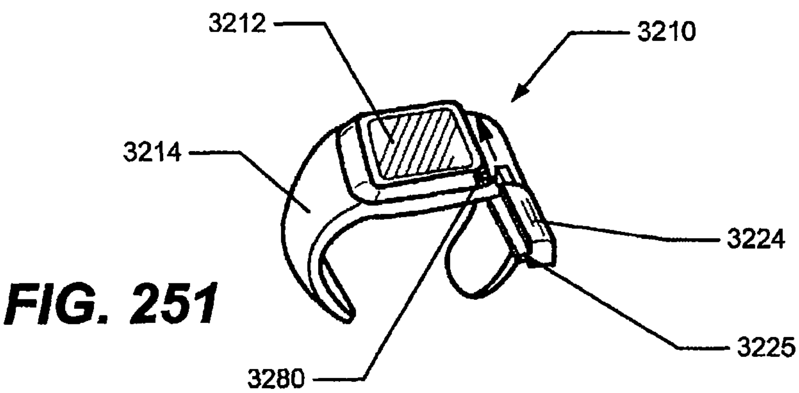
Figure 252:
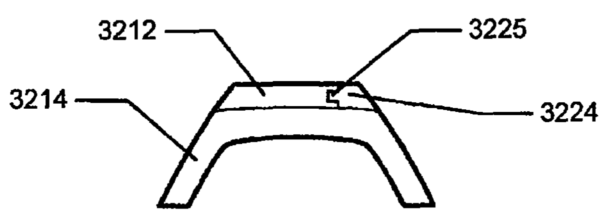

FIGS. 250-252 disclose another embodiment of the watch generally designated with the reference numeral 3210. The electronic module 3212 is similar to the electronic module 12 as described above in FIGS. 1-21. It is understood that the electronic module 3212 can be permanently connected to the wristband 3214 or removably connected to the wristband 3214 as with the previous embodiments. The electronic module 3212 includes a removable key member 3224. The key member 3224 shown in FIGS. 250-252 may have a flange 3225 on one end, wherein leads are integrated within the flange 3225. The key member 3224 is operably connected to the electronic module 3212 through a groove 3280 or slot on the either the top or the bottom of the electronic module 3212 by sliding the flange 3225 on the key member 3224 through the groove 3280 on the electronic module 3212. Once athletic performance data is recorded on the key member 3224, the key member 3224 is removed from the electronic module 3212. The key member 3224 can then be inserted into a USB device configured to receive the key member 3224. The USB device can then be inserted into a USB port of a computer wherein the athletic performance data can be uploaded to the computer and a remote location such as an athletic performance monitoring site as described above. The leads on the key member 3234 provide the electrical connection to transfer the athletic performance data from the key member 3224 through the USB device to the computer. Operation of the watch 3210 is identical as described above.

Figure 253:
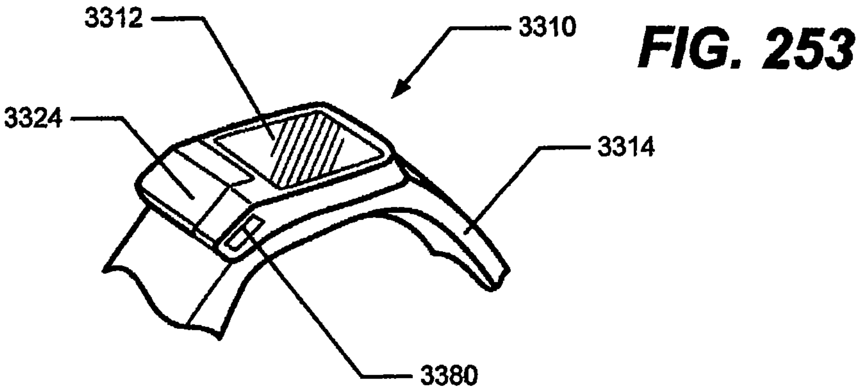
Figure 254:
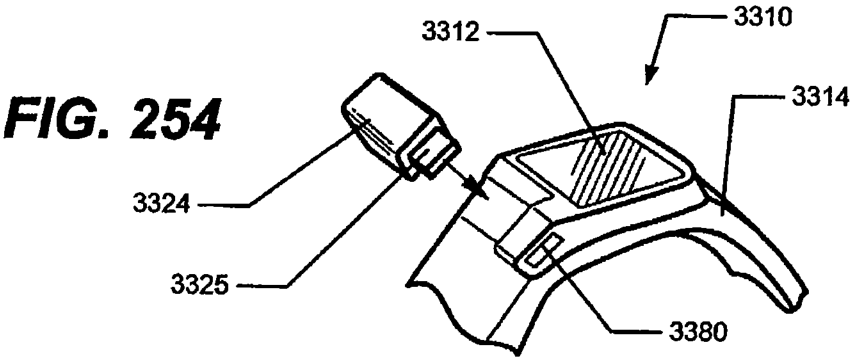
Figure 255:
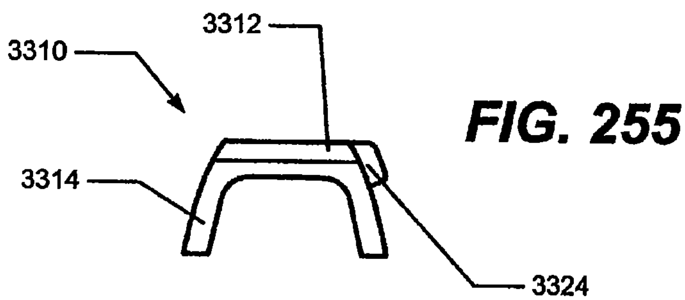
Figure 256:
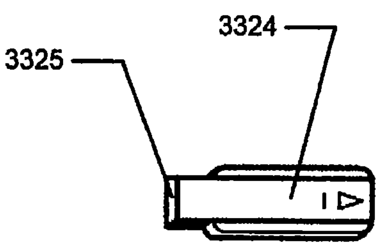

FIGS. 253-257 disclose another embodiment of the watch generally designated with the reference numeral 3310 similar to the embodiment in FIGS. 220-226. The watch 3310 has an electronic module 3312 connected to a wristband. The electronic module 3312 is similar to the electronic module 12 as described above in FIGS. 1-21. It is understood that the electronic module 3312 can be permanently connected to the wristband 3314 or removably connected to the wristband 3314 as with the previous embodiments. The electronic module 3312 includes a removable key member 3324. In an exemplary embodiment, the key member 3324 takes the form of a USB device having a USB connector 3325 and memory. In FIGS. 253-257, the electronic module 3312 has a sleeve 3380 that extends laterally from the bottom or top of the electronic module 3312. The USB connector 3325 of the electronic module 3312 is received by the sleeve 3380 on the electronic module 3312. The length and width of the key member 3324 and lateral position of the sleeve 3380 may be dimensioned such that when the key member 3324 is fully inserted into the sleeve 3380, the key member 3324 is generally flush with the outer periphery of the electronic module 3312 as shown in FIG. 253. The USB connector 3325 and sleeve 3380 may have a cooperative structure to assure the key member 3324 remains connected to electronic module 3312 as desired. This cooperative structure may include an interference fit, cooperative detents or other suitable retaining structure. Operation of the watch 3310 is identical as described above.

FIGS. 258-299 disclose alternative embodiments of the watch of the present invention that generally disclose an articulating USB-type data transfer member.

FIGS. 258-262 disclose an embodiment of the watch generally designated with the reference numeral 3410. The watch 3410 illustrated in FIGS. 258-262 may have an articulating USB-type data transfer member 3424. The watch 3410 has an electronic module 3412 connected to a wristband 3414. The electronic module 3412 is similar to the electronic module 12 as described above in FIGS. 1-21. It is understood that the electronic module 3412 can be permanently connected to the wristband 3414 or removably connected to the wristband 3414 as with the previous embodiments. The electronic module 3412 includes a removable articulating USB-type data transfer member 3424. In an exemplary embodiment, the articulating member 3424 takes the form of a USB device having a USB connector 3425 and memory.

As is shown in FIGS. 259-260, the articulating member 3424 has a base 3426 and a USB connector 3425 that is pivotally or hingedly connected to the base 3426. The articulating member 3424 may have multiple supports or fingers 3428 which extend from the pivotal connection to assist connecting the articulating member 3424 and the electronic module 3412. The articulating member 3424 is operably connected to the electronic module 3412 when the supports 3428 are positioned over the base 3426 of the articulating member 3424. The articulating member 3424 is operably connected to the electronic module 3412 by sliding the supports 3428 through corresponding slots 3480 positioned under the electronic module 3412. One of the supports or fingers 3428, usually the center finger, has leads that make up the USB connector 3425. As discussed, the electronic module 3412 has the same user interface as described above and operates in similar fashion as described above. To transfer data, the user pivots the USB connector 3425 about the pivotal connection wherein the USB connector 3425 rotates generally away from the base 3426 of the articulating member 3424 as shown in FIGS. 179 and 181. The USB connector 3425 can then be connected to a USB port of a computer as described above. Once data transfer is complete, the USB connector 3425 is removed from the computer and the USB connector 3425 is rotated back on top of the base 3426 of the articulating member 3424 as shown in FIGS. 259 and 261. Operation of the watch 3410 is identical as described above.

Figure 263:
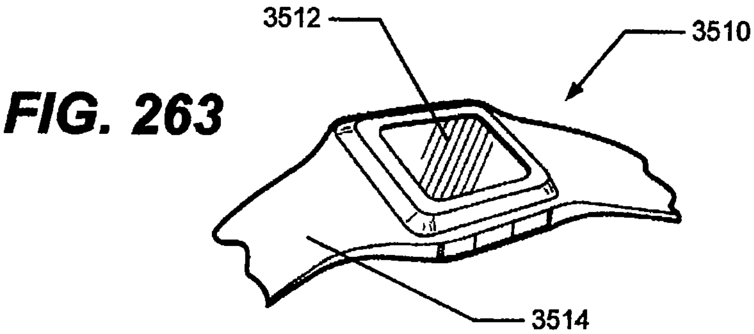
Figure 264:
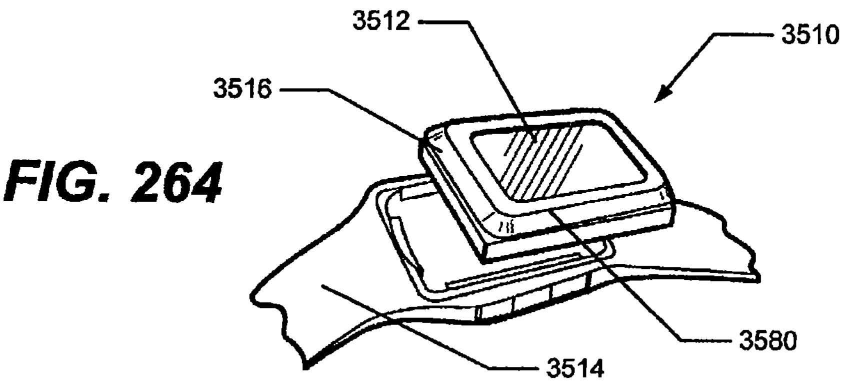
Figure 265:
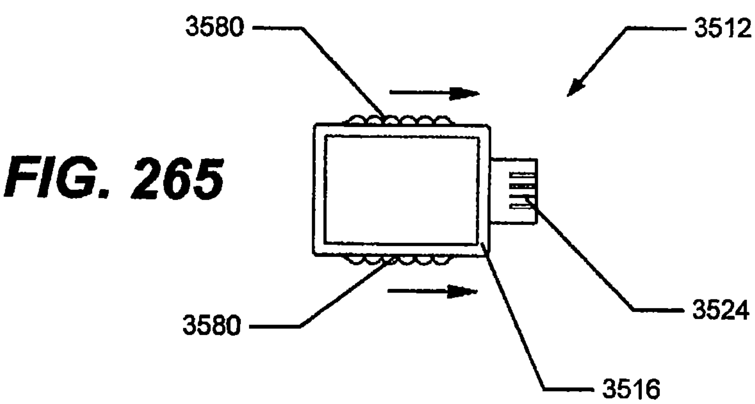

FIGS. 263-265 disclose another embodiment of the watch generally designated with the reference numeral 3510. The watch 3510 has an electronic module 3512 removably connected to a wristband 3514. The electronic module 3512 may be removably connected to the wristband 3514 by setting the electronic module 3512 on the top of the wristband 3514 and further connected to the wristband 3514 using an interference fit or a cooperative structure between the wristband 3514 and the electronic module 3512. This embodiment has a USB connector 3524 integrated with the housing 3516 of the electronic module 3512. The electronic module 3512 may have a pair of levers 3580 on each side of the housing 3516 of the electronic module 3512 connected to the USB connector 3524. To transfer data, the user removes the electronic module 3512 and slides the levers 3580 on each side of the electronic module 3512 forward, thereby sliding the USB connector 3524 out of the housing 3516. Additionally, in another embodiment, the user may pivot the USB connector 3512 about a pivotal connection within the housing 3516 to extend the USB connector 3524. The USB connector 3524 can then be connected to a USB port of a computer as described above. Once data transfer is complete, the USB connector 3524 is removed from the computer and the user slides the levers 3580 back, thereby retracting the USB connector 3524 back into the housing 3516. Also, the USB connector 3524 may be pivoted back into the slot of the housing 3516 wherein the USB connector 3524 is completely contained within the housing 3516. After the USB connector 3524 is put back in the housing 3516, the electronic module 3512 can be reattached to the wristband 3514 using the interference fit or the cooperative structure connection. It is understood that the electronic module 3512 may have a gripping member (not shown) thereon wherein a user could grasp the electronic module 3512 in order to more easily remove and replace the electronic module 3512. The gripping member could take various forms such as a small protrusion or textured surface. It is further contemplated that a magnetic connection could be used between the wristband 3514 and the electronic module 3512. Operation of the watch 3510 is identical as described above.

Figure 266:
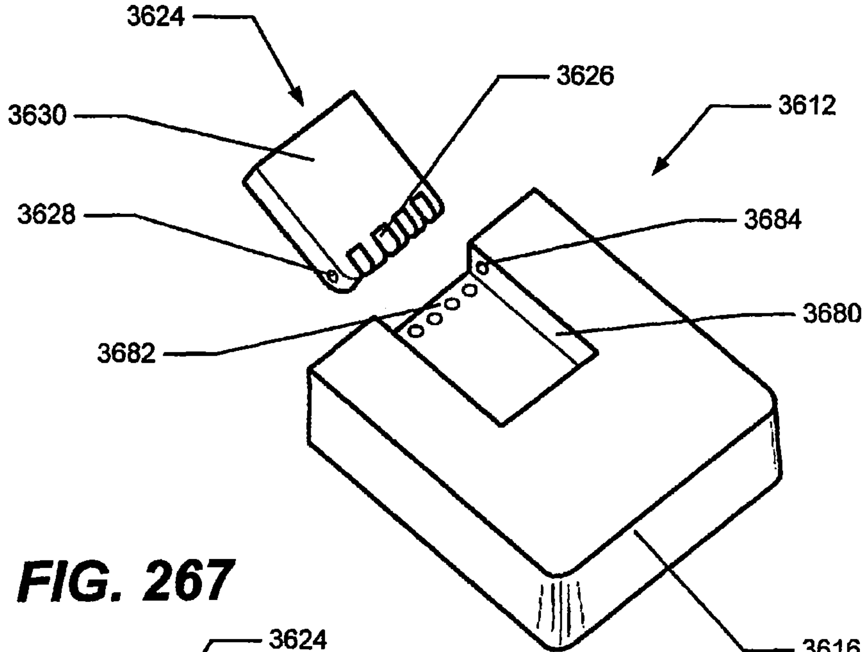
Figure 267:
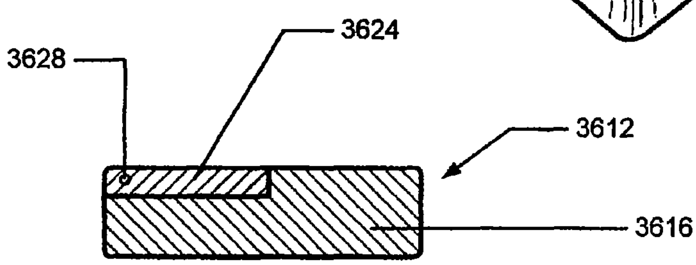
Figure 268:
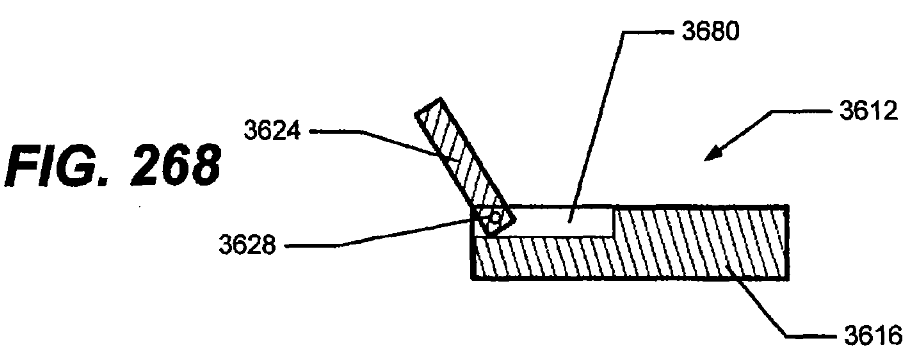

FIGS. 266-268 disclose another embodiment of the electronic module generally designated with the reference numeral 3612. As with previous embodiments, the electronic module 3612 may be connected to a wristband to make up a watch (the watch and wristband are not shown in this embodiment). It is understood that the electronic module 3612 can be permanently connected to the wristband or removably connected to the wristband as with the previous embodiments. This embodiment has a USB connector 3624 integrated with the housing 3616 of the electronic module 3612. The electronic module 3612 has a slot 3680 positioned in the bottom portion of the housing 3616. The slot 3680 has an opening 3682 in which two protrusions 3684 extend from each side of the opening 3682. The USB connector 3624 has a base 3626 that is pivotally or hingedly connected to the housing 3616 of the electronic module 3612 with the protrusions 3684 connected to two holes 3628 on each side of the USB connector 3624. Additionally, in another embodiment, it should be understood that the housing 3616 may include the two holes 3628 on each side of the opening 3682 and the USB connector 3624 may include the protrusions 3684 which connect to the two holes 3628 on the housing 3616 of the electronic module 3612. The USB connector 3624 has a distal end 3630 extending from the base 3626 that supports the leads that make up the USB connection 3624. To transfer data, the user pivots the USB connector 3624 about the pivotal connection wherein the distal end 3630 of the USB connector 3624 extends generally transversely from the electronic module 3612. The USB connector 3624 can then be connected to a USB port of a computer as described above. Once data transfer is complete, the USB connector 3524 is removed from the computer and the USB connector 3624 is pivoted back into the slot 3580 of the housing 3516 as shown in FIG. 267 wherein the USB connector 3624 is completely contained within the housing 3516. It is understood that the distal end 3620 of the USB connector 3624 may have a gripping member thereon wherein a user could grasp the USB connector 3624 with a finger to pivot. The gripping member could take various forms such as a small protrusion or textured surface. It is further contemplated that a magnetic connection could be used between the housing 3616 and USB connector 3624 wherein the USB connector 3624 could be pushed further into the housing 3616 such that the USB connector 3624 would be then be forced back partially out of the housing 3616 where the USB connector 3624 could then be further pivoted out of the housing 3616. Operation of the watch is identical as described above.

Figure 269:
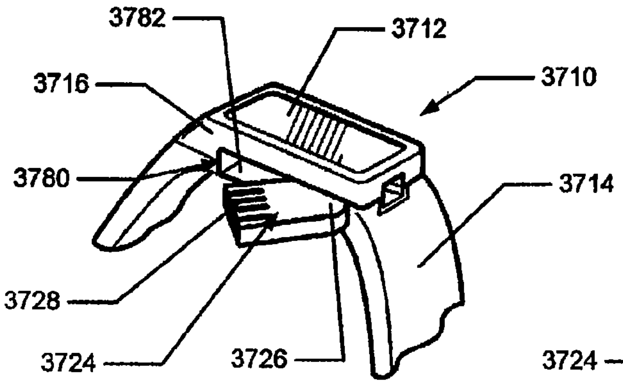
Figure 270:
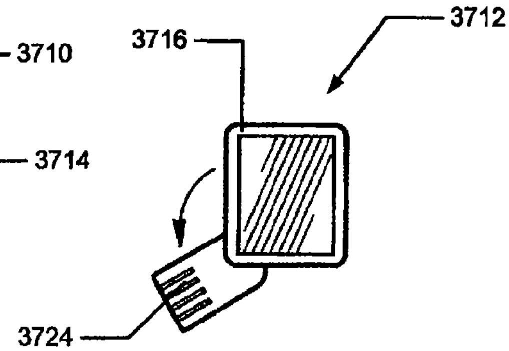
Figure 271:
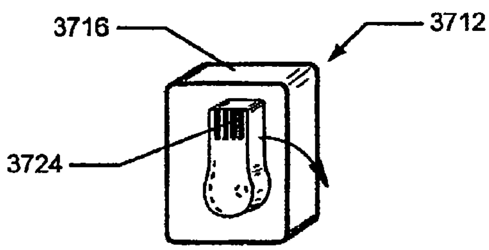

FIGS. 269-271 disclose another embodiment of the watch generally designated with the reference numeral 3710. The watch 3710 has an electronic module 3712 connected to a wristband 3714. It is understood that the electronic module 3712 can be permanently connected to the wristband 3714 or removably connected to the wristband 3714 as with the previous embodiments. This embodiment has a USB connector 3724 integrated with the housing 3716 of the electronic module 3712. The electronic module 3712 has a slot 3580 positioned in a bottom portion of the housing 3716. The slot 3780 has an opening 3780 at a side portion of the housing 3716 and extends into the housing 3716. The USB connector 3724 has a base 3726 that is pivotally or hingedly connected to the housing 3716 of the electronic module 3712. The USB connector 3724 has a distal end 3728 extending from the base 3726 that supports the leads that make up the USB connection 3724. As discussed, the electronic module 3712 has the same user interface as described above and operates in similar fashion as described above. To transfer data, the user pivots the USB connector 3724 about the pivotal connection wherein the distal end 3728 of the USB connector 3724 extends generally transversely from the electronic module 3712. The USB connector 3724 can then be connected to a USB port of a computer as described above. Once data transfer is complete, the USB connector 3724 is removed from the computer and the USB connector 3724 is pivoted back into the slot 3780 of the housing 3716 as shown in FIG. 169 wherein the USB connector 3724 is completely contained within the housing 3716. It is understood that the distal end of the USB connector 3724 may have a gripping member thereon wherein a user could grasp the USB connector 3724 with a finger to pivot. The gripping member could take various forms such as a small protrusion or textured surface. It is further contemplated that a magnetic connection could be used between the housing 3716 and USB connector 3724 wherein the USB connector 3724 could be pushed further into the housing 3716 such that the USB connector 3724 would be then be forced back partially out of the housing 3716 where the USB connector 3724 could then be further pivoted out of the housing 3716. Operation of the watch 3710 is identical as described above.

Figure 272:
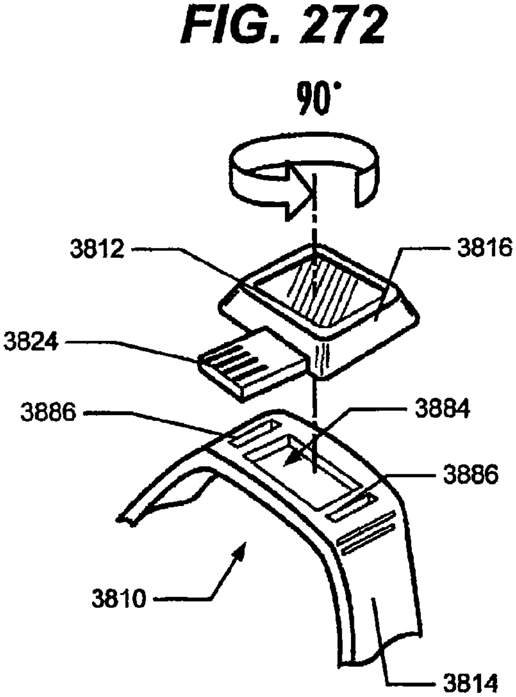
Figure 273:
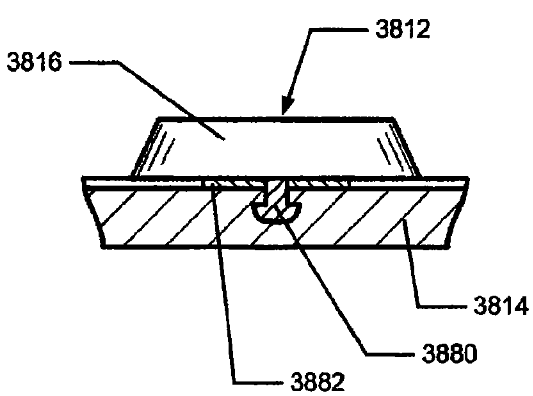

FIGS. 272-273 disclose another embodiment of the watch generally designated with the reference numeral 3810. The watch 3810 has an electronic module 3812 connected to a wristband 3814. This embodiment discusses an alternative structure for the electronic module 3812 to be removably connected to the wristband 3814. This embodiment generally has a USB connector 3824 integrated with the housing 3816 of the electronic module 3812 in any of the various methods as described above and throughout this application. The electronic module 3812 has a protrusion 3880 on the bottom side of the housing 3816. The protrusion 3880 has a generally circular cross-section and an enlarged rounded head. The protrusion 3880 is adapted to be inserted into a receiver or aperture 3815 in the wristband 3814 that is dimensioned to receive the protrusion 3880. Structure is provided for rotational connection and removal of the electronic module 3812.

Additionally, as is shown in FIGS. 272-273, the electronic module 3812 has a flange portion 3882 extending from the housing 3816 for connecting the flange portion 3882 to a receiving portion 3884 on the wristband 3814. The receiving portion of the wristband 3884 has an elongated slot 3886. The face of the receiving portion 3884 can have guide holes (not shown) to provide for a tactile feel. The elongated slot 3886 receives the flange portion 3882 of the electronic module 3812. The underside of the receiving portion 3884 may have a first locking groove and a second locking groove. The first locking groove and the second locking groove can include locating holes to provide for a tactile feel with associated structure on the flange portion 3882. The grooves receive the flange portion 3882 of the electronic module 3812. To secure the electronic module 3812 to the wristband 3814, the flange portion 3882 is aligned with the elongated slot 3886 located in the receiving portion 3884 of the wristband 3814. Once the flange portion 3882 is aligned with the elongated slot 3886, the flange portion 3882 is inserted through the slot 3886. The user then rotates the electronic module 3812 either ninety or one hundred eighty degrees such that the first end and the second end of the flange portion 3882 align with the first locking groove and the second locking groove respectively. Thus, the electronic module 3812 is mounted such as shown in FIG. 191. Additionally, the locating protrusions 3880 may align with the locating holes so the user knows that the electronic module 3812 is properly secured to the wristband 3814. Thus, the electronic module 3812 is connectable and removable from the wristband 3814 using a rotational movement. Operation of the watch 3810 is identical as described above.

FIGS. 274-276 disclose another embodiment of the watch generally designated with the reference numeral 3910. The watch 3910 has an electronic module 3912 connected to a wristband 3914. It is understood that the electronic module 3912 can be permanently connected to the wristband 3914 or removably connected to the wristband 3914 as with the previous embodiments. This embodiment has a USB connector 3924 integrated with the housing 3916 of the electronic module 3912. The electronic module 3912 may have a slot 3980 positioned in the bottom portion of the housing 3916. The USB connector 3924 has a base 3926 that is pivotally or hingedly connected to the housing 3916 of the electronic module 3912. The USB connector 3924 has a distal end 3928 extending from the base 3926 that supports to the leads that make up the USB connection 3924. To transfer data, the user pivots the USB connector 3924 about the pivotal connection wherein the distal end 3926 of the USB connector 3924 extends generally transversely from the electronic module 3912. The USB connector 3924 can then be connected to a USB port of a computer as described above. Once data transfer is complete, the USB connector 3924 is removed from the computer and the USB connector 3924 is pivoted back into the slot 3980 of the housing 3916 wherein the USB connector 3924 is completely contained within the housing 3916. It is understood that the distal end 3928 of the USB connector 3924 may have a gripping member thereon wherein a user could grasp the USB connector 3924 with a finger to pivot. The gripping member could take various forms such as a small protrusion or textured surface. It is further contemplated that a magnetic connection could be used between the housing 3916 and USB connector 3924 wherein the USB connector 3924 could be pushed further into the housing 3916 such that the USB connector 3924 would be then be forced back partially out of the housing 3916 where the USB connector 3924 could then be further pivoted out of the housing 3916. Additionally, the slot 3980 may be located on the top of the housing 3916 of the electronic module 3912, wherein the USB connector 3924 would rotate and pivot up and out of the housing 3916 as shown in FIG. 195 as opposed to down and out of the housing 3916 as shown in FIG. 275. Operation of the 3910 watch is identical as described above.

Figure 277:
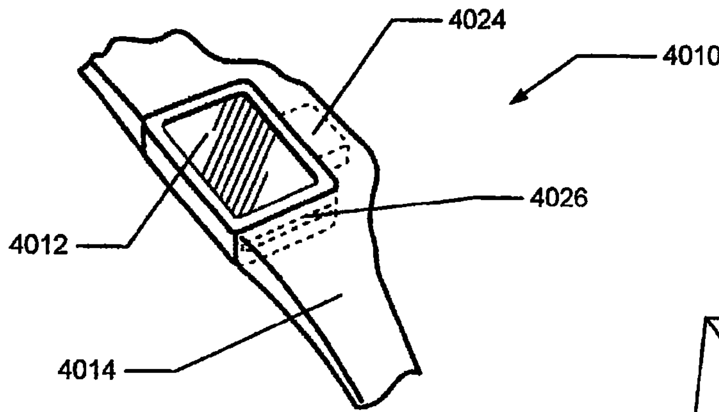
Figure 279:
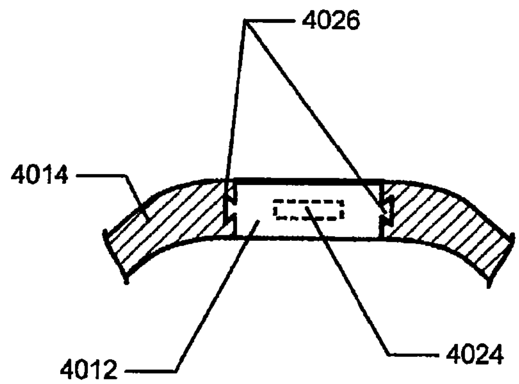
Figure 278:
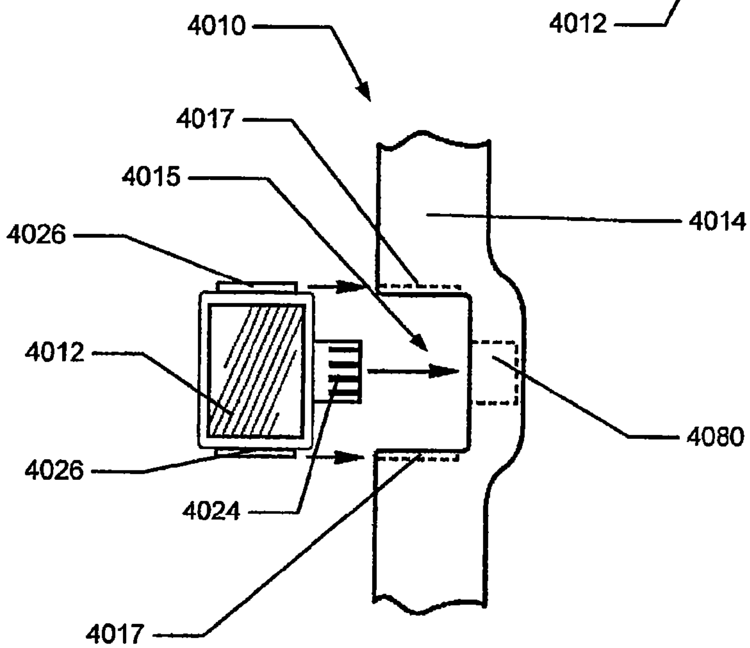
Figure 280:
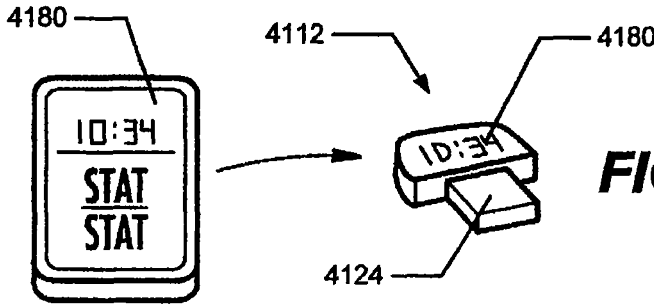
Figure 281:
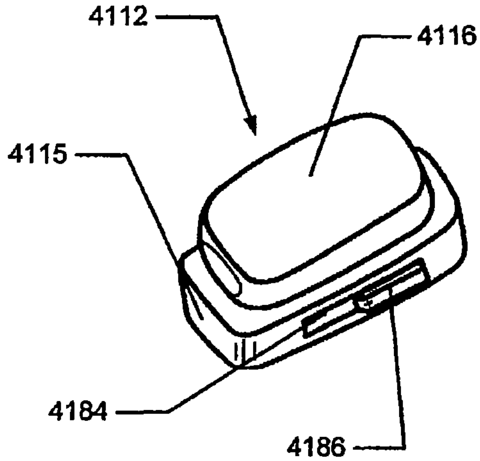
Figure 282:
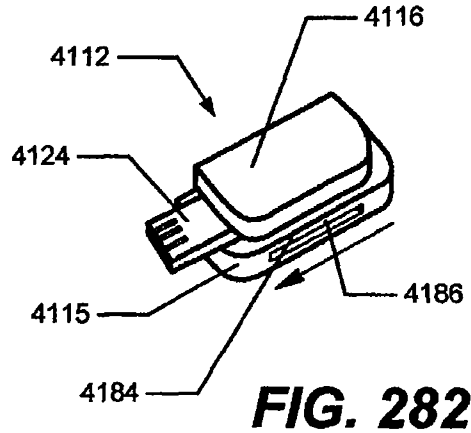
Figure 283:
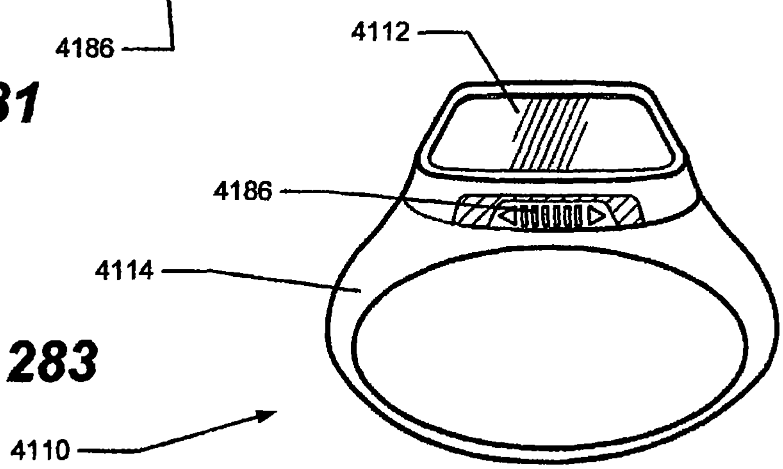

FIGS. 277-279 disclose another embodiment of the watch generally designated with the reference numeral 4010. The watch 4010 has an electronic module 4012 connected to a wristband 4014. The electronic module 4012 is similar to the electronic module 12 as described above in FIGS. 1-21. The electronic module 4012 has a USB connector 4024 extending laterally from a sidewall of the electronic module 4012. The wristband 4014 has a recessed portion 4015 at generally a central portion of the wristband 4014. An opening 4080 is further included in the wristband 4014 at the recessed portion 4015. Additionally, the electronic module 4012 has a rail 4026 located on the top side and bottom side of the electronic module 4012 as shown in FIG. 278. As the electronic module 4012 is inserted into the recessed portion 4015, the rails 4026 slide into grooves 4017 to help guide the electronic module 4012 into place and maintain the electronic module 4012 inside the recessed portion 4015. The USB connector 4024 of the electronic module 4012 is received by the opening 4080 in the wristband 4014. Operation of the watch 4010 is identical as described above.

FIGS. 280-288 disclose another embodiment of the watch generally designated with the reference numeral 4110. The watch 4110 has an electronic module 4112 connected to a wristband 4114. The electronic module 4112 is similar to the electronic module 12 as described above in FIGS. 1-21. The electronic module 4112 has a base 4115 and a housing 4116. The base 4115 may be located under the housing 4116. Additionally, the housing 4116 may contain the display and controls as described above and shown in FIG. 281, as well as a USB connector 4024. The base 4115 may contain a slot 4184 on one of the lateral edges of the base 4115. Within the slot 4184, the base 4115 may also contain a slidable lever 4186 wherein the slidable lever 4186 is connected to the USB connector 4124 within the housing 4116. To transfer data, the user slides the lever 4186 to the extended position on the base 4115 wherein the USB connector 4124 extends outward from the housing 4116. The USB connector 4124 can then be connected to a USB port of a computer as described above. Once data transfer is complete, the USB connector 4124 is removed from the computer and the user slides the lever 4186 back to the retracted position wherein the USB connector 4124 retracts inward back into the housing 4116. In the embodiments shown in FIGS. 200-207, the lever 4186 slides the same way as the USB connector 4124 slides. For instance, when the lever 4186 slides from the back to the front of the base 4115, the USB connector 4124 also slides from the back to the front, extending outside the base 4115. Operation of the watch 4110 is identical as described above.

Figure 284:
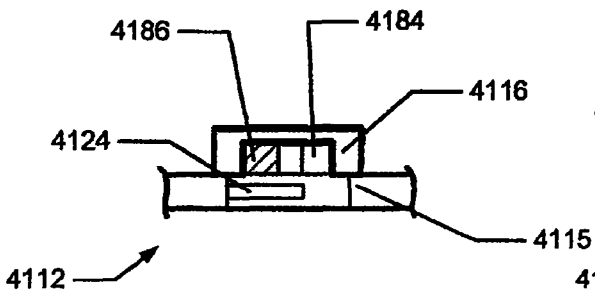
Figure 285:
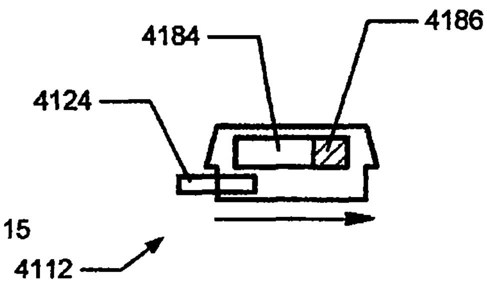

Additionally, in another embodiment as shown in FIGS. 284-285, the lever 4186 and the USB connector 4124 slide in opposite directions. For instance, when the lever 4186 slides from the front to the back, the USB connector 4124 slides from the back to the front of the base 4115. Specifically, when the lever 4186 is in the retracted position, the USB connection 4124 is also in the retracted position. However, as is different from above in FIGS. 280-283, the lever 4186 is not directly connected to the USB connection 4124. As shown in FIGS. 284-285, the lever 4186 acts a locking device for the USB connection 4124, such that when the lever 4186 is moved to the extended position, the lever 4186 releases the USB connector 4124 and the USB connector 4124 extends in the opposite direction that the lever 4186 was moved. To transfer data, the user slides the lever 4186 to the extended position on the base 4115 wherein the USB connector 4124 extends in the opposite direction, outward from the housing 4116. The USB connector 4124 can then be connected to a USB port of a computer as described above. Once data transfer is complete, the USB connector 4124 is removed from the computer and the user pushes the USB connector 4124 back into the housing 4116 while sliding the lever 4186 back to the retracted position to lock the USB connector 4124 back in the housing 4116.

Figure 286:
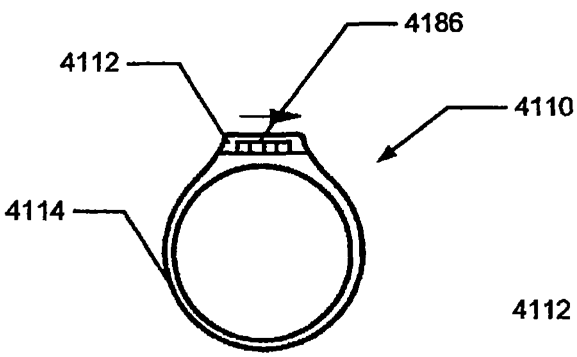
Figure 287:
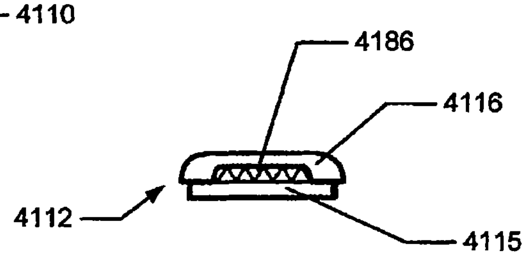
Figure 288:
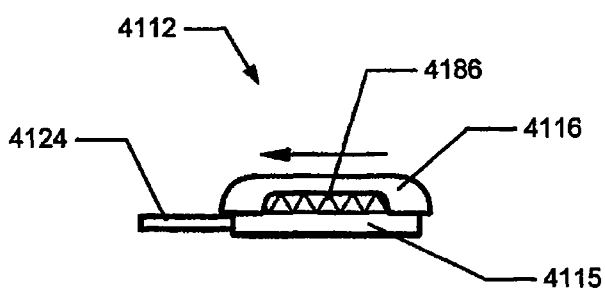

FIGS. 286-288 show an embodiment that is similar to the embodiment described in FIGS. 280-283. In FIGS. 286-288, the electronic module 4112 has a base 4115 and a housing 4116. The base 4115 may be located under the housing 4116. Additionally, the housing 4116 may contain the display and controls as described above and shown in FIG. 281, as well as a slot 4184 on one of the lateral edges of the base 4115 and a slidable lever 4186. The base 4115 may contain a USB connector 4124 which is connected to the slidable lever 4186 in the housing 4116. To transfer data, the user slides the lever 4186 to the extended position on the housing 4116 wherein the USB connector 4124 extends outward from the base 4115. The USB connector 4124 can then be connected to a USB port of a computer as described above. Once data transfer is complete, the USB connector 4124 is removed from the computer and the user slides the lever 4186 back to the retracted position wherein the USB connector 4124 retracts inward back into the base 4115. Operation of the watch 4110 is identical as described above.

Figure 289:
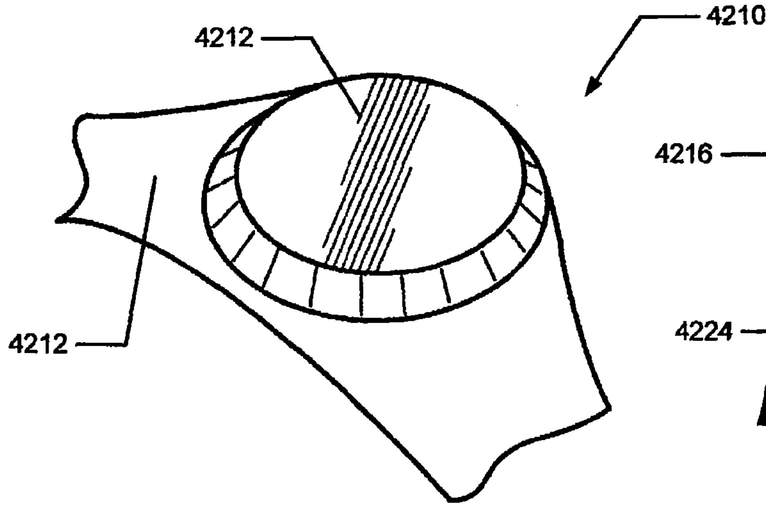
Figure 290:
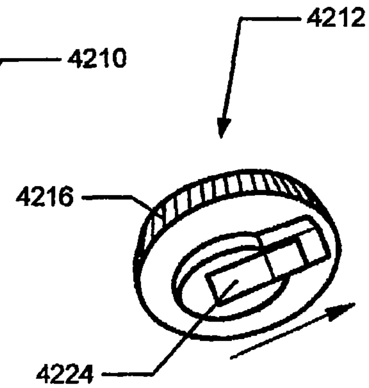
Figure 291:
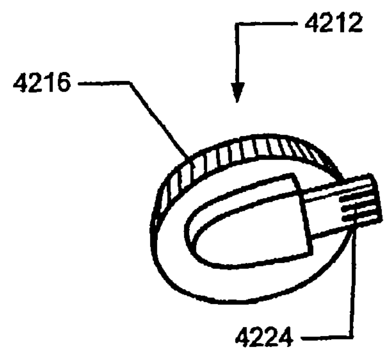

FIGS. 289-291 disclose another embodiment of the watch generally designated with the reference numeral 4210. The watch 4120 has an electronic module 4212 removably connected to a wristband 4214. In this embodiment, the electronic module 4212 is generally circular in shape and rotatably connected to the wristband 4214. This embodiment has a USB connector 4224 integrated with bottom of the housing 4216 of the electronic module 4212. To transfer data, the user removes the electronic module 4212 by rotating the electronic module 4212 and unlocking the electronic module 4212 from the wristband 4214. The user then slides the USB connector 4224 to the extended position on the housing 4216 wherein the USB connector 4224 extends outward from the electronic module 4212 as shown in FIG. 291. The USB connector 4224 can then be connected to a USB port of a computer as described above. Once data transfer is complete, the USB connector 4224 is removed from the computer and the user slides the USB connector 4224 back to the retracted position wherein the USB connector 4224 retracts inward back into the housing 4216 of the electronic module 4212 as shown in FIG. 291. Operation of the watch 4210 is identical as described above.

Figure 292:
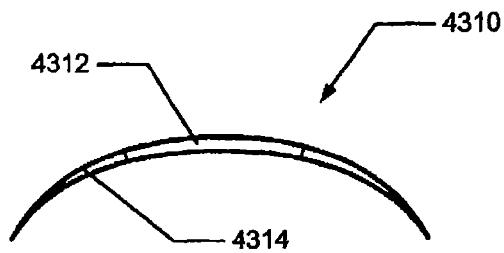
Figure 293:
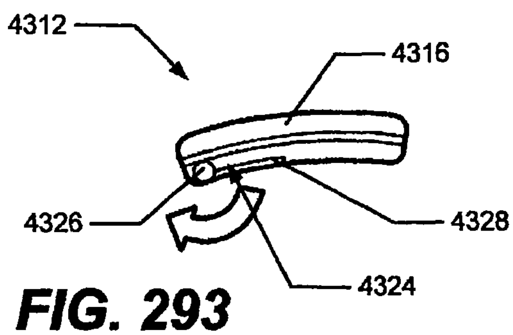
Figure 294:
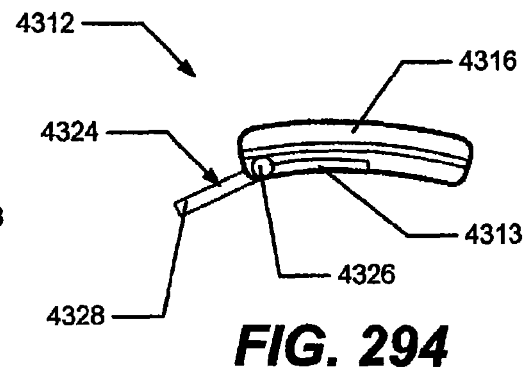
Figure 295:
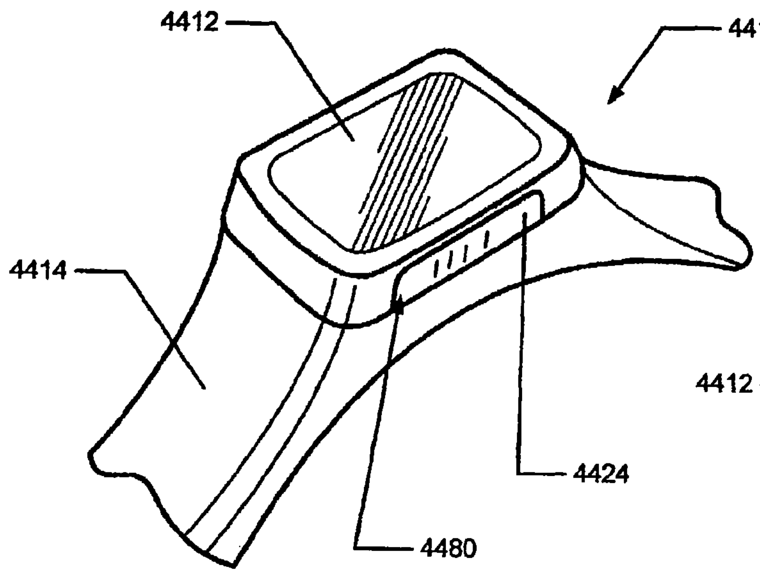
Figure 296:
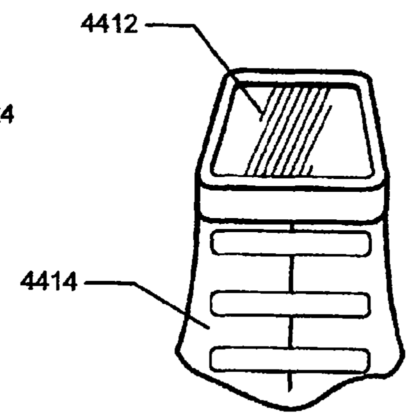
Figure 297:
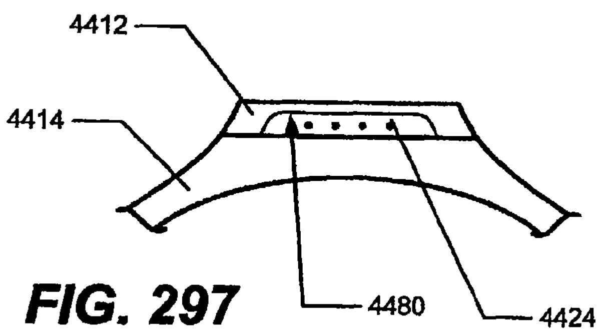
Figure 298:
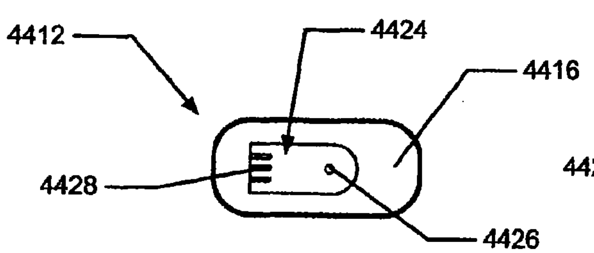

FIGS. 292-294 disclose another embodiment of the watch generally designated with the reference numeral 4310. The watch 4310 has an electronic module 4312 connected to a wristband 4314. It is understood that the electronic module 4312 can be permanently connected to the wristband 4314 or removably connected to the wristband 4314 as with the previous embodiments. This embodiment has a USB connector 4324 integrated with the housing 4316 of the electronic module 4312. The electronic module 4312 may have a slot 4313 positioned in the bottom portion of the housing 4316. The USB connector 4324 has a base 4326 that is pivotally or hingedly connected to the housing 4316 of the electronic module 4312. The USB connector 4324 has a distal end 4328 extending from the base 4326 that supports to the leads that make up the USB connection 4324. To transfer data, the user pivots the USB connector 4324 about the pivotal connection wherein the distal end 4328 of the USB connector 4324 extends generally transversely from the electronic module 4312 as shown in FIG. 294. The USB connector 4324 can then be connected to a USB port of a computer as described above. Once data transfer is complete, the USB connector 4324 is removed from the computer and the connector is pivoted back into the slot 4313 of the housing 4316 wherein the USB connector 4324 is completely contained within the housing 4316 as is shown in FIG. 293. It is understood that the distal end 4328 of the USB connector 4324 may have a gripping member thereon wherein a user could grasp the USB connector 4324 with a finger to pivot. The gripping member could take various forms such as a small protrusion or textured surface. It is further contemplated that a magnetic connection could be used between the housing 4316 and USB connector 4324 wherein the USB connector 4324 could be pushed further into the housing 4316 such that the USB connector 4324 would be then be forced back partially out of the housing 4316 where the USB connector 4324 could then be further pivoted out of the housing 4316. Operation of the watch 4310 is identical as described above.

Figure 299:
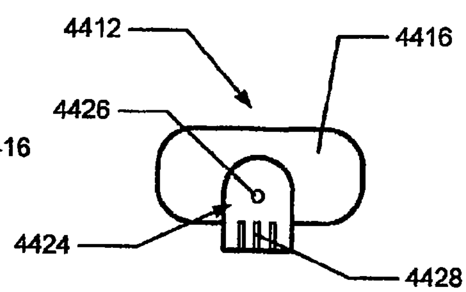

FIGS. 295-299 disclose another embodiment of the watch generally designated with the reference numeral 4410. The watch 4410 has an electronic module 4412 removably connected to a wristband 4414. This embodiment has a USB connector 4412 integrated with the housing 4416 of the electronic module 4412. The electronic module 4412 may have a slot 4480 positioned in a bottom portion of the housing 4416. The slot 4480 may have an opening at a side portion of the housing 4416 and extends into the housing 4416. The electronic module 4412 has the USB connector 4424 operably coupled to the electrical components of the module 4412. The USB connector 4424 has a base 4426 that is pivotally or hingedly connected to the housing 4416 of the electronic module 4412. The USB connector 4424 has a distal end 4428 extending from the base 4426 that supports to the leads that make up the USB connection. As discussed, the electronic module 4412 has the same user interface as described above and operates in similar fashion as described above. To transfer data, the user must first remove the electronic module 4412 from the wristband 4414. The electronic module 4412 may be connected to the wristband 4414 as previously described through the use of an interference fit or a cooperative structure connection. Once the electronic module 4412 is removed, the user pivots the USB connector 4412 about the pivotal connection wherein the distal end 4428 of the USB connector 4428 extends generally transversely from the electronic module 4412 as shown in FIG. 299. The USB connector 4424 can then be connected to a USB port of a computer as described above. Once data transfer is complete, the USB connector 4424 is removed from the computer and the USB connector 4424 is pivoted back into the slot 4480 of the housing 4416 wherein the USB connector 4424 is completely contained within the housing 4416. The user may then re-attach the electronic module 4412 to the wristband 4414. It is understood that the distal end 4428 of the USB connector 4424 may have a gripping member thereon wherein a user could grasp the USB connector 4424 with a finger to pivot. The gripping member could take various forms such as a small protrusion or textured surface. It is further contemplated that a magnetic connection could be used between the housing 4416 and USB connector 4424 wherein the USB connector 4424 could be pushed further into the housing 4416 such that the USB connector 4424 would be then be forced back partially out of the housing 4416 where the USB connector 4424 could then be further pivoted out of the housing 4416. Operation of the watch 4410 is identical as described above.

Figure 300:
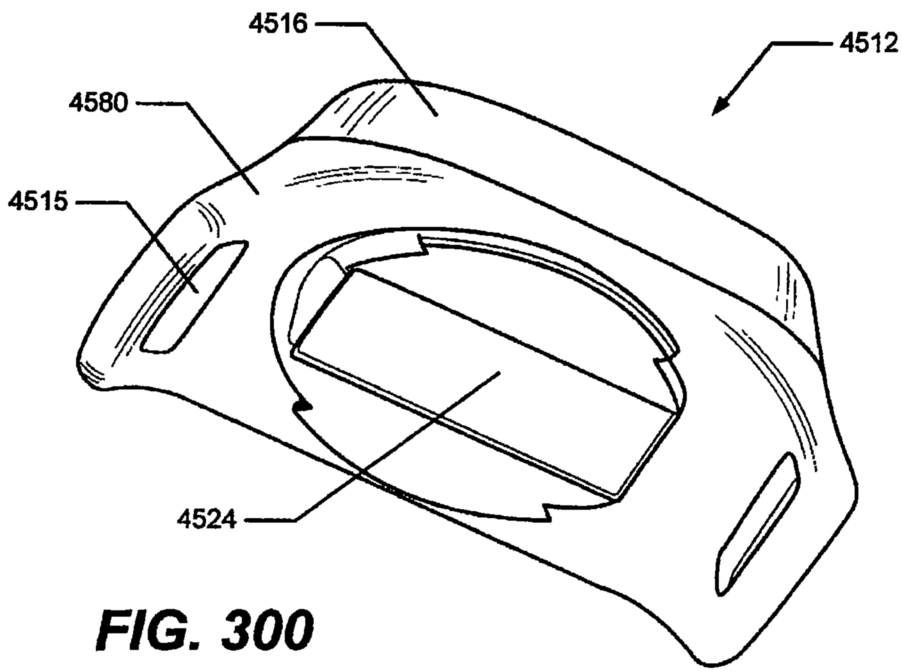

FIG. 300 discloses another embodiment of the watch generally designated with the reference numeral 4510. The watch 4510 has an electronic module 4512 that is removably connected to a carrier 4580 by an interference fit or a cooperative structure connection between the electronic module 4512 and the carrier 4580. As shown in FIG. 300, the electronic module 4512 may have tabs that interconnect with tabs on the carrier 4580. Additionally, the carrier 4580 may be connected to a wristband through the slots 4515 on each of the ends of the carrier 4580. This embodiment has a USB connector 4524 integrated with the housing 4516 of the electronic module 4512. The electronic module 4512 may have a slot positioned in a bottom portion of the housing 4516. The USB connector 4524 may have a base that is pivotally or hingedly connected to the housing 4516 of the electronic module 4512. The USB connector 4524 may have a distal end extending from the base that supports to the leads that make up the USB connection. As discussed, the electronic module 4512 has the same user interface as described above and operates in similar fashion as described above.

To transfer data, the user must first remove the electronic module 4512 from the carrier 4580. To remove the electronic module 4512 from the carrier 4580, the user may twist or rotate the electronic module 4512 counter-clockwise to release the electronic module 4512. Once the electronic module 4512 is removed, the user pivots the USB connector 4524 about the pivotal connection wherein the distal end of the USB connector 4524 extends generally perpendicular from the electronic module 4512. The USB connector 4524 can then be connected to a USB port of a computer as described above. Once data transfer is complete, the USB connector 4524 is removed from the computer and the USB connector 4524 is pivoted back into the slot of the housing 4516 wherein the USB connector 4524 is completely contained within the housing 4516. The user may then re-attach the electronic module 4512 to the carrier by twisting or rotating the electronic module 4512 clockwise onto the carrier 4580 until the tabs on both the electronic module 4512 and the carrier 4580 interconnect and lock the electronic module 4512 onto the carrier 4580. It is understood that the distal end of the USB connector 4524 may have a gripping member thereon wherein a user could grasp the USB connector 4524 with a finger to pivot. The gripping member could take various forms such as a small protrusion or textured surface. It is further contemplated that a magnetic connection could be used between the housing 4516 and USB connector 4524 wherein the USB connector 4524 could be pushed further into the housing 4516 such that the USB connector 4524 would be then be forced back partially out of the housing 4516 where the USB connector 4524 could then be further pivoted out of the housing 4516. It is also noted that the USB operation may be completed with the electronic module 4512 still attached to the carrier 4580, as the USB connector 4524 may be extended without removing the electronic module 4512 from the carrier 4580. Operation of the watch is identical as described above.

Figure 301:
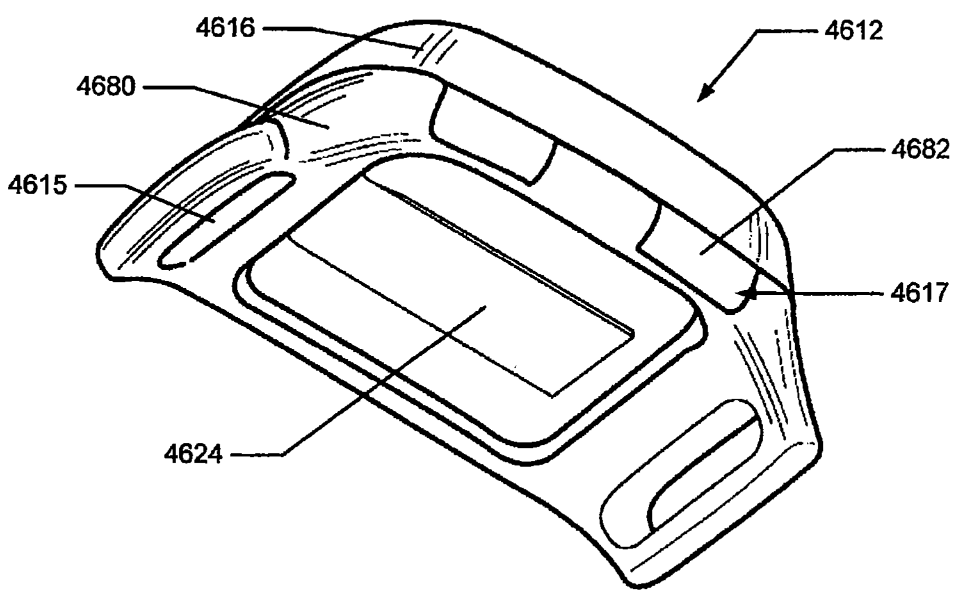

In a similar embodiment to FIG. 300, FIG. 301 discloses another embodiment of the watch generally designated with the reference numeral 4610. The watch 4610 has an electronic module 4612 that is removably connected to a carrier 4680 by an interference fit or a cooperative structure connection between the electronic module 4612 and the carrier 4680. As shown in FIG. 301, the carrier 4680 may have arms 4682 that extend perpendicular to the bottom of the carrier 4680. Additionally, the housing 4616 of the electronic module 4612 may have slots 4617 in which the ends of the arms 4682 of the carrier 4680 interconnect with to help keep the electronic module 4612 connected within the carrier 4680. Additionally, the carrier 4680 may be connected to a wristband through the slots 4615 on each of the ends of the carrier 4680. This embodiment has a USB connector 4624 integrated with the housing 4616 of the electronic module 4612. The electronic module 4612 may have a slot positioned in a bottom portion of the housing 4616. The USB connector 4624 has a base that is pivotally or hingedly connected to the housing 4612 of the electronic module 4624. The USB connector 4624 has a distal end extending from the base that supports the leads that make up the USB connection 4624. As discussed, the electronic module 4612 has the same user interface as described above and operates in similar fashion as described above.

To transfer data, the user must first remove the electronic module 4612 from the carrier 4680. To remove the electronic module 4612 from the carrier 4680, the user may press one of the sides of the electronic module 4612 to peel the electronic module 4612 away from the carrier 4680, essentially disengaging the arms 4682 from the electronic module 4612. Once the electronic module 4612 is removed, the user pivots the USB connector 4624 about the pivotal connection wherein the distal end of the USB connector 4624 extends generally perpendicular from the electronic module 4612. The USB connector 4624 can then be connected to a USB port of a computer as described above. Once data transfer is complete, the USB connector 4624 is removed from the computer and the USB connector 4624 is pivoted back into the slot of the housing 4616 wherein the USB connector 4624 is completely contained within the housing 4616. The user may then re-attach the electronic module 4612 to the carrier 4680 by placing the electronic module 4612 on the carrier 4680 and pressing the electronic module 4612 into place by snapping it into the arms 4682 of the carrier 4680. It is understood that the distal end of the USB connector 4624 may have a gripping member thereon wherein a user could grasp the USB connector 4624 with a finger to pivot. The gripping member could take various forms such as a small protrusion or textured surface. It is further contemplated that a magnetic connection could be used between the housing 4616 and USB connector 4624 wherein the USB connector 4624 could be pushed further into the housing 4616 such that the USB connector 4624 would be then be forced back partially out of the housing 4616 where the USB connector 4624 could then be further pivoted out of the housing 4616. It is also noted that the USB operation may be completed with the electronic module 4612 still attached to the carrier, as the USB connector 4624 may be extended without removing the electronic module 4612 from the carrier 4680. Operation of the watch is identical as described above.

Figure 303:
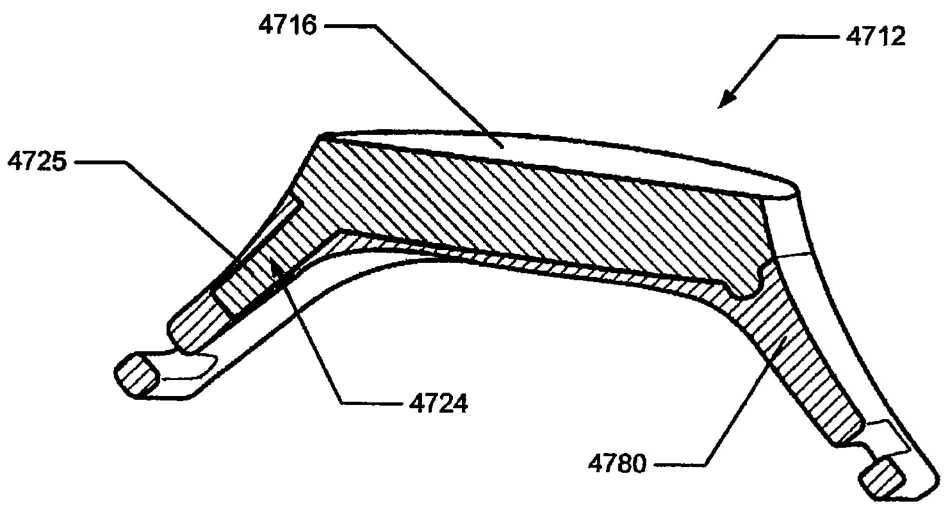
Figure 302:
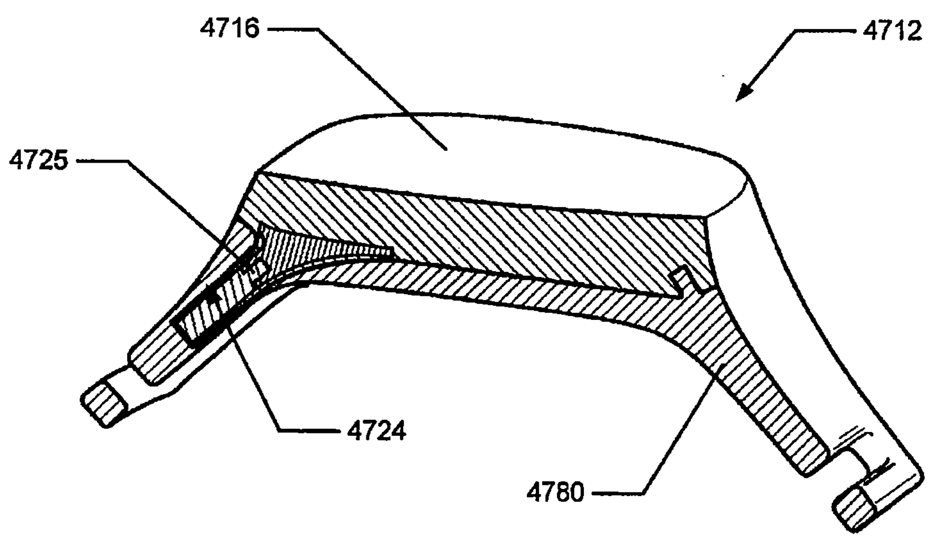

FIGS. 302-303 disclose an embodiment of the watch generally designated with the reference numeral 4710. The structure of the watch is very similar to the watch 10 of FIG. 1. For the embodiment in FIG. 302, the electronic module 4712 has a data transfer member 4724 in the form of a USB connector 4725 that is rigid with respect to the housing 4716 of the electronic module 4724. For the embodiment in FIG. 222, the electronic module 4712 has a data transfer member 4724 in the form of a USB connector 4725 that is flexible with respect to the housing 4716 of the electronic module 4712. As is shown in FIGS. 302-303, the electronic module 4712 is removably connected to a wristband by a cooperative structure connection. To transfer data, the user removes the electronic module 4712 from the wristband by pulling the electronic module 4712 off the wristband and disengaging the cooperative structure connection. Once the electronic module 4712 is removed, the USB connector 4725 can then be connected to a USB port of a computer as described above. Once data transfer is complete, the USB connector 4725 is removed from the computer. The user may then re-attach the electronic module 4712 to the wristband by placing the electronic module 4712 on the carrier 4780 and pressing the electronic module 4712 into place by snapping it into wristband. Operation of the watch is identical as described above.

Figure 224:
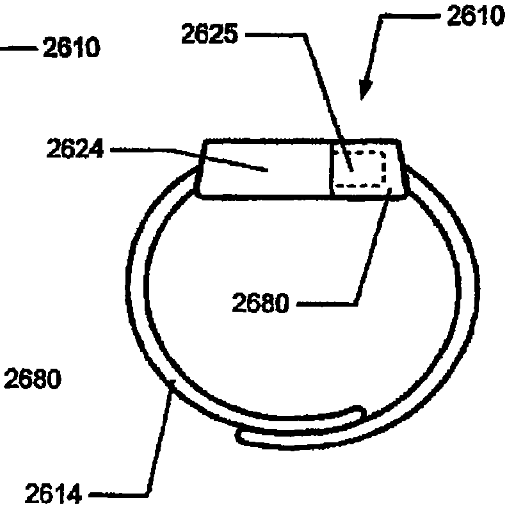
Figure 226:
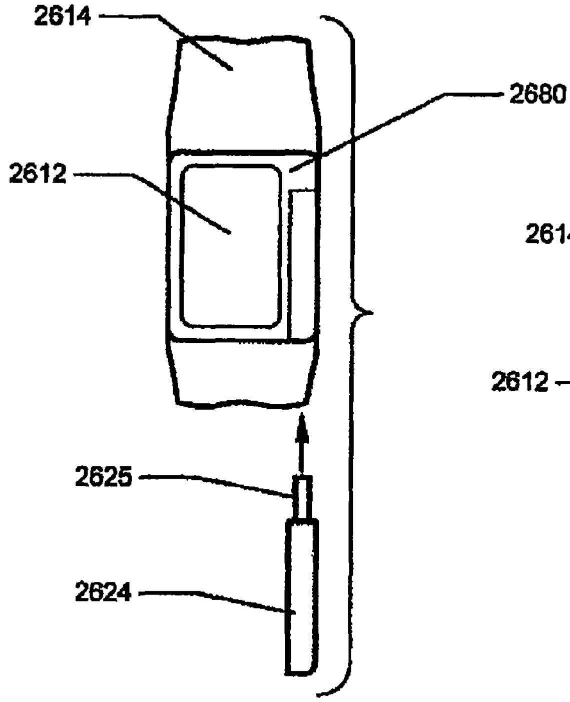
Figure 225:
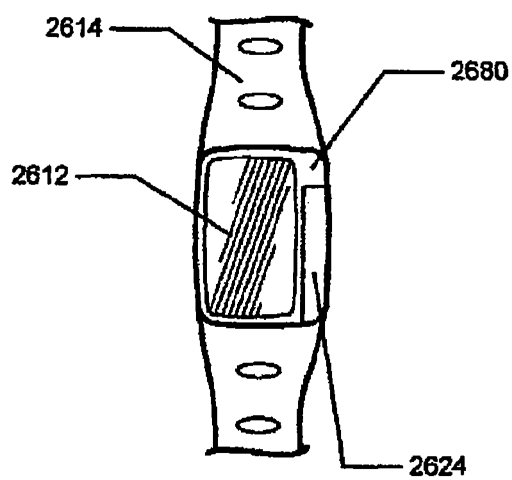
Figure 304:
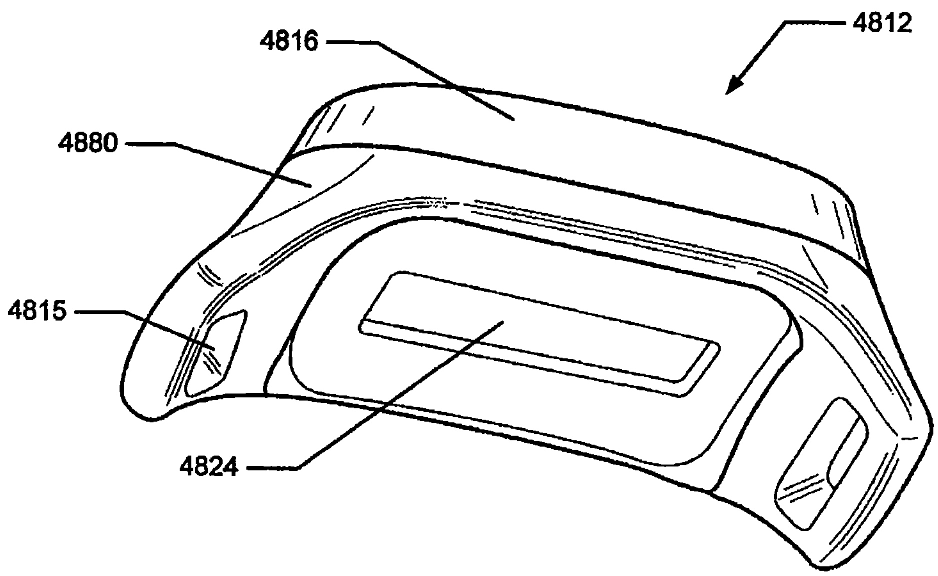
Figure 305:
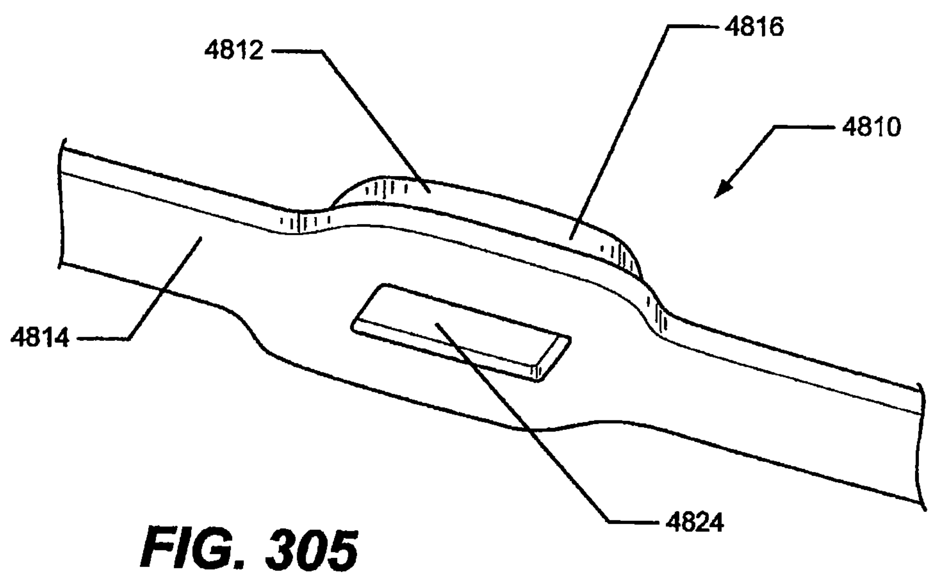

FIGS. 304-305 disclose another embodiment of the watch generally designated with the reference numeral 4810. In FIG. 304, the watch has an electronic module 4812 that is removably connected to a carrier 4880 by an interference fit or a cooperative structure connection between the electronic module 4812 and the carrier 4880. Additionally, the carrier 4880 may be connected to a wristband through a slot 4815 on each end of the carrier 4880. In FIG. 224, the watch has an electronic module 4812 that is removably connected to the wristband 4814. For both FIGS. 304 and 305, the housing 4816 of the electronic module 4812 may have two arms that extend from the bottom of the housing 4816. The arms are flexible enough to slightly bend inward. The arms have wings that will cooperatively engage with the edges of an opening in either the carrier 4880 (for FIG. 304) or the wristband 4814 (for FIG. 305). This embodiment has a USB connector 4824 integrated with the housing 4816 of the electronic module 4812. The electronic module 4812 may have a slot 4826 positioned in a bottom portion of the housing. The USB connector 4824 has a base that is pivotally or hingedly connected to the housing 4816 of the electronic module 4824. The USB connector 4824 has a distal end extending from the base that supports the leads that make up the USB connection. As discussed, the electronic module 4812 has the same user interface as described above and operates in similar fashion as described above.

To transfer data, the user must first remove the electronic module 4812 from the carrier 4880 or the wristband 4814. To remove the electronic module 4812 from the carrier 4880 or the wristband 4814, the user may inwardly press on each of the arms to disengage the wings from edges of the opening, and then pull the electronic module 4812 away from the carrier 4880 or wristband 4814. Once the electronic module 4812 is removed, the user pivots the USB connector 4824 about the pivotal connection wherein the distal end of the USB connector 4824 extends generally perpendicular from the electronic module 4812. The USB connector 4824 can then be connected to a USB port of a computer as described above. Once data transfer is complete, the USB connector 4824 is removed from the computer and the USB connector 4824 is pivoted back into the slot of the housing 4816 wherein the USB connector 4824 is completely contained within the housing 4816. The user may then re-attach the electronic module 4812 to the carrier 4880 by placing the electronic module 4812 on the carrier 4880 or the wristband 4814 and pressing the electronic module 4812 into place by snapping it into the opening of the carrier 4880 or the wristband 4814. It is understood that the distal end of the USB connector 4824 may have a gripping member thereon wherein a user could grasp the USB connector 4824 with a finger to pivot. The gripping member could take various forms such as a small protrusion or textured surface. It is further contemplated that a magnetic connection could be used between the housing 4816 and USB connector 4824 wherein the USB connector 4824 could be pushed further into the housing 4816 such that the USB connector 4824 would be then be forced back partially out of the housing 4816 where the USB connector 4824 could then be further pivoted out of the housing 4816. It is also noted that the USB operation may be completed with the electronic module 4812 still attached to the carrier 4880 or wristband 4814, as the USB connector 4824 may be extended without removing the electronic module 4812 from the carrier 4880. Operation of the watch is identical as described above.

Figure 306:
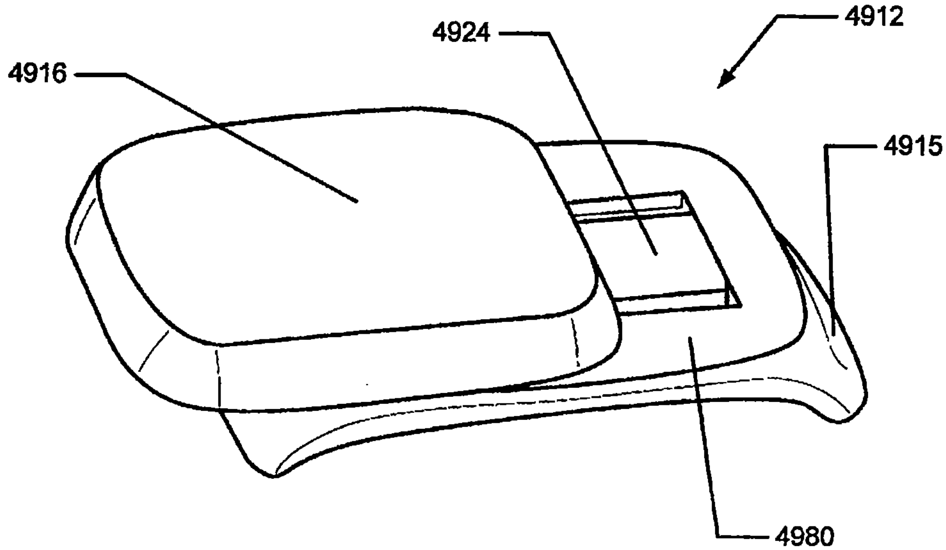

FIG. 306 discloses another embodiment of the watch generally designated with the reference numeral 4910. The watch has an electronic module 4912 that is removably connected to a carrier 4980 by a sliding cooperative structure connection between the electronic module 4912 and the carrier 4980. Additionally, the carrier 4980 may be connected to a wristband through a slot 4915 on each end of the carrier 4980. This embodiment has a USB connector 4924 connected with the housing 4916 of the electronic module 4912. The carrier 4980 may have a slot positioned in the top portion of the carrier 4980. As discussed, the electronic module 4912 has the same user interface as described above and operates in similar fashion as described above.

To transfer data, the user must first remove the electronic module 4912 from the carrier 4980. To remove the electronic module 4912 from the carrier 4980, the user may slide the electronic module 4912 laterally back disengaging it from the sliding cooperative structure on the carrier 4980. This sliding action reveals the USB connector 4924. The user may then remove the electronic module 4912 from the carrier 4980 by pulling it away from the carrier 4980. Once the electronic module 4912 is removed, the USB connector 4924 can then be connected to a USB port of a computer as described above. Once data transfer is complete, the USB connector 4924 is removed from the computer and the USB connector 4924 is placed back into the slot of the carrier 4980 wherein the USB connector 4924 is completely contained within the carrier 4980. The user may then re-attach the electronic module 4912 to the carrier 4980 by sliding the electronic module 4912 forward and back into place. Operation of the watch is identical as described above.

Figure 307:
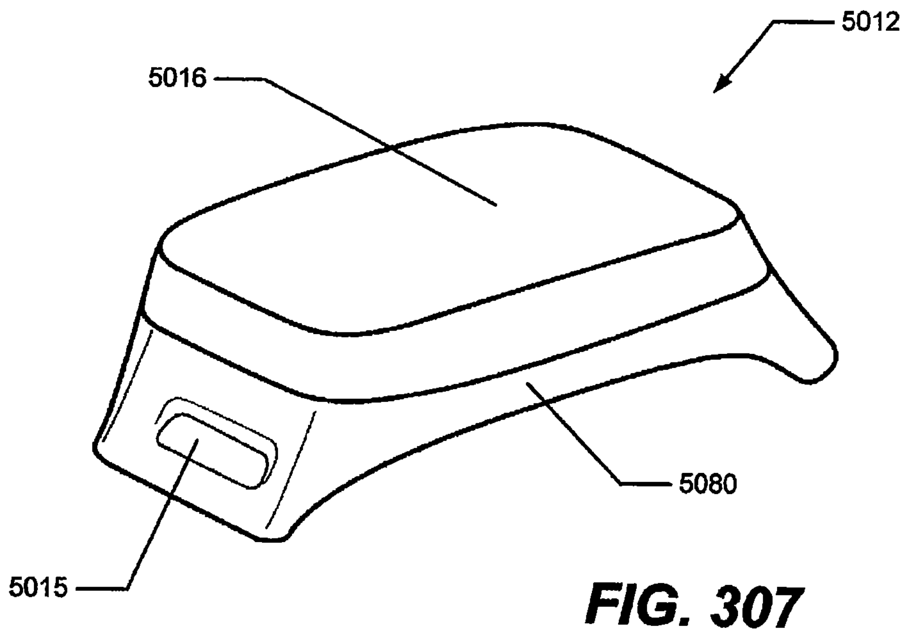

FIG. 307 discloses another embodiment of the watch generally designated with the reference numeral 5010. The watch has an electronic module 5012 that is removably connected to a carrier 5080 by a cooperative structure spring-release connection between the electronic module 5012 and the carrier 5080. The electronic module 5012 has a push-button located on either the top or bottom which engages or disengages the spring-release connection. Additionally, the carrier 5080 may be connected to a wristband through a slot 5015 on each end of the carrier 5080. This embodiment has a USB connector (not shown) integral within the housing 5016 of the electronic module 5012. The housing 5016 may have a slot positioned in the bottom portion of the housing 5016. As discussed, the electronic module 5012 has the same user interface as described above and operates in similar fashion as described above.

To transfer data, the user must remove the electronic module 5012 from the carrier 5080. To remove the electronic module 5012 from the carrier 5080, the user may press the push-button, which will release the electronic module 5012 while also automatically flipping out the USB connection (not shown). Once the electronic module 5012 is removed, the USB connector can then be connected to a USB port of a computer as described above. Once data transfer is complete, the USB connector is removed from the computer and the USB connector is placed back into the slot of the housing 5016 wherein the USB connector is completely contained within the carrier 5080. The user may then place the top of the electronic module 5012 in the carrier 5080 and press the heel down into the carrier 5080, snapping the electronic module 5012 into place with the cooperative spring-release connection. Operation of the watch is identical as described above.

Figure 308:
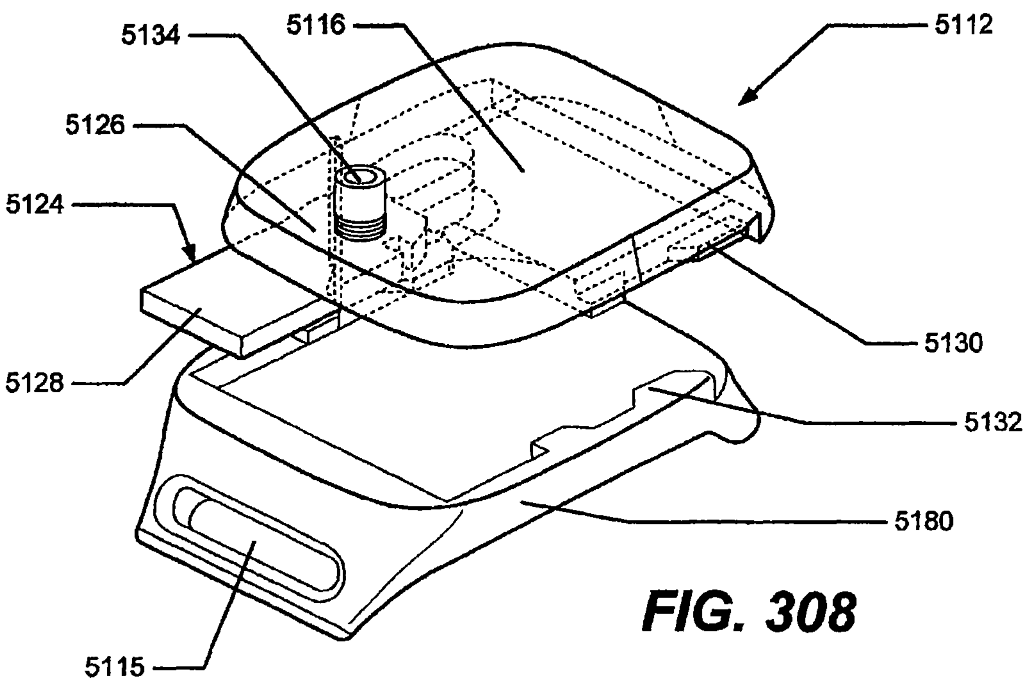

FIG. 308 discloses another embodiment of the watch generally designated with the reference numeral 5110. The watch has an electronic module 5112 that is removably connected to a carrier 5180 by a cooperative structure between the electronic module 5112 and the carrier 5180. The cooperative structure may include a first set of tabs 5130 on both the sides of the electronic module 5112 and a second set of tabs 5132 on the sides of a cavity on the carrier 5180. The electronic module 5112 has a push-button 5134 located on one of the sides of the electronic module 5112 which engages or disengages the spring-release for an USB connector 5124. Additionally, the carrier 5180 may be connected to a wristband through a slot 5115 on each end of the carrier 5180. This embodiment has the USB connector 5124 integral within the housing 5116 of the electronic module 5112. The housing 5116 may have an area positioned in the bottom portion of the housing 5116. The USB connector 5124 has a base 5126 that is pivotally or hingedly connected to the housing of the electronic module. The USB connector has a distal end 5128 extending from the base 5126 that supports to the leads that make up the USB connection. As discussed, the electronic module 5112 has the same user interface as described above and operates in similar fashion as described above.

To transfer data, the user must remove the electronic module 5112 from the carrier 5180. To remove the electronic module 5112 from the carrier 5180, the user must slide the electronic module 5112 from the carrier 5180, thereby disengaging the tabs from the electronic module 5112 from the carrier 5180. Once the electronic module 5112 is removed, the user then may press the push-button 5134, which releases the USB connector 5124 and pivots the USB connector 5124 about the pivotal connection wherein the distal end 5128 of the USB connector 5124 extends generally transversely from the electronic module 5112. The USB connector 5124 can then be connected to a USB port of a computer as described above. Once data transfer is complete, the USB connector 5124 is removed from the computer and the USB connector 5124 is pivoted back into the slot of the housing 5116 wherein the USB connector 5124 is completely contained within the housing 5116. Operation of the watch is identical as described above.

FIG. 309 discloses another embodiment of the watch generally designated with the reference numeral 5210. The watch has an electronic module 5210 that is removably connected to a carrier 5280 by a rotatable cooperative structure between the electronic module 5210 and the carrier 5280. The rotatable cooperative structure may include a first set of tabs 5230 on a circular plane on the carrier 5280 and a second set of tabs 5232 on a circular plane on the electronic module 5212. Additionally, the carrier 5280 may be connected to a wristband through a slot 5215 on each end of the carrier 5280. This embodiment has the USB connector 5224 attached to the housing 5216 of the electronic module 5212. The carrier 5280 may have a slot positioned in the upper portion of the carrier 5280 for the USB connector 5224. The USB connector 5224 has a base 5226 that is pivotally or hingedly connected to the carrier 5228. The housing 5216 is also pivotally or hingedly connected at the same point to the carrier 5280. The USB connector 5224 has a distal end 5228 extending from the base 5226 that supports the leads that make up the USB connection. As discussed, the electronic module 5212 has the same user interface as described above and operates in similar fashion as described above.

To transfer data, the user must remove the electronic module 5212 from the carrier 5280. To remove the electronic module 5212 from the carrier 5280, the user rotates the side away from the hinged connection point approximately 90 degrees or more. This rotation will disengage the tabs 5230 5232 from the circular plane on the electronic module 5212 and the carrier 5280, while keeping the USB connector 5224 in the same location. The user can then remove the electronic module 5212 from the carrier 5280, wherein the distal end 5228 of the USB connector 5224 is already extended generally transversely from the electronic module 5212. The USB connector 5224 can then be connected to a USB port of a computer as described above. Once data transfer is complete, the USB connector 5224 is removed from the computer and the USB connector 5224 is placed in the slot in the carrier 5280 and the electronic module 5212 is rotated back. Operation of the watch is identical as described above.

The various embodiments of the device of the present invention provides enhanced functionality in recording and monitoring athletic performance data. Data can regularly be uploaded to the computer as well as the Remote Site as described herein. In addition, data from the Remote Site can be downloaded to the device wherein the user can take the Remote Site with the user. The housing provides for a robust wearable watch. The housing structure can absorb the shocks and impacts of running such that the controller can operate smoothly. Additionally, the housing structure prevents debris, water, perspiration or other moisture from ingress into the interior of the housing where it could contaminate the controller and adversely affect operability. In one exemplary embodiment, the housing is water-resistant to approximately five atmospheres of pressure. The user interface configuration provides simple and easy operation of the watch, particularly the tri-axis configuration. The user can easily perform functions such as using the shock sensor and, in particular, mark laps by tapping the front face or crystal of the device. With such an easy operation, the user can focus on the athletic performance rather than to locate a proper user input on the watch. The user interface provides many features as described herein to provide enhanced operability of the device.

While the specific embodiments have been illustrated and described, numerous modifications come to mind without significantly departing from the spirit of the invention and the scope of protection is only limited by the scope of the accompanying Claims.

What is claimed is:

1. A device for monitoring athletic performance of a user, the device comprising:
- a wristband configured to be worn by the user; and
- an electronic module removably attached to the wristband, the electronic module having a controller, the electronic module further having a plurality of user inputs operably associated with the controller, the plurality of user inputs including a first user input operable along an x-axis direction, and a second user input operable along a y-axis direction, and a third user input operable along a z-axis direction, wherein the electronic module has a screen and the wherein the third user input comprises a sensor operably connected to the controller wherein the sensor is activated by the user tapping the screen, and further wherein the third input is activated by tapping the screen at a first force to provide a first signal and the third input is activated by tapping the screen at a second force to provide a second signal, the second force being different than the first force.

2. The device of claim 1 wherein the electronic module has a housing and the first user input comprises a first button operably connected to the controller and positioned on a side portion of the housing.

3. The device of claim 1 wherein the electronic module has a housing and the second user input comprises a second button operably connected to the controller and positioned on an end portion of the housing.

4. The device of claim 1 wherein the electronic module has a housing and the first user input comprises a first button operably connected to the controller and positioned on a side portion of the housing, and wherein the second user input comprises a second button operably connected to the controller and positioned on an end portion of the housing, and wherein the electronic module has a screen and the wherein the third user input comprises a sensor operably connected to the controller wherein the sensor is activated by the user tapping the screen.

5. The device of claim 1 wherein the electronic module has a USB connector.

6. The device of claim 5 wherein upon the electronic module being removed from the wristband, the USB connector is configured to be plugged into a USB port of a computer wherein data can be transferred from the electronic module to a remote site and wherein data from the remote site can be transferred to the electronic module.

7. The device of claim 1 wherein the sensor is an accelerometer.

8. The device of claim 7 wherein the accelerometer is a three axis accelerometer.

9. The device of claim 1 wherein the sensor is positioned within the housing proximate a periphery of the housing.

10. The device of claim 1 wherein the sensor is positioned within the housing proximate a center of the housing.

11. The device of claim 1 wherein one of the wristband and the electronic module has a protrusion and the other of the wristband and the electronic module has an aperture wherein the protrusion is removably received in the aperture to connect the electronic module to the wristband.

12. The device of claim 1 wherein the wristband has a sleeve with an opening, and wherein the electronic module has a USB connector, the USB connector being received by the sleeve through the opening.

13. The device of claim 12 wherein the sleeve encompasses the USB connector.

14. The device of claim 13 wherein the sleeve is positioned proximate a central portion of the wristband.

15. The device of claim 1 wherein the controller of the electronic module has athletic functionality.

16. The device of claim 15 wherein the athletic functionality includes recording and monitoring athletic performance data.

17. The device of claim 16 wherein the data includes at least one of time, distance and speed.

18. The device of claim 17 wherein the controller is configured to receive data from a sensor operably associated with a user.

19. The device of claim 1 wherein the electronic module has a USB connector configured to be plugged into a USB port of a computer wherein data stored on the electronic module can be displayed on the computer.

20. The device of claim 19 where in response to plugging the electronic module into the computer, data stored on the electronic module is automatically uploaded to a remote website for display.

21. The device of claim 18 wherein the controller has a display and wherein the controller is configured to display athletic performance data in seven separate segments, each segment representing a day of the week.

22. The device of claim 1 wherein the electronic module has a GPS receiver adapted to receive data from a GPS satellite for use in monitoring of athletic performance of the user.

23. A device for monitoring athletic performance of a user, the device comprising:

a wristband configured to be worn by the user; and an electronic module attached to the wristband, wherein the electronic module has a controller with athletic functionality that includes recording and monitoring athletic data that includes at least one of time, distance, and speed, wherein the electronic module has a plurality of user inputs operably associated with the controller, the plurality of user inputs including a first user input operable along an x-axis direction, and a second user input operable along a y-axis direction, and a third user input operable along a z-axis direction, and further wherein the electronic module has a housing and a screen, wherein the third user input comprises a sensor operably connected to the controller wherein the sensor is activated by the user tapping the screen, wherein the third user input is activated by tapping the screen at a first force to provide a first signal and the third input is activated by tapping the screen at a second force to provide a second signal, the second force being different than the first force, and wherein a first end of the wristband forms a USB connector with a plurality of leads located at a distal end of the first end.

24. The device of claim 23 wherein the electronic module has a controller and a screen and a plurality of user inputs operably associated with the controller, and wherein the controller is configured to generate an interface comprising a time of day displayed in conjunction with a workout summary comprising a plurality of workouts performed over a predefined time period.

25. The device of claim 24 wherein the workout summary includes a day-by-day breakdown of the workouts performed over the predefined time period.

26. The device of claim 25, wherein each of the plurality of workouts is represented by a progress bar indicating an target workout amount and an actual workout amount.

27. The device of claim 25 wherein the controller is configured to display the breakdown of the workouts in an animated configuration.

28. The device of claim 24 wherein the user inputs include a user input configured to be applied by the user against the screen and in a direction generally normal to the screen.

29. The device of claim 23 wherein the first end of the wristband includes a cover member positioned proximate to the distal end of the first end, and wherein the cover member is hingedly connected to the wristband proximate the distal end such that the cover member covers the USB connector at the distal end.

30. The device of claim 29 wherein the cover member has a recessed portion that is configured to receive the USB connector at the distal end.

31. The device of claim 30 wherein the cover member has at least one protrusion located on an inside surface of the cover member.

32. The device of claim 31 wherein a second end of the wristband has a plurality of holes.

33. The device of claim 32 wherein the at least one protrusion is received in respective holes of the plurality of holes of the second end of the wristband to fasten the first end with the second end.

34. The device of claim 29 wherein the cover member is moveable between a first position and a second position.

35. The device of claim 34 wherein in the first position, the cover member covers the USB connector at the distal end.

36. The device of claim 35 wherein in the second position, the cover member exposes the leads of the USB connector by pivoting the cover member away from the distal end.

37. The device of claim 36 wherein in the second position, the USB connector is configured to be plugged into a USB port of a computer wherein data stored on the electronic module can be displayed on the computer.

38. The device of claim 37 wherein in response to plugging the electronic module into the computer, data stored on the electronic module is automatically uploaded to a remote website for display.

39. The device of claim 23 wherein the controller has a display and wherein the controller is configured to display athletic performance data in seven separate segments, each segment representing a day of the week.

40. The device of claim 23 wherein the sensor is an accelerometer.

41. The device of claim 40 wherein the accelerometer is a three axis accelerometer.

42. The device of claim 23 wherein the sensor is positioned within the housing proximate a periphery of the housing.

43. The device of claim 23 wherein the sensor is positioned within the housing proximate a center of the housing.

44. The device of claim 23 wherein the controller is configured to receive data from a sensor operably associated with a user.

45. The device of claim 23 wherein the electronic module has a GPS receiver adapter to receive data from a GPS satellite for use in monitoring of athletic performance of the user.

46. A device for monitoring athletic performance of a user, the device comprising:

a wristband configured to be worn by the user; and an electronic module removably attached to the wristband, the electronic module having a controller, the electronic module further having a plurality of user inputs operably associated with the controller, the plurality of user inputs including a first user input operable along an x-axis direction, and a second user input operable along a y-axis direction, and a third user input operable along a z-axis direction, and wherein the controller of the electronic module is configured to receive data from a sensor operably associated with a user, and the controller has athletic functionality that includes recording and monitoring athletic performance data including at least one of time, distance and speed, and further wherein the controller has a display and wherein the controller is configured to display athletic performance data in seven separate segments, each segment representing a day of the week.

47. The device of claim 46 wherein the electronic module has a housing and the first user input comprises a first button operably connected to the controller and positioned on a side portion of the housing.

48. The device of claim 46 wherein the electronic module has a housing and the second user input comprises a second button operably connected to the controller and positioned on an end portion of the housing.

49. The device of claim 46 wherein the electronic module has a screen and the wherein the third user input comprises a sensor operably connected to the controller wherein the sensor is activated by the user tapping the screen.

50. The device of claim 46 wherein the electronic module has a housing and the first user input comprises a first button operably connected to the controller and positioned on a side portion of the housing, and wherein the second user input comprises a second button operably connected to the controller and positioned on an end portion of the housing, and wherein the electronic module has a screen and the wherein the third user input comprises a sensor operably connected to the controller wherein the sensor is activated by the user tapping the screen.

51. The device of claim 46 wherein the electronic module has a USB connector.

52. The device of claim 51 wherein upon the electronic module being removed from the wristband, the USB connector is configured to be plugged into a USB port of a computer wherein data can be transferred from the electronic module to a remote site and wherein data from the remote site can be transferred to the electronic module.

53. The device of claim 49 wherein the third input is activated by tapping the screen at a first force to provide a first signal and the third input is activated by tapping the screen at a second force to provide a second signal, the second force being different than the first force.

54. The device of claim 49 wherein the sensor is an accelerometer.

55. The device of claim 54 wherein the accelerometer is a three axis accelerometer.

56. The device of claim 49 wherein the sensor is positioned within the housing proximate a periphery of the housing.

57. The device of claim 49 wherein the sensor is positioned within the housing proximate a center of the housing.

58. The device of claim 46 wherein one of the wristband and the electronic module has a protrusion and the other of the wristband and the electronic module has an aperture wherein the protrusion is removably received in the aperture to connect the electronic module to the wristband.

59. The device of claim 46 wherein the wristband has a sleeve with an opening, and wherein the electronic module has a USB connector, the USB connector being received by the sleeve through the opening.

60. The device of claim 59 wherein the sleeve encompasses the USB connector.

61. The device of claim 60 wherein the sleeve is positioned proximate a central portion of the wristband.

62. The device of claim 46 wherein the electronic module has a USB connector configured to be plugged into a USB port of a computer wherein data stored on the electronic module can be displayed on the computer.

63. The device of claim 62 where in response to plugging the electronic module into the computer, data stored on the electronic module is automatically uploaded to a remote website for display.

64. The device of claim 46 wherein the electronic module has a GPS receiver adapted to receive data from a GPS satellite for use in monitoring of athletic performance of the user.

* * * * *